(12) United States Patent
Matsuzaki et al.

(10) Patent No.: US 12,439,917 B2
(45) Date of Patent: Oct. 14, 2025

(54) METHOD FOR CONTROLLING PHAKOPSORA PACHYRHIZI HAVING RESISTANCE AGAINST QOI FUNGICIDE

(71) Applicant: SUMITOMO CHEMICAL COMPANY, LIMITED, Chuo-ku (JP)

(72) Inventors: Yuichi Matsuzaki, Takarazuka (JP); Takaaki Nakano, Kasai (JP); Hidekatsu Tobita, Takarazuka (JP); Hiroto Tamashima, Takarazuka (JP); Keisuke Arai, Takarazuka (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 557 days.

(21) Appl. No.: 17/759,640

(22) PCT Filed: Jan. 29, 2021

(86) PCT No.: PCT/JP2021/003390
§ 371 (c)(1),
(2) Date: Jul. 28, 2022

(87) PCT Pub. No.: WO2021/153782
PCT Pub. Date: Aug. 5, 2021

(65) Prior Publication Data
US 2023/0127143 A1 Apr. 27, 2023

(30) Foreign Application Priority Data
Jan. 31, 2020 (JP) .................................. 2020-015185

(51) Int. Cl.
*A01N 43/32* (2006.01)
*A01N 37/38* (2006.01)
(Continued)

(52) U.S. Cl.
CPC ............. *A01N 43/32* (2013.01); *A01N 37/38* (2013.01); *A01N 37/44* (2013.01); *A01N 37/52* (2013.01);
(Continued)

(58) Field of Classification Search
CPC ........ A01N 43/32; A01N 37/38; A01N 37/44; A01N 37/52; A01N 43/56; A01N 43/88;
(Continued)

(56) References Cited

U.S. PATENT DOCUMENTS

| 4,802,913 A | 2/1989 | Clough et al. |
| 4,913,721 A | 4/1990 | Clough et al. |

(Continued)

FOREIGN PATENT DOCUMENTS

| BO | SP 009-2020 (12925 | 1/2020 |
| DE | 198 34 557 A1 | 2/2000 |

(Continued)

OTHER PUBLICATIONS

International Search Report issued Apr. 6, 2021 in PCT/JP2021/003390 filed Jan. 29, 2021, 4 pages.

(Continued)

*Primary Examiner* — Trevor Love
(74) *Attorney, Agent, or Firm* — Oblon, McClelland, Maier & Neustadt, L.L.P.

(57) ABSTRACT

The present invention provides a method for controlling a soybean rust fungus having an amino acid substitution of F129L on mitochondrial cytochrome b protein. According to the present invention, a compound represented by formula (I) [wherein $R^1$ represents a C1-C3 chain hydrocarbon group and so on, n is 0, 1, 2 or 3, and when is 2 or 3, a plural of $R^2$ may be identical to or different from each other, and $R^2$ represents a C1-C3 chain hydrocarbon group and so on, Q represents a group represented by Q1 (where • represents a binding site to a benzene ring) and so on, $L^1$ represents $CH_2$ or an oxygen atom, and E represents a C1-C6 alkyl group and so on.] can use to control a soybean rust fungus having an amino acid substitution of F129L on mitochondrial cytochrome b protein.

5 Claims, No Drawings

(51) Int. Cl.

| | | |
|---|---|---|
| *A01N 37/44* | (2006.01) | |
| *A01N 37/52* | (2006.01) | |
| *A01N 43/56* | (2006.01) | |
| *A01N 43/88* | (2006.01) | |
| *A01N 47/22* | (2006.01) | |
| *A01P 3/00* | (2006.01) | |
| *C07C 69/54* | (2006.01) | |
| *C07C 251/60* | (2006.01) | |

(52) U.S. Cl.
CPC ............ *A01N 43/56* (2013.01); *A01N 43/88* (2013.01); *A01N 47/22* (2013.01); *A01P 3/00* (2021.08); *C07C 69/54* (2013.01); *C07C 251/60* (2013.01)

(58) Field of Classification Search
CPC A01N 47/22; A01P 3/00; C07C 69/54; C07C 251/60
See application file for complete search history.

(56) References Cited

U.S. PATENT DOCUMENTS

| | | | |
|---|---|---|---|
| 5,124,353 | A | 6/1992 | Clough et al. |
| 5,229,393 | A | 7/1993 | Clough et al. |
| 5,312,960 | A | 5/1994 | Krämer et al. |
| 5,354,779 | A | 10/1994 | Krämer et al. |
| 5,380,914 | A | 1/1995 | Krämer et al. |
| 5,464,809 | A | 11/1995 | Krämer et al. |
| 5,985,919 | A | 11/1999 | Grote et al. |
| 6,337,306 | B1 | 1/2002 | Sasaki et al. |
| 6,489,487 | B1 | 12/2002 | Manabe et al. |
| 6,762,197 | B2 | 7/2004 | Araki et al. |
| 2003/0119670 | A1 | 6/2003 | Araki et al. |
| 2004/0167193 | A1 | 8/2004 | Araki et al. |

FOREIGN PATENT DOCUMENTS

| | | | |
|---|---|---|---|
| JP | 62-48649 | A | 3/1987 |
| JP | 4-230252 | A | 8/1992 |
| JP | 5-279310 | A | 10/1993 |
| JP | 10-21 8839 | A | 8/1998 |
| JP | 11-508227 | A | 7/1999 |
| JP | 11-286472 | A | 10/1999 |
| JP | 2000-103772 | A | 4/2000 |
| JP | 2000-239261 | A | 9/2000 |
| JP | 2001-64237 | A | 3/2001 |
| JP | 2001-114737 | A | 4/2001 |
| JP | 2002-53561 | A | 2/2002 |
| JP | 2018-150363 | A | 9/2018 |
| WO | WO 98/43949 | A1 | 10/1998 |
| WO | WO 99/07687 | A1 | 2/1999 |
| WO | WO 00/41999 | A1 | 7/2000 |
| WO | WO 01/42227 | A1 | 6/2001 |
| WO | WO 2018/097318 | A1 | 5/2018 |
| WO | WO 2020/193387 | A1 | 10/2020 |

OTHER PUBLICATIONS

English translation of International Preliminary Report on Patentability and Written Opinion issued Jul. 28, 2022 in PCT/JP2021/003390, 6 pages.

J. H. Leiminger, et al., "Occurrence of the F129L mutation in *Alternaria solani* populations in Germany in response to QoI application, and its effect on sensitivity," Plant Pathology, vol. 63, 2014, pp. 640-650.

J. S. Pasche, et al., "Effect of the F129L Mutation in *Alternaria solani* on Fungicides Affecting Mitochondrial Respiration," Plant Disease, vol. 89, No. 3, Mar. 2005, pp. 269-278.

Yun-Sik Kim, et al., "Field Resistance to Strobilurin ($Q_oI$) Fungicides in *Pyricularia grisea* Caused by Mutations in the Mitochondrial Cytochrome b Gene," Phytopathology vol. 93, No. 7, 2003, pp. 891-900.

Firuz Odilbekov, et al., "Genetic diversity and occurrence of the F129L substitutions among isolates of *Alternaria solani* in southeastern Sweden," Hereditas, vol. 153, No. 10, 2016, 10 pages.

J. S. Pasche, et al., "Shift in Sensitivity of *Alternaria solani* in Response to $Q_oI$ Fungicides," Plant Disease, vol. 88, No. 2, Feb. 2004, pp. 181-187.

Ana C. Klosowski, et al., "Competitive Fitness of *Phakopsora pachyrhizi* Isolates with Mutations in the CYP51 and CYTB Genes," Phytopathology, vol. 106, No. 11, 2016, pp. 1278-1284.

Ana C Klosowski, et al., "Detection of the F129L mutation in the cytochrome b gene in *Phakopsora pachyrhizi*," Pest. Manag. Science, vol. 72, 2016, pp. 1211-1215.

Hubert Sauter, "13.2 Strobilurins and Other Complex III Inhibitors," Modern Crop Protection Compounds, vol. 2, 2007, 20 pages.

Jean-Paul di Rago, et al., "Molecular Basis for Resistance to Myxothiazol, Mucidin (Strobilurin A), and Stigmatellin," The Journal of Biological Chemistry, vol. 264, No. 24, 1989, pp. 14543-14548.

Pierre Bennoun, et al., "Mitochondrial Genetics of *Chlamydomonas reinhardtii*: Resistance Mutations Marking the Cytochrome b Gene," Genetics, vol. 127, Feb. 1991, pp. 335-343.

Desen Zheng, et al., "Characterization of laboratory mutants of *Venturia inaequalis* resistant to the strobilurin-related fungicide kresoxim-methyl," Current Genetics, vol. 38, 2000, pp. 148-155.

Helena K. Schmitz, et al., "Sensitivity of *Phakopsora pachyrhizi* towards quinone-outside-inhibitors and demethylation-inhibitors, and corresponding resistance mechanisms," Pest Management Science, vol. 70, 2014, pp. 378-388.

Cláudia Vieira Godoy, et al., "Asian soybean rust in Brazil: past, present, and future," Pesq. agropec. bras., Brasilia, vol. 51, No. 5, 2016, pp. 407-421.

Hideo Ishii, "Current Status of QoI Fungicide Resistance," Plant Protection, vol. 69, No. 8, 2015, 15 pages (with English language translation).

METHOD FOR CONTROLLING PHAKOPSORA PACHYRHIZI HAVING RESISTANCE AGAINST QOI FUNGICIDE

CROSS-REFERENCE TO RELATED APPLICATIONS

The present application is a 35 U.S.C. § 371 national stage patent application of International patent application PCT/JP2021/003390, filed on Jan. 29, 2021, which is based on and claims the benefits of priority to Japanese Application No. 2020-015185, filed on Jan. 31, 2020. The entire contents of these applications are incorporated herein by reference.

TECHNICAL FIELD

This application claims priority to and the benefit of Japanese Patent Application No. 2020-015185 filed Jan. 31, 2020, the entire contents of which are incorporated herein by reference.

The present invention relates to a method for controlling soybean rust fungus having an amino acid substitution of F129L on mitochondrial cytochrome b protein.

BACKGROUND ART

The spread of phytopathogenic fungi that shows acquired character being resistant to agricultural fungicides becomes a major problem. Under such circumstances, FRAC (Fungicide Resistance Action Committee) has been established as an organization that provides guidelines for acquiring a resistance to existing agricultural fungicides, and suppressing and delaying the spread of the fungi having the resistance acquired. A variety of information on phytopathogenic fungi that shows a resistance to agricultural fungicides is available on the FRAC-provided website (http://www.frac.info/). It has been known that in the case of a phytopathogenic fungi, the main cause of acquiring a resistance is that a mutation of the phytopathogenic fungal gene encoding the target enzyme of the fungicide causes a partial substitution of amino acids in the target enzyme of the fungicides, which results in reducing the affinity between the fungicides and the target enzyme.

QoI fungicides are named as aliases a strobilurin fungicide, or a methoxyacrylate fungicide because of its characteristic structure. The QoI fungicides are one group of agricultural fungicides that have been widely used to control phytopathogenic fungi including soybean rust fungus. QoI fungicides usually bind to the ubihydroquinone oxidation centers of cytochrome bc1 complex (electron transfer complex III) in mitochondria, and suppress a respiration of the phytopathogenic fungi, which results in killing the phytopathogenic fungi or stopping the growth of the same. The above-mentioned oxidation center is located outside the mitochondrial inner membrane (see Non-patent document 1).

It has been revealed by model studies in the laboratory before QoI fungicides were actually used extensively as agricultural fungicides that phytopathogenic fungi are subjected to a selection pressure by QoI fungicide, which results in easily generating the fungi having a resistance to a QoI fungicide that has acquired a gene mutation that causes a specific single amino acid substitution such as G143A in the cytochrome b gene of the target enzyme cytochrome bc1 complex (see Non-patent documents 2 to 4).

Soybean rust fungus (scientific name: *Phakopsora pachyrhizi*) is a phytopathogenic fungus that causes damages to soybeans. Since QoI fungicides have been widely used for controlling soybean rust disease as agricultural fungicides, an emergence of soybean rust fungi showing a resistance to the QoI fungicides has been reported (see Non-patent document 5).

For soybean rust fungus, a strain which has acquired a gene mutation causing a single amino acid substitution of F129L in the same cytochrome b gene becomes a problem as a resistant fungus against QoI fungicide. The efficacy of the QoI fungicides conventionally used against soybean rust fungi, that is, pyribencarb, azoxystrobin, dimoxystrobin, metominostrobin, fluoxastrobin, kresoxim-methyl and the others, has been reduced to the level of practical problems against the resistant fungi (see Non-patent document 6).

CITATION LIST

Non-Patent Document

Non-Patent Document 1: Sauter, "Modern Crop Protection Compounds", Volume 2, Wiley-VCH Verlag, 2007, p. 457-495: the 13.2 Chapter, Strobilurins and other complex III inhibitors;

Non-Patent Document 2: "Journal of Biological Chemistry", 1989, Volume 264, no.24, p.14543-14548

Non-Patent Document 3: "Genetics", 1991, Volume 127, p.335-343

Non-Patent Document 4: "Current Genetics", 2000, Volume 3, p.148-155

Non-Patent Document 5: "Pest Management Science", 2014, Volume 70, no.3, p.379-388

Non-Patent Document 6: "Pesq. agropec. bras." (Brasilia), 2016, Volume 51, no.5, p.407-421

SUMMARY OF THE INVENTION

Problems to be Solved by Invention

On the basis of these facts, the present invention aims to provide a method for controlling soybean rust fungus having an amino acid substitution of F129L on mitochondrial cytochrome b protein.

Means to Solve Problems

The present invention is as follows.

[1] A method for controlling a soybean rust fungus having an amino acid substitution of F129L on mitochondrial cytochrome b protein, which comprises applying an effective amount of a compound represented by formula (I):

$$\underset{E}{\overset{(R^2)_n}{\text{[structure]}}}\underset{Q}{\overset{R^1}{}} \quad (I)$$

[wherein, $R^1$ represents a C1-C3 chain hydrocarbon group which may be optionally substituted with one or more halogen atoms, a cyclopropyl group, a halogen atom, or a hydrogen atom, n is 0, 1, 2 or 3, when n is 2 or 3, a plural of $R^2$ may be identical to or different from each other, $R^2$ represents a C1-C3 chain hydrocarbon group which may be optionally substituted with one or more halogen atoms, a cyclopropyl group, or a halogen atom, a combination of Q and E represents a combination wherein Q represents a group represented by Q1, and E represents a C1-C6 alkyl group which may be optionally substituted with one or more substituents selected from Group A, a C3-C6 cycloalkyl group which may be optionally substituted with one or more substituents selected from Group C, $OR^4$, $CR^5R^6R^7$, $N=C(R^8)NR^9R^{10}$ or $SR^{11}$; or a combination wherein Q represents a group represented by Q2, a group represented by Q3, a group represented by Q4, a group represented by Q5, or a group represented by Q6, and E represents a C1-C6 alkyl group which may be optionally substituted with one or more substituents selected from Group A, a C3-C6 cycloalkyl group which may be optionally substituted with one or more substituents selected from Group C, $OR^{11}$, $CR^5R^6R^7$, $N=C(R^8)NR^9R^{10}$ or $SR^{11}$, a group represented by Q1, a group represented by Q2, a group represented by Q3, a group represented by Q4, a group represented by Q5, or a group represented by Q6 represents a group represented by the following formulae (where • represents a binding site to a benzene ring),

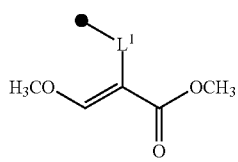

Q1

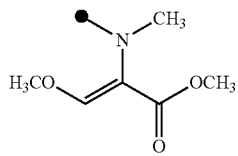

Q2

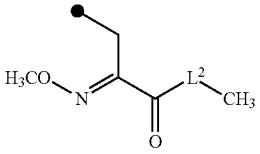

Q3

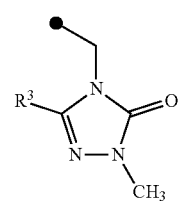

Q4

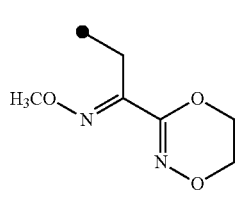

Q5

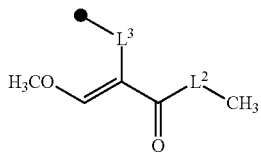

Q6

$L^1$ represents $CH_2$ or an oxygen atom, $L^2$ represents an oxygen atom or NH, $L^3$ represents $CH_2$, an oxygen atom or $NCH_3$, $R^3$ represents a C1-C3 alkoxy group which may be optionally substituted with one or more halogen atoms, or a C1-C3 chain hydrocarbon group which may be optionally substituted with one or more halogen atoms, $R^4$ represents a C6-C10 aryl group, a five- to ten-membered aromatic heterocyclic group {the C6-C10 aryl group and the five- to ten-membered aromatic heterocyclic group may be optionally substituted with one or more substituents selected from Group D}, or a C3-C6 cycloalkyl group which may be optionally substituted with one or more substituents selected from Group B, $R^5$ represents a C1-C3 chain hydrocarbon group or a hydrogen atom, $R^6$ and $R^7$ combine together with a carbon atom to which they are attached to form a 1,3-dioxolan-2-yl group, a 1,3-dioxan-2-yl group, a 1,3-dioxepan-2-yl group, a 1,3-dithiolan-2-yl group, a 1,3-dithian-2-yl group, or a 1,3-dithiepan-2-yl group {the 1,3-dioxolan-2-yl group, the 1,3-dioxan-2-yl group, the 1,3-dioxepan-2-yl group, the 1,3-dithiolan-2-yl group, the 1,3-dithian-2-yl group, and the 1,3-dithiepan-2-yl group may be optionally substituted with one or more substituents selected from Group H}, $R^8$ represents a C1-C3 chain hydrocarbon group which may be optionally substituted with one or more halogen atoms, or a hydrogen atom, $R^9$ represents a C1-C6 chain hydrocarbon group which may be optionally substituted with one or more substituents selected from Group B, a C6-C10 aryl group, a five- to ten-membered aromatic heterocyclic group {the C6-C10 aryl group, and the five- to ten-membered aromatic heterocyclic group may be optionally substituted with one or more substituents selected from Group D}, a C3-C6 cycloalkyl group which may be optionally substituted with one or more substituents selected from Group C, $OR^{11}$, $SR^{11}$, a cyano group, or a hydrogen atom, $R^{10}$ represents a C1-C6 chain hydrocarbon group which may be optionally substituted with one or more substituents selected from Group B, or a hydrogen atom, $R^{11}$ represents a C1-C6 chain hydrocarbon group which may be optionally substituted with one or more substituents selected from Group B, a C3-C6 cycloalkyl group which may be optionally substituted with one or more substituents selected from Group C, a C6-C10 aryl group, a five- to ten-membered aromatic heterocyclic group {the C6-C10 aryl group, and the five- to ten-membered aromatic heterocyclic group may be optionally substituted with one or more substituents selected from Group D}, $R^{16}C(O)—$, $R^{14}OC(O)—$, $R^{13}R^{15}NC(O)—$, $R^{13}R^{15}NC(S)—$, $R^{14}S(O)_2—$ or $R^{13}R^{15}NS(O)_2—$, $R^{13}$ represents a C1-C6 chain hydrocarbon group which may be optionally substituted with one or more substituents selected from Group B, a C3-C6 cycloalkyl group which may be optionally substituted with one or more substituents selected from Group C, a C6-C10 aryl group, a five- to ten-membered aromatic heterocyclic group {the C6-C10 aryl group, and the five- to ten-membered aromatic heterocyclic group may be optionally substituted with one or more substituents selected from Group D}, or a hydrogen atom, $R^{14}$ represents a C1-C6 chain hydrocarbon group which may be optionally substituted with one or more substituents selected from Group B, a C3-C6 cycloalkyl group which may be optionally substituted with one or more substituents selected from Group C, a C6-C10 aryl group, or a five- to ten-membered aromatic heterocyclic group {the C6-C10 aryl group, and the five- to ten-membered aromatic heterocyclic group may be optionally substituted with one or more substituents selected from Group D}, $R^{1b}$ represents a C1-C3 chain hydrocarbon group which may be optionally substituted with one or more halogen atoms, a C1-C3 alkoxy group which may be optionally substituted with one or more halogen atoms, or a hydrogen atom, $R^{16}$ represents a C1-C6 chain hydrocarbon group which may be optionally substituted with one or more substituents selected from Group B, a C3-C6 cycloalkyl group which may be optionally substituted with one or more substituents selected from Group C, a C6-C10 aryl group, a five- to ten-membered aromatic heterocyclic group {the C6-C10 aryl group, and the five- to ten-membered aromatic heterocyclic group may be optionally substituted with one or more substituents selected from Group D}, or a hydrogen atom, $R^{13}$ and $R^{15}$ may combine together with a nitrogen atom to which they are attached to form a three- to eight-membered non-aromatic heterocyclic group {the three- to eight-membered non-aromatic heterocyclic group may be optionally substituted with one or more substituents selected from Group C}, Group A is a group consisting of $OR^{21}$, $S(O)_m R^{23}$, $OS(O)_2 R^{23}$, $C(O)R^{21}$, $C(O)OR^{21}$, $OC(O)R^{21}$, $OC(O)OR^{21}$, $OC(O)NR^{21}R^{22}$, $NR^{21}C(O)NR^{22}R^{23}$, $NR^{21}R^{22}$, $C(O)NR^{21}R^{22}$, $S(O)_2NR^{21}R^{22}$, $NR^{22}C(O)R^{21}$, $NR^{22}C(O)OR^{21}$, $NR^{22}S(O)_2R^{23}$, $C(R^{22})=N-OR^{21}$, $SiR^{24}R^{25}R^{26}$, a C3-C6 cycloalkyl group, a phenyl group, a naphthyl group, a five-to six-membered aromatic heterocyclic group, a three- to eight-membered non-aromatic heterocyclic group {the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from Group F}, an oxo group, a thioxo group, a halogen atom, a cyano group, and a nitro group, $R^{21}$ and $R^{22}$ are identical to or different from each other and represent a C1-C6 chain hydrocarbon group which may be optionally substituted with one or more substituents selected from Group E, a C3-C6 cycloalkyl group which may be optionally substituted with one or more substituents selected from Group F, a C3-C6 cycloalkyl group which may be optionally substituted with one or more substituents selected from Group F, a phenyl group, a naphthyl group, a five- to six-membered aromatic heterocyclic group, a three-to eight-membered non-aromatic heterocyclic group {the phenyl group, the naphthyl group, the five- to six-membered aromatic heterocyclic group, and the three- to eight-membered non-aromatic heterocyclic group may be optionally substituted with one or more substituents selected from Group G}, or a hydrogen atom, $R^{21}$ represents a C1-C6 chain hydrocarbon group which may be optionally substituted with one or more substituents selected from Group E, a C3-C6 cycloalkyl group which may be optionally substituted with one or more substituents selected from Group F, a phenyl group, a naphthyl group, a five- to six-membered aromatic heterocyclic group, or a three- to eight-membered non-aromatic heterocyclic group {the phenyl group, the naphthyl group, the five- to six-membered aromatic heterocyclic group, and the three- to eight-membered non-aromatic heterocyclic group may be optionally substituted with one or more substituents selected from Group G}, $R^{24}$, $R^{25}$ and $R^{26}$ are identical to or different from each other and represent a C1-C6 chain hydrocarbon group or a phenyl group, m is 0, 1 or 2, Group B is a group consisting of $OR^{21}$, $S(O)_m R^{23}$, $OS(O)_2 R^{23}$, $C(O)R^{21}$, $C(O)OR^{21}$, $OC(O)R^{21}$, $OC(O)OR^{21}$, $OC(O)NR^{21}R^{22}$, $NR^{21}C(O)NR^{22}R^{23}$, $NR^{21}R^{22}$, $C(O)NR^{21}R^{22}$, $S(O)_2NR^{21}R^{22}$, $NR^{22}C(O)R^{21}$, $NR^{22}C(O)OR^{23}$, $NR^{22}S(O)_2R^{23}$, $C(R^{22})=N-OR^{21}$, $O-N=CR^{21}R^{23}$, $SiR^{24}R^{25}R^{26}$, a C3-C6 cycloalkyl group, a phenyl group, a naphthyl group, a five- to six-membered aromatic heterocyclic group, a three- to eight-membered non-aromatic heterocyclic group {the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from Group F}, a halogen atom, a cyano group, and a nitro group, Group C is a group consisting of a C1-C6 chain hydrocarbon group which may be optionally substituted with one or more substituents selected from Group E, $OR^{21}$, $S(O)_m R^{23}$, $OS(O)_2 R^{23}$, $C(O)R^{21}$, $C(O)OR^{21}$, $OC(O)R^{21}$, $OC(O)OR^{21}$, $OC(O)NR^{21}R^{22}$, $NR^{21}C(O)NR^{22}R^{23}$, $NR^{21}R^{22}$, $C(O)NR^{21}R^{22}$, $S(O)_2NR^{21}R^{22}$, $NR^{22}C(O)R^{21}$, $NR^{22}C(O)OR^{23}$, $NR^{22}S(O)_2R^{23}$, $C(R^{22})=N-OR^{21}$, $O-N=CR^{21}R^{23}$, $SiR^{24}R^{25}R^{26}$, a C3-C6 cycloalkyl group, a phenyl group, a naphthyl group, a five- to six-membered aromatic heterocyclic group, a three- to eight-membered non-aromatic heterocyclic group {the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from Group F}, an oxo group, a thioxo group, a halogen atom, a cyano group, and a nitro group, Group D is a group consisting of a C1-C6 chain hydrocarbon group which may be optionally substituted with one or more substituents selected from Group E, $OR^{21}$, $S(O)_m R^{23}$, $OS(O)_2 R^{23}$, $C(O)R^{21}$, $C(O)OR^{21}$, $OC(O)R^{21}$, $OC(O)OR^{21}$, $OC(O)NR^{21}R^{22}$, $NR^{21}C(O)NR^{22}R^{23}$, $NR^{21}R^{22}$, $C(O)NR^{21}R^{22}$, $S(O)_2NR^{21}R^{22}$, $NR^{22}C(O)R^{21}$, $NR^{22}C(O)OR^{23}$, $NR^{22}S(O)_2R^{23}$, $C(R^{22})=N-OR^{21}$, $O-N=CR^{21}R^{23}$, $SiR^{24}R^{25}R^{26}$ a C3-C6 cycloalkyl group, a phenyl group, a naphthyl group, a five- to six-membered aromatic heterocyclic group, a three- to eight-membered non-aromatic heterocyclic group {the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from Group F}, a halogen atom, a cyano group, and a nitro group, Group F is a group consisting of a C3-C6 cycloalkyl group {the C3-C6 cycloalkyl group may be optionally substituted with one or more substituents selected from the group consisting of a halogen atom, a cyano group, and a C1-C3 alkoxy group}, $OR^{27}$, $S(O)_pR^{29}$, $OS(O)_2R^{29}$, $C(O)R^{27}$, $C(O)OR^{27}$, $OC(O)R^{27}$, $OC(O)OR^{27}$, $OC(O)NR^{27}R^{28}$, $NR^{27}C(O)NR^{28}R^{29}$, $NR^{27}R^{28}$, $C(O)NR^{27}R^{28}$, $S(O)_2NR^{27}R^{29}$, $NR^{28}C(O)R^{27}$, $NR^{28}C(O)OR^{29}$, $NR^{28}S(O)_2R^{29}$, $C(R^{20})=N-OR^{27}$, $O-N=CR^{27}R^{29}$, $SiR^{24}R^{25}R^{29}$, a halogen atom, a cyano group, a nitro group, a hydroxy group, a phenoxy group, a phenyl group, a naphthyl group, a five- to six-membered aromatic heterocyclic group, and a three- to eight-membered non-aromatic heterocyclic group {the phenoxy group, the phenyl group, the naphthyl group, the five- to six-membered aromatic heterocyclic group, and the three- to eight-membered non-aromatic heterocyclic group may be optionally substituted with one or more substituents selected from Group G}, $R^{27}$ and $R^{29}$ are identical to or different from each other and represent a C1-C6 chain hydrocarbon group, a C3-C6 cycloalkyl group, a phenyl group, a naphthyl group, a five-to six-membered aromatic heterocyclic group, a three- to eight-membered non-aromatic heterocyclic group {the C1-C6 chain hydrocarbon group, the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from the group consisting of a halogen atom, a cyano group and a C1-C3 alkoxy group}, or a hydrogen atom, $R^{29}$ represents a C1-C6 chain hydrocarbon group, a C3-C6 cycloalkyl group, a phenyl group, a naphthyl group, a five-to six-membered aromatic heterocyclic group, or a three- to eight-membered non-aromatic heterocyclic group {the C1-C6 chain hydrocarbon group, the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from the group consisting of a halogen atom, a cyano group and a C1-C3 alkoxy group}, p is 0, 1 or 2, Group F is a group consisting of a C1-C6 chain hydrocarbon group, a C3-C6 cycloalkyl group {the C1-C6 chain hydrocarbon group, and the C3-C6 cycloalkyl group may be optionally substituted with one or more substituents selected from the group consisting of a halogen atom, a cyano group and a C1-C3 alkoxy group}, $OR^{27}$, $S(O)_pR^{29}$, $OS(O)_2R^{29}$, $C(O)R^{27}C(O)OR^{27}$, $OC(O)R^{27}$, $OC(O)OR^{27}$, $OC(O)NR^{27}R^{28}$, $NR^{27}C(O)NR^{28}R^{29}$, $NR^{27}R^{28}$, $C(O)NR^{27}R^{28}$, $S(O)_2NR^{27}R^{28}$, $NR^{28}C(O)R^{27}$, $NR^{28}C(O)OR^{29}$, $NR^{28}S(O)_2R^{29}$, $C(R^{28})=N-OR^{27}$, $O-N=CR^{27}R^{29}$, $SiR^{24}R^{25}R^{26}$, a halogen atom, a cyano group, a nitro group, a hydroxy group, a phenoxy group, a phenyl group, a naphthyl group, a five-to six-membered aromatic heterocyclic group, and a three-to eight-membered non-aromatic heterocyclic group {the phenoxy group, the phenyl group, the naphthyl group, the five-to six-membered aromatic heterocyclic group, and the three- to eight-membered non-aromatic heterocyclic group may be optionally substituted with one or more substituents selected from Group G}, Group G is a group consisting of a C1-C6 chain hydrocarbon group, a C3-C6 cycloalkyl group, a C1-C6 alkoxy group, and a C1-C6 alkylthio group {the C1-C6 chain hydrocarbon group, the C3-C6 cycloalkyl group, the C1-C6 alkoxy group, and the C1-C6 alkylthio group may be optionally substituted with one or more substituents selected from the group consisting of a halogen atom and a cyano group}, a halogen atom, a cyano group, a nitro group, and a hydroxy group, Group H is a group consisting of a C1-C6 chain hydrocarbon group which may be optionally substituted with one or more substituents selected from Group B, $OR^{11}$, a cyano group, and a halogen atom](hereinafter, referred to as "Present compound Z"), or its N oxide or an agriculturally acceptable salt thereof (hereinafter, Compound represented by formula (I), or its N oxide or agriculturally acceptable salts are referred to as "Present compound").

[2] The method according to [1] wherein the compound represented by formula (I), or its N oxide or an agriculturally acceptable salt thereof represents a compound wherein Q represents a group represented by Q2, a group represented by Q3, a group represented by Q4, a group represented by Q5, or a group represented by Q6, E represents $OR^{11}$, $R^1$ represents a methyl group, and n is 0, or its N oxide or an agriculturally acceptable salt thereof.

[3] The method according to [2] wherein the compound represented by formula (I), or its N oxide or an agriculturally acceptable salt thereof represents a compound wherein Q represents a group represented by Q2 or a group represented by Q3, and $R^{11}$ represents a C1-C6 chain hydrocarbon group which may be optionally substituted with one or more substituents selected from Group B, a C6-C10 aryl group which may be optionally substituted with one or more substituents selected from Group D, or $R^{13}R^{15}NC(O)-$, or its N oxide or an agriculturally acceptable salt thereof.

[4] The method according to [1] wherein the compound represented by formula (I), or its N oxide or an agriculturally acceptable salt thereof represents a compound wherein Q represents a group represented by Q1, F represents $OR^4$, $R^1$ represents a methyl group, and n is 0, or its N oxide or an agriculturally acceptable salt thereof.

[5] Use of the compound represented by formula (I) according to any one of [1] to [4], or its N oxide or an agriculturally acceptable salt thereof, for controlling soybean rust fungus with an amino acid replacement at F129L position in a mitochondrial cytochrome b protein.

[6] A compound represented by formula (II):

(II)

$(R^2)_n$, $R^1$, $E^4$, Q

[wherein
R¹ represents a C1-C3 chain hydrocarbon group which may be optionally substituted with one or more halogen atoms, a cyclopropyl group, a halogen atom or a hydrogen atom,
n is 0, 1, 2 or 3,
when n is 2 or 3, a plural of R² may be identical to or different from each other,
R² represents a C1-C3 chain hydrocarbon group which may be optionally substituted with one or more halogen atoms, a cyclopropyl group, or a halogen atom,
E^A represents a cyclopropyl group which may be optionally substituted with one or more substituents selected from Group C, CR⁵R⁶R⁷, or N=C(R⁸)NR⁹R¹⁰,
Q represents a group represented by Q1, a group represented by Q2, a group represented by Q3, a group represented by Q4, a group represented by Q5, or a group represented by Q6 (where • represents a binding site to a benzene ring),

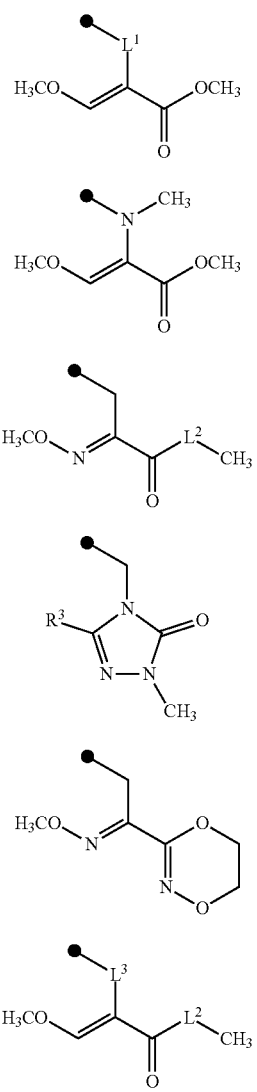

L¹ represents CH₂, or an oxygen atom,
L² represents an oxygen atom or NH,
L³ represents CH₂, an oxygen atom, or NCH₃, R³ represents a C1-C3 alkoxy group which may be optionally substituted with one or more halogen atoms, or a C1-C3 chain hydrocarbon group which may be optionally substituted with one or more halogen atoms,
R⁵ represents a C1-C3 chain hydrocarbon group, or a hydrogen atom,
R⁶ and R⁷ combine together with a carbon atom to which they are attached to form a 1,3-dioxolan-2-yl group, a 1,3-dioxan-2-yl group, a 1,3-dioxepan-2-yl group, a 1,3-dithiolan-2-yl group, a 1,3-dithian-2-yl group, or a 1,3-dithiepan-2-yl group {the 1,3-dioxolan-2-yl group, the 1,3-dioxan-2-yl group, the 1,3-dioxepan-2-yl group, the 1,3-dithiolan-2-yl group, the 1,3-dithian-2-yl group, and the 1,3-dithiepan-2-yl group may be optionally substituted with one or more substituents selected from Group H},
R⁸ represents a C1-C3 chain hydrocarbon group which may be optionally substituted with one or more halogen atoms, or a hydrogen atom,
R⁹ represents a C1-C6 chain hydrocarbon group which may be optionally substituted with one or more substituents selected from Group B, a C6-C10 aryl group, a five- to ten-membered aromatic heterocyclic group {the C6-C10 aryl group, and the five- to ten-membered aromatic heterocyclic group may be optionally substituted with one or more substituents selected from Group D}, a C3-C6 cycloalkyl group which may be optionally substituted with one or more substituents selected from Group C, OR¹¹, SR¹¹, a cyano group, or a hydrogen atom,
R¹⁰ represents a C1-C6 chain hydrocarbon group which may be optionally substituted with one or more substituents selected from Group B, or a hydrogen atom,
R¹¹ represents a C1-C6 chain hydrocarbon group which may be optionally substituted with one or more substituents selected from Group B, a C3-C6 cycloalkyl group which may be optionally substituted with one or more substituents selected from Group C, a C6-C10 aryl group, a five- to ten-membered aromatic heterocyclic group {the C6-C10 aryl group, and the five- to ten-membered aromatic heterocyclic group may be optionally substituted with one or more substituents selected from Group D}, R¹⁶C(O)—, R¹⁴OC(O)—, R¹³R¹⁵NC(O)—, R¹³R¹⁵NC(S)—, R¹⁴S(O)₂—, or R¹³R¹⁵NS(O)₂—,
R¹³ represents a C1-C6 chain hydrocarbon group which may be optionally substituted with one or more substituents selected from Group B, a C3-C6 cycloalkyl group which may be optionally substituted with one or more substituents selected from Group C, a C6-C10 aryl group, a five- to ten-membered aromatic heterocyclic group {the C6-C10 aryl group, and the five- to ten-membered aromatic heterocyclic group may be optionally substituted with one or more substituents selected from Group D}, or a hydrogen atom,
R¹⁴ represents a C1-C6 chain hydrocarbon group which may be optionally substituted with one or more substituents selected from Group B, a C3-C6 cycloalkyl group which may be optionally substituted with one or more substituents selected from Group C, a C6-C10 aryl group, or a five- to ten-membered aromatic heterocyclic group {the C6-C10 aryl group, and the five- to ten-membered aromatic heterocyclic group may be optionally substituted with one or more substituents selected from Group D},
R¹⁵ represents a C1-C3 chain hydrocarbon group which may be optionally substituted with one or more halogen atoms, a C1-C3 alkoxy group which may be optionally substituted with one or more halogen atoms, or a hydrogen atom, $R^{16}$ represents a C1-C6 chain hydrocarbon group which may be optionally substituted with one or more substituents selected from Group B, a C3-C6 cycloalkyl group which may be optionally substituted with one or more substituents selected from Group C, a C6-C10 aryl group, a five- to ten-membered aromatic heterocyclic group {the C6-C10 aryl group, and the five- to ten-membered aromatic heterocyclic group may be optionally substituted with one or more substituents selected from Group D} or a hydrogen atom, $R^{13}$ and $R^{15}$ may combine together with a nitrogen atom to which they are attached to form a three- to eight-membered non-aromatic heterocyclic group {the three- to eight-membered non-aromatic heterocyclic group may be optionally substituted with one or more substituents selected from Group C}, Group B is a group consisting of $OR^{21}$, $S(O)_mR^{23}$, $OS(O)_2R^{23}$, $C(O)R^{21}$, $C(O)OR^{21}$, $OC(O)R^{21}$, $OC(O)OR^{21}$, $OC(O)NR^{21}R^{22}$, $NR^{21}C(O)NR^{22}R^{23}$, $NR^{21}R^{22}$, $C(O)NR^{21}R^{22}$, $S(O)_2NR^{21}R^{22}$, $NR^{22}C(O)R^{21}$, $NR^{22}C(O)OR^{23}$, $NR^{22}S(O)_2R^{23}$, $C(R^{22})=N-OR^{21}$, $O-N=CR^{21}R^{23}$, $SiR^{24}R^{25}R^{26}$, a C3-C6 cycloalkyl group, a phenyl group, a naphthyl group, a five- to six-membered aromatic heterocyclic group, a three- to eight-membered non-aromatic heterocyclic group {the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from Group F}, a halogen atom, a cyano group, and a nitro group, $R^{21}$ and $R^{22}$ are identical to or different from each other and represent a C1-C6 chain hydrocarbon group which may be optionally substituted with one or more substituents selected from Group E, a C3-C6 cycloalkyl group which may be optionally substituted with one or more substituents selected from Group F, a phenyl group, a naphthyl group, a five- to six-membered aromatic heterocyclic group, a three-to eight-membered non-aromatic heterocyclic group {the phenyl group, the naphthyl group, the five- to six-membered aromatic heterocyclic group, and the three- to eight-membered non-aromatic heterocyclic group may be optionally substituted with one or more substituents selected from Group G} or a hydrogen atom, $R^{23}$ represents a C1-C6 chain hydrocarbon group which may be optionally substituted with one or more substituents selected from Group E, a C3-C6 cycloalkyl group which may be optionally substituted with one or more substituents selected from Group F, a phenyl group, a naphthyl group, a five- to six-membered aromatic heterocyclic group, or a three- to eight-membered non-aromatic heterocyclic group {the phenyl group, the naphthyl group, the five- to six-membered aromatic heterocyclic group, and the three- to eight-membered non-aromatic heterocyclic group may be optionally substituted with one or more substituents selected from Group G}, $R^{24}$, $R^{21}$ and $R^{26}$ are identical to or different from each other and represent a C1-C6 chain hydrocarbon group, or a phenyl group, m is 0, 1 or 2, Group C is a group consisting of a C1-C6 chain hydrocarbon group which may be optionally substituted with one or more substituents selected from Group F, $OR^{21}$, $S(O)_mR^{23}$, $OS(O)_2R^{23}$, $C(O)R^{21}$, $C(O)OR^{21}$, $OC(O)R^{21}$, $OC(O)OR^{21}$, $OC(O)NR^{21}R^{22}$, $NR^{21}C(O)NR^{22}R^{23}$, $NR^{21}R^{22}$, $C(O)NR^{21}R^{22}$, $S(O)_2NR^{21}R^{22}$, $NR^{22}C(O)R^{21}$, $NR^{22}C(O)OR^{23}$, $NR^{22}S(O)_2R^{23}$, $C(R^{22})=N-OR^{21}$, $O-N=CR^{21}R^{23}$, $SiR^{24}R^{25}R^{26}$, a C3-C6 cycloalkyl group, a phenyl group, a naphthyl group, a five- to six-membered aromatic heterocyclic group, a three- to eight-membered non-aromatic heterocyclic group {the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from Group F1}, an oxo group, a thioxo group, a halogen atom, a cyano group, and a nitro group, Group D is a group consisting of a C1-C6 chain hydrocarbon group which may be optionally substituted with one or more substituents selected from Group E, $OR^{21}$, $S(O)_mR^{23}$, $OS(O)_2R^{23}$, $C(O)R^{21}$, $C(O)OR^{21}$, $OC(O)R^{21}$, $OC(O)OR^{21}$, $OC(O)NR^{21}R^{22}$, $NR^{21}C(O)NR^{22}R^{23}$, $NR^{21}R^{22}$, $C(O)NR^{21}R^{22}$, $S(O)_2NR^{21}R^{22}$, $NR^{22}C(O)R^{21}$, $NR^{22}C(O)OR^{23}$, $NR^{22}S(O)_2R^{23}$, $C(R^{22})=N-OR^{21}$, $O-N=CR^{21}R^{23}$, $SiR^{24}R^{25}R^{26}$, a C3-C6 cycloalkyl group, a phenyl group, a naphthyl group, a five- to six-membered aromatic heterocyclic group, a three- to eight-membered non-aromatic heterocyclic group {the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from Group F}, a halogen atom, a cyano group, and a nitro group, Group E is a group consisting of a C3-C6 cycloalkyl group {the C3-C6 cycloalkyl group may be optionally substituted with one or more substituents selected from the group consisting of a halogen atom, a cyano group, and a C1-C3 alkoxy group}, $OR^{27}$, $S(O)_pR^{29}$, $OS(O)_2R^{29}$, $C(O)R^{27}$, $C(O)OR^{27}$, $OC(O)R^{27}$, $OC(O)OR^{27}$, $OC(O)NR^{27}R^{28}$, $NR^{27}C(O)NR^{28}R^{29}$, $NR^{27}R^{28}$, $C(O)NR^{27}R^{29}$, $S(O)_2NR^{27}R^{29}$, $NR^{28}C(O)R^{27}$, $NR^{28}C(O)OR^{29}$, $NR^{29}S(O)_2R^{29}$, $C(R^{28})=N-OR^{27}$, $O-N=CR^{27}R^{29}$, $SiR^{24}R^{25}R^{26}$, a halogen atom, a cyano group, a nitro group, a hydroxy group, a phenoxy group, a phenyl group, a naphthyl group, a five- to six-membered aromatic heterocyclic group, and a three- to eight-membered non-aromatic heterocyclic group {the phenoxy group, the phenyl group, the naphthyl group, the five- to six-membered aromatic heterocyclic group, and the three- to eight-membered non-aromatic heterocyclic group may be optionally substituted with one or more substituents selected from Group G}, $R^{27}$ and $R^{29}$ are identical to or different from each other and represent a C1-C6 chain hydrocarbon group, a C3-C6 cycloalkyl group, a phenyl group, a naphthyl group, a five-to six-membered aromatic heterocyclic group, a three- to eight-membered non-aromatic heterocyclic group {the C1-C6 chain hydrocarbon group, the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from the group consisting of a halogen atom, a cyano group, and a C1-C3 alkoxy group} or a hydrogen atom, $R^{29}$ represents a C1-C6 chain hydrocarbon group, a C3-C6 cycloalkyl group, a phenyl group, a naphthyl group, a five-to six-membered aromatic heterocyclic group, or a three- to eight-membered non-aromatic heterocyclic group {the C1-C6 chain hydrocarbon group, the C3-C6 cycloalkyl group, the phenyl group, the naphthyl group, the five- to six-membered aromatic heterocyclic group, and the three- to eight-membered non-aromatic heterocyclic group may be optionally substituted with one or more substituents selected from the group consisting of a halogen atom, a cyano group, and a C1-C3 alkoxy group}, p is 0, 1 or 2, Group F is a group consisting of a C1-C6 chain hydrocarbon group, a C3-C6 cycloalkyl group {the C1-C6 chain hydrocarbon group, and the C3-C6 cycloalkyl group may be optionally substituted with one or more substituents selected from the group consisting of a halogen atom, a cyano group, and a C1-C3 alkoxy group}, $OR^{27}$, $S(O)_pR^{29}$, $OS(O)_2R^{29}$, $C(O)R^{27}$, $C(O)OR^{27}$, $OC(O)R^{27}$, $OC(O)OR^{27}$, $OC(O)NR^{27}R^{28}$, $NR^{27}C(O)NR^{20}R^{29}$, $NR^{27}R^{28}$, $C(O)NR^{27}R^{28}$, $S(O)_2NR^{27}R^{20}$, $NR^2OC(O)R^{27}$, $NR^{28}C(O)OR^{29}$, $NR^{28}S(O)_2R^{29}$, $C(R^{28})=N-OR^{27}$, $O-N=CR^{27}R^{29}$, $SiR^{24}R^{25}R^{26}$, a halogen atom, a cyano group, a nitro group, a hydroxy group, a phenoxy group, a phenyl group, a naphthyl group, a five-to six-membered aromatic heterocyclic group, and a three-to eight-membered non-aromatic heterocyclic group {the phenoxy group, the phenyl group, the naphthyl group, the five- to six-membered aromatic heterocyclic group, and the three- to eight-membered non-aromatic heterocyclic group may be optionally substituted with one or more substituents selected from Group G}, Group G is a group consisting of a C1-C6 chain hydrocarbon group, a C3-C6 cycloalkyl group, a C1-C6 alkoxy group, and a C1-C6 alkylthio group {the C1-C6 chain hydrocarbon group, the C3-C6 cycloalkyl group, the C1-C6 alkoxy group, and the C1-C6 alkylthio group may be optionally substituted with one or more substituents selected from the group consisting of a halogen atom and a cyano group}, a halogen atom, a cyano group, a nitro group, and a hydroxy group.

Group H is a group consisting of a C1-C6 chain hydrocarbon group which may be optionally substituted with one or more substituents selected from Group B, $OR^{11}$, a cyano group, and a halogen atom](hereinafter, referred to as "Compound Z of the present invention")

or its N oxide or an agriculturally acceptable salt thereof (hereinafter, the compound represented by formula (II), its N-oxide, or an agriculturally acceptable salt thereof are referred to as "Compound of the present invention").

[7] The compound according to [6] wherein
  Q represents a group represented by Q1,
  $R^1$ represents a methyl group, and
  n is 0,
or its N oxide, or an agriculturally acceptable salt thereof.

[8] The compound according to [7] wherein
  $E^A$ represents $N=C(R^8) NR^9R^{10}$, and
  $L^1$ represents an oxygen atom.

[9] An agricultural composition which comprises the compound according to any one of [6] to [8] or its N-oxide compound or an agriculturally acceptable salt thereof and an inert carrier.

[10] The agricultural composition according to [9] which comprises one or more ingredients selected from the group consisting of the following Groups (a), (b), (c) and (d):
  Group (a): a group consisting of insecticidal ingredients, miticidal ingredients, and nematicidal ingredients;
  Group (b): fungicidal ingredients:
  Group (c): plant growth modulating ingredients; and
  Group (d): repellent ingredients.

[11] A compound represented by formula (III):

[wherein
  $R^1$ represents a C1-C3 chain hydrocarbon group which may be optionally substituted with one or more halogen atoms, a cyclopropyl group, a halogen atom, or a hydrogen atom,
  n is 0, 1, 2 or 3,
  when n is 2 or 3, a plural of $R^2$ may be identical to or different from each other,
  $R^2$ represents a C1-C3 chain hydrocarbon group which may be optionally substituted with one or more halogen atoms, a cyclopropyl group, or a halogen atom, and
  $L^3$ represents $CH_2$, an oxygen atom, or $NCH_3$.] or its salt.

[12] The compound according to [11] wherein
  $R^1$ represents a methyl group,
  n is 0, and
  $L^3$ represents an oxygen atom.

Effect of Invention

The present invention can control soybean rust fungus having an amino acid substitution of F129L on mitochondrial cytochrome b protein.

MODE FOR CARRYING OUT THE INVENTION

The substituent(s) as described herein is/are explained.

The term "halogen atom" represents fluorine atom, chlorine atom, bromine atom, or iodine atom.

When the substituent has two or more halogen atoms, these halogen atoms may be identical to or different from each other.

The expression of "CX—CY" as used herein represents that the number of carbon atom is from X to Y. For example, the expression of "C1-C6" represents that the number of carbon atom is from 1 to 6.

The term "chain hydrocarbon group" represents an alkyl group, an alkenyl group, or an alkynyl group.

Examples of the "alkyl group" include methyl group, ethyl group, propyl group, isopropyl group, 1,1-dimethylpropyl group, 1,2-dimethylpropyl group, 1-ethylpropyl group, butyl group, sec-butyl group, tert-butyl group, pentyl group, and hexyl group.

Examples of the "alkenyl group" include vinyl group, 1-propenyl group, 2-propenyl group, 1-methyl-1-propenyl group, 1-methyl-2-propenyl group, 1,2-dimethyl-1-propenyl group, 1-ethyl-2-propenyl group, 3-butenyl group, 4-pentenyl group, and 5-hexenyl group.

Examples of the "alkynyl group" include ethynyl group, 1-propynyl group, 2-propynyl group, 1-methyl-2-propynyl group, 1,1-dimethyl-2-propynyl group, 1-ethyl-2-propynyl group, 2-butynyl group, 4-pentynyl group, and 5-hexynyl group.

Examples of the "alkoxy group" include methoxy group, ethoxy group, propoxy group, isopropoxy group, butoxy group, tert-butoxy group, pentyloxy group, and hexyloxy group.

Examples of the "alkylthio group" includes methylthio group, ethylthio group, propylthio group, isopropylthio group, butylthio group, tert-butylthio group, pentylthio group, and hexylthio group.

Examples of the "cycloalkyl group" include cyclopropyl group, cyclobutyl group, cyclopentyl group, and cyclohexyl group.

Examples of the "cycloalkenyl group" include cyclopentenyl group, and cyclohexenyl group.

Examples of the "aryl group" include phenyl group, naphthyl group, indanyl group, and tetrahydronaphthyl group.

Examples of the "aromatic heterocyclic group" include five-membered aromatic heterocyclic group such as pyrrolyl group, furanyl group, thienyl group, pyrazolyl group, imidazolyl group, triazolyl group, tetrazolyl group, oxazolyl group, isoxazolyl group, thiazolyl group, isothiazolyl group, oxadiazolyl group, and thiadiazolyl group and so on; six-membered aromatic heterocyclic group such as pyridyl group, pyridazinyl group, pyrimidinyl group, pyrazinyl group, triazinyl group, and tetrazinyl group and so on; nine-membered aromatic heterocyclic group such as indazolyl group, indolidinyl group, imidazopyridyl group, and 1,3-benzodioxolyl group and so on; and ten-membered aromatic heterocyclic group such as quinolyl group, isoquinolyl group, quinazolinyl group, naphthylidinyl group, benzopyranyl group, and dihydrobenzopyranyl group and so on.

Examples of "non-aromatic heterocyclic group" include aziridinyl group, oxiranyl group, thiranyl group, azetidinyl group, oxetanyl group, thietanyl group, pyrrolidinyl group, tetrahydrofuranyl group, tetrahydrothienyl group, pyrazolynyl group, pyrazolidinyl group, imidazolinyl group, imidazolidinyl group, oxazolinyl group, thiazolinyl group, oxazolidinyl group, thiazolidinyl group, isoxazolinyl group, isoxazolidinyl group, isothiazolynyl group, isothiazolidinyl group, dioxolanyl group, dioxanyl group, piperidyl group, piperazinyl group, morpholinyl group, thiomorpholinyl group, pyranyl group, dihydropyranyl group, tetrahydropyranyl group, azepanyl group, oxepanyl group, and thiepanyl group.

The term(s) as described herein is/are explained.

The term of "soybean rust fungus having an amino acid substitution of F129L on mitochondrial cytochrome b protein" represents soybean rust fungus (scientific name: *Phakopsora pachyrhizi*) which shows a resistance against QoI fungicide by having a mutation in the mitochondrial cytochrome b gene encoding mitochondrial cytochrome protein and as a result of the mutation, causing amino acid substitution of F129L.

Examples of the agriculturally acceptable salt thereof include acid addition salts such as hydrochloride salts, sulfates, nitrates, phosphates, sulfonates, acetates, and benzoates.

The present compound is a QoI fungicide.

Embodiments of the present compound Z include the following compounds.

[Embodiment 1]A present compound Z wherein Q represents a group represented by Q1, E represents a C1-C6 alkyl group which may be optionally substituted with one or more substituents selected from Group A, a C3-C6 cycloalkyl group which may be optionally substituted with one or more substituents selected from Group C, $OR^4$, $CR^5R^6R^7$, $N{=}C(R^8)NR^9R^{10}$, or $SR^{11}$.

[Embodiment 2] The compound described in the Embodiment 1 wherein E represents a C1-C6 alkyl group which may be optionally substituted with one or more substituents selected from Group I, a cyclopropyl group which may be optionally substituted with cyclopropyl group, $OR^4$, $CR^5R^6R^7$, or $N{=}C(R^8)\ NR^9R^{10}$,

- $R^4$ represents a phenyl group which may be optionally substituted with one or more substituents selected from Group D,
- $R^5$ and $R^8$ represent a hydrogen atom,
- $R^6$ and $R^7$ combine together with a carbon atom to which they are attached form a 1,3-dioxolan-2-yl group, or 1,3-dioxan-2-yl group {the 1,3-dioxolan-2-yl group and the 1,3-dioxan-2-yl group may be optionally substituted with one or more substituents selected from Group H},
- $R^9$ represents a C1-C6 chain hydrocarbon group which may be optionally substituted with one or more substituents selected from Group B, or a phenyl group which may be optionally substituted with one or more substituents selected from Group D, and
- $R^{10}$ represents a methyl group,
- Group I is a group consisting of $OR^{21}$, $S(O)_mR^{23}$, $OC(O)NR^{21}R^{22}$, an oxo group, and a halogen atom.

[Embodiment 3] The compound described in the Embodiment 1 wherein E represents $OR^4$.

[Embodiment 4] The compound described in the Embodiment 3 wherein $R^4$ represents a phenyl group which may be optionally substituted with one or more substituents selected from Group D.

[Embodiment 5] The compound described in the Embodiment 1 wherein E represents a C1-C6 alkyl group which may be optionally substituted with one or more substituents selected from Group I.

[Embodiment 6] The compound described in the Embodiment 1 wherein $L^1$ represents an oxygen atom.

[Embodiment 7] The compound described in the Embodiment 2 wherein $L^1$ represents an oxygen atom.

[Embodiment 8] The compound described in the Embodiment 3 wherein $L^1$ represents an oxygen atom.

[Embodiment 9] The compound described in the Embodiment 4 wherein $L^1$ represents an oxygen atom.

[Embodiment 10] The compound described in the Embodiment 5 wherein $L^1$ represents an oxygen atom.

[Embodiment 11] The compound described in the Embodiment 1 wherein n is 0.

[Embodiment 12] The compound described in the Embodiment 2 wherein n is 0.

[Embodiment 13] The compound described in the Embodiment 3 wherein n is 0.

[Embodiment 14] The compound described in the Embodiment 4 wherein n is 0.

[Embodiment 15] The compound described in the Embodiment 5 wherein n is 0.

[Embodiment 16] The compound described in the Embodiment 6 wherein n is 0.

[Embodiment 17] The compound described in the Embodiment 7 wherein n is 0.

[Embodiment 18] The compound described in the Embodiment 8 wherein n is 0.

[Embodiment 19] The compound described in the Embodiment 9 wherein n is 0.
[Embodiment 20] The compound described in the Embodiment 10 wherein n is 0.
[Embodiment 21] The compound described in any one of the Embodiment 1 to the Embodiment 20 wherein $R^1$ represents a methyl group or a chloro atom.
[Embodiment 22] The compound described in any one of the Embodiment 1 to the Embodiment 20 wherein $R^1$ represents a methyl group.
[Embodiment 23] A present compound Z wherein Q represents a group represented by formula Q2, a group represented by formula Q3, a group represented by formula Q4, a group represented by formula Q5, or a group represented by formula Q6, and
  E represents a C1-C6 alkyl group which may be optionally substituted with one or more substituents selected from Group A, a C3-C6 cycloalkyl group which may be optionally substituted with one or more substituents selected from Group C, $OR^{11}$, $CR^5R^6R^7$, $N=C(R^9)NR^9R^{10}$ or $SR^{11}$.
[Embodiment 24] The compound described in the Embodiment 23 wherein E represents a C1-C6 alkyl group which may be optionally substituted with one or more substituents selected from Group I, a cyclopropyl group which may be optionally substituted with cyclopropyl group, $OR^{11}$, $CR^5R^6R^7$, or $N=C(R^8)NR^9R^{10}$,
  $R^{11}$ represents a C1-C6 chain hydrocarbon group which may be optionally substituted with one or more substituents selected from Group B,
  $R^5$ and $R^8$ represent a hydrogen atom,
  $R^6$ and $R^7$ combine together with a carbon atom to which they are attached form a 1,3-dioxolan-2-yl group or a 1,3-dioxan-2-yl group {the 1,3-dioxolan-2-yl group and the 1,3-dioxan-2-yl group may be optionally substituted with one or more substituents selected from Group H},
  $R^9$ represents a C1-C6 chain hydrocarbon group which may be optionally substituted with one or more substituents selected from Group B, or a phenyl group which may be optionally substituted with one or more substituents selected from Group D, and
  $R^{10}$ represents a methyl group.
[Embodiment 25] The compound described in the Embodiment 23 wherein E represents $OR^{11}$.
[Embodiment 26] The compound described in the Embodiment 25 wherein $R^{11}$ represents a C1-C6 chain hydrocarbon group which may be optionally substituted with one or more substituents selected from Group B.
[Embodiment 27] The compound described in the Embodiment 23 wherein $R^1$ represents a methyl group, a chlorine atom or a hydrogen atom.
[Embodiment 28] The compound described in the Embodiment 24 wherein $R^1$ represents a methyl group, a chlorine atom or a hydrogen atom.
[Embodiment 29] The compound described in the Embodiment 25 wherein $R^1$ represents a methyl group, a chlorine atom or a hydrogen atom.
[Embodiment 30] The compound described in the Embodiment 26 wherein $R^1$ represents a methyl group, a chlorine atom or a hydrogen atom.
[Embodiment 31] The compound described in the Embodiment 23 wherein $R^1$ represents a methyl group or a hydrogen atom.
[Embodiment 32] The compound described in the Embodiment 24 wherein $R^1$ represents a methyl group or a hydrogen atom.
[Embodiment 33] The compound described in the Embodiment 25 wherein $R^1$ represents a methyl group or a hydrogen atom.
[Embodiment 34] The compound described in the Embodiment 26 wherein $R^1$ represents a methyl group or a hydrogen atom.
[Embodiment 35] The compound described in the Embodiment 23 wherein $R^1$ represents a methyl group.
[Embodiment 36] The compound described in the Embodiment 24 wherein $R^1$ represents a methyl group.
[Embodiment 37] The compound described in the Embodiment 25 wherein $R^1$ represents a methyl group.
[Embodiment 38] The compound described in the Embodiment 26 wherein $R^1$ represents a methyl group.
[Embodiment 39] The compound described in the Embodiment 23 wherein n is 0.
[Embodiment 40] The compound described in the Embodiment 24 wherein n is 0.
[Embodiment 41] The compound described in the Embodiment 25 wherein n is 0.
[Embodiment 42] The compound described in the Embodiment 26 wherein n is 0.
[Embodiment 43] The compound described in the Embodiment 27 wherein n is 0.
[Embodiment 44] The compound described in the Embodiment 28 wherein n is 0.
[Embodiment 45] The compound described in the Embodiment 29 wherein n is 0.
[Embodiment 46] The compound described in the Embodiment 30 wherein n is 0.
[Embodiment 47] The compound described in the Embodiment 31 wherein n is 0.
[Embodiment 48] The compound described in the Embodiment 32 wherein n is 0.
[Embodiment 49] The compound described in the Embodiment 33 wherein n is 0.
[Embodiment 50] The compound described in the Embodiment 34 wherein n is 0.
[Embodiment 51] The compound described in the Embodiment 35 wherein n is 0.
[Embodiment 52] The compound described in the Embodiment 36 wherein n is 0.
[Embodiment 53] The compound described in the Embodiment 37 wherein n is 0.
[Embodiment 54] The compound described in the Embodiment 38 wherein n is 0.
[Embodiment 55] The compound described in any one of the Embodiment 23 to the Embodiment 54 wherein Q represents a group represented by Q2, a group represented by Q3, or a group represented by Q4.
[Embodiment 56] The compound described in any one of the Embodiment 23 to the Embodiment 54 wherein Q represents a group represented by Q2, or a group represented by Q3.
[Embodiment 57] The compound described in any one of the Embodiment 23 to the Embodiment 54 wherein Q represents a group represented by Q3.

Embodiments of the compound Z of the present invention include the following compounds.
[Embodiment A1] The compound Z of the present invention wherein $E^A$ represents a cyclopropyl group which may be optionally substituted with cyclopropyl group, $CR^5R^6R^7$ or $N=C(R^8) NR^9R^{10}$,
  $R^5$ and $R^8$ represents a hydrogen atom,
  $R^6$ and $R^7$ combine together with a carbon atom to which they are attached form a 1,3-dioxolan-2-yl group or a 1,3-dioxan-2-yl group {the 1,3-dioxolan-2-yl group and the 1,3-dioxan-2-yl group may be optionally substituted with one or more substituents selected from Group H}, R$^9$ represents a C1-C6 chain hydrocarbon group which may be optionally substituted with one or more substituents selected from Group B, or a phenyl group which may be optionally substituted with one or more substituents selected from Group D, and R$^{10}$ represents a methyl group.

[Embodiment A2] The compound Z of the present invention wherein E$^4$ represents a cyclopropyl group which may be optionally substituted with one or more substituents selected from Group C.

[Embodiment A3] The compound Z of the present invention wherein E$^4$ represents CR$^5$R$^6$R$^7$.

[Embodiment A4] The compound Z of the present invention wherein E$^4$ represents N=C(R$^8$)NR$^9$R$^{10}$.

[Embodiment A5] The compound Z of the present invention wherein R$^1$ represents a methyl group.

[Embodiment A6] The compound described in the Embodiment A1 wherein R$^1$ represents a methyl group.

[Embodiment A7] The compound described in the Embodiment A2 wherein R$^1$ represents a methyl group.

[Embodiment A8] The compound described in the Embodiment A3 wherein R$^1$ represents a methyl group.

[Embodiment A9] The compound described in the Embodiment A4 wherein R$^1$ represents a methyl group.

[Embodiment A10] The compound Z of the present invention wherein n is 0.

[Embodiment A11] The compound described in the Embodiment A1 wherein n is 0.

[Embodiment A12] The compound described in the Embodiment A2 wherein n is 0.

[Embodiment A13] The compound described in the Embodiment A3 wherein n is 0.

[Embodiment A14] The compound described in the Embodiment A4 wherein n is 0.

[Embodiment A15] The compound described in the Embodiment A5 wherein n is 0.

[Embodiment A16] The compound described in the Embodiment A7 wherein n is 0.

[Embodiment A17] The compound described in the Embodiment A8 wherein n is 0.

[Embodiment A18] The compound described in the Embodiment A9 wherein n is 0.

[Embodiment A19] The compound described in the Embodiment A6 wherein n is 0.

[Embodiment A20] The compound Z of the present invention wherein L$^1$ represents an oxygen atom.

[Embodiment A21] The compound described in the Embodiment A1 wherein L$^1$ represents an oxygen atom.

[Embodiment A22] The compound described in the Embodiment A2 wherein L$^1$ represents an oxygen atom.

[Embodiment A23] The compound described in the Embodiment A3 wherein L$^1$ represents an oxygen atom.

[Embodiment A24] The compound described in the Embodiment A4 wherein L$^1$ represents an oxygen atom.

[Embodiment A25] The compound described in the Embodiment A5 wherein L$^1$ represents an oxygen atom.

[Embodiment A26] The compound described in the Embodiment A6 wherein L$^1$ represents an oxygen atom.

[Embodiment A27] The compound described in the Embodiment A7 wherein L$^1$ represents an oxygen atom.

[Embodiment A28] The compound described in the Embodiment A8 wherein L$^1$ represents an oxygen atom.

[Embodiment A29] The compound described in the Embodiment A9 wherein L$^1$ represents an oxygen atom.

[Embodiment A30] The compound described in the Embodiment A10 wherein L$^1$ represents an oxygen atom.

[Embodiment A31] The compound described in the Embodiment A11 wherein L$^1$ represents an oxygen atom.

[Embodiment A32] The compound described in the Embodiment A12 wherein L$^1$ represents an oxygen atom.

[Embodiment A33] The compound described in the Embodiment A13 wherein L$^1$ represents an oxygen atom.

[Embodiment A34] The compound described in the Embodiment A14 wherein L$^1$ represents an oxygen atom.

[Embodiment A35] The compound described in the Embodiment A15 wherein L$^1$ represents an oxygen atom.

[Embodiment A36] The compound described in the Embodiment A16 wherein L$^1$ represents an oxygen atom.

[Embodiment A37] The compound described in the Embodiment A17 wherein L$^1$ represents an oxygen atom.

[Embodiment A38] The compound described in the Embodiment A18 wherein L$^1$ represents an oxygen atom.

[Embodiment A39] The compound described in the Embodiment A19 wherein L$^1$ represents an oxygen atom.

[Embodiment A40] The compound Z of the present invention or the compound described in any one of the Embodiment A1 to the Embodiment A39, wherein Q represents a group represented by Q2 or a group represented by Q3.

[Embodiment A41] The compound Z of the present invention or the compound described in any one of the Embodiment A1 to the Embodiment A39, wherein Q represents a group represented by Q1.

Next, the process for preparing the present compound and the compound of the present invention are explained.

The present compound can be prepared according to the methods described in WO 2000/041999 A1, WO 2000/007999 A1, WO 2001/042227 A1, WO 2001/000562 A1, EP 212859 B2, WO 1999/007687 and the like. The present compound can be also prepared by the below-described processes and the like.

Process A

A compound represented by formula (A1) (hereinafter, referred to as "Compound (A1)") can be prepared by reacting a compound represented by formula (B1) (hereinafter, referred to as "Compound (B1)") with iodomethane in the presence of a base.

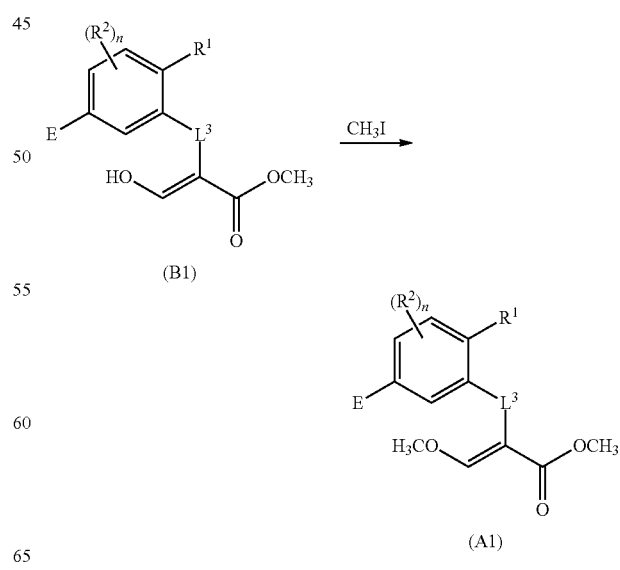

[wherein the symbols are the same as defined above.]

The reaction can be carried out according to the methods described in WO 1998/003464 A1, WO 2001/000562 A1, EP 212859 B2 and the like.

Process B

A compound represented by formula (A2) (hereinafter, referred to as "Compound (A2)") can be prepared by reacting a compound represented by formula (B2) (hereinafter, referred to as "Compound (B2)") with O-methyl hydroxylamine or salts thereof.

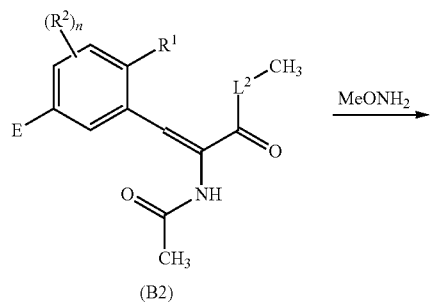

(B2)

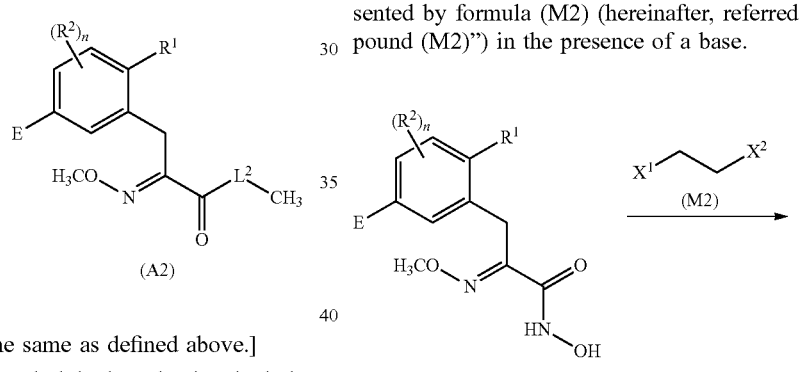

(A2)

[wherein the symbols are the same as defined above.]

Examples of salt of O-methyl hydroxylamine include hydrochloride salts and sulfates thereof.

The reaction can be conducted according to a method described in WO 2000/041999 A1 and the like.

Process C

A compound represented by formula (A3) (hereinafter, referred to as "Compound (A3)") can be prepared by reacting a compound represented by formula (B3) (hereinafter, referred to as "Compound (B3)") with a compound represented by formula (M1) (hereinafter, referred to as "Compound (M1)")

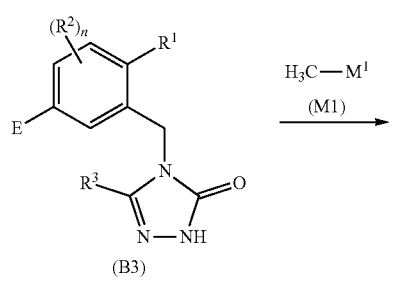

(B3)

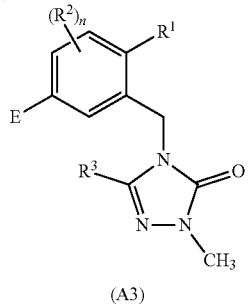

(A3)

[wherein $M^1$ represents a leaving group such as chlorine atom, bromine atom, iodine atom, tosyloxy group, mesyloxy group and triflyloxy group and the like; and the other symbols are the same as defined above.]

The reaction can be conducted according to a method described in WO 2000/007999 A1 and the like.

The compound (M1) is a known compound, or can be prepared according to a known method.

Process D

A compound represented by formula (A4) (hereinafter, referred to as "Compound (A4)") can be prepared by reacting a compound represented by formula (B4) (hereinafter, referred to as "Compound (B4)") with a compound represented by formula (M2) (hereinafter, referred to as "Compound (M2)") in the presence of a base.

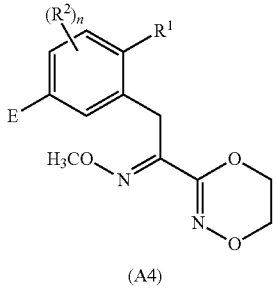

(A4)

[wherein $X^1$ and $X^2$ are identical to or different from each other and represent a chlorine atom, a bromine atom or an iodine atom, and the other symbols are the same as defined above.]

The reaction can be conducted according to a method described in WO 2017/005725 A1 and the like.

The compound (M2) is a known compound, or can be prepared according to a known method.

Process E

A compound represented by formula (A5) (hereinafter, referred to as "Compound (A5)") can be prepared by reacting a compound represented by formula (B5) (hereinafter, referred to as "Compound (B5)") with a compound represented by formula (M3) (hereinafter, referred to as "Compound (M3)") in the presence of a base.

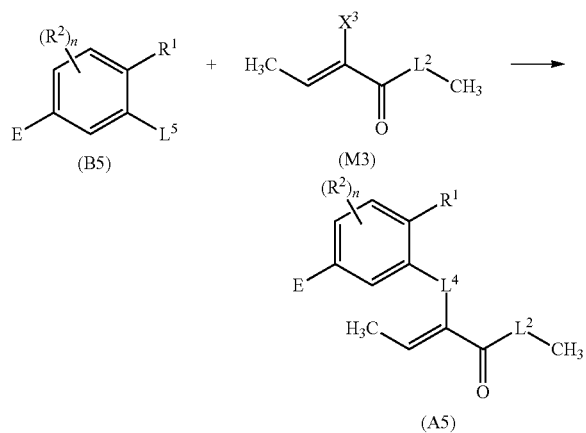

[wherein $X^3$ represents a chlorine atom, a bromine atom or an iodine atom, $L^4$ represents an oxygen atom or $NCH_3$, $L^5$ represents a hydroxy group or a methylamino group, and the other symbols are the same as defined above.]

The reaction can be conducted according to a method described in WO 2000/003975 A1 and the like.

The compound (M3) is a known compound, or can be prepared according to a known method.

Process F

A compound represented by formula (A6) (hereinafter, referred to as "Compound (A6)") can be prepared by reacting a compound represented by formula (B6) (hereinafter, referred to as "Compound (B6)") with a compound represented by formula (M4) (hereinafter, referred to as "Compound (M4)") in the presence of a palladium catalyst and a base.

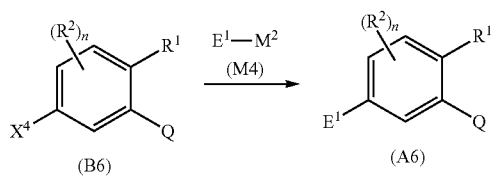

[wherein $E^1$ represents a C3-C6 cycloalkyl group which may be optionally substituted with one or more substituents selected from Group C; $M^2$ represents $B(OH)_2$, or 4,4,5,5-tetramethyl-1,3,2-dioxaborolan-2-yl group; $X^4$ represents a leaving group such as chlorine atom, bromine atom, iodine atom, or triflyloxy group; and the other symbols are the same as defined above.]

The reaction is usually carried out in a solvent. Examples of the solvent to be used in the reaction include hydrocarbons such as hexane, toluene, and xylene (hereinafter, collectively referred to as hydrocarbons); ethers such as methyl tert-butyl ether (hereinafter, referred to as MTBE), tetrahydrofuran (hereinafter, referred to as THF), dimethoxyethane (hereinafter, collectively referred to as ethers); halogenated hydrocarbons such as chloroform and chlorobenzene (hereinafter, collectively referred to as halogenated hydrocarbons); amides such as dimethylformamide (hereinafter, referred to as DMF) and N-methyl pyrrolidone (hereinafter, collectively referred to as amides); esters such as methyl acetate and ethyl acetate (hereinafter, collectively referred to as esters); nitriles such as acetonitrile and propionitrile (hereinafter, collectively referred to as nitriles); water; and mixed solvents thereof.

Example of the palladium catalysts includes [1,1'-bis (diphenylphoshino)ferrocene]palladium (II) dichloride (hereinafter, described as $PdCl_2(dppf)$).

Examples of the base include organic bases such as triethylamine and pyridine (hereinafter, collectively referred to as organic bases); alkali metal carbonates such as sodium carbonates and potassium carbonates (hereinafter, collectively referred to as alkali metal carbonates); alkali metal hydrocarbonates such as sodium hydrocarbonate and potassium hydrocarbonate (hereinafter, collectively referred to as hydrocarbonates); sodium fluoride, and tripotassium phosphate.

In the reaction, the compound (M4) is usually used within a range of 1 to 10 molar ratio(s), the palladium catalyst is usually used within a range of 0.01 to 1 molar ratio(s), and the base is usually used within a range of 1 to 10 molar ratio(s), as opposed to 1 mole of the compound (B6).

The reaction temperature is usually within a range of 0 to 150° C. The reaction period of the reaction is usually within a range of 0.1 to 120 hours.

When the reaction is completed, the reaction mixtures are worked up (such as concentration and drying) to isolate the compound (A6).

The compound (B6) and the compound (M4) are known compounds, or can be prepared according to a known method.

Process G

A compound represented by formula (A7) (hereinafter, referred to as "Compound (A7)") can be prepared by reacting the compound (B6) with a compound represented by formula (M5) (hereinafter, referred to as "Compound (M5)") in the presence of a metal catalyst and a base.

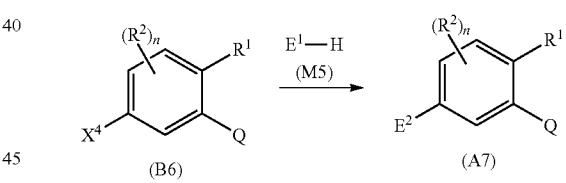

[wherein F2 represents $OR^{11}$ or $SR^{11}$, and the other symbols are the same as defined above.]

The reaction is usually carried out in a solvent. Examples of the solvents to be used in the reaction include hydrocarbons, ethers, halogenated hydrocarbons, amides, esters, nitriles, and mixed solvents thereof.

Examples of the metal catalyst to be used in the reaction include tris(dibenzylideneacetone)dipalladium(0) (hereinafter, referred to as $Pd_2(dba)_3$), tris(2,4-pentanedionato)iron (III) (hereinafter, referred to as $Fe(acac)_3$) and copper iodide (I).

A ligand may be used in the reaction as needed.

Examples of the ligand to be used in the reaction include L-proline and Xantphos. When a ligand is used in the reaction, the ligand is used within a range of 0.01 to 1 molar ratios as opposed to 1 mole of the compound (B6).

Examples of the base to be used in the reaction include tripotassium phosphate, carbonates and organic bases.

In the reaction, the compound (M5) is usually used within a range of 1 to 10 molar ratio(s), the metal catalyst is usually used within a range of 0.01 to 1 molar ratio(s), and the base is usually used within a range of 1 to 10 molar ratio(s), as opposed to 1 mole of the compound (B6).

The reaction temperature is usually within a range of 0 to 150° C. The reaction period of the reaction is usually within a range of 0.1 to 120 hours.

When the reaction is completed, the reaction mixtures are worked up (such as concentration and drying) to isolate the compound (A7).

The compound (B6) and the compound (M5) are known compounds, or can be prepared according to a known method.

Process H

A compound represented by formula (A8) (hereinafter, referred to as "Compound (A8)") can be prepared by reacting a compound represented by formula (A15) (hereinafter, referred to as "Compound (A15)") with a compound represented by formula (M6) (hereinafter, referred to as "Compound (M6)") in the presence of a base.

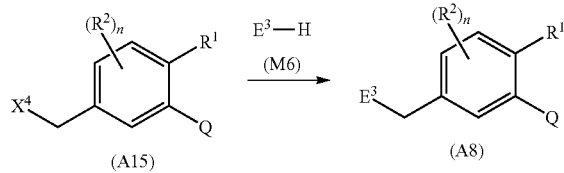

[wherein $E^3$ represents $OR^{21}$ or $SR^{23}$, and the other symbols are the same as defined above.]

The reaction can be conducted according to a method described in WO 1990/07493 A1, WO 1995/18789 A1 and the like.

The compound (A15) and the compound (M6) are known compounds, or can be prepared according to a known method.

Process I

A compound represented by formula (A9) (hereinafter, referred to as "Compound (A9)") can be prepared by reacting a compound represented by formula (A16) (hereinafter, referred to as "Compound (A16)") with a compound represented by formula (M7) (hereinafter, referred to as "Compound (M7)") in the presence of a base or Lewis acid.

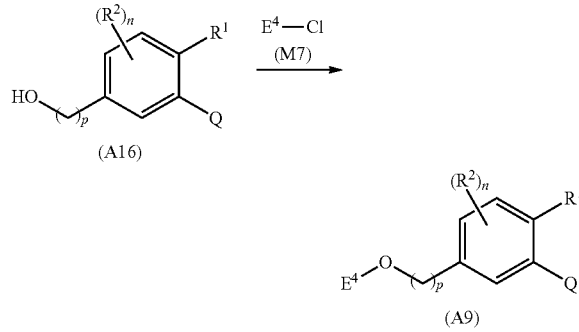

[wherein $E^4$ represents $S(O)_2R^{23}$, $C(O)R^{21}$, $C(O)OR^{21}$ or $C(O)NR^{21}R^{22}$, p is 0, 1, 2, 3, 4, 5 or 6, and the other symbols are the same defined above.]

The reaction is usually carried out in a solvent. Examples of the solvents to be used in the reaction include hydrocarbons, ethers, halogenated hydrocarbons, amides, esters, nitriles, and mixed solvents thereof.

Examples of the bases to be used in the reaction include organic bases, carbonates, hydrocarbonates, and alkali metal hydrides (such as sodium hydride, potassium hydride and lithium hydride) (hereinafter, referred to as metal hydrides)

Examples of the Lewis acid to be used in the reaction include aluminium (III) oxide.

In the reaction, the compound (M7) is usually used within a range of 1 to 10 molar ratio(s) as opposed to 1 mole of the compound (A16). When the base is used in the reaction, the base is usually used within a range of 1 to 10 molar ratio(s) as opposed to 1 mole of the compound (A16). When the base is used in the reaction, the Lewis acid is usually used within a range of 0.01 to 1 molar ratio(s) as opposed to 1 mole of the compound (A16).

The reaction temperature for the reaction is usually within a range of −20 to 150° C. The reaction period in the reaction is usually within a range of 0.1 to 120 hours.

When the reaction is completed, the reaction mixture is mixed with water, and the resulting mixture is then extracted with organic solvent(s), and the organic layers are worked up (for example, drying and concentration) to isolate the compound (A9).

The compound (M7) is a known compound, or can be prepared according to a known method.

Process J

A compound represented by formula (A18) (hereinafter, referred to as "Compound (A18)") can be prepared by reacting a compound represented by formula (B7) (hereinafter, referred to as "Compound (B7)") with a compound represented by formula (M8) (hereinafter, referred to as "Compound (M8)") in the presence of a base.

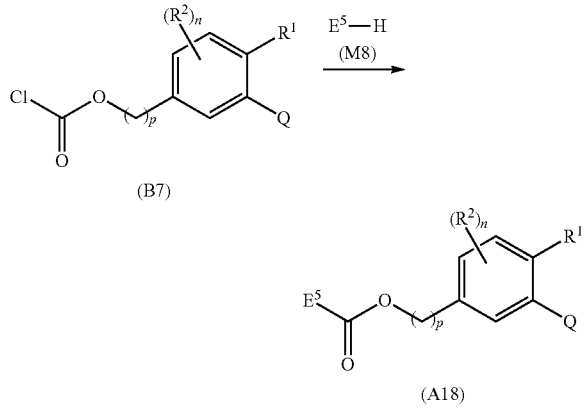

[wherein $E^5$ represents $OR^{21}$ or $NR^{21}R^{22}$, and the other symbols are the same as defined above.]

The reaction is usually carried out in a solvent. Examples of the solvents to be used in the reaction include hydrocarbons, ethers, halogenated hydrocarbons, amides, esters, nitriles, water, and mixed solvents thereof.

When $E^5$ represents $NR^{21}R^{22}$, the compound (M8) may be in the form of acid addition salts. Examples of the acid addition salts of the compound (M8) include hydrochloride salts and sulfates.

Examples of the bases to be used in the reaction include organic bases; alkali metal hydroxides (such as sodium hydroxide, and potassium hydroxide) (hereinafter, referred to as alkali metal hydroxides); carbonates; and hydrocarbonates.

In the reaction, the compound (M8) is usually used within a range of 1 to 10 molar ratio(s), and the base is usually used within a range of 1 to 10 molar ratio(s), as opposed to 1 mole of the compound (B7).

The reaction temperature of the reaction is usually within a range of −20 to 150° C. The reaction period of the reaction is usually within a range of 0.1 to 120 hours.

When the reaction is completed, the reaction mixture is mixed with water, and the resulting mixture is then extracted with organic solvent(s), and the organic layers are worked up (for example, drying and concentration) to isolate the compound (A18).

The compound (M8) is a known compound, or can be prepared according to a known method.

Process K

A compound represented by formula (A10) (hereinafter, referred to as "Compound (A10)") can be prepared by reacting the compound (A16) with a compound represented by formula (M9) (hereinafter, referred to as "Compound (M9)") in the presence of triphenylphosphine and azo compounds.

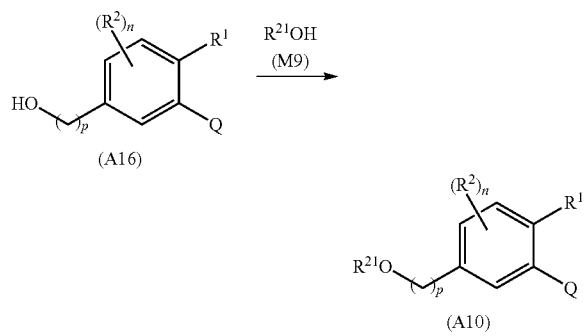

[wherein the symbols are the same as defined above.]

The reaction is usually carried out in a solvent. Examples of the solvents to be used in the reaction include hydrocarbons, ethers, halogenated hydrocarbons, amides, esters, nitriles, and mixed solvents thereof.

Examples of the azo compounds to be used in the reaction include bis(2-methoxyethyl)azodicarboxylate and diethyl azocarboxylate.

In the reaction, the compound (M9) is usually used within a range of 1 to 10 molar ratio(s), triphenylphosphine is usually used within a range of 1 to 10 molar ratio(s), and azo compounds is usually used within a range of 1 to 10 molar ratio(s), as opposed to 1 mole of the compound (A16).

The reaction temperature is usually within a range of −20 to 150° C. The reaction period of the reaction is usually within a range of 0.1 to 120 hours.

When the reaction is completed, the reaction mixture is mixed with water, and the resulting mixture is then extracted with organic solvent(s), and the organic layers are worked up (for example, drying and concentration) to isolate the compound (A10).

The compound (M9) is a known compound, or can be prepared according to a known method.

Process L

A compound represented by formula (A11) (hereinafter, referred to as "Compound (A11)") can be prepared by reacting a compound represented by formula (B8) (hereinafter, referred to as "Compound (B8)") with a compound represented by formula (M10) (hereinafter, referred to as "Compound (M10)") in the presence of an acid, followed by reacting with a compound represented by formula (M11) (hereinafter, referred to as "Compound (M11)").

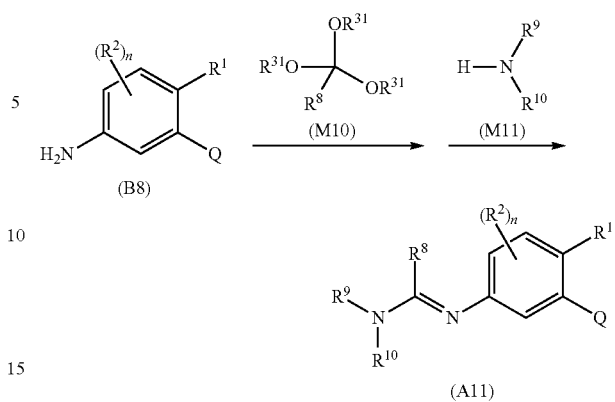

[wherein $R^{31}$ represents a C1-C6 alkyl group, and the other symbols are the same as defined above.]

The reaction is usually carried out in a solvent. Examples of the solvents to be used in the reaction include hydrocarbons, ethers, halogenated hydrocarbons, amides, esters, nitriles, and mixed solvents thereof.

Examples of the acid to be used in the reaction include paratoluenesulfonic acid, and paratoluenesulfonic acid pyridinium.

In the reaction, the compound (M10) is usually used within a range of 1 to 10 molar ratio(s), the acid is usually within a range of 0.01 to 1 molar ratio(s), and the compound (M11) is usually within a range of 1 to 10 molar ratio(s), as opposed to 1 mole of the compound (B8).

The reaction temperature is usually within a range of −20 to 150° C. The reaction period of the reaction is usually within a range of 0.1 to 120 hours.

When the reaction is completed, the reaction mixture is mixed with water, and the resulting mixture is then extracted with organic solvent(s), and the organic layers are worked up (for example, drying and concentration) to isolate the compound (A11).

The compound (M10) and the compound (M11) are known compounds, or can be prepared according to a known method.

Process M

The compound (A11) can be prepared by reacting the compound (B8) with a compound represented by formula (M12) (referred to as "Compound (M12)").

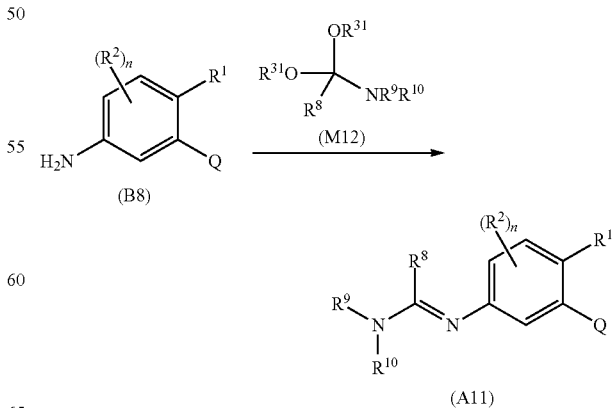

[wherein the symbols are the same as defined above.]

The reaction is usually carried out in a solvent. Examples of the solvents to be used in the reaction include hydrocarbons, ethers, halogenated hydrocarbons, amides, esters, nitriles, and mixed solvents thereof.

In the reaction, the compound (M12) is usually used within a range of 1 to 100 molar ratio(s), as opposed to 1 mole of the compound (B8).

The reaction temperature is usually within a range of −20 to 150° C. The reaction period of the reaction is usually within a range of 0.1 to 120 hours.

When the reaction is completed, the reaction mixture is mixed with water, and the resulting mixture is then extracted with organic solvent(s), and the organic layers are worked up (for example, drying and concentration) to isolate the compound (A11).

The compound (M12) is a known compound, or can be prepared according to a known method.

Process N

A compound represented by formula (A12) (hereinafter, referred to as "Compound (A12)") can be prepared by reacting a compound represented by formula (A17) (hereinafter, referred to as "Compound (A17)") with a compound represented by formula (M13) (hereinafter, referred to as "Compound (M13)") in the presence of an acid or a Lewis acid.

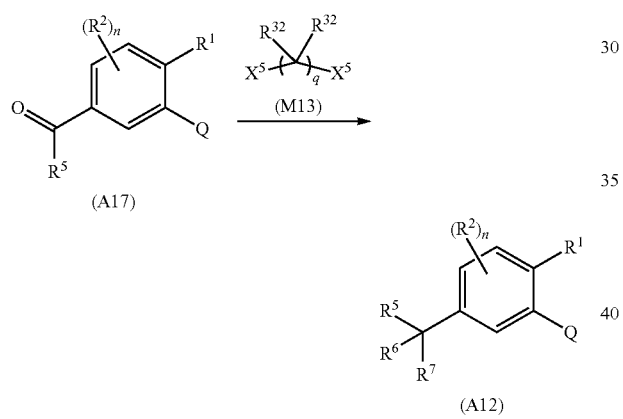

(A17)

(M13)

(A12)

[wherein $X^5$ represents a hydroxy group or a sulphanyl group; q is 2, 3 or 4; $R^{32}$ represents a C1-C6 chain hydrocarbon group which may be optionally substituted with one or more substituents selected from Group B, $OR^{11}$, a cyano group, a halogen atom or a hydrogen atom; and the other symbols are the same as defined above]

The reaction is usually carried out in a solvent. Examples of the solvents to be used in the reaction include hydrocarbons, ethers, halogenated hydrocarbons, amides, esters, nitriles, and mixed solvents thereof.

Examples of the acid to be used in the reaction include paratoluenesulfonic acid, paratoluenesulfonic acid pyridinium, and hydrochloride.

Examples of the Lewis acid to be used in the reaction include chloro trimethyl silane, boron trifluoride-ethyl ether complex, and titanium(IV) chlorides.

In the reaction, the compound (M13) is usually used within a range of 1 to 10 molar ratio(s), as opposed to 1 mole of the compound (A17). When the acid is used in the reaction, the acid is usually used within a range of 0.01 to 1 molar ratio(s) as opposed to 1 mole of the compound (A17). When the Lewis acid is used in the reaction, the Lewis acid is usually used within a range of 0.01 to 1 molar ratio(s) as opposed to 1 mole of the compound (A17).

The reaction temperature is usually within a range of −20 to 150° C. The reaction period of the reaction is usually within a range of 0.1 to 120 hours.

When the reaction is completed, the reaction mixture is mixed with water, and the resulting mixture is then extracted with organic solvent(s), and the organic layers are worked up (for example, drying and concentration) to isolate the compound (A12).

The compound (M13) is a known compound, or can be prepared according to a known method.

Process O

A compound represented by formula (A13) (hereinafter, referred to as "Compound (A13)") can be prepared by reacting a compound represented by formula (B13) (hereinafter, referred to as "Compound (B13)") in the presence of a palladium catalyst.

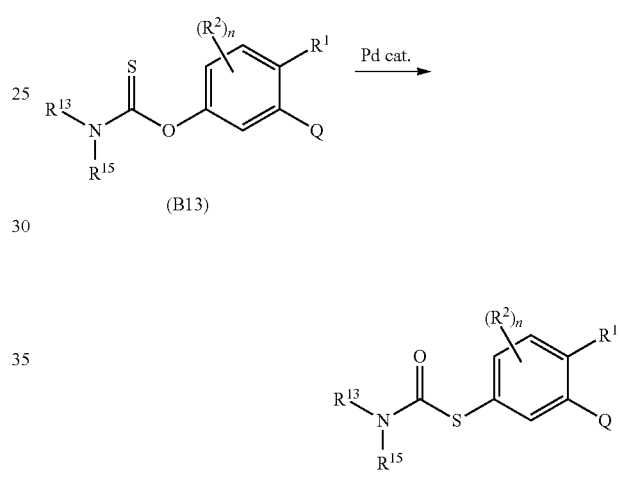

(B13)

(A13)

[wherein the symbols are the same as defined above]

The reaction is usually carried out in a solvent. Examples of the solvents to be used in the reaction include hydrocarbons, ethers, halogenated hydrocarbons, amides, esters, nitriles, and mixed solvents thereof.

Examples of the palladium catalyst to be used in the reaction include bis(tri-tert-butylphosphine)palladium(0).

In the reaction, the palladium catalyst is usually used within a range of 0.001 to 1 molar ratio(s) as opposed to 1 mole of the compound (B13).

The reaction temperature is usually within a range of 50 to 200° C. The reaction period of the reaction is usually within a range of 0.1 to 120 hours.

When the reaction is completed, the reaction mixture is mixed with water, and the resulting mixture is then extracted with organic solvent(s), and the organic layers are worked up (for example, drying and concentration) to isolate the compound (A13).

Process P

A compound represented by formula (A14) (hereinafter, referred to as "Compound (A14)") can be prepared by reacting a compound represented by formula (A15) (hereinafter, referred to as "Compound (A15)" with methylamine.

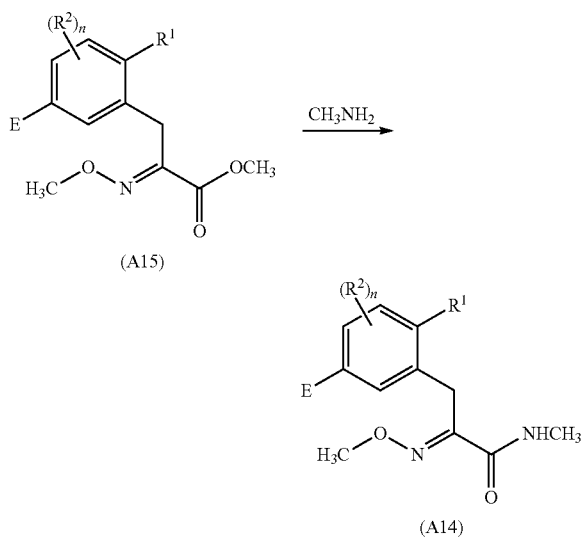

(A15)

(A14)

[wherein the symbols are the same as defined above.]

The reaction is usually carried out in a solvent. Examples of the solvents to be used in the reaction include alcohols (such as methanol, ethanol, and isopropyl alcohol), hydrocarbons, ethers, halogenated hydrocarbons, amides, esters, nitriles, and mixed solvents thereof.

In the reaction, the methylamine is usually used within a range of 1 to 100 molar ratio(s) as opposed to 1 mole of the compound (A15).

The reaction temperature is usually within a range of −20 to 150° C. The reaction period of the reaction is usually within a range of 0.1 to 120 hours.

When the reaction is completed, the reaction mixture is mixed with water, and the resulting mixture is then extracted with organic solvent(s), and the organic layers are worked up (for example, drying and concentration) to isolate the compound (A14).

Process Q

A compound represented by formula (A15-1) (hereinafter, referred to as "Compound (A15-1)") can be prepared by reacting a compound represented by formula (A16-1) (hereinafter, referred to as "Compound (A16-1)") with carbon tetrachloride, carbon tetrabromide, iodine in the presence of triphenylphosphine.

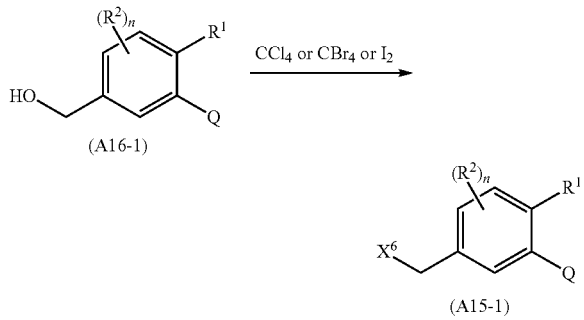

(A16-1)

(A15-1)

[wherein $X^6$ represents a chlorine atom, a bromine atom or an iodine atom, and the other symbols are the same as defined above.]

The reaction can be carried out according to a method described in J. Org. Synth., 1974, 54, 63, and so on.

Process R

The compound (A16-1) can be prepared by reacting a compound represented by formula (A17-1) (hereinafter, referred to as "Compound (A17-1)") with sodium borohydride.

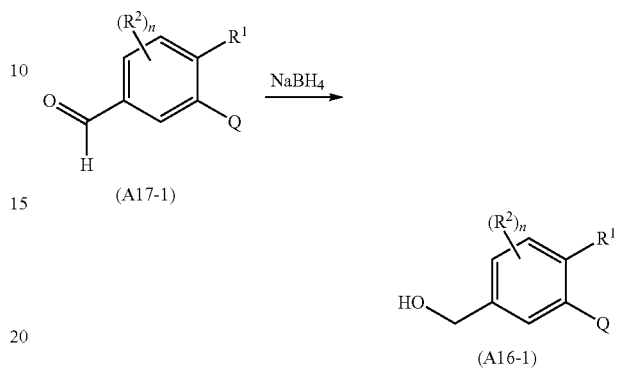

(A17-1)

(A16-1)

[wherein the symbols are the same as defined above]

The reaction can be carried out according to a method described in Chemistry-A European Journal 2019, 25(15), 3950.

Process S

The compound (A17-1) can be prepared by reacting the compound (B6) with N-formyl saccharin in the presence of a palladium catalyst, a ligand, triethyl silane and a base.

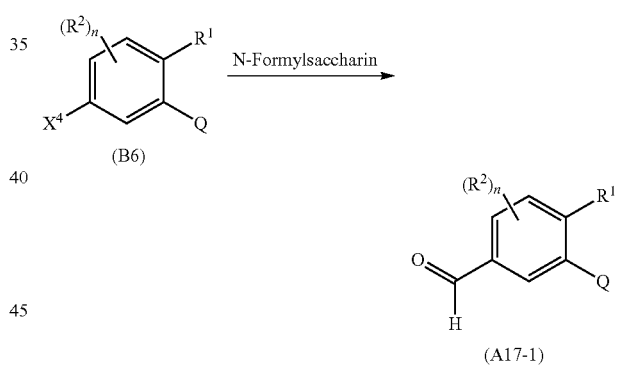

(B6)

(A17-1)

[wherein the symbols are the same as defined above]

The reaction can be carried out according to a method described in Angew Chem Int. Ed., 2013, 52, 8611 and so on.

Process T

The N oxide of the compound represented by formula (I) can be prepared by reacting the compound represented by formula (I) with an oxidizing agent. The reaction can be carried out according a method described in US patent publication No. 2018/0009778 or WO 2016/121970 A1.

Next, a process for preparing an intermediate compound of the present compound is explained.

Reference Process A

The compound (B1) can be prepared by reacting a compound represented by formula (C1) (hereinafter, referred to as "Compound (C1)") with methyl formate in the presence of a base.

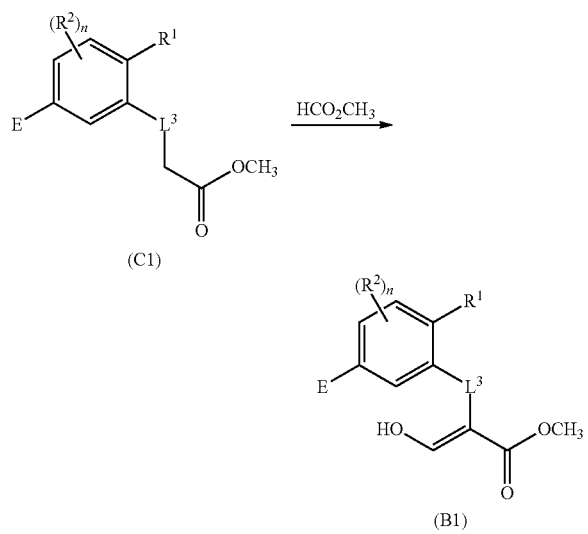

(C1)

(B1)

[wherein the symbols are the same as defined above]

The reaction can be carried out according to a method described in European patent No. 212859 and so on.

Reference Process B

A compound represented by formula (C1-1) (hereinafter, referred to as "Compound (C1-1)") can be prepared by reacting a compound represented by formula (D1-1) (hereinafter, referred to as "Compound (D1-1)") with methyl bromoacetate in the presence of a base.

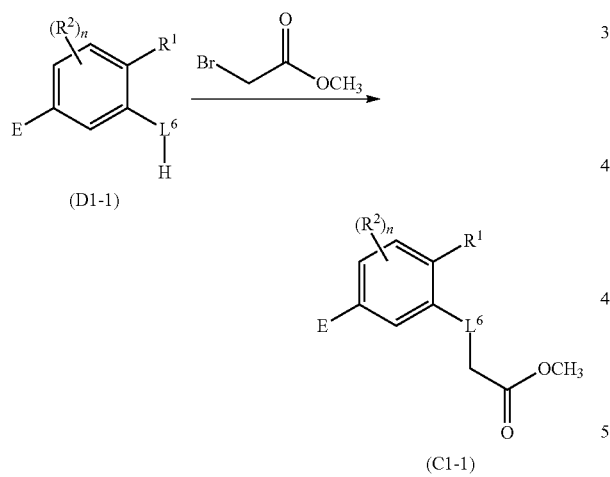

(D1-1)

(C1-1)

[wherein $L^6$ represents an oxygen atom or $NCH_3$, and the symbols are the same as defined above.]

Examples of the base to be used in the reaction include potassium carbonate.

The reaction can be carried out according to a method described in WO 2001/000562 A1 and so on.

The compound (D1-1) is a known compound, or can be prepared according a publicly known method.

Reference Process C

A compound represented by formula (C1-2) (hereinafter, referred to as "Compound (C1-2)") can be prepared by reacting a compound represented by formula (D1-2) (hereinafter, referred to as "Compound (D1-2)") with lithium chloride.

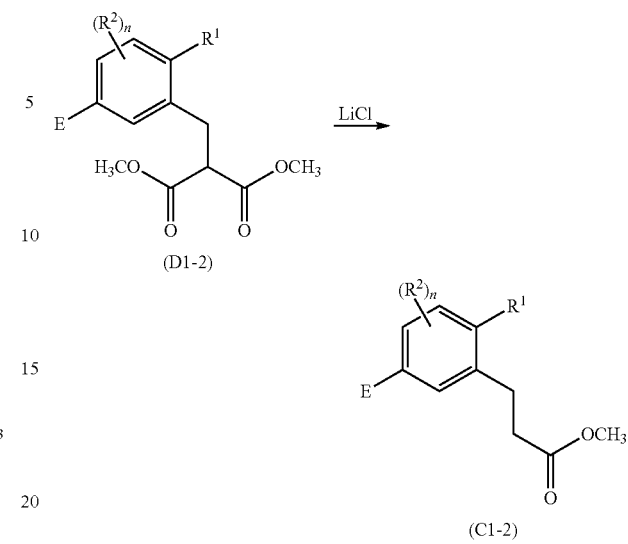

(D1-2)

(C1-2)

[wherein the symbols are the same as defined above]

The reaction can be carried out according to a method described in WO 2001/000562 A1 and so on.

The compound (D1-2) is a known compound, or can be prepared according to a publicly known method.

Reference Process D

A compound represented by formula (B2-1) (hereinafter, referred to as "Compound (B2-1)") can be prepared by reacting a compound represented by formula (C2) (hereinafter, referred to as "Compound (C2)") with methanol in the presence of aqueous solution of sodium hydroxide.

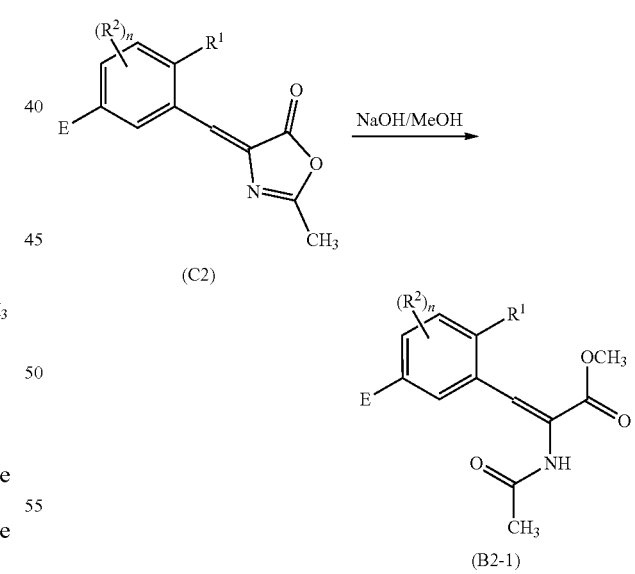

(C2)

(B2-1)

[wherein the symbols are the same as defined above]

The reaction can be carried out according to a method described in WO 2000/041999 and so on.

Reference Process E

The compound (C2) can be prepared by reacting a compound represented by formula (D2) (hereinafter, referred to as "Compound (D2)") with N-acetylglycine in the presence of acetic anhydride and sodium acetate.

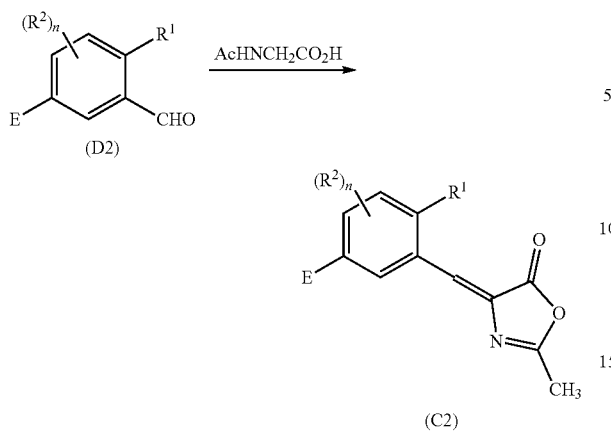

[wherein the symbols are the same as defined above.]

The reaction can be carried out according to a method described in WO 2000/041999 A1 and so on.

The compound (D2) is a known compound, or can be prepared according to a publicly known method.

Reference Process F

A compound represented by formula (B6-1) (hereinafter, referred to as "Compound (B6-1)") can be prepared by reacting a compound represented by formula (C6-1) (hereinafter, referred to as "Compound (C6-1)") with iodomethane in the presence of a base.

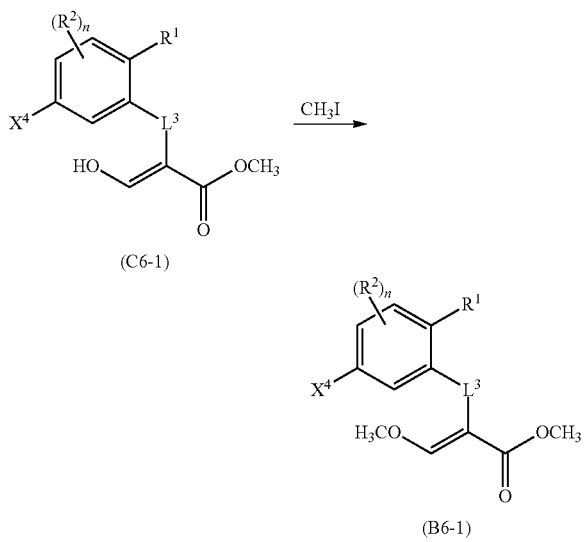

[wherein the symbols are the same as defined above]

The reaction can be carried out by using the compound (C6-1) in place of the compound (B1) according to the Process A.

Reference Process G

A compound represented by formula (B6-2) (hereinafter, referred to as "Compound (B6-2)") can be prepared by reacting a compound represented by formula (C6-2) (hereinafter, referred to as "Compound (C6-2)") with O-methyl hydroxylamine or salts thereof.

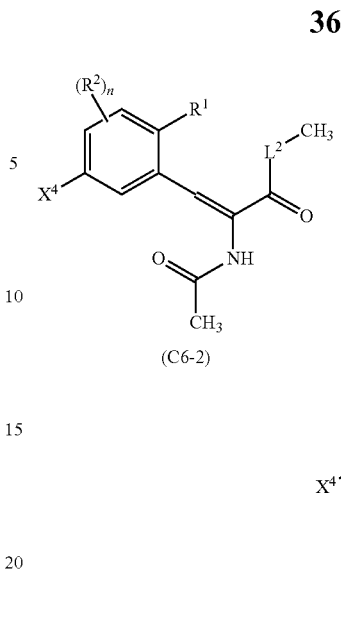

[wherein the symbols are the same as defined above]

The reaction can be carried out by using the compound (C6-2) in place of the compound (B2) according to the Process B.

Reference Process H

The compound (B8) can be prepared by reducing a compound represented by formula (C8) (hereinafter, referred to as "Compound (C8)"). Examples of the reduction reaction include a reduction reaction with iron powder or tin in aqueous acetic solution or hydrochloric acid or a catalytic reduction reaction.

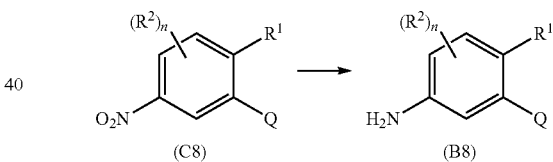

[wherein the symbols are the same as defined above]

The reaction is usually carried out in a solvent. Examples of the solvents to be used in the reaction include water, a mixed solvent of water and THF, and a mixed solvent of water and ethanol.

In the reaction, the iron powder is usually used within a range of 1 to 10 molar ratio(s), acetic acid is usually used as an amount used as a solvent, and hydrochloric acid is used as an amount used as a solvent.

The reaction temperature is usually within a range of −20 to 150° C. The reaction period of the reaction is usually within a range of 0.1 to 120 hours.

When the reaction is completed, the reaction mixture is mixed with water, and the resulting mixture is then extracted with organic solvent(s), and the organic layers are worked up (for example, drying and concentration) to isolate the compound (B8).

Reference Process I

A compound represented by formula (C8-1) (hereinafter, referred to as "Compound (C8-1)") can be prepared by reacting a compound represented by formula (D8-1) (hereinafter, referred to as "Compound (D8-1)") with iodomethane in the presence of a base.

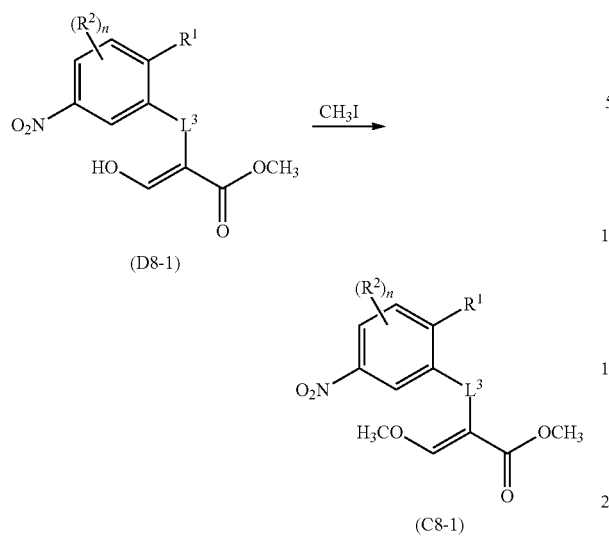

(D8-1)

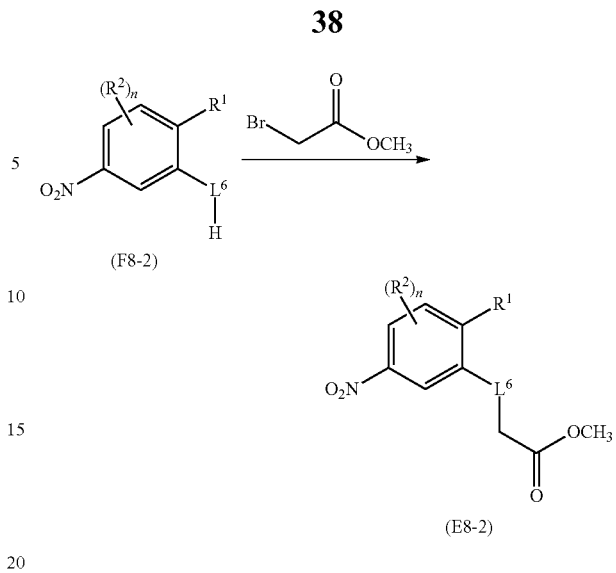

(F8-2)

(E8-2)

[wherein the symbols are the same as defined above]

The reaction can be carried out by using the compound (D8-1) in place of the compound (B1) according to the Process A.

Reference Process J

The compound (D8-1) can be prepared by reacting a compound represented by formula (E8-1) (hereinafter, referred to as "Compound (E8-1)") with methyl formate in the presence of a base.

[wherein the symbols are the same as defined above]

The reaction can be carried out by using the compound (F8-2) in place of the compound (D1-1) according to the Reference Process B.

The compound (F8-2) is a known compound, or can be prepared according to a publicly known method.

Reference Process K

A compound represented by formula (E8-3) can be prepared by reacting a compound represented by formula (F8-3) (hereinafter, referred to as "Compound (F8-3)") with lithium chloride.

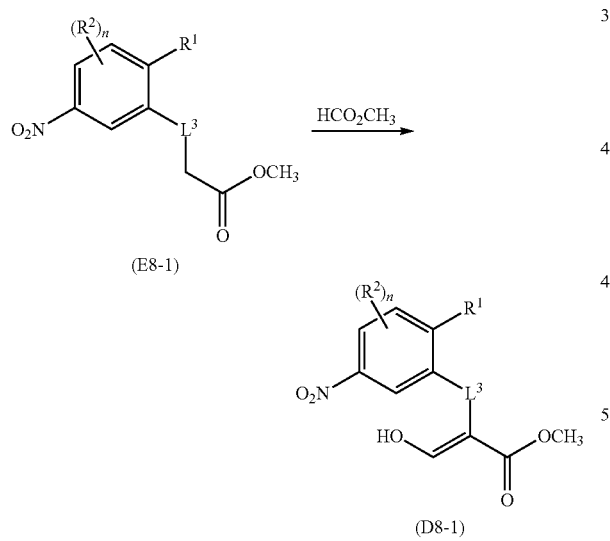

(E8-1)

(D8-1)

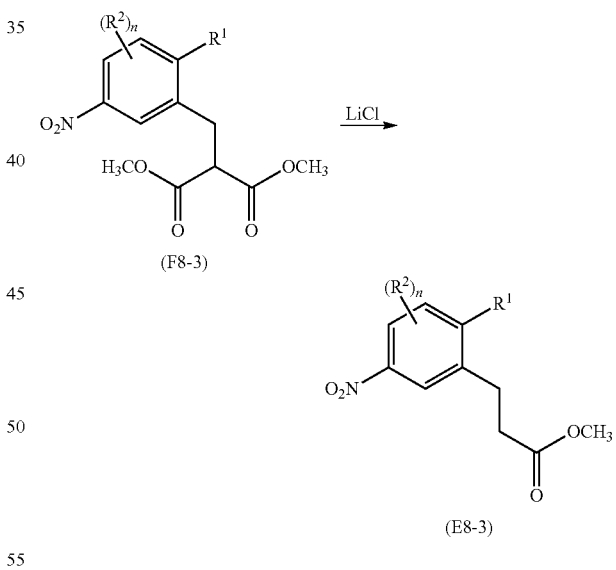

(F8-3)

(E8-3)

[wherein the symbols are the same as defined above]

The reaction can be carried out by using the compound (E8-1) in place of the compound (C1) according to the Reference Process A.

Reference Process N

A compound represented by formula (E8-2) (hereinafter, referred to as "Compound (E8-2)") can be prepared by reacting a compound represented by formula (F8-2) (hereinafter, referred to as "Compound (F8-2)") with methyl bromoacetate in the presence of a base.

[wherein the symbols are the same as defined above]

The reaction can be carried out by using the compound (F8-3) in place of the compound (D1-2) according to the Reference Process C.

The compound (F8-3) is a known compound, or can be prepared according to a publicly known method.

The compound of the present invention may be mixed or combined with one or more ingredients selected from a group consisting of the following Group (a), Group (b), Group (c), and Group (d), (hereinafter, referred to as "Present ingredient").

The above-mentioned mixing or combining represents a use of the compound of the present invention and the Present ingredient at same time, separately or at certain intervals.

When the compound of the present invention and the present ingredient are used at the same time, the compound of the present invention and the Present ingredient may be contained in separate formulations respectively, or may be contained in the same one formulation.

One aspect of the present invention is a composition comprising one or more ingredients selected from Group (a), Group (b), Group (c) and Group (d) as well as the compound of the present invention (hereinafter, referred to as Composition A).

Group (a) is a group consisting of
each active ingredient as Acetylcholinesterase inhibitors (for example, carbamate insecticides, or organophosphorus insecticides), GABA-gated chloride channel blockers (for example, phenylpyrazole insecticides), Sodium channel modulators (for example, pyrethroid insecticides), Nicotinic acetylcholine receptor competitive modulators (for example, neonicotinoid insecticides), Nicotinic acetylcholine receptor allosteric modulators, Glutamatergic chlorine ion channel allosteric modulators (for example, macrolide insecticides), Juvenile hormone mimic, Multisite inhibitors, chordotonal organ TRPV channel modulators, Mites growth inhibitors, Mitochondria ATP biosynthetic enzyme inhibitors, Uncouplers of oxidative phosphorylation, Nicotinic acetylcholine receptor channel blocker (for example, Nereistoxin insecticides), Chitin synthesis inhibitors, Molting inhibitors, Ecdysone receptor agonist, Octopamine receptor agonist, Inhibitors of Mitochondrial electron transport system complex I, II, III and IV, Voltage-dependent sodium channel blockers, Acetyl CoA carboxylase inhibitor, Ryanodine receptor modulator (for example, Diamide insecticides), Chordotonal organ modulators, Microbial pesticides; and
the other insecticidal, miticidal or nematicidal active ingredients.

These ingredients are classified as a class based on the action mechanism of IRAC.

Group (b) is a group consisting of
Nucleic acid synthesis inhibitors (for example, Phenylamide fungicides, or Acylamino acid fungicides), cell division and cytoskeleton inhibitors (for example, MBC fungicides), Respiratory inhibitors (for example, QoI fungicides or QiI fungicides), Amino acid synthesis and protein synthesis inhibitors (for example, anilinopyridine fungicides), Signal transduction inhibitors, Lipid synthesis and membrane synthesis inhibitors, sterol biosynthesis inhibitors (for example, DMI fungicides such as triazole), cell wall synthesis inhibitors, Melanin synthesis inhibitors, Plant defense inducers, Other action point contact active fungicides, Microbial fungicides, and the other fungicidal ingredients. These are classified as a class based on the action mechanism of FRAC.

Group (c) is a plant growth modulating ingredient group (including Mycorrhizal fungi, and Root nodule bacteria).

Group (d) is a repellent ingredient group consisting of a bird repellant ingredient and an insect repellant ingredient.

Examples of the combination of the Present ingredient and the compound of the present invention are described below. For example, alanycarb+SX represents a combination of alanycarb and SX. The symbol of "SX" represents any one of the compound of the present invention selected from the Compound Class SX208 to the Compound Class SX402. Also, all of the below-mentioned present active ingredient are known ingredients, and are commercially available or may be produced by the known method. If the present ingredient is a bacterium, it is available from the bacterial authority depository. The numerical number in bracket represents a CAS RN™.

Combination of the Present ingredient of the above Group (a) and the compound of the present invention: abamectin+SX, acephate+SX, acequinocyl+SX, acetamiprid+SX, acetoprole+SX, acrinathrin+SX, acynonapyr+SX, afidopyropen+SX, afoxolaner+SX, alanycarb+SX, aldicarb+SX, allethrin+SX, alpha-cypermethrin+SX, alpha-endosulfan+SX, aluminium phosphide+SX, amitraz+SX, azadirachtin+SX, azamethiphos+SX, azinphos-ethyl+SX, azinphos-methyl+SX, azocyclotin+SX, bark of Celastrus angulatus+SX, bendiocarb+SX, benfluthrin+SX, benfuracarb+SX, bensultap+SX, benzoximate+SX, benzpyrimoxan+SX, beta-cyfluthrin+SX, beta-cypermethrin+SX, bifenazate+SX, bifenthrin+SX, bioallethrin+SX, bioresmethrin+SX, bistrifluron+SX, borax+SX, boric acid+SX, broflanilide+SX, bromopropylate+SX, buprofezin+SX, butocarboxim+SX, butoxycarboxim+SX, cadusafos+SX, calcium phosphide+SX, carbaryl+SX, carbofuran+SX, carbosulfan+SX, cartap hydrochloride+SX, cartap+SX, chinomethionat+SX, chlorantraniliprole+SX, chlordane+SX, chlorethoxyfos+SX, chlorfenapyr+SX, chlorfenvinphos+SX, chlorfluazuron+SX, chlormephos+SX, chloropicrin+SX, chlorpyrifos+SX, chlorpyrifos-methyl+SX, chromafenozide+SX, clofentezine+SX, clothianidin+SX, concanamycin A+SX, coumaphos+SX, cryolite+SX, cyanophos+SX, cyantraniliprole+SX, cyclaniliprole+SX, cyclobutrifluram+SX, cycloprothrin+SX, cycloxaprid+SX, cyenopyrafen+SX, cyetpyrafen+SX, cyflumetofen+SX, cyfluthrin+SX, cyhalodiamide+SX, cyhalothrin+SX, cyhexatin+SX, cypermethrin+SX, cyphenothrin+SX, cyromazine+SX, dazomet+SX, deltamethrin+SX, demeton-S-methyl+SX, diafenthiuron+SX, diazinon+SX, dichlorvos+SX, dicloromezotiaz+SX, dicofol+SX, dicrotophos+SX, diflovidazin+SX, diflubenzuron+SX, dimefluthrin+SX, dimethoate+SX, dimethylvinphos+SX, dimpropyridaz+SX, dinotefuran+SX, disodium octaborate+SX, disulfoton+SX, DNOC (2-methyl-4,6-dinitrophenol)+SX, doramectin+SX, dried leaves of Dryopteris filix-mas+SX, emamectin-benzoate+SX, empenthrin+SX, endosulfan+SX, EPN (O-ethyl O-(4-nitrophenyl)phenylphosphonothioate)+SX, epsilon-metofluthrin+SX, epsilon-momfluorothrin+SX, esfenvalerate+SX, ethiofencarb+SX, ethion+SX, ethiprole+SX, ethoprophos+SX, etofenprox+SX, etoxazole+SX, extract of Artemisia absinthium+SX, extract of Cassia nigricans+SX, extract of clitoriaternatea+SX, extract of Symphytum officinale+SX, extracts or simulated blend of Chenopodium ambrosioides+SX, extract of Tanacetum vulgare+SX, extract of Urtica dioica+SX, extract of Viscum album+SX, famphur+SX, fenamiphos+SX, fenazaquin+SX, fenbutatin oxide+SX, fenitrothion+SX, fenobucarb+SX, fenoxycarb+SX, fenpropathrin+SX, fenpyroximate+SX, fenthion+SX, fenvalerate+SX, fipronil+SX, flometoquin+SX, flonicamid+SX, fluacrypyrim+SX, fluazaindolizine+SX, fluazuron+SX, flubendiamide+SX, flucycloxuron+SX, flucythrinate+SX, fluensulfone+SX, flufenoprox+SX, flufenoxuron+SX, flufiprole+SX, flumethrin+SX, flupentiofenox+SX, flupyradifurone+SX, flupyrimin+SX, fluralaner+SX, fluvalinate+SX, fluxametamide+SX, formetanate+SX, fosthiazate+SX, furamethrin+SX, furathiocarb+SX, gamma-cyhalothrin+SX, GS-omega/kappa HXTX-Hvla peptide+SX, halfenprox+SX, halofenozide+SX, heptafluthrin+SX, heptenophos+SX, hexaflumuron+SX, hexythiazox+SX, potassium salt of hop beta acid+SX, hydramethylnon+SX, hydroprene+SX, imicyafos+SX, imidacloprid)+SX, imidaclothiz+SX, imiprothrin+SX, indoxacarb+SX, isocycloseram+SX, isofenphos+SX, isoprocarb+SX, isopropyl-O-(methoxyaminothiophosphoryl)salicylate+SX, isoxathion+SX, ivermectin+SX, kadethrin+SX, kappa-tefluthrin+SX, kappa-bifenthrin+SX, kinoprene+SX, lambda-cyhalothrin+SX, lenoremycin+SX, lepimectin+SX, lime sulfur+SX, lotilaner+SX, lufenuron+SX, machine oil+SX, malathion+SX, mecarbam+SX, meperfluthrin+SX, metaflumizone+SX, metam+SX, methamidophos+SX, methidathion+SX, methiocarb+SX, methomyl+SX, methoprene+SX, methoxychlor+SX, methoxyfenozide+SX, methyl bromide+SX, metofluthrin+SX, metolcarb+SX, metoxadiazone+SX, mevinphos+SX, milbemectin+SX, milbemycin oxime+SX, momfluorothrin+SX, monocrotophos+SX, moxidectin+SX, naled+SX, neem oil+SX, nicotine+SX, nicotine-sulfate+SX, nitenpyram+SX, novaluron+SX, noviflumuron+SX, oil of the seeds of *Chenopodium* anthelminticum+SX, omethoate+SX, oxamyl+SX, oxazosulfyl+SX, oxydemeton-methyl+SX, parathion+SX, parathion-methyl+SX, permethrin+SX, phenothrin+SX, phenthoate+SX, phorate+SX, phosalone+SX, phosmet+SX, phosphamidon+SX, phosphine+SX, phoxim+SX, pirimicarb+SX, pirimiphos-methyl+SX, prallethrin+SX, profenofos+SX, profluthrin+SX, propargite+SX, propetamphos+SX, propoxur+SX, propylene glycol alginate+SX, prothiofos+SX, pyflubumide+SX, pymetrozine+SX, pyraclofos+SX, pyrethrins+SX, pyridaben+SX, pyridalyl+SX, pyridaphenthion+SX, pyrifluquinazone+SX, pyrimidifen+SX, pyriminostrobin+SX, pyriprole+SX, pyriproxyfen+SX, quinalphos+SX, resmethrin+SX, rotenone+SX, ryanodine+SX, sarolaner+SX, selamectin+SX, sigma-cypermethrin+SX, silafluofen+SX, sodium borate+SX, sodium metaborate+SX, spinetoram+SX, spinosad+SX, spirodiclofen+SX, spiromesifen+SX, spiropidion+SX, spirotetramat+SX, sulfluramid+SX, sulfotep+SX, sulfoxaflor+SX, sulfur+SX, sulfuryl fluoride+SX, tartar emetic+SX, tau-fluvalinate+SX, tebufenozide+SX, tebufenpyrad+SX, tebupirimfos+SX, teflubenzuron+SX, tefluthrin+SX, temephos+SX, terbufos+SX, terpene constituents of the extract of *chenopodium* ambrosioides near ambrosioides+SX, tetrachlorantraniliprole+SX, tetrachlorvinphos+SX, tetradifon+SX, tetramethrin+SX, tetramethylfluthrin+SX, tetraniliprole+SX, theta-cypermethrin+SX, thiacloprid+SX, thiamethoxam+SX, thiocyclam+SX, thiodicarb+SX, thiofanox+SX, thiometon+SX, thiosultap-disodium+SX, thiosultap-monosodium+SX, tioxazafen+SX, tolfenpyrad+SX, tralomethrin+SX, transfluthrin+SX, triazamate+SX, triazophos+SX, trichlorfon+SX, triflumezopyrim+SX, triflumuron+SX, trimethacarb+SX, tyclopyrazoflor+SX, vamidothion+SX, wood extract of Quassia amara+SX, XMC (3,5-dimethylphenyl N-methylcarbamate+SX, xylylcarb+SX, zeta-cypermethrin+SX, zinc phosphide+SX, 4-[5-(3,5-dichlorophenyl)-5-(trifluoromethyl)-4,5-dihydro-1,2-oxazol-3-yl]-2-methyl-N-(1-oxothietan-3-yl)benzamide (1241050-20-3)+SX, 3-methoxy-N-(5-{5-(trifluoromethyl)-5-[3-(trifluoromethyl)phenyl]-4,5-dihydro-1,2-oxazol-3-yl}indan-1-yl)propanamide (1118626-57-5)+SX, 4-chloro-5-[2,2-difluoro-2-(3,4,5-trifluorophenyl)ethoxy]-2-methylphenyl 2,2,2-trifluoroethyl sulfoxide (1632218-00-8)+SX, 4-fluoro-5-[2,2-difluoro-2-(3,4,5-trifluorophenyl)ethoxy]-2-methylphenyl 2,2,2-trifluoroethyl sulfoxide (1632217-98-1)+SX, 2-({2-fluoro-4-methyl-5-[(2,2,2-trifluoroethyl)sulfinyl]phenyl}imino)-3-(2,2,2-trifluoroethyl)-1,3-thiazolidin-4-one (1445683-71-5)+SX, (3R)-3-(2-chlorothiazol-5-yl)-8-methyl-7-oxo-6-phenyl-2,3-dihydrothiazolo[3,2-a]pyrimidin-4-ium-5-olate (2249718-27-0)+SX, BT crop protein CrylAb+SX, BT crop protein CrylAc+SX, BT crop protein CrylFa+SX, BT crop protein CrylA.105+SX, BT crop protein Cry2Ab+SX, BT crop protein Vip3A+SX, BT crop protein Cry3A+SX, BT crop protein Cry3Ab+SX, BT crop protein Cry3Bb+SX, BT crop protein Cry34Ab1/Cry35Ab1+SX, *Adoxophyes orana* granulosis virus strain BV-0001+SX, *Anticarsia gemmatalis* mNPV+SX, *Autographa californica* mNPV+SX, *Cydia pomonella* GV strain V15+SX, *Cydia pomonella* GV strain V22+SX, *Cryptophlebia leucotreta* GV+SX, *Dendrolimus* punctatus cypovirus+SX, *Helicoverpa armigera* NPV strain BV-0003+SX, *Helicoverpa zea* NPV+SX, *Lymantria dispar* NPV+SX, *Mamestra brassicae* NPV+SX, *Mamestra configurata* NPV+SX, Neodiprion *abietis* NPV+SX, Neodiprion *lecontei* NPV+SX, Neodiprion *sertifer* NPV+SX, *Nosema locustae*+SX, *Orgyia pseudotsugata* NPV+SX, *Pieris rapae* GV+SX, *Plodia interpunctella* GV+SX, *Spodoptera exigua* mNPV+SX, *Spodoptera littoralis* mNPV+SX, *Spodoptera litura* NPV+SX, *Arthrobotrys dactyloides*+SX, *Bacillus firmus* strain GB-126+SX, *Bacillus firmus* strain I-1582+SX, *Bacillus megaterium*+SX, *Bacillus* sp. strain AQ175+SX, *Bacillus* sp. strain AQ177+SX, *Bacillus* sp. strain AQ178+SX, *Bacillus sphaericus* strain 2362+SX, *Bacillus sphaericus* strain ABTS1743+SX, *Bacillus sphaericus* Serotype strain H5a5b+SX, *Bacillus thuringiensis* strain AQ52+SX, *Bacillus thuringiensis* strain BD #32+SX, *Bacillus thuringiensis* strain CR-371+SX, *Bacillus thuringiensis* subsp. *Aizawai* strain ABTS-1857+SX, *Bacillus thuringiensis* subsp. *Aizawai* strain AM65-52+SX, *Bacillus thuringiensis* subsp. *Aizawai* strain GC-91+SX, *Bacillus thuringiensis* subsp. *Aizawai* Serotype strain H-7+SX, *Bacillus thuringiensis* subsp. Kurstaki strain ABTS351+SX, *Bacillus thuringiensis* subsp. Kurstaki strain BMP123+SX, *Bacillus thuringiensis* subsp. Kurstaki strain EG234+SX, *Bacillus thuringiensis* subsp. Kurstaki strain EG7841+SX, *Bacillus thuringiensis* subsp. Kurstaki strain EVB113-19+SX, *Bacillus thuringiensis* subsp. Kurstaki strain F810+SX, *Bacillus thuringiensis* subsp. Kurstaki strain HD-1+SX, *Bacillus thuringiensis* subsp. Kurstaki strain PB54+SX, *Bacillus thuringiensis* subsp. Kurstaki strain SA-11+SX, *Bacillus thuringiensis* subsp. Kurstaki strain SA-12+SX, *Bacillus thuringiensis* subsp. Tenebriosis strain NB176+SX, *Bacillus thuringiensis* subsp. *Thuringiensis* strain MPPL002+SX, *Bacillus thuringiensis* subsp. *morrisoni*+SX, *Bacillus thuringiensis* var. *colmeri*+SX, *Bacillus thuringiensis* var. darmstadiensis strain 24-91+SX, *Bacillus thuringiensis* var. *dendrolimus*+SX, *Bacillus thuringiensis* var. *galleriae*+SX, *Bacillus thuringiensis* var. *israelensis* strain BMP144+SX, *Bacillus thuringiensis* var. *israelensis* serotype strain H-14+SX, *Bacillus thuringiensis* var. japonensis strain *Buibui*+SX, *Bacillus thuringiensis* var. san diego strain M-7+SX, *Bacillus thuringiensis* var. 7216+SX, *Bacillus thuringiensis* var. *aegypti*+SX, *Bacillus thuringiensis* var. T36+SX, *Beauveria bassiana* strain ANT-03+SX, *Beauveria bassiana* strain ATCC74040+SX, *Beauveria bassiana* strain GHA+SX, *Beauveria brongniartii*+SX, *Burkholderia* rinojensis strain A396+SX, Chromobacterium subtsugae strain PPAA4-1T+SX, Dactyllela *ellipsospora*+SX, Dectylaria *thaumasia*+SX, Hirsuteila *minnesotensis*+SX, Hirsutella *rhossiliensis*+SX, Hirsutella *thompsonii*+SX, Lagenidium *giganteum*+SX, Lecanicillium *lecanii* strain KV01+SX, Lecanicillium *lecanii* conidia of strain DAOM198499+SX, Lecanicillium *lecanii* conidia of strain DAOM216596+SX, Lecanicillium *muscarium* strain Ve6+SX, *Metarhizium anisopliae* strain F52+SX, *Metarhizium* anisopiiae var. acridum+SX, *Metarhizium anisopliae* var. *anisopliae* BIPESCO 5/F52+SX, *Metarhizium flavoviride*+SX, *Monacrosporium* phymatopagua+SX, *Paecilomyces* fumosoroseus Apopka strain 97+SX, *Paecilomyces lilacinus* strain 251+SX, *Paecilomyces tenuipes* strain Ti+SX, *Paenibacillus popilliae*+SX, *Pasteuria nishizawae* strain Pn1+SX, *Pasteuria penetrans*+SX, *Pasteuria* usgae+SX, *Pasteuria* thoynei+SX, *Serratia entomophila*+SX, *Verticillium chlamydosporium*+SX, *Verticillium* lecani strain NCIM1312+SX, N-{4-chloro-3-[(1-cyanocyclopropyl)carbamoyl]phenyl}-1-methyl-4-(methanesulfonyl)-3-(1,1,2,2,2-pentafluoroethyl)-1H-pyrazole-3-carboxamide (1400768-21-9)+SX, 11-(4-chloro-2,6-dimethylphenyl)-12-hydroxy-1,4-dioxa-9-azadispiro[4.2.4.2]tetradec-11-en-10-one (907187-07-9)+SX, 3-(4'-fluoro-2,4-dimethyl[1,1'-biphenyl]-3-yl)-4-hydroxy-8-oxa-1-azaspiro[4.5]dec-3-en-2-one (1031385-91-7)+SX, N-[3-chloro-1-(pyridin-3-yl)-1H-pyrazol-4-yl]-2-(methanesulfonyl)propanamide (2396747-83-2)+SX, 2-isopropyl-5-[(3,4,4-trifluoro-3-buten-1-yl)sulfonyl]-1,3,4-thiadiazole (2058052-95-0)+SX, nicofluprole+SX, 1,4-dimethyl-2-[2-(3-pyridinyl)-2H-indazol-5-yl]-1,2,4-triazolidine-3,5-dione (2171099-09-3)+SX, cyproflanilide+SX, N-({2-fluoro-4-[(2S,3S)-2-hydroxy-3-(3,4,5-trichlorophenyl)-3-(trifluoromethyl)pyrrolidin-1-yl]phenyl}methyl)cyclopropanecarboxamide+SX.

Combination of the Present ingredient of the above Group (b) and the compound of the present invention:

acibenzolar-S-methyl+SX, aldimorph+SX, ametoctradin+SX, aminopyrifen+SX, amisulbrom+SX, anilazine+SX, azaconazole+SX, azoxystrobin+SX, basic copper sulfate+SX, benalaxyl+SX, benalaxyl-M+SX, benodanil+SX, benomyl+SX, benthiavalicarb+SX, benthiavalicarb-isopropyl+SX, benzovindiflupyr+SX, binapacryl+SX, biphenyl+SX, bitertanol+SX, bixafen+SX, blasticidin-S+SX, Bordeaux mixture+SX, boscalid+SX, bromothalonil+SX, bromuconazole+SX, bupirimate+SX, captafol+SX, captan+SX, carbendazim+SX, carboxin+SX, carpropamid+SX, chinomethionat+SX, chitin+SX, chloroneb+SX, chlorothalonil+SX, chlozolinate+SX, colletochlorin B+SX, copper(II) acetate+SX, copper(II) hydroxide+SX, copper oxychloride+SX, copper(II) sulfate+SX, coumoxystrobin+SX, cyazofamid+SX, cyflufenamid+SX, cymoxanil+SX, cyproconazole+SX, cyprodinil+SX, dichlobentiazox+SX, dichlofluanid+SX, diclocymet+SX, diclomezine+SX, dicloran+SX, diethofencarb+SX, difenoconazole+SX, diflumetorim+SX, dimethachlone+SX, dimethirimol+SX, dimethomorph+SX, dimoxystrobin+SX, diniconazole+SX, diniconazole-M+SX, dinocap+SX, dipotassium hydrogenphosphite+SX, dipymetitrone+SX, dithianon+SX, dodecylbenzenesulphonic acid bisethylenediamine copper(II) salt+SX, dodemorph+SX, dodine+SX, edifenphos+SX, enoxastrobin+SX, epoxiconazole+SX, etaconazole+SX, ethaboxam+SX, ethirimol+SX, etridiazole+SX, extract from *Melaleuca* alternifolia+SX, extract from *Reynoutria sachalinensis*+SX, extract from the cotyledons of lupine plantlets ("BLAD")+SX, extract of *Allium sativum*+SX, extract of Equisetum *arvense*+SX, extract of *Tropaeolum majus*+SX, famoxadone+SX, fenamidone+SX, fenaminstrobin+SX, fenarimol+SX, fenbuconazole+SX, fenfuram+SX, fenhexamid+SX, fenoxanil+SX, fenpiclonil+SX, fenpicoxamid+SX, fenpropidin+SX, fenpropimorph+SX, fenpyrazamine+SX, fentin acetate+SX, fentin chloride+SX, fentin hydroxide+SX, ferbam+SX, ferimzone+SX, florylpicoxamid+SX, fluazinam+SX, flubeneteram+SX, fludioxonil+SX, flufenoxystrobin+SX, fluindapyr+SX, flumorph+SX, fluopicolide+SX, fluopyram+SX, fluopimomide+SX, fluoroimide+SX, fludioxonil+SX, flufenoxystrobin+SX, fluindapyr+SX, flumorph+SX, fluopicolide+SX, fluopyram+SX, fluopimomide+SX, fluoroimide+SX, fluoxapiprolin+SX, fluoxastrobin+SX, fluquinconazole+SX, flusilazole+SX, flusulfamide+SX, flutianil+SX, flutolanil+SX, flutriafol+SX, fluxapyroxad+SX, folpet+SX, fosetyl+SX, fosetyl-aluminium+SX, fuberidazole+SX, furalaxyl+SX, furametpyr+SX, guazatine+SX, hexaconazole+SX, hymexazole+SX, imazalil+SX, imibenconazole+SX, iminoctadine+SX, iminoctadine triacetate+SX, inpyrfluxam+SX, iodocarb+SX, ipconazole+SX, ipfentrifluconazole+SX, ipflufenoquin+SX, iprobenfos+SX, iprodione+SX, iprovalicarb+SX, isofetamid+SX, isoflucypram+SX, isoprothiolane+SX, isopyrazam+SX, isotianil+SX, kasugamycin+SX, kresoxim-methyl+SX, laminarin+SX, leaves and bark of *Quercus*+SX, mancozeb+SX, mandestrobin+SX, mandipropamid+SX, maneb+SX, mefentrifluconazole+SX, mepanipyrim+SX, mepronil+SX, meptyldinocap+SX, metalaxyl+SX, metalaxyl-M+SX, metconazole+SX, methasulfocarb+SX, metiram+SX, metominostrobin+SX, metrafenone+SX, metyltetraprole+SX, mineral oils+SX, myclobutanil+SX, naftifine+SX, nuarimol+SX, octhilinone+SX, ofurace+SX, orysastrobin+SX, oxadixyl+SX, oxathiapiprolin+SX, oxine-copper+SX, oxolinic acid+SX, oxpoconazole+SX, oxpoconazole fumarate+SX, oxycarboxin+SX, oxytetracycline+SX, pefurazoate+SX, penconazole+SX, pencycuron+SX, penflufen+SX, penthiopyrad+SX, phenamacril+SX, phosphorous acid+SX, phthalide+SX, picarbutrazox+SX, picoxystrobin+SX, piperalin+SX, polyoxins+SX, potassium hydrogencarbonate+SX, potassium dihydrogenphosphite+SX, probenazole+SX, prochloraz+SX, procymidone+SX, propamidine+SX, propamocarb+SX, propiconazole+SX, propineb+SX, proquinazid+SX, prothiocarb+SX, prothioconazole+SX, pydiflumetofen+SX, pyraclostrobin+SX, pyrametostrobin+SX, pyraoxystrobin+SX, pyrapropoyne+SX, pyraziflumid+SX, pyrazophos+SX, pyribencarb+SX, pyributicarb+SX, pyridachlometyl+SX, pyrifenox+SX, pyrimethanil+SX, pyrimorph+SX, pyriofenone+SX, pyrisoxazole+SX, pyroquilon+SX, Quillaja extract+SX, quinconazole+SX, quinofumelin+SX, quinoxyfen+SX, quintozene+SX, Saponins of *Chenopodium quinoa*+SX, sedaxane+SX, silthiofam+SX, simeconazole+SX, sodium hydrogencarbonate+SX, spiroxamine+SX, streptomycin+SX, sulfur+SX, tebuconazole+SX, tebufloquin+SX, teclofthalam+SX, tecnazene+SX, terbinafine+SX, tetraconazole+SX, thiabendazole+SX, thifluzamide+SX, thiophanate+SX, thiophanate-methyl+SX, thiram+SX, thymol+SX, tiadinil+SX, tolclofos-methyl+SX, tolfenpyrad+SX, tolprocarb+SX, tolylfluanid+SX, triadimefon+SX, triadimenol+SX, triazoxide+SX, triclopyricarb+SX, tricyclazole+SX, tridemorph+SX, trifloxystrobin+SX, triflumizole+SX, triforine+SX, triticonazole+SX, validamycin+SX, valifenalate+SX, vinclozolin+SX, yellow mustard powder+SX, zinc thiazole+SX, zineb+SX, ziram+SX, zoxamide+SX, N'-[4-({3-[(4-chlorophenyl)methyl]-1,2,4-thiadiazol-5-yl}oxy)-2,5-dimethylphenyl]-N-ethyl-N-methylmethanimidamide (1202781-91-6)+SX, N'-{4-[(4,5-dichlorothiazol-2-yl)oxy]-2,5-dimethylphenyl}-N-ethyl-N-methylmethanimidamide (929908-57-6)+SX, N'-(2,5-dimethyl-4-phenoxyphenyl)-N-ethyl-N-methylmethanimidamide (1052688-31-9)+SX, N'-[5-choro-4-(2-fluorophenoxy)-2-methylphenyl)-N-ethyl-N-methylmethanimidamide (2055589-28-9)+SX, N'-[2-choro-4-(2-fluorophenoxy)-5-methylphenyl)-N-ethyl-N-methylmethanimidamide (2055756-21-1)+SX, N'-[4-(1-hydroxy-1-phenyl-2,2,2-trifluoroethyl)-2-methyl-5-methoxyphenyl)-N-isopropyl-N-methylmethanimidamide (2101814-55-3)+SX, N'-[5-bromo-6-(1-methyl-2-propoxyethoxy)-2-methylpyridin-3-yl)-N-ethyl-N-methylmethanimidamide (1817828-69-5)+SX, 4-(2-bromo-4-fluorophenyl)-N-(2-chloro-6-fluorophenyl)-1,3-dimethyl-1H- pyrazol-5-amine (1362477-26-6)+SX, 2-[6-(3-fluoro-4-methoxyphenyl)-5-methylpyridin-2-yl]quinazoline (1257056-97-5)+SX, 5-fluoro-4-imino-3-methyl-1-tosyl-3,4-dihydropyrimidin-2 (1H)-one (1616664-98-2)+SX, ethyl (2Z)-3-amino-2-cyano-3-phenylacrylate (39491-78-6)+SX, N-[(2-chlorothiazol-5-yl)methyl]-N-ethyl-6-methoxy-3-nitropyridin-2-amine (1446247-98-8)+SX, 5-(4-chlorobenzyl)-2-(chloromethyl)-2-methyl-1-(1H-1,2,4-triazol-1-ylmethyl)cyclopentan-1-ol (1394057-11-4)+SX, (1R,2S, 5S)-5-(4-chlorobenzyl)-2-(chloromethyl)-2-methyl-1-(1H-1,2,4-triazol-1-ylmethyl)cyclopentan-1-ol (1801930-06-2)+SX, (1S, 2R, 5R)-5-(4-chlorobenzyl)-2-(chloromethyl)-2-methyl-1-(1H-1,2,4-triazol-1-ylmethyl)cyclopentan-1-ol (1801930-07-3)+SX, 2-(chloromethyl)-5-(4-fluorobenzyl)-2-methyl-1-(1H-1,2,4-triazol-1-ylmethyl)cyclopentan-1-ol (1394057-13-6)+SX, (1R, 2S, 5S)-2-(chloromethyl)-5-(4-fluorobenzyl)-2-methyl-1-(1H-1,2,4-triazol-1-ylmethyl)cyclopentan-1-ol (1801930-08-4)+SX, (1S, 2R, 5R)-2-(chloromethyl)-5-(4-fluorobenzyl)-2-methyl-1-(1H-1,2,4-triazol-1-ylmethyl)cyclopentan-1-ol (1801930-09-5)+SX, methyl 3-[(4-chlorophenyl)methyl]-2-hydroxy-1-methyl-2-(1H-1,2,4-triazol-1-ylmethyl)cyclopentan-1-carboxylate (1791398-02-1)+SX, 1-(2,4-difluorophenyl)-2-(1H-1,2,4-triazol-1-yl)-1-[1-(4-bromo-2,6-difluorophenoxy)cyclopropyl]ethanol (2019215-86-0)+SX, 1-(2,4-difluorophenyl)-2-(1H-1,2,4-triazol-1-yl)-1-[1-(4-chloro-2,6-difluorophenoxy)cyclopropyl]ethanol (2019215-84-8)+SX, 1-[2-(1-chlorocyclopropyl)-3-(2-fluorophenyl)-2-hydroxypropyl]-1H-imidazole-5-carbonitrile (2018316-13-5)+SX, 1-[2-(1-chlorocyclopropyl)-3-(2,3-difluorophenyl)-2-hydroxypropyl]-1H-imidazole-5-carbonitrile (2018317-25-2)+SX, 4-({6-[2-(2,4-difluorophenyl)-1,1-difluoro-2-hydroxy-3-(1H-1,2,4-triazol-1-yl)propyl]pyridin-3-yl}oxy)benzonitrile (2046300-61-0)+SX, 2-[6-(4-bromophenoxy)-2-(trifluoromethyl)pyridin-3-yl]-1-(1H-1,2,4-triazol-1-yl) propan-2-ol (2082661-43-4)+SX, 2-[6-(4-chlorophenoxy)-2-(trifluoromethyl)pyridin-3-yl]-1-(1H-1,2,4-triazol-1-yl) propan-2-ol (2082660-27-1)+SX, methyl({2-methyl-5-[1-(4-methoxy-2-methylphenyl)-1H-pyrazol-3-yl]phenyl}methyl)carbamate (1605879-98-8)+SX, 2-(difluoromethyl)-N-[1,1,3-trimethyl-2,3-dihydro-1H-inden-4-yl]pyridine-3-carboxamide (1616239-21-4)+SX, 2-(difluoromethyl)-N-[3-ethyl-1,1-dimethyl-2,3-dihydro-1H-inden-4-yl]pyridine-3-carboxamide (1847460-02-9)+SX, 2-(difluoromethyl)-N-[3-propyl-1,1-dimethyl-2,3-dihydro-1H-inden-4-yl]pyridine-3-carboxamide (1847460-05-2)+SX, (2E,3Z)-5-{[1-(4-chlorophenyl)-1H-pyrazol-3-yl]oxy}-2-(methoxyimino)-N,3-dimethylpent-3-enamide (1445331-27-0)+SX, (2E,3Z)-5-{[1-(2,4-dichlorophenyl)-1H-pyrazol-3-yl]oxy}-2-(methoxyimino)-N,3-dimethylpent-3-enamide (1445331-54-3)+SX, 5-chloro-4-({2-[6-(4-chlorophenoxy)pyridin-3-yl]ethyl}amino)-6-methylpyrimidine (1605340-92-8)+SX, N-(1-benzyl-1,3-dimethylbutyl)-8-fluoroquinoline-3-carboxamide (2132414-04-9)+SX, N-(1-benzyl-3,3,3-trifluoro-1-methylpropyl)-8-fluoroquinoline-3-carboxamide (2132414-00-5)+SX, 4,4-dimethyl-2-({4-[5-(trifluoromethyl)-1,2,4-oxadiazol-3-yl]phenyl}methyl)isoxazolidin-3-one (2098918-25-1)+SX, 5,5-dimethyl-2-({4-[5-(trifluoromethyl)-1,2,4-oxadiazol-3-yl]phenyl}methyl)isoxazolidin-3-one (2098918-26-2)+SX, *Agrobacterium* radiobacter strain K1026+SX, *Agrobacterium* radiobacter strain K84+SX, *Bacillus amyloliquefaciens* (Aveo(Trademark) EZ Nematicide)+SX, *Bacillus amyloliquefaciens* strain AT332+SX, *Bacillus amyloliquefaciens* strain B3+SX, *Bacillus amyloliquefaciens* strain D747+SX, *Bacillus amyloliquefaciens* strain DB101+SX, *Bacillus amyloliquefaciens* strain DB102+SX, *Bacillus amyloliquefaciens* strain GB03+SX, *Bacillus amyloliquefaciens* strain FZB24+SX, *Bacillus amyloliquefaciens* strain FZB42+SX, *Bacillus amyloliquefaciens* strain IN937a+SX, *Bacillus amyloliquefaciens* strain MBI600+SX, *Bacillus amyloliquefaciens* strain QST713+SX, *Bacillus amyloliquefaciens* isolate strain B246+SX, *Bacillus amyloliquefaciens* strain F727+SX, *Bacillus amyloliquefaciens* subsp. *plantarum* strain D747+SX, *Bacillus licheniformis* strain HB-2+SX, *Bacillus licheniformis* strain SB3086+SX, *Bacillus pumilus* strain AQ717+SX, *Bacillus pumilus* strain BUF-33+SX, *Bacillus pumilus* strain GB34+SX, *Bacillus pumilus* strain QST2808+SX, *Bacillus simplex* strain CGF2856+SX, *Bacillus subtilis* strain AQ153+SX, *Bacillus subtilis* strain AQ743+SX, *Bacillus subtilis* strain BU1814+SX, *Bacillus subtilis* strain D747+SX, *Bacillus subtilis* strain DB101+SX, *Bacillus subtilis* strain FZB24+SX, *Bacillus subtilis* strain GB03+SX, *Bacillus subtilis* strain HAI0404+SX, *Bacillus subtilis* strain IAB/BSO3+SX, *Bacillus subtilis* strain MBI600+SX, *Bacillus subtilis* strain QST30002/AQ30002+SX, *Bacillus subtilis* strain QST30004/AQ30004+SX, *Bacillus subtilis* strain QST713+SX, *Bacillus subtilis* strain QST714+SX, *Bacillus subtilis* var. *Amyloliquefaciens* strain FZB24+SX, *Bacillus subtilis* strain Y1336+SX, *Burkholderia cepacia*+SX, *Burkholderia cepacia* type Wisconsin strain J82+SX, *Burkholderia cepacia* type Wisconsin strain M54+SX, *Candida oleophila* strain O+SX, *Candida saitoana*+SX, *Chaetomium cupreum*+SX, Clonostachys *rosea*+SX, *Coniothyrium minitans* strain CGMCC8325+SX, *Coniothyrium minitans* strain CON/M/91-8+SX, *cryptococcus albidus*+SX, *Erwinia carotovora* subsp. *carotovora* strain CGE234M403+SX, *Fusarium oxysporum* strain Fo47+SX, *Gliocladium catenulatum* strain J1446+SX, *Paenibacillus polymyxa* strain AC-1+SX, *Paenibacillus polymyxa* strain BS-0105+SX, *Pantoea agglomerans* strain E325+SX, *Phlebiopsis gigantea* strain VRA1992+SX, *Pseudomonas aureofaciens* strain TX-1+SX, *Pseudomonas chlororaphis* strain 63-28+SX, *Pseudomonas chlororaphis* strain AFS009+SX, *Pseudomonas chlororaphis* strain MA342+SX, *Pseudomonas fluorescens* strain 1629RS+SX, *Pseudomonas fluorescens* strain A506+SX, *Pseudomonas fluorescens* strain CL145A+SX, *Pseudomonas fluorescens* strain G7090+SX, *Pseudomonas* sp. strain CAB-02+SX, *Pseudomonas syringae* strain 742RS+SX, *Pseudomonas syringae* strain MA-4+SX, *Pseudozyma flocculosa* strain PF-A22UL+SX, *Pseudomonas rhodesiae* strain HAI-0804+SX, *Pythium oligandrum* strain DV74+SX, *Pythium oligandrum* strain M1+SX, *Streptomyces griseoviridis* strain K61+SX, *Streptomyces lydicus* strain WYCD108US+SX, *Streptomyces lydicus* strain WYEC108+SX, *Talaromyces flavus* strain SAY-Y-94-01+SX, *Talaromyces flavus* strain V117b+SX, *Trichoderma asperellum* strain ICCO12+SX, *Trichoderma asperellum* SKT-1+SX, *Trichoderma asperellum* strain T25+SX, *Trichoderma asperellum* strain T34+SX, *Trichoderma asperellum* strain TV1+SX, *Trichoderma atroviride* strain CNCM 1-1237+SX, *Trichoderma atroviride* strain LC52+SX, *Trichoderma atroviride* strain IMI 206040+SX, *Trichoderma atroviride* strain SC1+SX, *Trichoderma atroviride* strain SKT-1+SX, *Trichoderma atroviride* strain T11+SX, *Trichoderma gamsii* strain ICCO80+SX, *Trichoderma harzianum* strain 21+SX, *Trichoderma harzianum* strain DB104+SX, *Trichoderma harzianum* strain DSM 14944+SX, *Trichoderma harzianum* strain ESALQ-1303+SX, *Trichoderma harzianum* strain ESALQ-1306+SX, *Trichoderma harzianum* strain IIHR—Th-2+SX, *Trichoderma harzianum* strain ITEM908+SX, *Trichoderma harzianum* strain kd+SX, *Trichoderma harzianum* strain MO1+SX, *Trichoderma harzianum* strain SF+SX, *Tricho-*

*derma harzianum* strain T22+SX, *Trichoderma harzianum* strain T39+SX, *Trichoderma harzianum* strain T78+SX, *Trichoderma harzianum* strain TH35+SX, *Trichoderma polysporum* strain IMI206039+SX, *trichoderma stromaticum*+SX, *Trichoderma virens* strain G-41+SX, *Trichoderma virens* strain GL-21+SX, *Trichoderma viride*+SX, *Variovorax paradoxus* strain CGF4526+SX, Harpin protein+SX, (2S,3S)-3-(2-methylphenyl)butan-2-yl N-[(3-acetoxy-4-methoxypyridin-2-yl)carbonyl]-L-alaninate (2376210-00-1)+SX, (2S,3S)-3-(4-fluoro-2-methylphenyl)butan-2-yl N-[(3-acetoxy-4-methoxypyridin-2-yl)carbonyl]-L-alaninate+SX, (2S,3S)-3-(4-methoxy-2-methylphenyl)butan-2-yl N-[(3-acetoxy-4-methoxypyridin-2-yl)carbonyl]-L-alaninate+SX, (2S,3S)-3-(2,4-dimethylphenyl)butan-2-yl N-[(3-acetoxy-4-methoxypyridin-2-yl)carbonyl]-L-alaninate (2376209-13-9)+SX, (2S,3S)-3-(2-methylphenyl)butan-2-yl N-({3-[(2-methylpropanoyl)oxy]-4-methoxypyridin-2-yl}carbonyl)-L-alaninate (2376210-02-3)+SX, (2S,3S)-3-(4-fluoro-2-methylphenyl)butan-2-yl N-({3-[(2-methylpropanoyl)oxy]-4-methoxypyridin-2-yl}carbonyl)-L-alaninate+SX, (2S,3S)-3-(4-methoxy-2-methylphenyl)butan-2-yl N-({3-[(2-methylpropanoyl)oxy]-4-methoxypyridin-2-yl}carbonyl)-L-alaninate (2376209-40-2)+SX, (2S,3S)-3-(2,4-dimethylphenyl)butan-2-yl N-({3-[(2-methylpropanoyl)oxy]-4-methoxypyridin-2-yl}carbonyl)-L-alaninate (2376209-15-1)+SX, N'-(2-choro-4-phenoxy-5-methylphenyl)-N-ethyl-N-methylmethanimidamide (2062599-39-5)+SX, (2S,3S)-3-(2-methylphenyl)butan-2-yl N-[(3-hydroxy-4-methoxypyridin-2-yl)carbonyl]-L-alaninate+SX, (2S,3S)-3-(4-fluoro-2-methylphenyl)butan-2-yl N-[(3-hydroxy-4-methoxypyridin-2-yl)carbonyl]-L-alaninate+SX, (2S,3S)-3-(4-methoxy-2-methylphenyl)butan-2-yl N-[(3-hydroxy-4-methoxypyridin-2-yl)carbonyl]-L-alaninate+SX, (2S,3S)-3-(2,4-dimethylphenyl)butan-2-yl N-[(3-hydroxy-4-methoxypyridin-2-yl)carbonyl]-L-alaninate+SX, (2S,3S)-3-(4-fluoro-2-methylphenyl)-4-methylpentan-2-yl N-[(3-acetoxy-4-methoxypyridin-2-yl)carbonyl]-L-alaninate+SX, (2S,3S)-3-(2-fluoro-4-methylphenyl)-4-methylpentan-2-yl N-[(3-acetoxy-4-methoxypyridin-2-yl)carbonyl]-L-alaninate+SX, (2S,3S)-3-(2,4-difluorophenyl)-4-methylpentan-2-yl N-[(3-acetoxy-4-methoxypyridin-2-yl)carbonyl]-L-alaninate+SX, (2S,3S)-3-(2,4-dimethylphenyl)-4-methylpentan-2-yl N-[(3-acetoxy-4-methoxypyridin-2-yl)carbonyl]-L-alaninate+SX, (2S,3S)-3-(4-fluoro-2-methoxylphenyl)-4-methylpentan-2-yl N-[(3-acetoxy-4-methoxypyridin-2-yl)carbonyl]-L-alaninate+SX, (2S,3S)-3-(4-fluoro-2-methylphenyl)-4-methylpentan-2-yl N-{[3-(acetoxymethoxy)-4-methoxypyridin-2-yl]carbonyl}-L-alaninate+SX, (2S,3S)-3-(2-fluoro-4-methylphenyl)-4-methylpentan-2-yl N-{[3-(acetoxymethoxy)-4-methoxypyridin-2-yl]carbonyl}-L-alaninate+SX, (2S,3S)-3-(2,4-difluorophenyl)-4-methylpentan-2-yl N-{[3-(acetoxymethoxy)-4-methoxypyridin-2-yl]carbonyl}-L-alaninate+SX, (2S,3S)-3-(2,4-dimethylphenyl)-4-methylpentan-2-yl N-{[3-(acetoxymethoxy)-4-methoxypyridin-2-yl]carbonyl}-L-alaninate+SX, (2S,3S)-3-(4-fluoro-2-methoxylphenyl)-4-methylpentan-2-yl N-{[3-(acetoxymethoxy)-4-methoxypyridin-2-yllcarbonyl}-L-alaninate+SX, (2S,3S)-3-(4-fluoro-2-methylphenyl)-4-methylpentan-2-yl N-({3-[(isobutyryloxy)methoxy]-4-methoxypyridin-2-yl}carbonyl)-L-alaninate+SX, (2S,3S)-3-(2-fluoro-4-methylphenyl)-4-methylpentan-2-yl N-({3-[(isobutyryloxy)methoxy]-4-methoxypyridin-2-yl}carbonyl)-L-alaninate+SX, (2S,3S)-3-(2,4-difluorophenyl)-4-methylpentan-2-yl N-({3-[(isobutyryloxy)methoxy]-4-methoxypyridin-2-yl}carbonyl)-L-alaninate+SX, (2S,3S)-3-(2,4-dimethylphenyl)-4-methylpentan-2-yl N-({3-[(isobutyryloxy)methoxy]-4-methoxypyridin-2-yl}carbonyl)-L-alaninate+SX, (2S,3S)-3-(4-fluoro-2-methoxylphenyl)-4-methylpentan-2-yl N-({3-[(isobutyryloxy)methoxy]-4-methoxypyridin-2-yl}carbonyl)-L-alaninate+SX, (2S,3S)-3-(4-fluoro-2-methylphenyl)-4-methylpentan-2-yl N-[(3-hydroxy-4-methoxypyridin-2-yl)carbonyl]-L-alaninate+SX, (2S,3S)-3-(2-fluoro-4-methylphenyl)-4-methylpentan-2-yl N-[(3-hydroxy-4-methoxypyridin-2-yl)carbonyl]-L-alaninate+SX, (2S,3S)-3-(2,4-difluorophenyl)-4-methylpentan-2-yl N-[(3-hydroxy-4-methoxypyridin-2-yl)carbonyl]-L-alaninate+SX, (2S,3S)-3-(2,4-dimethylphenyl)-4-methylpentan-2-yl N-[(3-hydroxy-4-methoxypyridin-2-yl)carbonyl]-L-alaninate+SX, (2S,3S)-3-(4-fluoro-2-methoxylphenyl)-4-methylpentan-2-yl N-[(3-hydroxy-4-methoxypyridin-2-yl)carbonyl]-L-alaninate+SX, 3-(4-bromo-7-fluoroindol-1-yl)butan-2-yl N-[(3-hydroxy-4-methoxypyridin-2-yl)carbonyl]-L-alaninate+SX, 3-(7-bromoindol-1-yl)butan-2-yl N-[(3-hydroxy-4-methoxypyridin-2-yl)carbonyl]-L-alaninate+SX, 3-(7-bromo-4-fluoroindol-1-yl)butan-2-yl N-[(3-hydroxy-4-methoxypyridin-2-yl)carbonyl]-L-alaninate+SX, 3-(3,5-dichloropyridin-2-yl)butan-2-yl N-[(3-hydroxy-4-methoxypyridin-2-yl)carbonyl]-L-alaninate+SX, 3-(3,5-dichloropyridin-2-yl)butan-2-yl N-{[3-(acetoxymethoxy)-4-methoxypyridin-2-yl]carbonyl}-L-alaninate+SX, (1S)-1-[1-(naphthalen-1-yl)cyclopropyl]ethyl N-[(3-hydroxy-4-methoxypyridin-2-yl)carbonyl]-L-alaninate+SX, (1S)-1-[1-(naphthalen-1-yl)cyclopropyl]ethyl N-[(3-acetoxy-4-methoxypyridin-2-yl)carbonyl]-L-alaninate+SX, (1S)-1-[1-(naphthalen-1-yl)cyclopropyl]ethyl N-{[3-(acetoxymethoxy)-4-methoxypyridin-2-yl]carbonyl}-L-alaninate+SX, chloroinconazide+SX, N-ethyl-2-methyl-N-({4-[5-(trifluoromethyl)-1,2,4-oxadiazol-3-yl]phenyl}methyl)propanamide+SX, N,2-dimethoxy-N-({4-[5-(trifluoromethyl)-1,2,4-oxadiazol-3-yl]phenyl}methyl)propanamide+SX, N-methoxy-N-({4-[5-(trifluoromethyl)-1,2,4-oxadiazol-3-yl]phenyl}methyl)cyclopropanecarboxamide+SX, N-methoxy-N'-methyl-N-({4-[5-(trifluoromethyl)-1,2,4-oxadiazol-3-yl]phenyl}methyl)urea+SX, N'-ethyl-N-methoxy-N-({4-[5-(trifluoromethyl)-1,2,4-oxadiazol-3-yl]phenyl}methyl)urea+SX, N,N'-dimethoxy-N-({4-[5-(trifluoromethyl)-1,2,4-oxadiazol-3-yl]phenyl}methyl)urea+SX, N-(2-fluorophenyl)-4-[5-(trifluoromethyl)-1,2,4-oxadiazol-3-yl]benzamide+SX, N-[2-(difluoromethoxy)phenyl]-4-[5-(trifluoromethyl)-1,2,4-oxadiazol-3-yl]benzamide+SX, N-[2-(difluoromethoxy)-4-fluorophenyl]-4-[5-(trifluoromethyl)-1,2,4-oxadiazol-3-yl]benzamide+SX, N-acetyl-2-(ethanesulfonyl)-N-[2-(methoxycarbonyl)-4-(trifluoromethoxy)phenyl]-4-(trifluoromethyl)benzamide (2043675-28-9)+SX.

A combination of the present ingredient in the above-mentioned Group (c) and the present compound:

1-methylcyclopropene+SX, 1,3-diphenylurea+SX, 2,3,5-triiodobenzoic acid+SX, IAA ((1H-indol-3-yl)acetic acid)+SX, IBA (4-(1H-indol-3-yl)butyric acid)+SX, MCPA (2-(4-chloro-2-methylphenoxy)acetic acid)+SX, MCPB (4-(4-chloro-2-methylphenoxy)butyric acid)+SX, 4-CPA (4-chlorophenoxyacetic acid)+SX, 5-aminolevulinic acid hydrochloride+SX, 6-benzylaminopurine+SX, abscisic acid+SX, AVG (aminoethoxyvinylglycine)+SX, ancymidol+SX, butralin+SX, calcium carbonate+SX, calcium chloride+SX, calcium formate+SX, calcium peroxide+SX, calcium polysulfide+SX, calcium sulfate+SX, chlormequat-chloride+SX, chlorpropham+SX, choline chloride+SX, cloprop+SX, cyanamide+SX, cyclanilide+SX, daminozide+SX, decan-1-ol+SX, dichlorprop+SX, dikegulac+SX, dimethipin+SX, diquat+SX, ethephon+SX, ethychlozate+SX, flumetralin+SX, flurprimidol+SX, forchlorfenuron+SX, formononetin+SX, Gibberellin A+SX, Gibberellin A3+SX, inabenfide+SX, Kinetin+SX, lipochitooligosaccharide SP104+SX, maleic hydrazide+SX, mefluidide+SX, mepiquat-chloride+SX, oxidized glutathione+SX, pacrobutrazol+SX, pendimethalin+SX, prohexandione-calcium+SX, prohydrojasmon+SX, pyraflufen-ethyl+SX, sintofen+SX, sodium 1-naphthaleneacetate+SX, sodium cyanate+SX, streptmycin+SX, thidiazuron+SX, triapenthenol+SX, Tribufos+SX, trinexapac-ethyl+SX, uniconazole-P+SX, 2-(naphthalen-1-yl)acetamide+SX, [4-oxo-4-(2-phenylethyl)amino]butylate+SX, methyl 5-(trifluoromethyl)benzo[b]thiophene-2-carboxylate+SX, 3-[(6-chloro-4-phenylquinazolin-2-yl)amino]-1-propanol+SX, *Claroideoglomus etunicatum*+SX, *Claroideoglomus claroideum*+SX, *Funneliformis mosseae*+SX, *Gigaspora margarita*+SX, *Gigaspora rosea*+SX, *Glomus aggregatum*+SX, *Glomus deserticola*+SX, *Glomus monosporum*+SX, *Paraglomus* brasillianum+SX, *Rhizophagus clarus*+SX, *Rhizophagus intraradices* RTI-801+SX, *Rhizophagus irregularis* DAOM 197198+SX, *Azorhizobium caulinodans*+SX, *Azospirillum amazonense*+SX, *Azospirillum brasilense* XOH+SX, *Azospirillum brasilense* Ab-V5+SX, *Azospirillum brasilense* Ab-V6+SX, *Azospirillum caulinodans*+SX, *Azospirillum halopraeferens*+SX, *Azospirillum irakense*+SX, *Azospirillum lipoferum*+SX, *Bradyrhizobium elkanii* SEMIA 587+SX, *Bradyrhizobium elkanii* SEMIA 5019+SX, *Bradyrhizobium japonicum* TA-11+SX, *Bradyrhizobium japonicum* USDA 110+SX, *Bradyrhizobium liaoningense*+SX, *Bradyrhizobium lupini*+SX, *Delftia acidovorans* RAY209+SX, *Mesorhizobium ciceri*+SX, *Mesorhizobium huakii*+SX, *Mesorhizobium loti*+SX, *Rhizobium etli*+SX, *Rhizobium galegae*+SX, *Rhizobium leguminosarum* bv. *Phaseoli*+SX, *Rhizobium leguminosarum* bv. *Trifolii*+SX, *Rhizobium leguminosarum* bv. *Viciae*+SX, *Rhizobium trifolii*+SX, *Rhizobium tropici*+SX, *Sinorhizobium fredii*+SX, *Sinorhizobium meliloti*+SX, Zucchini Yellow Mosaik Virus weak strain+SX.

A combination of the present ingredient in the above-mentioned Group (d) and the present compound X:
anthraquinone+SX, deet+SX, icaridin+SX.

The ratio of the compound of the present invention to the Present ingredient includes, but not limited thereto, as a ratio by weight (the compound of the present invention: the Present ingredient) 1,000:1 to 1:1,000, 500:1 to 1:500, 100:1 to 1:100, 50:1, 20:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10. 1:20, and 1:50, and the others.

The present compound, the compound of the present invention, or the composition A is usually mixed with solid carrier(s), liquid carrier(s), oil(s), and/or surfactant(s), and if necessary, added by the other auxiliary agents for formulation, to formulate into emulsifiable concentrates, oil solutions, dust formulations, granules, wettable powders, wettable dispersible granules, flowables, dry flowables, microcapsules and the others. In these formulations, the present compound, the compound of the present invention, or the composition A is contained in usually 0.1 to 99% by weight, preferably 0.2 to 90%.

Examples of the solid carrier include fine powders or granules of clays (for example, kaolin clay, diatomaceous earth, bentonite, or acid white clay), dry silica, wet silica, hydrated silica, talcs, ceramics, other inorganic minerals (for example, sericite, quartz, sulfur, active carbon, or calcium carbonate); as well as synthetic resins (for example, polyester resins such as polypropylene, polyacrylonitrile, polymethyl methacrylate or polyethylene terephthalate; nylon resins (for example, nylon-6, nylon-11, or nylon-66); polyamide resins; polyvinyl chloride, polyvinylidene chloride, vinyl chloride-propylene copolymers, and the others).

Examples of the liquid carriers include water; alcohols (for example, methanol, ethanol, isopropyl alcohol, butanol, hexanol, benzyl alcohol, ethylene glycol, propylene glycol, or phenoxy ethanol); ketones (for example, acetone, methyl ethyl ketone, or cyclohexanone); aromatic hydrocarbons (for example, toluene, xylene, ethyl benzene, dodecyl benzene, phenyl xylyl ethane, or methylnaphthalene); aliphatic hydrocarbons (for example, hexane, cyclohexane, kerosene, or light oil); esters (for example, ethyl acetate, butyl acetate, isopropyl myristate, ethyl oleate, diisopropyl adipate, diisobutyl adipate, or propylene glycol monomethyl ether acetate); nitriles (for example, acetonitrile, or isobutyronitrile); ethers (for example, diisopropyl ether, 1,4-dioxane, 1,2-dimethoxyethane, diethyleneglycol dimethyl ether, diethylene glycol monomethyl ether, propylene glycol monomethyl ether, dipropylene glycol monomethyl ether, or 3-methoxy-3-methyl-1-butanol); amides (for example, DMF, or N,N-dimethylacetamide); sulfoxides (for example, dimethyl sulfoxide); propylene carbonate; and vegetable oils (for example, soybean oil or cottonseed oil).

Examples of the surfactants include nonionic surfactants such as polyoxyethylenated alkyl ethers, polyoxyethylenated alkyl aryl ethers, and polyethylene glycol fatty acid esters; and anionic surfactants such as alkyl sulfonates, alkylbenzene sulfonates and alkyl sulfates. Specific examples thereof include Nimbus (registered trademark), Assist (registered trademark), Aureo (registered trademark), Iharol (registered trademark), Silwet L-77 (registered trademark), BreakThru (registered trademark), SundanceII (registered trademark), Induce (registered trademark), Penetrator (registered trademark), AgriDex (registered trademark), Lutensol A8 (registered trademark), NP-7 (registered trademark), Triton (registered trademark), Nufilm (registered trademark), Emulgator NP7 (registered trademark), Emulad (registered trademark), TRITON X 45 (registered trademark), AGRAL 90 (registered trademark), AGROTIN (registered trademark), ARPON (registered trademark), EnSpray N (registered trademark), and BANOLE (registered trademark), and the others.

Examples of the other auxiliary agents for formulation include a binder, a dispersant, a colorant and a stabilizer. Specific examples include casein, gelatin, polysaccharides (for example, starch, gum arabic, cellulose derivatives and alginic acid), lignin derivatives, bentonite, water-soluble synthetic polymers (for example, polyvinyl alcohol, polyvinyl pyrrolidone and polyacrylic acids), acidic isopropyl phosphate, 2,6-di-tert-butyl-4-methylphenol, and a mixture of 2-tert-butyl-4-methoxyphenol and 3-tert-butyl-4-methoxyphenol.

Examples of an application of the present compound, the compound of the present invention, or the composition A include a spreading to stems and leaves of soybeans, an application to seeds, and an application to soil for cultivating soybeans.

The application dose of the present compound, or the compound of the present invention may be varied depending on a climate condition, a formulation form, an application period, an application method, an application site, plant diseases to be controlled, plant to be applied, and the others. In the cases where these compounds are spread to stems and leaves of soybean or are applied to soil for cultivating soybeans, the application dose thereof is within a range of usually 1 to 500 g, preferably 2 to 200 g per 1,000 m². In the cases where these compounds are applied to seeds, the application dose thereof is within a range of 0.01 to 100 g, preferably 0.01 to 50 g per 1 Kg of seeds. The application dose of the composition A is within a range of usually 1 to 500 g per 1,000 m² in the case where it is spread to stems and leaves of soybean or are applied to soil for cultivating soybeans. In the cases where it is applied to seeds, the application dose thereof is within a range of usually 0.001 to 100 g per 1 Kg of seeds. The emulsifiable concentrate, the wettable powder, the suspension etc., is usually applied by diluting them with water. In these cases, the concentration of the present compound, the compound of the present invention, or the composition A after the dilution is within a range of usually 0.0005 to 2% by weight, preferably 0.005 to 2% by weight. The dust formulation or the granular formulation, etc., is usually applied as itself without diluting them.

The above-mentioned soybean may be a plant which can be produced by natural mating, a soybean which can be generated by mutation, a F1 hybrid soybean, and a transgenic soybean (also referred to as genetically modified soybean). In general, these soybeans have characteristics that are tolerance to herbicides, accumulation of toxic substances against pests (which is also referred to as pest resistance), suppression of sensitivity to diseases (which is also referred to as disease resistance), increase of yield potential, improvement of tolerance to biological and abiotic stress factors, modification of quality of products (for example, increase or decrease of the content of ingredient(s), change of composition, or improvement of storability and processability), and the like. Techniques for producing the above-mentioned soybeans include, for example, traditional breed improvement techniques; genetic recombination technologies; genome breeding technologies; new breeding techniques; and genome editing techniques.

Examples of the soybeans which are imparted with herbicide tolerance include auxin type herbicidal compounds such as 2,4-D, dicamba; soybeans having tolerance to glufosinate, soybeans having tolerance to glyphosate, soybeans having tolerance to isoxaflutole, soybeans having tolerance to 4-hydroxyphenylpyruvate dioxygenase inhibitory herbicides (such mesotrione); soybeans having tolerance to imidazolinone type herbicides; acetolactate synthase (ALS) inhibitory herbicides (such as sulfonylurea herbicide inhibitors); and soybeans having tolerance to protoporphyrinogen oxidase inhibitory herbicides (such as flumioxazin), and the others.

The soybeans which are imparted with herbicide tolerance by genetic recombination technologies can be produced by introducing foreign genes (such as genes derived from other organisms such as microorganisms). For example, a tolerance to 2,4-D is introduced by "aad-12" which is a gene derived from Delftia *acidovorans*; a tolerance to Dicamba is introduced by "dmo" which is a gene derived from *Stenotrophomonas maltophilia* strain DI-6; a tolerance to glufosinate is introduced by "bar" which is a gene derived from *Streptomyces hygroscopicus* or "pat" which is a gene derived from Streptomyes *viridochromogenes*; a tolerance to glyphosate is introduced by "2mepsps" which is a gene derived from *Zea mays*, "CP4 epsps" which is a gene derived from *Agrobacterium tumefaciens* strain CP4, or "gat4601" which is a gene derived from *Bacillus licheniformis*; a tolerance to isoxaflutole is introduced by "hppdPF W336" which is a gene derived from *Pseudomonas fluorescens* strain A32; a tolerance to mesotrione is introduced by "avhppd-03" which is a gene derived from Oat (*Avena sativa*); a tolerance to imidazolinone herbicides is introduced by "csr1-2" which is a gene derived from *Arabidopsis thaliana*; a tolerance to sulfonylurea herbicides is introduced by "gm-hra" which is a gene derived from *Glycine max*.

Examples of soybeans which are imparted with herbicides by traditional breed improvement techniques or genome breeding technologies include soybean having tolerance to sulfonylurea ALS inhibitory herbicides (such as thifensulfuron methyl) ("STS (registered trademark) soybean").

Examples of soybeans which are imparted with herbicides by a new breeding technique include the plants in which glyphosate tolerance is imparted to nontransgenic soybean by using Roundup Ready (Registered trademark) having glyphosate tolerance as a rootstock (see, Weed Technology 27: 412-416 2013).

Examples of soybeans which are imparted with pest tolerance include soybean having tolerance to Lepidoptera pests (such as Pseuoplusia includes, *Helicoverpa zea, Spodoptera frugiperda*), soybean having tolerance to Hemiptera (such as *Aphis glycines*), and soybean having tolerance to Nematode (such as *Heterodera glycines, Meloidogyne incognita*).

The soybeans which are imparted with pest tolerance by genetic recombination technologies can be produced by introducing foreign genes (such as genes encoding δ-endotoxin which is insecticidal protein derived from *Bacillus thuringiensis* For example, a tolerance to Lepidoptera pests is introduced by "cry1Ac" which is a gene derived from *Bacillus thuringiensis* subsp. Kurstaki strain HD73, "cry1F" which is a gene derived from *Bacillus thuringiensis* var. *aizawai*, "cry1A.105" which is a gene derived from *Bacillus thuringiensis* subsp. kumamotoensis, or "cry2Ab2" which is a gene derived from *Bacillus thuringiensis* subsp. kumamotoensis.

Examples of soybeans which are imparted with pest tolerance by traditional breed improvement techniques or genome breeding technologies include soybean having as a resistance gene against aphid a resistance gene Rag1 (Tolerance Aphid Gene 1) or a gene Rag1 (Tolerance Aphid Gene 1) and also showing resistance to aphids (see J. Econ. Entomol., 2015, 108, 326.); soybean showing resistance to *Heterodera glycines* (see Phytopathology, 2016, 106, 1444.); and soybean showing resistance to *Spodoptera litura* (that is, "Fukuminori").

Examples of soybeans which are imparted with disease resistance include soybean which is imparted with a resistance to soybean rust disease by traditional breed improvement techniques or genetic recombination technologies. Examples of commonly used resistance genes include, not limited thereto, Rpp1, Rpp2, Rpp3, Rpp4, Rpp5, and Rpp6. These genes may be introduced alone into a soybean, or may be introduced in any combinations of a plural of these genes into soybean. These genes are described in the following scientific documents: Crop Science, 2007, 47, 837.; Theoretical and Applied Genetics, 2008, 117, 57.; Theoretical and Applied Genetics, 117, 545.; Crop Science, 2009, 49, 783.; Theoretical and Applied Genetics, 2009, 119, 271.; Theoretical and Applied Genetics, 2010, 121, 1023.; Theoretical and Applied Genetics, 2012, 125, 133.

Examples of the soybeans which are imparted with disease resistance by genome breeding technologies include soybean showing resistance to soybean stem disease due to *Phytophthora sojae* by destructing RXLR effector gene (Avr4/6) using CRISPR-Cas9 (see, Mol. Plant. Pathol., 2016, 17, 127.).

Also, soybeans which is imparted with a resistance to soybean diseases other than soybean rust disease (for example, frogeye leaf spot, brown ring spot disease, stem disease, sudden death syndrome) are also included.

Examples of soybeans in which a quality of product is modified by genetic recombination technologies include soybean "Plenish (Trademark)" or "Treus (Trademark)" in which partial gene of ω-6 desaturase (gm-fad2-1) derived from *Glycine max* which is the fatty acid desaturase enzyme, is introduced and an expression of the same genes are then suppressed, and the oleic acid contents is enriched; soybean "Vistive Gold (Trademark)") in which the contents of saturated fatty acid is reduced by introducing genes that produce double-stranded RNA of acyl-acyl carrier protein-thioesterase gene (fatb1-A) derived from *Glycine max* and genes that produce double-stranded RNA of δ-12 desaturase (fad2-1A) derived from *Glycine max*; genetically modified soybean in which the contents of stearidonic acid as one of ω3 fatty acid is enriched by introducing δ-6 desaturase gene (Pj. D6D) derived from *Primula juliae* and δ-12 desaturase gene (Nc. Fad3) derived from *Neurospora crassa*; soybean in which the oil contents is altered; soybean in which the allergen contents is reduced (see U.S. Pat. No. 6,864,362); spybeans in which the lysine contents are increased (see Bio/Technology, 1995, 13, 577.); soybean in which the composition of methionine, leucine, isoleucine, and valine is modified; soybean in which the contents of a sulfur-containing amino acid is increased (see WO 1997/041239 A1); soybean in which the contents of phenolic compound is increased (see US publication No. 2008/235829); soybean in which the contents of vitamin E is increased (see WO 2004/058934 A1).

Examples of soybeans in which a quality of product is modified by genetic recombination technologies include soybean in which the contents of allergen is reduced (that is, "Yumeminori").

Examples of the plants in which the traits related to plant growth and yields are altered include soybean in which the plant growth is enhanced by introducing a gene derived from thale cress encoding transcription factor which regulates daily periodicity ("bbx32"), and thereby a high yields are expected.

Examples of soybeans having other characteristics include soybean in which an uptake of phosphorus is improved; soybean which is imparted with fertility traits; soybean which is imparted with tolerance to drought; soybean which is imparted with tolerance to low temperature; soybean which is imparted with tolerance to high salinity; soybean in which iron chlorosis is altered; and soybean in which chloride sensitivity is altered.

Examples of the above-mentioned soybeans encompass also soybeans in which two or more characteristics selected from the above-mentioned herbicide tolerance, pest resistance, disease resistance, abiotic stress tolerance, traits relating to growth or yield, traits relating to nutrient intake, traits relating to product quality, or fertility traits are imparted. Examples of these soybeans include soybean having a tolerance to glyphosate; soybean having a tolerance to glyphosate; soybean having tolerance to glufosinate; soybean having a resistance to frogeye leaf spot, Sudden Death Syndrome, southern stem canker, *Phytophthora* root rot, southern root-knot nematode, *Sclerotinia* white mold, brown stem rot, or soybean cyst nematode; soybean in which iron chlorosis is improved; and soybean in which chloride sensitivity is altered (that is, "Credenz (registered trademark) soybean").

Hereinafter, the soybeans that is commercially available or has been developed are listed below. Hereafter, they are described as [Event Name, Event code, Tread name]. Also, NA represents an information that is not existed or is unavailable. Many of these soybeans is listed in a registration database (GM APPROVAL DATABASE) in a website (http://www.isaaa.org/) of INTERNATINAL SERVICE for the ACQUISITION of AGRI-BIOTECH APPLICATIONS, ISAAA).

[260-05(G94-1, G94-19, G168), DD-026005-3, NA], [A2704-12, ACS-GM005-3, Liberty Link (trademark) soybean], [A2704-21, ACS-GM004-2, Liberty Link (trademark) soybean], [A5547-127, ACS-GM006-4, Liberty Link (trademark) soybean], [A5547-35, ACS-GM008-6, Liberty Link (trademark) soybean], [CV127, BPS-CV127-9, Cultivance], [DAS44406-6, DAS-44406-6, NA], [DAS68416-4, DAS-68416-4, Enlist (trademark) Soybean], [DAS68416-4xMON89788, DAS-68416-4xMON-89788-1, NA], [DAS81419, DAS-81419-2, NA], [DAS81419xDAS44406-6, DAS-81419-2xDAS-44406-6, NA], [DP305423, DP-305423-1, Treus (trademark) or Plenish (trademark)], [DP305423xGTS40-3-2, DP-305423-1xMON-04032-6, NA], [DP356043, DP-356043-5, Optimum GAT (trademark)], [FG72(FG072-2, FG072-3), MST-FG072-3, NA], [FG72xA5547-127, MST-FG072-3xACS-GM006-4, NA], [GTS40-3-2 (40-3-2), MON-04032-6, Roundup Ready (trademark) soybean], [GU262, ACS-GM003-1, Liberty Link (trademark) soybean], [IND-00410-5, IND-00410-5, Verdeca HB4 Soybean], [MON87701, MON-87701-2, NA], [MON87701xMON89788, MON-87701-2xMON-89788-1, Intacta (trademark) Roundup Ready (trademark) 2 Pro], [MON87705, MON-87705-6, Vistive Gold (trademark)], [MON87705xMON87708, MON-87705-6xMON-87708-9, NA], [MON87705xMON87708xMON89788, MON-87705-6xMON-87708-9xMON-89788-1, NA], [MON87705xMON89788, MON-87705-6xMON-89788-1, NA], [MON87708, MON-87708-9, Genuity (registered trademark) Roundup Ready (trademark) 2 Xtend (trademark)], [MON87708xMON89788, MON-87708-9xMON-89788-1, Roundup Ready 2 Xtend (registered trademark)], [MON87712, MON-87712-4, NA], [MON87751, MON-87751-7, NA], [MON87751xMON87701xMON87708xMON89788, MON-87751-7xMON-87701-2xMON87708xMON89788, NA], [MON87769, MON87769-7, NA], [MON87769xMON89788, MON-87769-7xMON-89788-1, NA], [MON89788, MON-89788-1, Genuity (registered trademark) Roundup Ready 2 Yield (trademark)], [SYH-TOH2, SYN-000H2-5, Herbicide-tolerant Soybean line], [W62, ACS-GM002-9, Liberty Link (trademark) soybean], [W98, ACS-GM001-8, Liberty Link (trademark) soybean], [OT96-15, OT96-15, NA], [NA, NA, STS (registered trademark) soybean], [NA, NA, Credenz (registered trademark) soybean], [NA, NA, Enlist E3 (trademark)], [NA, NA, Enlist (trademark) Roundup Ready 2 Yield (registered trademark)], [NA, NA, Fukuminori], [NA, NA, Yumeminori], [DP305423xMOV87708, DP-305423-1xMON-87708-9, NA], [DP305423xMOV87708xMON89788, DP-305423-1xMON-87708-9xMON-89788-1, NA], [DP305423xMON89788, DP-305423-1xMON-89788-1, NA]

An application of the present compound, the compound of the present invention, or the composition A can provide an effect of a promotion of the growth of a plant, such as an increase in the rate of seedling establishment, an increase in the number of healthy leaves, an increase in the height of the plant, an increase in the weight of the plant body, an increase in the leaf area, an increase in the number or weight of seeds, an increase in the number of occasion of flower setting or fruit setting, and a promoted growth of a root and the like. Also, an application of the present compound, the compound of the present invention, or the composition A can provide an increase of a resistance against an abiotic stress such as a temperature stress (for example, high-temperature stress or low-temperature stress), water stress (for example, drought stress or excess water stress), and a salt stress.

A commercially available QoI fungicide shows an efficacy against soybean rust fungus not having an amino acid substitution of F129L on mitochondrial cytochrome b protein (that is, sensitive wild type strain of soybean rust fungus), whilst does not show an efficacy against soybean rust fungus having an amino acid substitution of F129L on mitochondrial cytochrome b protein (that is, resistant strain of soybean rust fungus). On the other hand, the present compound has excellent activity against sensitive wild type strain of soybean rust fungus, and also has more excellent activity against resistant strain of soybean rust fungus. Accordingly, the resistance factor ratio (RF) of the present compound is low, which means that the present compound is useful.

EXAMPLES

Hereinafter, the present invention is explained in more detail by using Preparation examples, Formulation examples, and Test examples, however, the present invention should not be limited to these examples.

Herein, Me represents a methyl group, Et represents an ethyl group, Pr represents a propyl group, i-Pr represents isopropyl group, Bu represents a butyl group, i-Bu represents an isobutyl group, t-Bu represents a t-butyl group, Pen represents a pentyl group, Hex represents a hexyl group, c-Pr represents a cyclopropyl group, c-Bu represents a cyclobutyl group, c-Pen represents a cyclopentyl group, c-Hex represents a cyclohexyl group, and Ph represents a phenyl group. When the Ph group has any substituent(s), the substituent(s) is described together with a substitution position before the symbol. For example, 3,4-$Me_2$-Ph represents a 3,4-dimethylphenyl group.

The preparation examples of the present compounds and the compounds of the present invention are described.

When a physical property of a compound is measured by a liquid chromatography/mass spectrometry analysis (hereinafter, referred to as LCMS), a measured molecular ion value $[M+H]^+$ or $[M-H]^-$ and a retention time (hereinafter, referred to as RT) is described. The measured condition for liquid chromatography (hereinafter, referred to as LC) and mass spectrometry (hereinafter, referred to as MS) is described below.

[Lc Condition]

Column: L-column2 ODS, inner diameter 4.6 mm, length 30 m m, particle size 3 μm (Chemicals Evaluation and Research Institute, Japan)

UV measurement wavelength: 254 nm

Mobile phase: A solution: 0.1% aqueous formic acid solution,

B solution: 0.1% formic acid in acetonitrile

Flow Rate: 2.0 mL/min

Pump: LC-20 AD (manufacturing SHIMAZU) 2 umps (high pressure gradient)

Gradient condition: The following concentration gradient shown in [Table LC1] is liquid-transferred.

TABLE LC1

| Time (min) | A solution (%) | B solution (%) |
|---|---|---|
| 0.01 | 90 | 10 |
| 2.00 | 0 | 100 |
| 4.00 | 0 | 100 |
| 4.01 | 90 | 10 |

[Ms Condition]

Detector: LCMS-2020 (manufacturing SHIMAZU)

Ionization method: DUIS

Reference Preparation Example 1

To a mixture of sodium hydride (60%, oily) 4.7 g and DME 200 mL was added to a mixture of methyl 2-(5-nitro-2-methylphenoxy)acetate that was prepared according to a method described in WO 2006/133426 A1 10.0 g, methyl formate 27.2 mL and DME 50 mL was added at 0° C., and the mixture was stirred at room temperature for 20 hours. To the resulting mixture was added aqueous saturated ammonium chloride solution, and the mixture was extracted with ethyl acetate. The resulting organic layer was dried over magnesium sulfate anhydride and concentrated under reduced pressure. To the resulting residue was added DMF 75 mL, and the mixture was stirred, and thereto were added potassium carbonate 10.4 g and iodomethane 4.1 mL successively, and the mixture was stirred at room temperature for 18 hours. Water was added to the resulting mixture, and the mixture was extracted with ethyl acetate. The resulting organic layer was dried over anhydrous magnesium sulfate and concentrated under reduced pressure. The resulting residue was subjected to a silica gel column chromatography to obtain an intermediate compound 1 represented by the following formula 2.1 g.

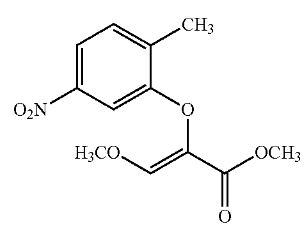 [SMILES: CO/C=C(\Oc1cc([N+](=O)[O-])ccc1C)C(=O)OC]

Intermediate compound 1: $^1H$-NMR ($CDCl_3$) δ: 7.82 (1H, d), 7.56 (1H, s), 7.41 (1H, s), 7.31 (1H, d), 3.92 (3H, s), 3.75 (3H, s), 2.45 (3H, s).

Reference Preparation Example 2

A mixture of the intermediate compound 1 1.9 g, iron powder 2.0 g, acetic acid 7 mL, and water 7 mL was stirred at 60° C. for 1 hour. After the resulting mixture was cooled to around room temperature, the mixture was concentrated under reduced pressure. The resulting residue was made alkaline with 1N aqueous sodium hydroxide solution, and thereto was added ethyl acetate, and the mixture was filtered. The filtrates were extracted with ethyl acetate, and the organic layer was washed with water, saturated aqueous sodium hydrocarbonate solution, and brine successively, and dried over anhydrous magnesium sulfate, concentrated under reduced pressure to obtain an intermediate compound 2 represented by the following formula 1.7 g.

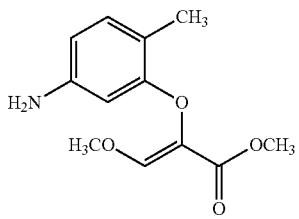

Intermediate Compound 2: $^1$H-NMR (CDCl$_3$) δ: 7.30 (1H, s), 6.92 (1H, d), 6.26 (1H, dd), 6.12 (1H, d), 3.86 (3H, s), 3.70 (3H, s), 3.49 (2H, br s), 2.23 (3H, s).

Reference Preparation Example 3

At room temperature, to a mixture of methyl (2E)-2-(methoxyimino)-3-[2-methyl-5-(4,4,5,5-tetramethyl-1,3,2-dioxoboran-2-yl)phenyl]propanoate (which was prepared by a method described in WO 2000/041999 A1) (hereinafter, referred to as Intermediate compound 3) 38 g, ethanol 253 mL, and acetonitrile 253 mL, and water 253 mL, methachloro perbenzoic acid (purity 70%, containing 30% water) 30.0 g, and the mixture was stirred for 3 hours. To the resulting mixture was added aqueous saturated sodium thiosulfate solution, and the mixture was stirred for 1 hour. The resulting mixture was concentrated under reduced pressure, and extracted with ethyl acetate. The resulting organic layer was washed with water and saturated brine successively, dried over anhydrous sodium sulfate, and concentrated under reduced pressure. The precipitated solids were washed with a mixed solvent of hexane 1L and ethyl acetate 100 mL to obtain an intermediate compound 4 represented by the following formula 18.2 g.

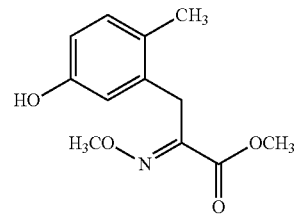 [SMILES: CO/N=C(\Cc1cc(O)ccc1C)C(=O)OC]

Intermediate compound 4: $^1$H-NMR (CDCl$_3$) δ: 7.02 (1H, d), 6.62 (1H, dd), 6.52 (1H, d), 4.70 (1H, s), 4.09 (3H, s), 3.86 (2H, s), 3.83 (3H, s), 2.28 (3H, s).

Reference Preparation Example 4

At room temperature, to a mixture of 3-(3-butenyloxy)aniline 3.5 g, methyl bromoacetate 2.1 mL, and DMF 54 mL was added N,N-diisopropylethylamine 9.5 mL, and the mixture was stirred at 60° C. for 3 hours. To the resulting mixture was added water, and the mixture was extracted with MTBE. The resulting organic layer was washed with aqueous saturated ammonium chloride solution, water and saturated brine successively, dried over anhydrous magnesium sulfate, and concentrated under reduced pressure. The resulting residue was subjected to a silica gel column chromatography to obtain an intermediate compound 5 represented by the following formula 4.2 g.

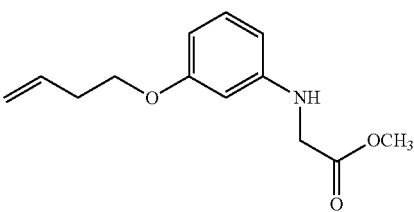 [SMILES: C=CCCOc1cccc(NCC(=O)OC)c1]

Intermediate compound 5: $^1$H-NMR (CDCl$_3$) δ: 7.08 (1H, t), 6.32 (1H, dd), 6.22 (1H, dd), 6.16 (1H, t), 5.96-5.84 (1H, m), 5.21-5.06 (2H, m), 4.28 (1H, br s), 3.98 (2H, t), 3.90 (2H, d), 3.78 (3H, s), 2.56-2.49 (2H, m).

Reference Preparation Example 5

At room temperature, to a mixture of the intermediate compound 5 2.0 g, potassium carbonate 2.4 g, and acetonitrile 30 mL, was added iodomethane 0.81 mL, and the mixture was stirred under reflux for 2 hours. To the resulting mixture was added water, and the mixture was extracted with ethyl acetate. The resulting organic layer was washed with water and saturated brine successively, dried over anhydrous sodium sulfate, and concentrated under reduced pressure. The resulting residue was subjected to a silica gel column chromatography to obtain an intermediate compound 6 represented by the following formula 1.5 g.

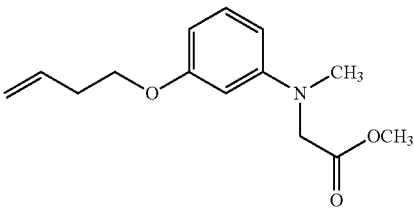 [SMILES: C=CCCOc1cccc(N(C)CC(=O)OC)c1]

Intermediate compound 6: $^1$H-NMR (CDCl$_3$) δ: 7.12 (1H, t), 6.34-6.22 (3H, m), 5.97-5.85 (1H, m), 5.21-5.06 (2H, m), 4.06 (2H, s), 4.00 (2H, t), 3.71 (3H, s), 3.05 (3H, s), 2.53 (2H, q).

Reference Preparation Example 6

A mixture of methyl (2Z)-2-(2-methyl-5-bromophenoxy)-3-methoxy-2-propenoate (which was prepared by a method described in WO 2001/000562 A1) (hereinafter, referred to as Intermediate compound 7) 20.0 g, bis(pinacolato)diboron 20.2 g, [1,1'-bis(diphenylphosphino)ferrocene]palladium (II) dichloride 2.43 g, potassium acetate 19.5 g, and DMSO 250 mL was stirred at 80° C. for 10 hours. To the resulting mixture was added water, and the mixture was extracted with ethyl acetate. The resulting organic layer was washed with water and saturated brine successively, dried over anhydrous magnesium sulfate, and concentrated under reduced pressure. The resulting residue was subjected to a silica gel column chromatography to obtain an intermediate compound 8 represented by the following formula 11.8 g.

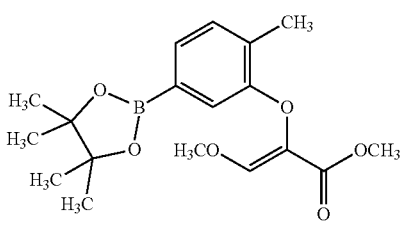 [SMILES: CO/C=C(\Oc1cc(B2OC(C)(C)C(C)(C)O2)ccc1C)C(=O)OC]

Intermediate compound 8: $^1$H-NMR (CDCl$_3$) δ: 7.37 (1H, d), 7.32 (1H, s), 7.16 (1H, d), 7.10 (1H, s), 3.87 (3H, s), 3.69 (3H, s), 2.37 (3H, s), 1.31 (12H, s).

Reference Preparation Example 7

At 0° C., to a mixture of sodium hydride (60%, oily) 0.4 g, and DMF 15 mL, was added 1-propanol, and the mixture was stirred at room temperature for 30 minutes. To the resulting mixture was added a mixture of 2-(benzyloxy)$_4$-(bromomethyl)-1-methylbenzene 2.0 g, and DMF 10 mL, and the mixture was stirred at room temperature for 6 hours. To the resulting mixture was added aqueous ammonium chloride solution and the mixture was extracted with ethyl acetate. The resulting organic layer was washed with water and saturated brine successively, dried over anhydrous sodium sulfate, and concentrated under reduced pressure. The resulting residue was subjected to a silica gel column chromatography to obtain an intermediate compound 9 represented by the following formula 0.91 g.

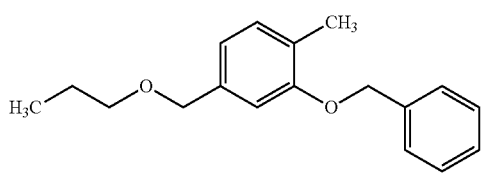

Intermediate compound 9: $^1$H-NMR (CDCl$_3$) δ: 7.48-7.28 (5H, m), 7.12 (1H, d), 6.91 (1H, s), 6.83 (1H, d), 5.09 (2H, s), 4.46 (2H, s), 3.39 (2H, t), 2.27 (3H, s), 1.68-1.57 (2H, m), 0.92 (3H, t).

Reference Preparation Example 7-1

The compounds which were prepared according to the Reference Preparation Example 7 and their physical property value are shown below.

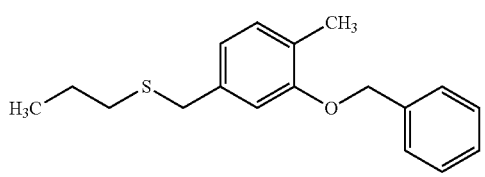 [SMILES: CCCSCc1ccc(C)c(OCc2ccccc2)c1]

Intermediate compound 10: $^1$H-NMR (CDCl$_3$) δ: 7.47-7.29 (5H, m), 7.08 (1H, d), 6.89 (1H, d), 6.80 (1H, dd), 5.09 (2H, s), 3.66 (2H, s), 2.36 (2H, t), 2.26 (3H, s), 1.62-1.52 (2H, m), 0.95 (3H, t).

Reference Preparation Example 8

Under hydrogen atmosphere, a mixture of the intermediate compound 9 0.20 g, 10% palladium/carbon 0.10 g, triethylamine 0.3 mL, and ethanol 5.7 ml was stirred at 35° C. for 4 hours. The resulting mixture was filtered, and the filtrates were concentrated under reduced pressure to obtain an intermediate compound 11 represented by the following formula 0.13 g.

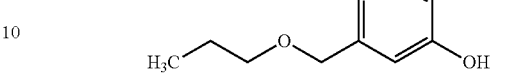

Intermediate compound 11: $^1$H-NMR (CDCl$_3$) δ: 7.05 (1H, d), 6.82 (1H, s), 6.77 (1H, d), 4.45 (2H, s), 3.46-3.40 (2H, m), 2.21 (3H, s), 1.69-1.58 (2H, m), 0.92 (3H, t).

Reference Preparation Example 9

At 0° C., to a mixture of the intermediate compound 10 3.1 g, N,N-dimethyl aniline 5.5 mL, and chloroform 30 mL, was added aluminium (III) chloride 4.3 g, and the mixture was stirred at 0° C. for 2 hours. To the resulting mixture was added hydrochloric acid, and the mixture was extracted with ethyl acetate. The resulting organic layer was washed with water and saturated brine successively, dried over anhydrous sodium sulfate, and concentrated under reduced pressure. The resulting residue was subjected to a silica gel column chromatography to obtain an intermediate compound 12 represented by the following formula 1.0 g.

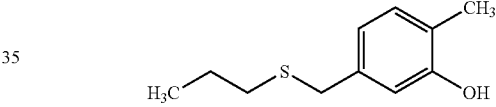

Intermediate compound 12: $^1$H-NMR (CDCl$_3$) δ: 7.04 (1H, d), 6.80-6.74 (2H, m), 4.74 (1H, s), 3.62 (2H, s), 2.40 (2H, t), 2.22 (3H, s), 1.63-1.53 (2H, m), 0.96 (3H, t).

Reference Preparation Example 10

To a mixture of the intermediate compound 11 0.59 g, potassium carbonate 0.54 g, and acetone 10 mL was added methyl bromoacetate 0.36 mL, and the mixture was stirred at room temperature for 6 hours. To the resulting mixture was added water, and the mixture was extracted with ethyl acetate. The resulting organic layer was washed with water and saturated brine successively, dried over anhydrous sodium sulfate, ad concentrated under reduced pressure. The resulting residue was subjected to a silica gel column chromatography to obtain an intermediate compound 13 represented by the following formula 0.65 g.

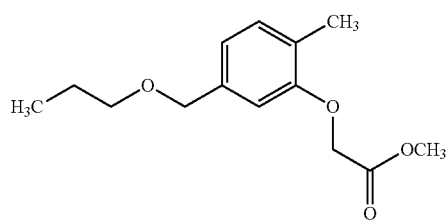 [SMILES: CCCOCc1ccc(C)c(OCC(=O)OC)c1]

Intermediate compound 13: $^1$H-NMR (CDCl$_3$) δ: 7.12 (1H, d), 6.85 (1H, dd), 6.72 (1H, d), 4.66 (2H, s), 4.45 (2H, s), 3.80 (3H, s), 3.40 (2H, t), 2.28 (3H, s), 1.67-1.57 (2H, m), 0.93 (3H, t).

Reference Preparation Example 10-1

The compounds which were prepared according to the method described in Reference Preparation Example 10 and their physical property values are shown below.

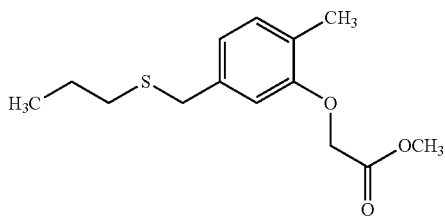 [SMILES: CCCSCc1ccc(C)c(OCC(=O)OC)c1]

Intermediate compound 14: $^1$H-NMR (CDCl$_3$) δ: 7.07 (1H, d), 6.82 (1H, dd), 6.70 (1H, d), 4.66 (2H, s), 3.80 (3H, s), 3.65 (2H, s), 2.37 (2H, t), 2.26 (3H, s), 1.62-1.52 (2H, m), 0.95 (3H, t).

Reference Preparation Example 1 1

At room temperature, to a mixture of the intermediate compound 8 0.50 g, ethanol 20 mL, acetonitrile 20 mL and water 20 mL was added methachloro perbenzoic acid (purity 70%, containing 30% water) 0.43 g, and the mixture was stirred for 3 hours. To the resulting mixture were added aqueous saturated sodium thiosulfate solution and aqueous saturated ammonium chloride solution successively, and the mixture was stirred for 1 hour. The resulting mixture was concentrated under reduced pressure, and extracted with ethyl acetate. The resulting organic layer was washed with water and saturated brine successively, dried over anhydrous magnesium sulfate, and concentrated under reduced pressure. The resulting residue was subjected to a silica gel column chromatography to obtain an intermediate compound 15 represented by the following formula 0.29 g.

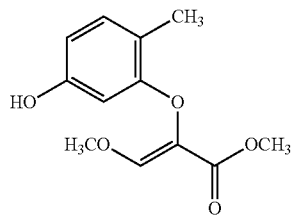 [SMILES: CO/C=C(\Oc1cc(O)ccc1C)C(=O)OC]

intermediate compound 15: $^1$H-NMR (CDCl$_3$) δ: 7.31 (1H, s), 6.98 (1H, d), 6.37 (1H, dd), 6.28 (1H, d), 4.75 (1H, s), 3.86 (3H, s), 3.71 (3H, s), 2.25 (3H, s).

Reference Preparation Example 15

At room temperature, to a mixture of the intermediate compound 15 2.50 g, sodium hydride (60%, oily) 0.50 g, and DMF 40 mL was added dimethyl thiocarbamoylchloride 1.56 g, and the mixture was stirred for 2 hours. To the resulting mixture was added aqueous saturated ammonium chloride solution, and the mixture was extracted with ethyl acetate. The resulting organic layer was washed with water and saturated brine successively, dried over anhydrous sodium sulfate, and concentrated under reduced pressure. The resulting residue was subjected to a silica gel column chromatography to obtain an intermediate compound 16 represented by the following formula 1.85 g.

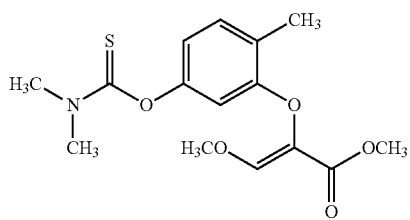 [SMILES: CO/C=C(\Oc1cc(OC(=S)N(C)C)ccc1C)C(=O)OC]

Intermediate compound 16: $^1$H-NMR (CDCl$_3$) δ: 7.29 (1H, s), 7.14 (1H, d), 6.62 (1H, dd), 6.48 (1H, d), 3.85 (3H, s), 3.71 (3H, s), 3.43 (3H, s), 3.31 (3H, s), 2.33 (3H, s).

Reference Preparation Example 6

At room temperature, to a mixture of the present compound 26 3.31 g, hydroxylamine hydrochloride salt 1.05 g, and methanol 60 mL was added potassium hydroxide 1.42 g, and the mixture was stirred for 15 hours. To the resulting mixture was aqueous saturated ammonium chloride solution, and the mixture was extracted with ethyl acetate. The resulting organic layer was washed with saturated brine, dried over anhydrous magnesium sulfate, and concentrated under reduced pressure. The resulting residue was subjected to a silica gel column chromatography to obtain an intermediate compound 17 represented by the following formula 0.93 g.

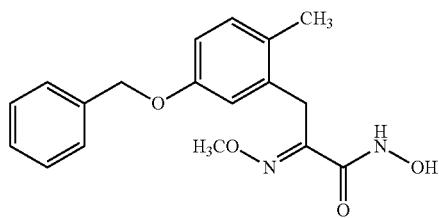 [SMILES: CO/N=C(\Cc1cc(OCc2ccccc2)ccc1C)C(=O)NO]

Intermediate compound 17: $^1$H-NMR (CDCl$_3$) δ: 8.98 (1H, br s), 7.56 (1H, br s), 7.42-7.29 (5H, m), 7.03 (1H, d), 6.73 (1H, dd), 6.68 (1H, d), 4.99 (2H, s), 3.94 (3H, s), 3.83 (2H, s), 2.26 (3H, s).

Preparation Example 1

A mixture of the intermediate compound 7 1.0 g, palladium (II) acetate 0.07 g, triethysilane 0.68 mL, 1,4-bis (diphenylphosphino)butane 0.21 g, sodium carbonate 0.52 g, N-formyl saccharin 1.05 g, and DMF 12 mL was stirred at 80° C. under nitrogen atmosphere for 5 hours. To the resulting mixture was added water, and the mixture was extracted with ethyl acetate. The resulting organic layer was dried over anhydrous sulfate, and concentrated under reduced pressure. The resulting residue was subjected to a silica gel column chromatography to obtain the present compound 1 represented by the following formula 0.38 g.

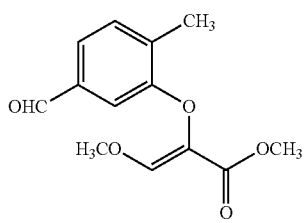 [SMILES: CO/C=C(\Oc1cc(C=O)ccc1C)C(=O)OC]

Present compound 1: $^1$H-NMR (CDCl$_3$) δ: 9.88 (1H, s), 7.42 (1H, dd), 7.36 (1H, s), 7.33 (1H, d), 7.23 (1H, d), 3.88 (3H, s), 3.71 (3H, s), 2.43 (3H, s).

Preparation Example 2

A mixture of the present compound 1 0.30 g, sodium borohydride 0.45 g, and methanol 20 mL was stirred at 0° C. for 30 minutes. To the resulting mixture was added aqueous saturated ammonium chloride solution, and the mixture was extracted with ethyl acetate. The resulting organic layer was dried over magnesium sulfate, and concentrated under reduced pressure. The resulting residue was subjected to a silica gel column chromatography to obtain the present compound 2 represented by the following formula 0.26 g.

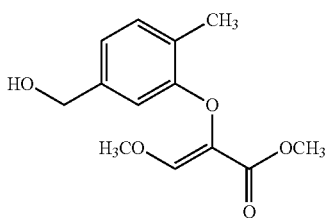 [SMILES: CO/C=C(\Oc1cc(CO)ccc1C)C(=O)OC]

Present compound 2: $^1$H-NMR (CDCl$_3$) δ: 7.31 (1H, s), 7.13 (1H, d), 6.89 (1H, dd), 6.74 (1H, d), 4.58 (2H, d), 3.86 (3H, s), 3.69 (3H, s), 2.33 (3H, s), 1.54 (1H, t).

Preparation Example 2-1

The compounds which were prepared according to the method described in Preparation Example 2 and their physical property values are shown below.

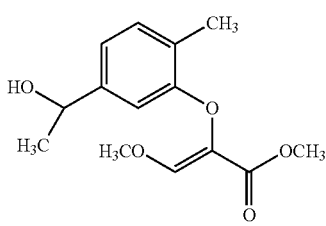 [SMILES: CO/C=C(\Oc1cc(C(C)O)ccc1C)C(=O)OC]

Present compound 3: $^1$H-NMR (CDCl$_3$) δ: 7.32 (1H, s), 7.12 (1H, d), 6.90 (1H, dd), 6.75 (1H, d), 4.84-4.76 (1H, m), 3.87 (3H, s), 3.70 (3H, s), 2.33 (3H, s), 1.72 (1H, d), 1.43 (3H, d)

Preparation Example 3

To a mixture of the present compound 2 0.20 g, carbon tetrabromide 0.31 g, and chloroform 10 mL was added triphenylphosphine 0.31 g at 0° C., and the mixture was stirred at room temperature for 20 hours. To the resulting mixture was added aqueous saturated sodium hydrogen carbonate solution, and the mixture was extracted with ethyl acetate. The resulting organic layer was dried over anhydrous magnesium sulfate, and concentrated under reduced pressure. The resulting residue as subjected to a silica gel column chromatography to obtain the present compound 4 represented by the following formula 0.22 g.

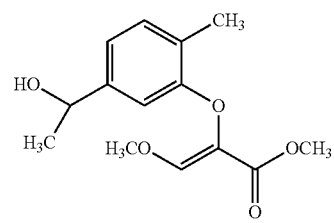

Present compound 4: $^1$H-NMR (CDCl$_3$) δ: 7.33 (1H, s), 7.11 (1H, d), 6.93 (1H, d), 6.72 (1H, d), 4.41 (2H, s), 3.87 (3H, s), 3.71 (3H, s), 2.33 (3H, s).

Preparation Example 4

A mixture of the intermediate compound 7 1.0 g, cyclopropyl boronic acid 0.34 g, palladium (II) acetate 0.04 g, tricyclohexyl phosphine (0.6 M toluene solution) 0.55 mL, tripotassium phosphate 2.5 g, toluene 10 mL and water 0.5 l was stirred at 100° C. for 6 hours. To the resulting mixture was added water, and the mixture was extracted with ethyl acetate. The resulting organic layer was washed with saturated brine, dried over anhydrous sodium sulfate, and concentrated under reduced pressure. The resulting residue was subjected to a silica gel column chromatography (ethyl acetate:hexane=1:4) to obtain the compound 1 of the present invention represented by the following formula 0.79 g.

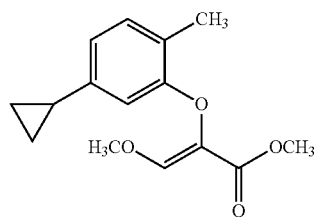 [SMILES: CO/C=C(\Oc1cc(C2CC2)ccc1C)C(=O)OC]

Compound 1 of the present invention: $^1$H-NMR (CDCl$_3$) δ: 7.31 (1H, s), 7.02 (1H, d), 6.59 (1H, dd), 6.47 (1H, d), 3.87 (3H, s), 3.71 (3H, s), 2.29 (3H, s), 1.84-1.76 (1H, m), 0.91-0.85 (2H, m), 0.62-0.57 (2H, m).

Preparation Example 4-1

The compounds which were prepared according to the method described in Preparation Example 4 and their physical property values are shown below.

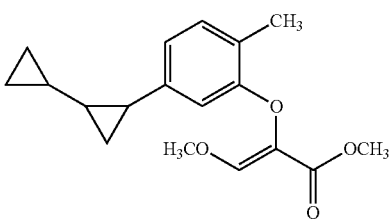 [SMILES: CO/C=C(\Oc1cc(C2CC2C2CC2)ccc1C)C(=O)OC]

Compound 2 of the present invention: $^1$H-NMR (CDCl$_3$) δ: 7.31 (1H, s), 7.01 (1H, d), 6.54 (1H, dd), 6.42 (1H, d), 3.87 (3H, s), 3.71 (3H, s), 2.29 (3H, s), 1.61-1.51 (1H, m), 1.11-1.02 (1H, m), 0.96-0.88 (1H, m), 0.68 (2H, dd), 0.44-0.32 (2H, m), 0.17-0.05 (2H, m).

Preparation Example 5

A mixture of the present compound 1 0.25 g, ethylene glycol 0.55 mL, paratoluenesulfonic acid monohydrate 0.02 g, and toluene 30 mL was stirred under reflux for 8 hours while dehydrating using Dean Stark apparatus. The resulting mixture was cooled, and then concentrated under reduced pressure. The resulting residue was subjected to a silica gel column chromatography (ethyl acetate:hexane=3:7) to obtain the Compound 3 of the present invention represented by the following formula 0.19 g.

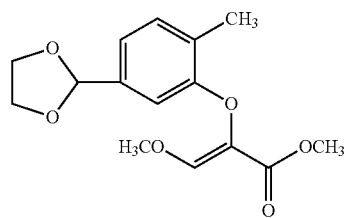 [SMILES: CO/C=C(\Oc1cc(C2OCCO2)ccc1C)C(=O)OC]

Compound 3 of the present invention: $^1$H-NMR (CDCl$_3$) δ: 7.32 (1H, s), 7.17 (1H, d), 7.03 (1H, d), 6.82 (1H, d), 5.74 (1H, s), 4.11-3.96 (4H, m), 3.86 (3H, s), 3.69 (3H, s), 2.35 (3H, s).

Preparation Example 5-1

The compounds which were prepared according to the method described in Preparation Example 5 and their physical property values are shown below.

A compound represented by formula (Z1):

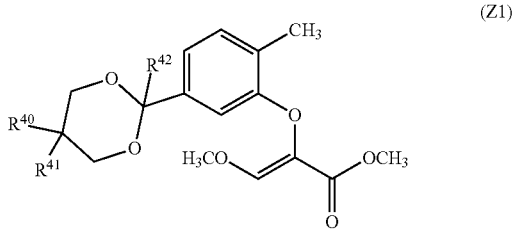

wherein a combination of $R^{40}$, $R^{41}$ and $R^{42}$ represents any combinations indicated below.

Compound 4 of the present invention ($R^{40}$: H, $R^{41}$: H, $R^{42}$: H) $^1$H-NMR (CDCl$_3$) δ: 7.32 (1H, s), 7.15 (1H, d), 7.03 (1H, dd), 6.83 (1H, d), 5.40 (1H, s), 4.27-4.21 (2H, m), 3.99-3.90 (2H, m), 3.86 (3H, s), 3.69 (3H, s), 2.33 (3H, s), 2.26-2.13 (1H, m), 1.46-1.39 (1H, m).

Compound 5 of the present invention ($R^{40}$: CH$_3$, $R^{41}$: H, $R^{42}$: H) $^1$H-NMR (CDCl$_3$) δ: 7.32 (1H, s), 7.14 (1H, d), 7.04 (1H, d), 6.83 (1H, s), 5.31 (1H, s), 4.19-4.12 (2H, m), 3.86 (3H, s), 3.69 (3H, s), 3.51-3.42 (2H, m), 2.33 (3H, s), 2.27-2.14 (1H, m), 0.76 (3H, d).

Compound 6 of the present invention ($R^{40}$: CH$_3$, $R^{41}$: CH$_3$, $R^{42}$: H)

$^1$H-NMR (CDCl$_3$) δ: 7.33 (1H, s), 7.16 (1H, d), 7.08 (1H, d), 6.84 (1H, s), 5.30 (1H, s), 3.87 (3H, s), 3.74 (2H, d), 3.70 (3H, s), 3.61 (2H, d), 2.34 (3H, s), 1.27 (3H, s), 0.79 (3H, s).

Compound 7 of the present invention ($R^{40}$: H, $R^{41}$: H $R^{42}$: CH$_3$) $^1$H-NMR (CDCl$_3$) δ: 7.31 (1H, s), 7.18 (1H, d), 6.97 (1H, dd), 6.77 (1H, d), 3.86 (3H, s), 3.83-3.73 (4H, m), 3.69 (3H, s), 2.36 (3H, s), 2.16-2.02 (1H, m), 1.46 (3H, s), 1.29-1.16 (1H, m).

Preparation Example 6

A mixture of the intermediate compound 2 0.15 g, and N,N-dimethylformamide dimethylacetal 2 mL was stirred at 80° C. for 2 hours. The resulting mixture was cooled, and then concentrated under reduced pressure to the Compound 8 of the present invention represented by the following formula 0.16 g.

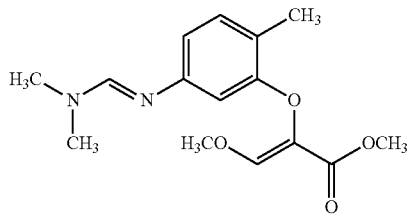 [SMILES: CO/C=C(\Oc1cc(/N=C/N(C)C)ccc1C)C(=O)OC]

Compound 8 of the present invention: $^1$H-NMR (CDCl$_3$) δ: 7.45 (1H, s), 7.28 (1H, s), 7.01 (1H, d), 6.47 (1H, dd), 6.41 (1H, d), 3.84 (3H, s), 3.68 (3H, s), 2.98 (6H, s), 2.29 (3H, s).

Preparation Example 7

A mixture of the intermediate compound 2 0.25 g, para-toluenesulfonic acid monohydrate 0.02 g and trimethyl orthoformate 10 mL was stirred under reflux for 2 hours. The resulting mixture was allowed to cool and concentrated under reduced pressure. The resulting residue and DME 10 mL were mixed, and to the resulting mixture were added N-methyl aniline 0.11 mL and triethylamine 0.17 mL successively at room temperature. The resulting mixture was stirred at 80° C. for 2 hours. The resulting mixture was cooled to around room temperature, and then concentrated under reduced pressure. The resulting residue was subjected to a silica gel column chromatography (ethyl acetate: hexane=1:4) to obtain the Compound 9 of the present invention represented by the following formula 0.11 g.

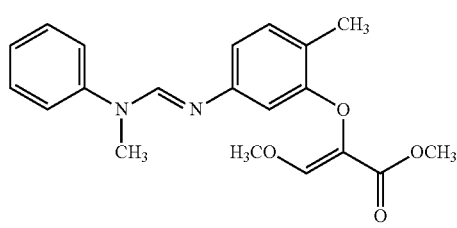 [SMILES: CO/C=C(\Oc1cc(/N=C/N(C)c2ccccc2)ccc1C)C(=O)OC]

Compound 9 of the present invention: $^1$H-NMR (CDCl$_3$) δ: 8.04 (1H, s), 7.37 (2H, t), 7.31 (1H, s), 7.18-7.12 (3H, m), 7.06 (1H, d), 6.56 (1H, dd), 6.49 (1H, d), 3.86 (3H, s), 3.70 (3H, s), 3.49 (3H, s), 2.32 (3H, s).

Preparation Example 8

To a mixture of the intermediate compound 6 1.4 g, THF 7 ml and DMF 21 ml was added sodium hydride (60%, oily) 0.5 g at 0° C., and the mixture was stirred at 1 hour. To the resulting mixture was added methyl formate 1.1 mL, and the mixture was stirred at room temperature for 48 hours. To the resulting mixture was added 1N hydrochloric acid, and the mixture was extracted with MTBE. The resulting organic layer was washed with water and saturated brine successively, dried over anhydrous magnesium sulfate, and concentrated under reduced pressure. To the resulting residue were added THF 18 mL and DMF 9 mL successively, and the mixture was stirred, and next, thereto were added potassium carbonate 0.9 g, and iodomethane 0.4 mL successively at 0° C., and the mixture was stirred at room temperature for 24 hours. To the resulting mixture was added aqueous saturated ammonium chloride solution, and the mixture was extracted with MTBE. The resulting organic layer was washed with water and saturated brine successively, dried over anhydrous magnesium sulfate, and concentrated under reduced pressure. The resulting residue was subjected to a silica gel column chromatography (ethyl acetate:hexane=1:3) to obtain the present compound 5 represented by the following formula 0.7 g:

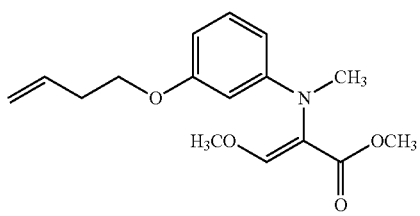 [SMILES: C=CCCOc1cccc(N(C)/C(=C\OC)C(=O)OC)c1]

Present compound 5: $^1$H-NMR (CDCl$_3$) δ: 7.38 (1H, s), 7.07 (1H, t), 6.30-6.19 (3H, m), 5.96-5.83 (1H, m), 5.19-5.05 (2H, m), 3.97 (2H, t), 3.85 (3H, s), 3.66 (3H, s), 3.04 (3H, s), 2.55-2.47 (2H, m).

Preparation Example 8-1

The compounds which were prepared according to Reference Preparation Example 4 and Reference Preparation Example 5 and Preparation Example 8 and their physical values are shown below.

A compound represented by formula (Z2):

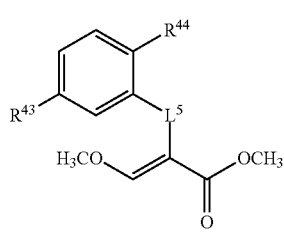

(Z2)

wherein a combination of $R^{43}$, $R^{44}$ and $L^5$ represents any combinations indicated in [Table A1].

TABLE A1

| Present compound | $R^{43}$ | $R^{44}$ | $L^5$ |
|---|---|---|---|
| 6 | phenyl-O- | H | NMe |
| 7 | (2-methylphenyl)-O- | H | NMe |
| 8 | phenyl-C(O)- | H | O |
| 9 | CH$_3$CH$_2$CH$_2$-O-CH$_2$CH$_2$- | Me | O |
| 10 | CH$_3$CH$_2$CH$_2$-S-CH$_2$CH$_2$- | Me | O |

Present compound 6: $^1$H-NMR (CDCl$_3$) δ: 7.37 (1H, s), 7.33-7.27 (2H, m), 7.16-6.98 (4H, m), 6.44-6.40 (1H, m), 6.37-6.33 (2H, m), 3.86 (3H, s), 3.68 (3H, s), 3.04 (3H, s).

Present compound 7: LCMS: 328 [M+H]$^+$, RT=2.17 min.

Present compound 8: $^1$H-NMR (CDCl$_3$) δ: 7.82-7.78 (2H, m), 7.61-7.55 (1H, m), 7.50-7.36 (5H, m), 7.33 (1H, s), 7.24-7.20 (1H, m), 3.88 (3H, s), 3.74 (3H, s).

Present compound 9: $^1$H-NMR (CDCl$_3$) δ: 7.31 (1H, s), 7.11 (1H, d), 6.86 (1H, dd), 6.72 (1H, d), 4.42 (2H, s), 3.86 (3H, s), 3.69 (3H, s), 3.36 (2H, t), 2.34 (3H, s), 1.65-1.56 (2H, m), 0.91 (3H, t).

Present compound 10: $^1$H-NMR (CDCl$_3$) δ: 7.32 (1H, s), 7.08 (1H, d), 6.84 (1H, dd), 6.69 (1H, d), 3.87 (3H, s), 3.70 (3H, s), 3.61 (2H, s), 2.34 (2H, t), 2.32 (3H, s), 1.59-1.50 (2H, m), 0.93 (3H, t).

Preparation Example 9

A mixture of the present compound 4 0.20 g, phenol 0.09 g, cesium carbonate 0.41 g, and DMF 5 ml was stirred at room temperature for 17 hours. To the resulting mixture was added water, and the mixture was extracted with ethyl acetate. The resulting organic layer was washed with water and saturated brine successively, dried over anhydrous magnesium sulfate and concentrated under reduced pressure. The resulting residue was subjected to silica gel column chromatography (ethyl acetate:hexane=1:4) to obtain the present compound 11 represented by the following formula 0.14 g.

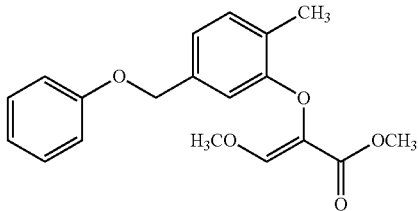 [SMILES: CO/C=C(\Oc1cc(COc2ccccc2)ccc1C)C(=O)OC]

Present compound 11: $^1$H-NMR (CDCl$_3$) δ: 7.30 (1H, s), 7.30-7.24 (2H, m), 7.16 (1H, d), 6.99-6.91 (4H, m), 6.78 (1H, d), 4.98 (2H, s), 3.83 (3H, s), 3.68 (3H, s), 2.35 (3H, s).

Preparation Example 9-1

The compounds which were prepared according to Preparation Example 9 and their physical property value are shown below.

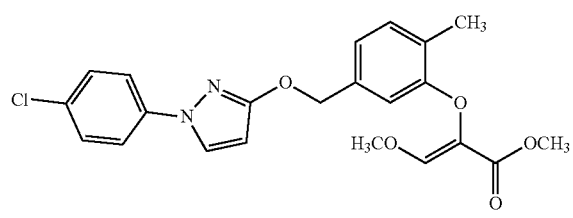 [SMILES: CO/C=C(\Oc1cc(COc2ccn(-c3ccc(Cl)cc3)n2)ccc1C)C(=O)OC]

Present compound 12: $^1$H-NMR (CDCl$_3$) δ: 7.69 (1H, d), 7.58-7.51 (2H, m), 7.40-7.35 (2H, m), 7.30 (1H, s), 7.17 (1H, d), 7.03 (1H, dd), 6.85 (1H, d), 5.91 (1H, d), 5.20 (2H, s), 3.83 (3H, s), 3.69 (3H, s), 2.35 (3H, s).

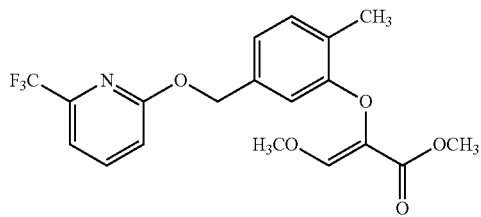 [SMILES: CO/C=C(\Oc1cc(COc2cccc(C(F)(F)F)n2)ccc1C)C(=O)OC]

Present compound 13: $^1$H-NMR (CDCl$_3$) δ: 7.68 (1H, t), 7.31 (1H, s), 7.23 (1H, d), 7.15 (1H, d), 7.04 (1H, d), 6.91 (1H, d), 6.83 (1H, s), 5.31 (2H, s), 3.84 (3H, s), 3.68 (3H, s), 2.34 (3H, s).

Preparation Example 10

To a mixture of the present compound 2 0.23 g, 2-cyanobenzylbromide 0.18 g, and THF 10 mL was added sodium hydride (60%, oily) 0.5 g at 0° C., and the mixture was stirred at room temperature for 18 hours. To the resulting mixture was added aqueous saturated ammonium chloride solution, and the mixture was extracted with ethyl acetate. The resulting organic layer was washed with water and saturated brine successively, dried over anhydrous magnesium sulfate and concentrated under reduced pressure. The resulting residue was subjected to a silica gel column chromatography (ethyl acetate:hexane=1:4) to obtain the present compound 14 represented by the following formula 0.07 g.

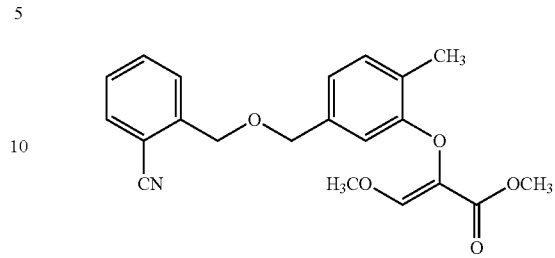

Present compound 14: $^1$H-NMR (CDCl$_3$) δ: 7.64 (1H, d), 7.61-7.54 (2H, m), 7.40-7.34 (1H, m), 7.32 (1H, s), 7.14 (1H, d), 6.93 (1H, d), 6.77 (1H, s), 4.68 (2H, s), 4.56 (2H, s), 3.85 (3H, s), 3.69 (3H, s), 2.34 (3H, s).

Preparation Example 11

A mixture of methyl (2Z)-2-(2-methyl-5-iodophenoxy)-3-methoxy-2-propenoate 1.4 g (which was prepared by a method described in WO 2001/000562 A1), Fe(acac)$_3$ 0.28 g, copper (I) iodide 0.15 g, tripotassium phosphate 1.68 g, phenol 0.44 g, and DMSO 12 mL was stirred at 140° C. under nitrogen atmosphere for 7 hours. To the resulting mixture was added water, and the mixture was extracted with MTBE. The resulting organic layer was dried over anhydrous magnesium sulfate, and concentrated under reduced pressure. The resulting residue was subjected to a silica gel column chromatography (ethyl acetate:hexane=1:4) to obtain the present compound 15 represented by the following formula 0.16 g.

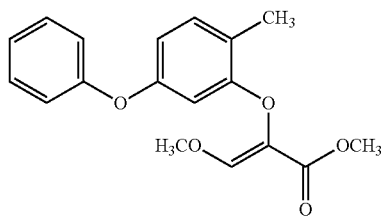 [SMILES: CO/C=C(\Oc1cc(Oc2ccccc2)ccc1C)C(=O)OC]

Present compound 15: $^1$H-NMR (CDCl$_3$) δ: 7.33-7.26 (3H, m), 7.12-7.03 (2H, m), 6.99-6.94 (2H, m), 6.55 (1H, dd), 6.49 (1H, d), 3.85 (3H, s), 3.71 (3H, s), 2.33 (3H, s).

Preparation Example 11-1

The compounds which were prepared according to the method described in Preparation Example 11 and their physical property values are shown below.

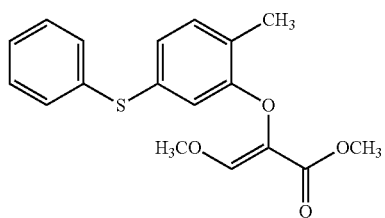 [SMILES: CO/C=C(\Oc1cc(Sc2ccccc2)ccc1C)C(=O)OC]

Present compound 16: $^1$H-NMR (CDCl$_3$) δ: 7.28-7.14 (6H, m), 7.11 (1H, d), 6.94 (1H, dd), 6.77 (1H, d), 3.81 (3H, s), 3.67 (3H, s), 2.34 (3H, s).

Preparation Example 12

A mixture of (2E)-2-(methoxyimino)-N-methyl-3-(2-methyl-5-bromophenyl)propanamide (which was prepared by a method described in WO 2000/041999 A1) 1.20 g, 2-methylphenol 0.87 g, copper (I) iodide 0.02 g, cesium carbonate 2.61 g, ethyl acetate 0.02 g, and toluene 20 mL was stirred under reflux under nitrogen atmosphere for 12 hours. To the resulting mixture was added water, and the mixture was extracted with diethyl ether. The resulting organic layer was dried over anhydrous magnesium sulfate, and concentrated under reduced pressure. The resulting residue was subjected to a silica gel column chromatography (ethyl acetate:hexane=1:3) to obtain the present compound 17 represented by the following formula 0.49 g.

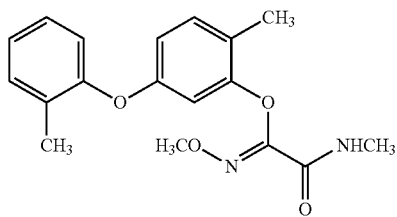 [SMILES: CNC(=O)/C(=N/OC)Oc1cc(Oc2ccccc2C)ccc1C]

Present compound 17: LCMS: 327 [M+H]$^+$, RT=2.15 min

Preparation Example 13

A mixture of the intermediate compound 8 0.20 g, benzylbromide 0.15 g, PdCl$_2$(dppf) 0.02 g, palladium (II) acetate 0.01 g, tripotassium phosphate 0.61 g, and DMF 3 mL was stirred under reflux under nitrogen atmosphere for 3 hours. The resulting mixture was filtered through Celite and the filtrates were concentrated under reduced pressure. The resulting residue was subjected to a silica gel column chromatography (ethyl acetate–hexane=1:2) to obtain the present compound 18 represented by the following formula 0.12 g.

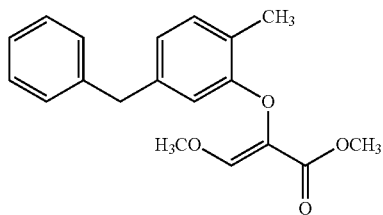

Present compound 18: $^1$H-NMR (CDCl$_3$) δ: 7.29-7.22 (3H, m), 7.20-7.11 (3H, m), 7.06 (1H, d), 6.72 (1H, d), 6.54 (1H, s), 3.89 (2H, s), 3.80 (3H, s), 3.67 (3H, s), 2.31 (3H, s).

Preparation Example 14

A mixture of the intermediate compound 7 0.5 g, 1-pentathiol 0.22 mL, tris(dibenzylideneacetone)dipalladium (O)$_{0.38}$ g, Xantphos 0.48 g, diisopropylethylamine 0.57 mL and 1,4-dioxane 8 mL was stirred at 100° C. for 6 hours. To the resulting mixture was added ethyl acetate, and the mixture was filtered. The resulting filtrates were washed with water and saturated brine successively, dried over anhydrous sodium sulfate, and concentrated under reduced pressure. The resulting residue was subjected to a silica gel column chromatography (ethyl acetate:hexane=1:4) to obtain the present compound 19 represented by the following formula 0.33 g.

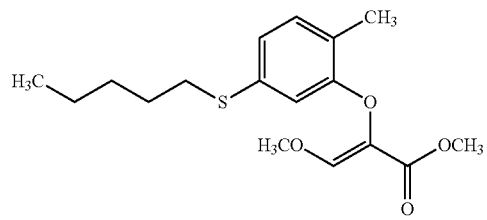 [SMILES: CCCCCSc1ccc(C)c(O/C(=C\OC)C(=O)OC)c1]

Present compound 19: $^1$H-NMR (CDCl$_3$) δ: 7.31 (1H, s), 7.07 (1H, d), 6.89 (1H, d), 6.72 (1H, s), 3.87 (3H, s), 3.70 (3H, s), 2.82 (2H, t), 2.30 (3H, s), 1.65-1.54 (2H, m), 1.42-1.22 (4H, m), 0.88 (3H, t).

Preparation Example 15

A mixture of the present compound 10 0.46 g, methachloro perbenzoic acid (purity 70%, containing 30% water) 0.46 g, and chloroform 13 mL was stirred at 0° C. for 2 hours. To the resulting mixture was aqueous sodium thiosulfate solution and the mixture was extracted with ethyl acetate. The resulting organic layer was washed with water and saturated brine successively, dried over anhydrous sodium sulfate, and concentrated under reduced pressure. The resulting residue was subjected to a silica gel column chromatography (ethyl acetate:hexane=1:1) to obtain the present compound 20 represented 0.14 g and the present compound 21 0.10 g, both represented by the following formulae.

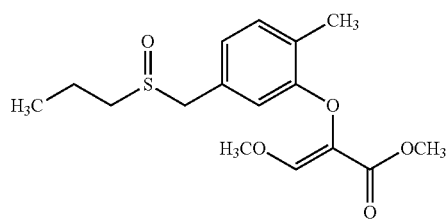 [SMILES: CCCS(=O)Cc1ccc(C)c(O/C(=C\OC)C(=O)OC)c1]

Present compound 20: $^1$H-NMR (CDCl$_3$) δ: 7.33 (1H, s), 7.15 (1H, d), 6.82 (1H, d), 6.64 (1H, s), 4.00 (1H, d), 3.88 (3H, s), 3.81 (1H, d), 3.71 (3H, s), 2.53-2.48 (2H, m), 2.34 (3H, s), 1.86-1.71 (2H, m), 1.00 (3H, t).

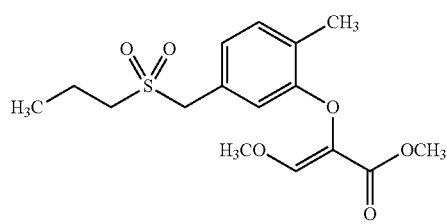 [SMILES: CCCS(=O)(=O)Cc1ccc(C)c(O/C(=C\OC)C(=O)OC)c1]

Present compound 21: $^1$H-NMR (CDCl$_3$) δ: 7.34 (1H, s), 7.18 (1H, d), 6.91 (1H, dd), 6.79 (1H, d), 4.12 (2H, s), 3.87

(3H, s), 3.71 (3H, s), 2.77-2.70 (2H, m), 2.35 (3H, s), 1.85-1.73 (2H, m), 1.00 (3H, t).

Preparation Example 16

To a mixture of the intermediate compound 4 0.40 g, isopropyl alcohol 0.41 g, triphenylphosphine 0.56 g, and chloroform 10 mL was added bis(2-methoxyethyl) azodicarboxylates 0.55 g at 0° C., and the mixture was stirred at room temperature for 1 hour. The resulting mixture was cooled, and thereto was then added aqueous saturated sodium hydrocarbonate solution, and the mixture was extracted with chloroform. The resulting organic layer was washed with water and saturated brine, and dried over anhydrous magnesium sulfate. The resulting residue was subjected to a silica gel column chromatography (ethyl acetate–hexane=1:4) to obtain the present compound 22 represented by the following formula 0.42 g.

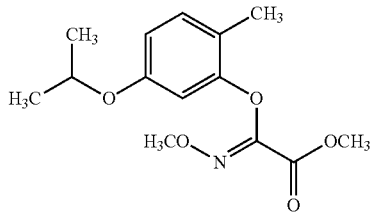 [SMILES: CO/N=C(\Oc1cc(OC(C)C)ccc1C)C(=O)OC]

Present compound 22: $^1$H-NMR (CDCl$_3$) δ: 7.03 (1H, d), 6.65 (1H, dd), 6.59 (1H, d), 4.50-4.39 (1H, m), 4.08 (3H, s), 3.86 (2H, s), 3.82 (3H, s), 2.27 (3H, s), 1.29 (6H, d).

Preparation Example 16-1

The compounds which were prepared according to Preparation Example 16 and their physical property value are shown below.

A compound represented by formula (Z3):

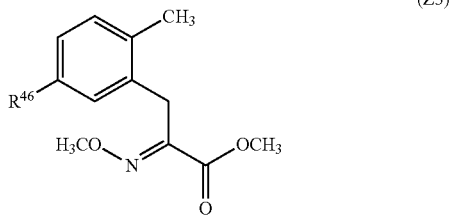

wherein $R^{46}$ represents the following groups.
Present Compound 23 ($R^{46}$: OCH$_2$ c-Pr)
$^1$H-NMR (CDCl$_3$) δ: 7.03 (1H, d), 6.66 (1H, dd), 6.61 (1H, d), 4.08 (3H, s), 3.86 (2H, s), 3.82 (3H, s), 3.72 (2H, d), 2.27 (3H, s), 1.29-1.19 (1H, m), 0.65-0.59 (2H, m), 0.35-0.29 (2H, m).
Present Compound 24 ($R^{46}$: OCH$_2$CH═CH$_2$)
$^1$H-NMR (CDCl$_3$) δ: 7.04 (1H, d), 6.68 (1H, dd), 6.62 (1H, d), 6.09-5.97 (1H, m), 5.42-5.35 (1H, m), 5.29-5.23 (1H, m), 4.48-4.44 (2H, m), 4.08 (3H, s), 3.86 (2H, s), 3.82 (3H, s), 2.27 (3H, s).
Present Compound 25 ($R^{46}$: OCH$_2$C≡CH)
$^1$H-NMR (CDCl$_3$) δ: 7.07 (1H, d), 6.74 (1H, dd), 6.68 (1H, d), 4.62 (2H, d), 4.08 (3H, s), 3.87 (2H, s), 3.82 (3H, s), 2.50 (1H, t), 2.28 (3H, s).

Present Compound 26 ($R^{46}$: OCH$_2$Ph)
$^1$H-NMR (CDCl$_3$) δ: 7.43-7.28 (5H, m), 7.05 (1H, d), 6.74 (1H, dd), 6.67 (1H, d), 4.99 (2H, s), 4.06 (3H, s), 3.86 (2H, s), 3.81 (3H, s), 2.27 (3H, s).

Preparation Example 17

A mixture of the present compound 22 0.17 g, and methylamine (9.8 M methanol solution) 3 mL was stirred at room temperature for 3 hours. The resulting mixture was concentrated under reduced pressure and to obtain the present compound 27 represented by the following formula 0.17 g.

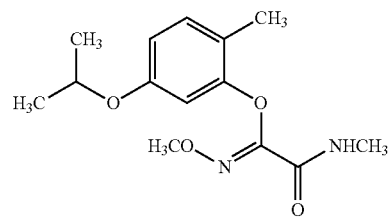 [SMILES: CNC(=O)/C(=N/OC)Oc1cc(OC(C)C)ccc1C]

Present Compound 27: $^1$H-NMR (CDCl$_3$) δ: 7.00 (1H, d), 6.81-6.70 (1H, br m), 6.65-6.59 (2H, m), 4.49-4.39 (1H, m), 3.95 (3H, s), 3.85 (2H, s), 2.85 (3H, d), 2.29 (3H, s), 1.28 (6H, d).

Preparation Example 17-1

The compounds which were prepared according to Preparation Example 17 and their physical property value are shown below.
A compound represented by formula (Z4):

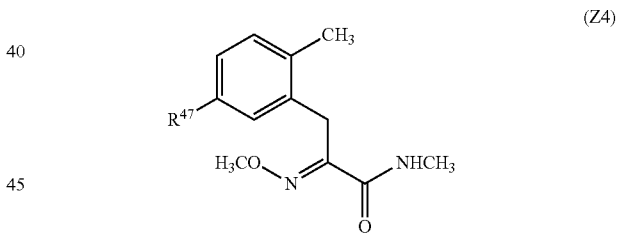

wherein $R^{47}$ represents the following groups.
Present Compound 28 ($R^{47}$: OCH$_2$ c-Pr)
$^1$H-NMR (CDCl$_3$) δ: 7.01 (1H, d), 6.80-6.71 (1H, br m), 6.65-6.60 (2H, m), 3.95 (3H, s), 3.85 (2H, s), 3.72 (2H, d), 2.86 (3H, d), 2.29 (3H, s), 1.29-1.17 (1H, m), 0.64-0.58 (2H, m), 0.34-0.29 (2H, m).
Present Compound 29 ($R^{47}$: OCH$_2$CH═CH$_2$)
$^1$H-NMR (CDCl$_3$) δ: 7.02 (1H, d), 6.78-6.70 (1H, br m), 6.67-6.63 (2H, m), 6.08-5.97 (1H, m), 5.41-5.35 (1H, m), 5.28-5.23 (1H, m), 4.48-4.44 (2H, m), 3.96 (3H, s), 3.86 (2H, s), 2.87 (3H, d), 2.30 (3H, s).
Present Compound 30 ($R^{47}$: OCH$_2$C≡CH)
$^1$H-NMR (CDCl$_3$) δ: 7.04 (1H, d), 6.81-6.67 (3H, m), 4.60 (2H, d), 3.95 (3H, s), 3.86 (2H, s), 2.85 (3H, d), 2.49 (1H, t), 2.31 (3H, s).
Present Compound 31 ($R^{47}$: OCH$_2$Ph)
$^1$H-NMR (CDCl$_3$) δ: 7.42-7.26 (5H, m), 7.02 (1H, d), 6.74-6.66 (3H, m), 4.97 (2H, s), 3.92 (3H, s), 3.85 (2H, s), 2.83 (3H, d), 2.29 (3H, s).

Preparation Example 18

To a mixture of the intermediate compound 4 0.41 g, potassium carbonate 0.33 g, and DMF 5 mL was added dimethyl carbamoyl chloride 0.19 ml at room temperature, and the mixture was stirred at room temperature for 1 hour. To the resulting mixture was added water, and the mixture was extracted with MTBE. The resulting organic layer was washed with water and saturated brine successively, and dried over anhydrous magnesium sulfate. The resulting residue was subjected to a silica gel column chromatography (ethyl acetate:hexane=1:3) to obtain the present compound 32 represented by the following formula 0.49 g.

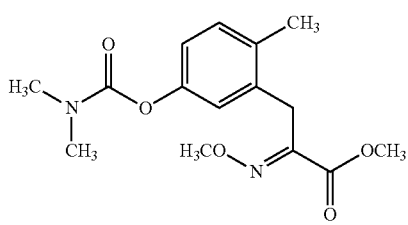 [SMILES: CO/N=C(\Cc1cc(OC(=O)N(C)C)ccc1C)C(=O)OC]

Present Compound 32: $^1$H-NMR (CDCl$_3$) δ: 7.11 (1H, d), 6.88 (1H, dd), 6.76 (1H, d), 4.08 (3H, s), 3.88 (2H, s), 3.82 (3H, s), 3.07 (3H, s), 2.99 (3H, s), 2.31 (3H, s).

Preparation Example 18-1

The compounds which were prepared according to Preparation Example 18 and their physical property value are shown below.

A compound represented by formula (Z5):

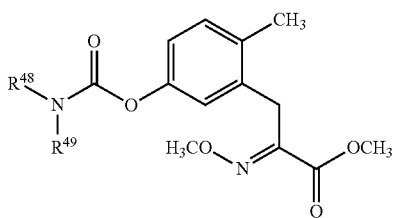

wherein $R^{48}$ and $R^{49}$ represent the following groups.
Present Compound 33 ($R^{48}$: Et, $R^{49}$: Et)

$^1$H-NMR (CDCl$_3$) δ: 7.11 (1H, d), 6.89 (1H, dd), 6.78 (1H, d), 4.08 (3H, s), 3.89 (2H, s), 3.82 (3H, s), 3.47-3.29 (4H, br m), 2.31 (3H, s), 1.27-1.14 (6H, br m).
Present Compound 34 ($R^{48}$: Me, $R^{49}$: Ph)

$^1$H-NMR (CDCl$_3$) δ: 7.43-7.32 (4H, m), 7.28-7.22 (1H, m), 7.10 (1H, d), 6.89 (1H, d), 6.76 (1H, s), 4.08 (3H, s), 3.87 (2H, s), 3.81 (3H, s), 3.41 (3H, s), 2.30 (3H, s).

Preparation Example 19

A mixture of the present compound 32 0.21 g and methylamine (9.8 M ethanol solution) 3 mL was stirred at room temperature for 3 hours. The resulting mixture was concentrated under reduced pressure to obtain the present compound 35 represented by the following formula 0.21 g.

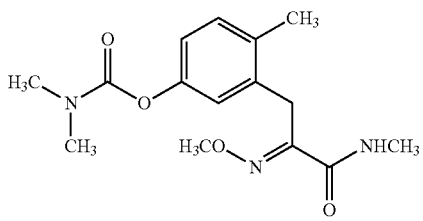 [SMILES: CNC(=O)/C(Cc1cc(OC(=O)N(C)C)ccc1C)=N/OC]

Present Compound 35: $^1$H-NMR (CDCl$_3$) δ: 7.08 (1H, d), 6.87-6.81 (2H, m), 6.79-6.72 (1H, br m), 3.95 (3H, s), 3.87 (2H, s), 3.06 (3H, s), 2.98 (3H, s), 2.85 (3H, d), 2.34 (3H, s).

Preparation Example 19-1

The compounds which were prepared according to Preparation Example 9 and their physical property value are shown below.

A compound represented by formula (Z26):

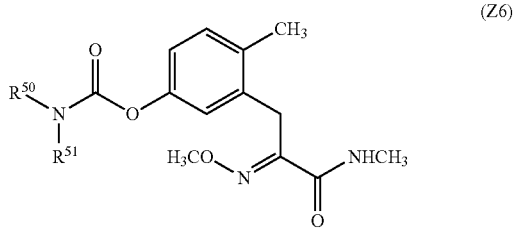

wherein $R^{50}$ and $R^{51}$ represent the following groups.
Present Compound 36 ($R^{50}$: Et, $R^{51}$: Et)

$^1$H-NMR (CDCl$_3$) δ: 7.09 (1H, d), 6.88-6.82 (2H, m), 6.75-6.67 (1H, br m), 3.96 (3H, s), 3.88 (2H, s), 3.46-3.32 (4H, br m), 2.87 (3H, d), 2.35 (3H, s), 1.27-1.15 (6H, br m).
Present Compound 37 ($R^{50}$: Me, $R^{51}$: Ph)

$^1$H-NMR (CDCl$_3$) δ: 7.41-7.31 (4H, m), 7.26-7.20 (1H, m), 7.08 (1H, d), 6.90-6.80 (2H, m), 6.74-6.66 (1H, m), 3.95 (3H, s), 3.86 (2H, s), 3.40 (3H, s), 2.85 (3H, d), 2.34 (3H, s).

Preparation Example 20

To a mixture of the present compound 2 0.15 g, 2-cyanophenol 0.07 g, triphenylphosphine 019 g and chloroform 5 mL was added bis(2-methoxyethyl)azodicarboxylate 0.18 g at 0° C., and the mixture was stirred at room temperature for 15 hours. The resulting mixture was cooled, and thereto was then added aqueous saturated sodium hydrogen carbonate solution, and the mixture was extracted with chloroform. The resulting organic layer was washed with water and saturated brine, and dried over anhydrous magnesium sulfate. The resulting residue was subjected to a silica gel column chromatography (ethyl acetate:hexane=1:4) to obtain the present compound 38 represented by the following formula 0.13 g.

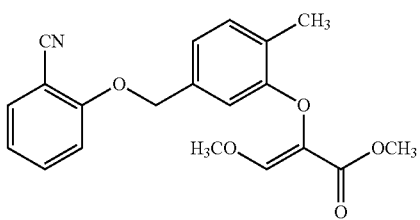 [SMILES: CO/C=C(\Oc1cc(COc2ccccc2C#N)ccc1C)C(=O)OC]

Present compound 38: ¹H-NMR (CDCl₁) δ: 7.56 (1H, d), 7.47 (1H, t), 7.36 (1H, s), 7.16 (1H, d), 7.02-6.88 (4H, m), 5.13 (2H, s), 3.87 (3H, s), 3.69 (3H, s), 2.35 (3H, s).

Preparation Example 20-1

The compounds which were prepared according to Preparation Example 20 and their physical property value are shown below.

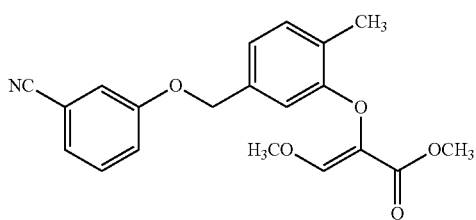 [SMILES: CO/C=C(\Oc1cc(COc2cccc(C#N)c2)ccc1C)C(=O)OC]

Present Compound 39: ¹H-NMR (CDCl₃) δ: 7.35 (1H, t), 7.32 (1H, s), 7.25-7.13 (4H, m), 6.95 (1H, dd), 6.75 (1H, d), 4.99 (2H, s), 3.85 (3H, s), 3.69 (3H, s), 2.36 (3H, s)

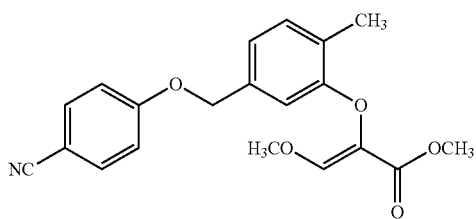 [SMILES: CO/C=C(\Oc1cc(COc2ccc(C#N)cc2)ccc1C)C(=O)OC]

Present Compound 40: ¹H-NMR (CDCl₃) δ: 7.59-7.55 (2H, m), 7.31 (1H, s), 7.18 (1H, d), 7.00-6.93 (3H, m), 6.73 (1H, d), 5.02 (2H, s), 3.84 (3H, s), 3.68 (3H, s), 2.35 (3H, s).

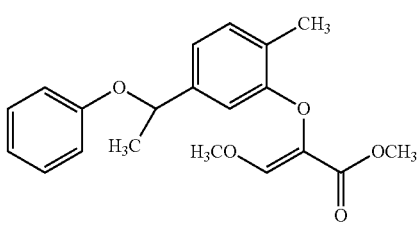 [SMILES: CO/C=C(\Oc1cc(C(C)Oc2ccccc2)ccc1C)C(=O)OC]

Present Compound 41: ¹H-NMR (CDCl₃) δ: 7.25 (1H, s), 7.19-7.09 (3H, m), 6.91-6.78 (4H, m), 6.71 (1H, d), 5.20 (1H, q), 3.73 (3H, s), 3.60 (3H, s), 2.31 (3H, s), 1.58 (3H, d)

Preparation Example 21

To a mixture of the present compound 2 0.25 g, triphosgene 0.10 g, and chloroform 5 mL was added dropwise diisopropylethylamine 0.17 mL, and the mixture was stirred at room temperature for 2 hours. To the resulting mixture was added dropwise a mixture of N-methylpropylamine 0.15 mL, diisopropylethylamine 0.33 mL, and chloroform 10 mL, and the mixture was stirred at room temperature overnight. To the resulting mixture was added aqueous saturated sodium hydrogen carbonate solution, and the mixture was extracted with ethyl acetate. The resulting organic layer was washed with saturated brine, then dried over anhydrous magnesium sulfate and concentrated under reduced pressure. The resulting residue was subjected to a silica gel column chromatography (ethyl acetate:hexane=1:1) to obtain the present compound 42 represented by the following formula 0.29 g.

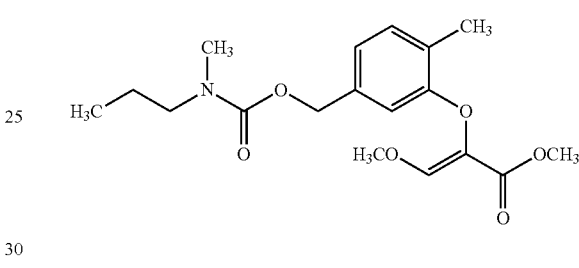

Present Compound 42: ¹H-NMR (CDCl₃) δ: 7.32 (1H, s), 7.13 (1H, d), 6.94-6.88 (1H, m), 6.71 (1H, s), 5.02 (2H, s), 3.87 (3H, s), 3.70 (3H, s), 3.25-3.18 (2H, m), 2.95-2.84 (3H, m), 2.34 (3H, s), 1.60-1.49 (2H, m), 0.88 (3H, t).

Preparation Example 21-1

The compounds which were prepared according to the method described in Preparation Example 21 and their physical property values are shown below.

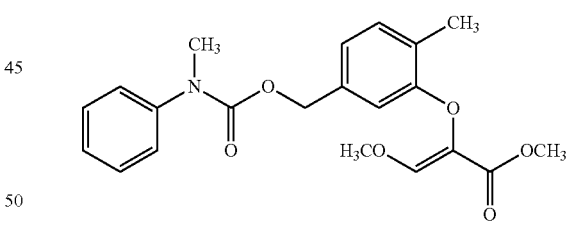

Present Compound 43: ¹H-NMR (CDCl₃) δ: 7.37-7.31 (2H, m), 7.29 (1H, s), 7.25-7.17 (3H, m), 7.10 (1H, d), 6.85 (1H, d), 6.66 (1H, s), 5.06 (2H, s), 3.81 (3H, s), 3.68 (3H, s), 3.29 (3H, s), 2.32 (3H, s).

Preparation Example 22

To a mixture of the intermediate compound 16 0.22 g, bis(tri-tert-butylphosphine)palladium (O)₀.₀₁₄ g, and toluene 6 mL was added dropwise diisopropylethylamine 0.17 mL, and the mixture was stirred at 100° C. for 10 hours. The resulting mixture was concentrated under reduced pressure and the resulting residue was subjected to a silica gel column chromatography to obtain the present compound 44 represented by the following formula 0.18 g.

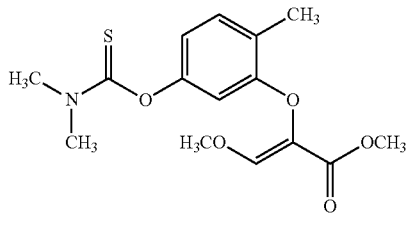 [SMILES: CO/C=C(\Oc1cc(OC(=S)N(C)C)ccc1C)C(=O)OC]

Present Compound 44: ¹H-NMR (CDCl₃) δ: 7.30 (1H, s), 7.17 (1H, d), 7.05 (1H, dd), 6.83 (1H, d), 3.86 (3H, s), 3.70 (3H, s), 3.03 (6H, br s), 2.35 (3H, s).

Preparation Example 23

A mixture of the intermediate compound 17 0.70 g, 1,2-dibromoethane 0.37 mL, potassium carbonate 0.88 g, and DMF 7 mL was stirred at room temperature for 15 hours. To the resulting mixture was added water, and the mixture was extracted with ethyl acetate. The resulting organic layer was washed with saturated brine, dried over anhydrous magnesium sulfate, and concentrated under reduced pressure. The resulting residue was subjected to a silica gel column chromatography to obtain the present compound 45 represented by the following formula 0.35 g.

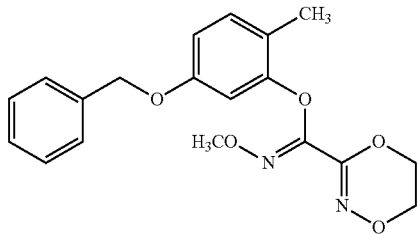 [SMILES: CO/N=C(\Oc1cc(OCc2ccccc2)ccc1C)C1=NOCCO1]

Present Compound 45: ¹H-NMR (CDCl₃) δ: 7.44-7.30 (5H, m), 7.05 (1H, d), 6.73 (1H, dd), 6.70 (1H, d), 5.00 (2H, s), 4.45-4.41 (2H, m), 4.14-4.10 (2H, m), 4.00 (3H, s), 3.85 (2H, s), 2.27 (3H, s).

Preparation Example 24

A mixture of 4-(5-bromo-2-methylbenzyl)-5-methoxy-2-methyl-2,4-dihydro-3H-1,2,4-triazol-3-one 4.56 g, thallium (I) acetate 4.20 g, butyl vinyl ether 9.34 mL, 1,3-his (diphenylphosphino)propane 604 mg, palladium (II) acetate 160 mg, triethylamine 2.44 mL and DMF 30 mL was stirred at 90° C. under nitrogen atmosphere for 8 hours. The resulting mixture was cooled to room temperature, and thereto was added dilute hydrochloric acid, and the mixture was stirred for 30 minutes. The resulting mixture was filtered, and the filtrates were extracted with chloroform. The resulting organic layer was washed with waster, dried over anhydrous sodium sulfate, and concentrated under reduced pressure. To the resulting residue was added a mixture of tert-butyl methyl ether and hexane (1:1), and the mixture was stirred at room temperature for 30 minutes. The resulting solids were filtered to obtain the present compound 46 represented by the following formula 2.58 g.

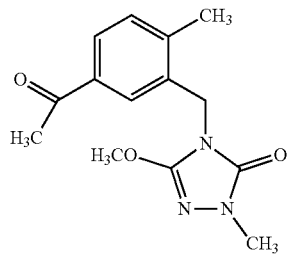

Present Compound 46: ¹H-NMR (CDCl₃) δ: 7.75-7.85 (2H, m), 7.25 (1H, d), 4.75 (2H, s), 3.94 (3H, s), 3.39 (3H, s), 2.56 (3H, s), 2.47 (3H, s).

Examples of the present compound and compound of the present invention which are prepared according to the above process and preparation example are shown below.

A compound represented by formula (IA):

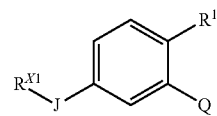

(hereinafter, referred to as "Compound (IA)") wherein Q represents Q2, $R^1$ represents a hydrogen atom, J represents an oxygen atom, $R^{x1}$ represents any substituents selected from Group X (hereinafter, referred to as "Compound class SX1").

Group X is a group consisting of the following groups. Et, Pr, i-Pr, $(CH_2)_3CH_3$, $CH_2CH(CH_3)_2$, $CH(CH_3)CH_2CH_3$, $C(CH_3)_3$, $CH_2c\text{-}Pr$, $(CH_2)_4CH_3$, $(CH_2)_2CH(CH_3)_2$, $CH(CH_3)(CH_2)_2CH_3$, $CH(CH_2CH_3)CH_2CH_3$, $CH_2CH(CH_3)CH_2CH_3$, $C(CH_3)_2CH_2CH_3$, $CH_2C(CH_3)_3$, $CH_2c\text{-}Bu$, $CH_2\text{-}Pen$, $CH_2c\text{-}Hex$, $(CR^{22})c\text{-}Pr$, (1-methylcyclopropyl)methyl, (2-methylcyclopropyl)methyl, 1-cyclopropylethyl, $(CH_2)_3c\text{-}Pr$, $(CH_2)_5CH_3$, $(CH_2)_3CH(CH_3)_2$, $(CH_2)_2CH(CH_3)CH_2CH_3$, $CH_2CH(CH_3)(CH_2)_2CH_3$, $CH(CH_3)(CH_2)_3CH_3$, $CH_2CH(CH_2CH_3)_2$, heptyl, octyl, nonyl, decyl, $CH_2CH=CH_2$, $CH_2CH=CHCH_3$, $CH_2CH=C(CH_3)_2$, $CH_2CH=CF_2$, $CH_2CH=CCl_2$, $CH_2CH=CHCH_2CH_3$, $CH_2CH=CH(CH_2)_2CH_3$, $CH_2C(CH_3)=CH_2$, $CH_2C(CH_3)=CHCH_3$, $CH_2C(CH_3)=C(CH_3)_2$, $CH_2C(CH_3)=CHCH_2CH_3$, $CH_2C(CH_3)=CH(CH_2)_2CH_3$, $CH_2CF=CH_2$, $CH_2CF=CHCH_3$, $CH_2CF=C(CH_3)_2$, $CH_2CF=CF_2$, $CH_2CF=CHCH_2CH_3$, $CH_2CF=CH(CH_2)_2CH_3$, $CH_2CCl=CH_2$, $CH_2CCl=CHCH_3$, $CH_2CCl=C(CH_3)_2$, $CH_2CCl=CCl_2$, $CH_2CCl=CHCH_2CH_3$, $CH_2CCl=CH(CH_2)_2CH_3$, $(CH_2)_2CH=CH_2$, $(CH_2)_2CH=CHCH_3$, $(CH_2)_2CH=CHCH_2CH_3$, $(CH_2)_2CH=C(CH_3)_2$, $(CH_2)_2C(CH_3)=CH_2$, $(CH_2)_2C(CH_3)=CHCH_3$, $(CH_2)_2C(CH_3)=CHCH_2CH_3$, $(CH_2)_2C(CH_3)=C(CH_3)_2$, $(CH_2)_3CH=CH_2$, $(CH_2)_3C(CH_3)=CH_2$, $(CH_2)_4CH=CH_2$, $(CH_2)_4C(CH_3)=CH_2$, $CH_2C=CH$, $CH_2C=CCH_3$, $CH_2C=CCH_2CH_3$, $CH_2C=C\ C\text{-}Pr$, $CH_2C=CPh$, $(CH_2)_2C=CH$, $(CH_2)_2C=CCH_3$, $(CH_2)_2C=CCH_2CH_3$, $(CH_2)_2C=Cc\text{-}Pr$, $(CH_2)_2C=CPh$, $(CH_2)_3C=CH$, $(CH_2)_3C=CCH_3$, $(CH_2)_3C=CCH_2CH_3$, $(CH_2)_3C=Cc\text{-}Pr$, $(CH_2)_3C=CPh$, $CH_2Cl$, $CH_2Br$, $CH_2CN$, $CH_2OCH_3$, $CH_2OCH_2CH_3$, $CH_2O(CH_2)_2CH_3$, $CH_2OPh$, $CH_2SCH_3$, $CH_2S(O)CH_3$, $CH_2S(O)_2CH_3$, $CH_2SCH_2CH_3$, $CH_2S(O)CH_2CH_3$, $CH_2S(O)_2CH_2CH_3$, $CH_2S(CH_2)_2CH_3$, $CH_2S(O)$ $(CH_2)_2CH_3$, $CH_2S(O)_2(CHR)_2CHR_3$, $CH_2SPh$, $CHS(O)Ph$, $CHS(O)_2Ph$, $CHC(O)CH_3$, $CHC(O)CH_2CH_3$, $CH_2C(O)Ph$, $CH_2C(O)NH_2$, $CH_2C(O)NHCH_3$, $CH_2C(O)N(CH_3)_2$, $CH_2C(O)NHPh$, $CH_2C(O)N(CH3)Ph$, $CH_2C(O)OCH_3$, $CH_2C(O)OCH_2CH_3$, $CH_2OC(O)Ph$, $CH_2OC(O)OCH_3$, $CH_2OC(O)OCH_2CH_3$, $CH_2OC(O)OPh$, $CH_2OC(O)NHCH_3$, $CH_2OC(O)NHCH_2CH_3$, $CH_2OC(O)NHPh$, $CH_2OC(O)N(CH_3)_2$, $CH_2OC(O)N(CH_3)CH_2CH_3$, $CH_2OC(O)N(CH_3)Ph$, $CH_2OC(O)N(CH_2CH_3)_2$, $CH_2(2\text{-oxiranyl})$, $CH_2(2\text{-tetrahydrofuranyl})$, $CH_2(2\text{-tetrahydropyranyl})$, $CH_2CH=NOCH_3$, $CH_2CH=NOCH_2CH_3$, $CH_2CH=NOCH_2Ph$, $CH_2C(CH_3)=NOCH_3$, $CH_2C(CH_3)=NOCH_2CH_3$, $CH_2C(CH_3)=NOCH_2Ph$, $(CH_2)_2F$, $CH_2CF_3$, $(CH_2)_2Cl$, $CH_2CCl_3$, $(CH_2Br$, $(CH_2)_{21}$, $CH_2Si(CH_3)_3$, $(CH_2)_2CF_3$, $(CH_2)_2CN$, $(CH_2)_2NO_2$, $(CH_2)_2Si(CH_3)_{33}$, $(CH_2)_2OCH_3$, $(CH_2)_2OCH_2CH_3$, $(CH_2)_2SCH_3$, $(CH_2)_2SCH_2CH_3$, $(CH_2)_2SPh$, $(CH_2)_2S(O)CH_3$, $(CH_2)_2S(O)CH_2CH_3$, $(CH_2)_2S(O)Ph$, $(CH_2)_2S(O)_2CH_3$, $(CH_2)_2S(O)_2CH_2CH_3$, $(CH_2)_2S(O)_2Ph$, $(CH_2)_2NHCH_3$, $(CH_2)_2N(CH_3)_2$, $(CH_2)_2NHPh$, $(CH_2)_2N HCH2 Ph$, $(CH_2)_2N(CH_3)CH_2Ph$, $(CH_2)_2C(O)CH_3$, $(CH_2)_2C(O)CH_2CH_3$, $(CH2)_2C(O)Ph$, $(CH_2)_2S(O)_2NHCH_3$, $(CH_2)_2S(O)_2N(CH_3)_2$, $(CH_2)_2S(O)_2NH Ph$, $(CH_2)_2S(O)_2N(CH_3)Ph$, $(CH_2)_2C(O)NH_2$, $(CH_2)_2C(O)NHCH_3$, $(CH_2)_2C(O)N(CH_3)_2$, $(CH_2)_2C(O)NHPh$, $(CH_2)_2C(O)N(CH_3)Ph$, $(CH_2)_2C(O)OCH3$, $(CH_2)_2C(O)OCH_2CH_3$, $(CH_2)_2NHC(O)CH_3$, $(CH_2)_2NHC(O)CH_2CH_3$, $(CH_2)_2NHC(O)Ph$, $(CH_2)_2NCH_3C(O)CH_3$, $(CH_2)_2NCH_3C(O)CH_2CH_3$, $(CH_2)_2NCH_3C(O)Ph$, $(CH_2)_2NHC(O)OCH_3$, $(CH_2)_2NHC(O)OCH_2CH_3$, $(CH)_2NHC(O)OPh$, $(CH_2)_2NCH_3C(O)OCH_3$, $(CH_2)_2NCH_3C(O)OCH_2CH_3$, $(CH_2)_2NCH_3C(O)OPh$, $(CH_2)_2NHC(O)NHCH_3$, $(CH_2)_2NHC(O)NHCH_2CH_3$, $(CH_2)_2NHC(O)NHPh$, $(CH_2)_2NHC(O)N(CH_3)_2$, $(CH_2)_2NHC(O)N(CH_3)CH_2CH_3$, $(CH_2)_2NHC(O)N(CH_3)Ph$, $(CH_2)_2NHC(O)N(CH_2CH_3)_2$, $(CH_2)_2NCH_3C(O)NHCH_3$, $(CH_2)_2NCH_3C(O)NHCH_2CH_3$, $(CH_2)_2NCH_3C(O)NHPh$, $(CH_2)_2NCH_3C(O)N(CH_3)_2$, $(CH_3)_2NCH_3C(O)N(CH_3)CH_2CH_3$, $(CH_2)_2NCH_3C(O)N(CH_3)Ph$, $(CH_2)_2NCH_3C(O)N(CH_2CH_3)_2$, $(CH_2)_2OC(O)CH_3$, $(CH_2OC(O)CH_2CH_3$, $(CH_2)_2OC(O)Ph$, $(CH_2)_2OC(O)OCH_3$, $(CH_2)_2OC(O)OCH_2CH_3$, $(CH_2)_2OC(O)OPh$, $(CH_2)_2OC(O)NHCH_3$, $(CH_2OC(O)NHCH_2CH_3$, $(CH_2)_2OC(O)NHPh$, $(CH_2OC(O)N(CH_3)2$, $(CH_2)_2OC(O)N(CH_3)CH_2CH_3$, $(CH_2)_2OC(O)N(CH_3)Ph$, $(CH)_2OC(O)N(CH_2CH_3)_2$, $(CH_2)_2S(O)_2NHCH_3$, $(CH_2)_2S(O)_2NHCH_2CH_3$, $(CH_2)_2S(O)_2NH Ph$, $(CH_2)_2S(O)_2N(CH_3)_2$, $(CH_2)_2S(O)_2N(CH_2CH_3$, $(CH_2)_2S(O)_2N(CH_3) Ph$, $(CH_2)_2S(O)_2N(CH_2CH_3)_2$, $(CH_2)_3F$, $(CH_2)_3Cl$, $(CH_2)_3Br$, $(CH_2)_3I$, $(CH_2)_3CF_3$, $(CH_2)_3CN$, $(CH_2)_3NO_2$, $(CH_2)_3Si(CH_3)_3$, $(CH_2)_3OCH_3$, $(CH_2)_3OCH_2CH_3$, $(CH_2)_3SCH_3$, $(CH_2)_3SCH_2CH_3$, $(CH_2)_3NHCH_3$, $(CH_2)_3N(CH_3)_2$, $(CH_2)_4F$, $(CH_2)_4Cl$, $(CH_2)_4CF_3$, $(CH_2)_4CN$, $(CH_2)_4NO_2$, $(CH_2)_4Ph$, $(CH_2)_4OCH_3$, $(CH_2)_4SCH_3$, $(CH_2)_4NHCH_3$, $(CH_2)_4N(CH_3)_2$, $(CH_2)_5F$, $(CH_2)_5Cl$, $(CH_2)_5CF_3$, $(CH_2)_5CN$, $(CH_2)_5NO_2$, $(CH_2)_5Ph$, $(CH_2)_5OCH_3$, $(CH_2)_5SCH_3$, $(CH_2)_5NHCH_3$, $(CH_2)_5N(CH_3)_2$, $(CH_2)_6F$, $(CH_2)_6Cl$, $(CH_2)_6CF3$, $(CH_2)_6CN$, $(CH_2)_6NO_2$, $(CH_2)_6Ph$, $(CH_2)_6OCH_3$, $(CH_2)_6SCH_3$, $(CH_2)_6NHCH_3$, $(CH_2)_6N(CH_3)_2$, $CH_2CF_2CF_3$, $(CH_2)_2CF_2CF_3$, $CH_2(CF_2)_2CF_3$, $(CH2)_2CF(CF_3)_2$, $(CH_2)_2(CF_2)_5CF_3$, $CF_3$, $CF_2CHF(CF_3)$, $CF_2CHF(OCF_3)$, $CH_2CF_2CF_2H$.

A compound (1A) wherein Q represents Q3, $R^1$ represents a methyl group, $L^2$ represents an oxygen atom, J represents an oxygen atom, and $R^{x1}$ represents any substituent selected from Group X (hereinafter, referred to as Compound Class SX2).

A compound (1A) wherein Q represents Q3, $R^1$ represents a chlorine atom, $L^2$ represents an oxygen atom, J represents an oxygen atom, and $R^{x1}$ represents any substituent selected from Group X (hereinafter, referred to as Compound Class SX3).

A compound (1A) wherein Q represents Q3, $R^1$ represents a methyl group, $L^2$ represents NH, J represents an oxygen atom, and $R^{x1}$ represents any substituent selected from Group X (hereinafter, referred to as Compound Class SX4).

A compound (1A) wherein Q represents Q3, $R^1$ represents a chlorine atom, $L^2$ represents NH, J represents an oxygen atom, and $R^{x1}$ represents any substituent selected from Group X (hereinafter, referred to as Compound Class SX5).

A compound (1A) wherein Q represents Q4, $R^1$ represents a methyl group, $R^3$ represents a methoxy group, J represents an oxygen atom, and $R^{x1}$ represents any substituent selected from Group X (hereinafter, referred to as Compound Class SX6).

A compound (1A) wherein Q represents Q4, $R^1$ represents a chlorine atom, $R^3$ represents a methoxy group, J represents an oxygen atom, and $R^{x1}$ represents any substituent selected from Group X (hereinafter, referred to as Compound Class SX7).

A compound (1A) wherein Q represents Q4, $R^1$ represents a methyl group, $R^3$ represents a difluoromethyl group, J represents an oxygen atom, and $R^{x1}$ represents any substituent selected from Group X (hereinafter, referred to as Compound Class SX8).

A compound (1A) wherein Q represents Q4, $R^1$ represents a chlorine atom, $R^3$ represents a difluoromethyl group, J represents an oxygen atom, and $R^{x1}$ represents any substituent selected from Group X (hereinafter, referred to as Compound Class SX9).

A compound (1A) wherein Q represents Q5, $R^1$ represents a methyl group, J represents an oxygen atom, and $R^{x1}$ represents any substituent selected from Group X (hereinafter, referred to as Compound Class SX10).

A compound (1A) wherein Q represents Q5, $R^1$ represents a chlorine atom, J represents an oxygen atom, and $R^{x1}$ represents any substituent selected from Group X (hereinafter, referred to as Compound Class SX11).

A compound (1A) wherein Q represents Q1, $R^1$ represents a methyl group, $L^1$ represents $CH_2$, J represents a sulfur atom, and $R^{x1}$ represents any substituent selected from Group X (hereinafter, referred to as Compound Class SX12).

A compound (1A) wherein Q represents Q1, $R^1$ represents a chlorine atom, $L^1$ represents $CH_2$, J represents a sulfur atom, and $R^{x1}$ represents any substituent selected from Group X (hereinafter, referred to as Compound Class SX13).

A compound (1A) wherein Q represents Q1, $R^1$ represents a methyl group, $L^1$ represents an oxygen atom, J represents a sulfur atom, and $R^{x1}$ represents any substituent selected from Group X (hereinafter, referred to as Compound Class SX14).

A compound (1A) wherein Q represents Q1, $R^1$ represents a chlorine atom, $L^1$ represents an oxygen atom, J represents a sulfur atom, and $R^{x1}$ represents any substituent selected from Group X (hereinafter, referred to as Compound Class SX15).

A compound (1A) wherein Q represents Q2, $R^1$ represents a hydrogen atom, J represents a sulfur atom, and $R^{x1}$ represents any substituent selected from Group X (hereinafter, referred to as Compound Class SX16).

A compound (1A) wherein Q represents Q3, $R^1$ represents a methyl group, $L^2$ represents an oxygen atom, J represents a sulfur atom, and $R^{x1}$ represents any substituent selected from Group X (hereinafter, referred to as Compound Class SX17).

A compound (1A) wherein Q represents Q3, $R^1$ represents a chlorine atom, $L^2$ represents an oxygen atom, J represents a sulfur atom, and $R^{x1}$ represents any substituent selected from Group X (hereinafter, referred to as Compound Class SX18).

A compound (1A) wherein Q represents Q3, $R^1$ represents a methyl group, $L^2$ represents NH, J represents a sulfur atom, and $R^{x1}$ represents any substituent selected from Group X (hereinafter, referred to as Compound Class SX19).

A compound (1A) wherein Q represents Q3, $R^1$ represents a chlorine atom, $L^2$ represents NH, J represents a sulfur atom, and $R^{x1}$ represents any substituent selected from Group X (hereinafter, referred to as Compound Class SX20).

A compound (1A) wherein Q represents Q4, $R^1$ represents a methyl group, $R^3$ represents a methoxy group, J represents a sulfur atom, and $R^{x7}$ represents any substituent selected from Group X (hereinafter, referred to as Compound Class SX21).

A compound (1A) wherein Q represents Q4, $R^1$ represents a chlorine atom, $R^3$ represents a methoxy group, J represents a sulfur atom, and $R^{x1}$ represents any substituent selected from Group X (hereinafter, referred to as Compound Class SX22).

A compound (1A) wherein Q represents Q4, $R^1$ represents a methyl group, $R^3$ represents a difluoromethyl group, J represents a sulfur atom, and $R^{x1}$ represents any substituent selected from Group X (hereinafter, referred to as Compound Class SX23).

A compound (1A) wherein Q represents Q4, $R^1$ represents a chlorine atom, $R^3$ represents a difluoromethyl group, J represents a sulfur atom, and $R^{x1}$ represents any substituent selected from Group X (hereinafter, referred to as Compound Class SX24).

A compound (1A) wherein Q represents Q5, $R^1$ represents a methyl group, J represents a sulfur atom, and $R^{x1}$ represents any substituent selected from Group X (hereinafter, referred to as Compound Class SX25).

A compound (1A) wherein Q represents Q5, $R^1$ represents a chlorine atom, J represents a sulfur atom, and $R^{x1}$ represents any substituent selected from Group X (hereinafter, referred to as Compound Class SX26).

A compound represented by formula (1B):

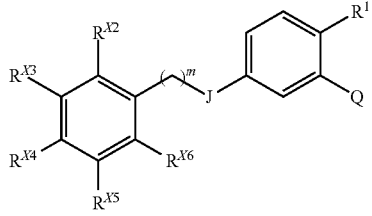

(1B)

(hereinafter, referred to as Compound (1B)), wherein Q represents Q2, $R^1$ represents a hydrogen atom, m is 1, J represents an oxygen atom, and a combination of $R^{x2}$, $R^{x3}$, $R^{x4}$, $R^{x5}$, and $R^{x6}$ represents any combination indicated in Combination A (hereinafter, referred to as Compound Class SX27).

Combination A consists of Substituent Nos. ZA1 to ZA311. The substituent No. ZA1 to ZA311 represents a combination of $R^{x2}$, $R^{x3}$, $R^{x4}$, $R^{x5}$ and $R^{x6}$ in the compound (1B), a compound represented by formula (1G), and a compound represented by formula (II), which hereinafter, is referred to as [Substituent No.; $R^{x2}$, $R^{x3}$, $R^{x4}$, RX, $R^{x6}$]. For example, Substituent No. ZA2 represents a combination wherein $R^{x2}$ represents a methyl group, and $R^{x2}$, $R^{x3}$, $R^{x4}$, $R^{x5}$, $R^{x6}$ represent a hydrogen atom.

Combination A

[ZA1; H, H, H, H, H], [ZA2; Me, H, H, H, H], [ZA3; F, H, H, H, H], [ZA4; Cl, H, H, H, H], [ZA5; OMe, H, H, H, H], [ZA6; $CF_3$, H, H, H, H], [ZA7; H, Me, H, H, H], [ZA8; H,Et, H, H, H], [ZA9; H, Pr, H, H, H], [ZA10; H, i-Pr, H, H, H], [ZA11; H, t-Bu, H, H, H], [ZA12; H, OMe, H, H, H], [ZA13; H, OEt, H, H, H], [ZA14; H, OPr, H, H, H], [ZA15; H, Oi-Pr, H, H, H], [ZA16; H, $CF_3$, H, H, H], [ZA17; H, $CF_2H$, H, H, H], [ZA18; H, $CFH_2$, H, H, H], [ZA19; H, F, H, H, H], [ZA20; H, Cl, H, H, H], [ZA21; H, Br, H, H H], [ZA22; H, CN, H, H, H], [ZA23; H, Ph, H, H, H], [ZA24; H, OPh, H, H, H], [ZA25; H, c-Pr, H, H, H], [ZA26; H, c-Pen, H, H, H], [ZA27; H, c-Hex, H, H, H], [ZA28; H, H, Me, H, H], [ZA29; H, H,Et, H, H], [ZA30; H, H, Pr, H, H], [ZA31; H, H, i-Pr, H, H], [ZA32; H, H, t-Bu, H, H], [ZA33; H, H, OMe, H, H], [ZA34; H, H, OEt, H, H], [ZA35; H, H, OPr, H, H], [ZA36; H, H, Oi-Pr, H, H], [ZA37; H, H, $CF_3$, H, H], [ZA38; H, H, $CF_2H$, H, H], [ZA39; H, H, $CFH_2$, H, H], [ZA40; H, H, F, H, H], [ZA41; H, H, Cl, H, H], [ZA42; H, H, Br, H, H], [ZA43; H, H, CN, H, H], [ZA44; H, H, Ph, H, H], [ZA45; H, H, OPh, H, H], [Z A.46; H, H, c-Pr, H, H], [ZA47; H, H, c-Pen, H, H], [ZA48; H, H, c-Hex, H, H], [ZA49; H, H, H, H, F], [ZA50; Me, H, H, H, F], [ZA51; F, H, H, H, F ], [ZA52; Cl, H, H, H, F], [ZA53; H, Me, H, H, F], [ZA54; H,Et, H, H, F], [ZA 55; H, Pr, H, H, F], [ZA56; H, i-Pr, H, H, F], [ZA57; H, t-Bu, H, H, F], [ZA58; H, OMe, H, H, F], [ZA59; H, OEt, H, H, F], [ZA60; H, OPr, H, H, F], [ZA61; H, Oi-Pr, H, H, F], [ZA62; H, $CF_3$, H, H, F], [ZA63; H, $CF_2H$, H, H, F], [ZA64; H, $CFH_2$, H, H, F], [ZA65; H, F, H, H, F], [ZA66; H, Cl, H, H, F], [ZA67; H, Br, H, H, F], [ZA68; H, CN, H, H, F], [ZA69; H, Ph, H, H, F], [ZA70; H, OPh, H, H, F], [ZA71; H, c-Pr, H, H, F], [ZA72; H, c-Pen, H, H, F], [ZA73; H, c-Hex, H, H, F], [ZA74; H, H, Me, H, F], [ZA75; H, H,Et, H, F], [ZA76; H, H, Pr, H, F], [ZA77; H, H, i-Pr, H, F], [ZA78; H, H, t-Bu, H, F], [ZA79; H, H, OMe, H, F], [ZA80; H, H, OEt, H, F], [ZA81; H, H, OPr, H, F], [ZA82; H, H, Oi-Pr, H, F], [ZA83; H, H, $CF_3$, H, F], [ZA84; H, H, $CF_2H$, H, F], [ZA85; H, H, $CFH_2$, H, F], [ZA86; H, H, F, H, F], [ZA87; H, H, Cl, H, F], [ZA88; H, H, Br, H, F], [ZA89; H, H, CN, H, F], [ZA90; H, H, Ph, H, F], [ZA91; H, H, OPh, H, F], [Z A92; H, H, c-Pr, H, F], [ZA93; H, H, c-Pen, H, F], [ZA94; H, H, c-Hex, H, F], [ZA95; H, H, H, H, Cl], [ZA96; Me, H, HH, Cl], [ZA97; F, H, H, H, C1], [ZA98; Cl, H, H, H, Cl], [ZA99; H, Me, H, H, Cl], [ZA100; H,Et, H, H, C1], [ZA101; H, Pr, H, H, Cl], [ZA102; H, i-Pr, H, H, Cl], [ZA103; H, t-Bu, H, H, Cl], [ZA104; H, OMe, H, H, Cl], [ZA105; H, OEt, H, H, Cl], [ZA106; H, OPr, H, H, Cl], [ZA107; H, Oi-Pr, H, H, Cl], [ZA108; H, $CF_3$, H, H, Cl], [ZA109; H, $CF_2H$, H, H, Cl], [ZA11 0; H, $CFH_2$, H, H, Cl], [ZA111; H, F, H, H, Cl], [ZA112; H, Cl, H, H, Cl], [ZA 113; H, Br, H, H, Cl], [ZA114; H, CN, H, H, Cl], [ZA115; H, Ph, H, H, Cl], [Z A116; H, OPh, H, H, Cl], [ZA117; H, c-Pr, H, H, Cl], [ZA118; H, c-Pen, H, H, Cl], [ZA119; H, c-Hex, H, H, Cl], [ZA120; H, H, Me, H, Cl], [ZA121; H, H,Et, H, Cl], [ZA122; H, H, Pr, H, Cl], [ZA123; H, H, i-Pr, H, Cl], [ZA124; H, H, t-Bu, H, Cl], [ZA125; H, H, OMe, H, Cl], [ZA126; H, H, OEt, H, Cl], [ZA127; H, H, OPr, H, Cl], [ZA128; H, H, Oi-Pr, H, Cl], [ZA129; H, H, $CF_3$, H, Cl], [ZA130; H, H, $CF_2H$, H, Cl], [ZA131; H, H, $CFH_2$, H, Cl], [ZA132; H, H, F, H, Cl], [ZA133; H, H, Cl, H, Cl], [ZA13 4; H, H, Br, H, Cl], [ZA135; H, H, CN, H, Cl], [ZA136; H, H, Ph, H, Cl], [ZA1 37; H, H, OPh, H, Cl], [ZA138; H, H, c-Pr, H, Cl], [ZA139; H, H, c-Pen, H, Cl], [ZA140; H, H, c-Hex, H, Cl], [ZA141; H, H, H, H, Me], [ZA142; Me, H, H, H, Me], [ZA143; F, H, H, H, Me], [ZA144; Cl, H, H, H, Me], [ZA145; H, Me, H, H, Me], [ZA146; H, Et, H, H, Me], [ZA147; H, Pr, H, H, Me], [ZA148; H, i-Pr, H, H, Me], [ZA149; H, t-Bu, H, H, Me], [ZA150; H, OMe, H, H, Me], [ZA151; H, OEt, H, H, Me], [ZA152; H, OPr, H, H, Me], [ZA153; H, Oi-Pr, H, H, Me], [ZA154; H, $CF_3$, H, H, Me], [ZA155; H, $CF_2H$, H, H, Me], [ZA15 6; H, $CFH_2$, H, H, Me], [ZA157; H, F, H, H, Me], [ZA158; H, Cl, H, H, Me], [ZA 159; H, Br, H, H, Me], [ZA160; H, CN, H, H, Me], [ZA161; H, Ph, H, H, Me], [Z A162; H, OPh, H, H, Me], [ZA163; H, c-Pr, H, H, Me], [ZA164; H, c-Pen, H, H, Me], [ZA165; H, c-Hex, H, H, Me], [ZA166; H, H, Me, H, Me], [ZA167; H, H,Et, H, Me], [ZA168; H, H, Pr, H, Me], [ZA169; H, H, i-Pr, H, Me], [ZA170; H, H, t-Bu, H, Me], [ZA171; H, H, OMe, H, Me], [ZA172; H, H, OEt, H, Me], [ZA173; H H, OPr, H, Me], [ZA174; H, H, Oi-Pr, H, Me], [ZA175; H, H, $CF_3$, H, Me], [ZA176; H, H, $CF_2H$, H, Me], [ZA177; H, H, $CFH_2$, H, Me], [ZA178; H, H, F, H, Me], [ZA179; H, H, Cl, H, Me], [ZA18 0; H, H, Br, H, Me], [ZA181; H, H, CN, H, Me], [ZA182; H, H, Ph, H, Me], [ZA1 83; H, H, OPh, H, Me], [ZA184; H, H, c-Pr, H, Me], [ZA185; H, H, c-Pen, H, Me], [ZA186; H, H, c-Hex, H, Me], [ZA187; H, H, H, H, OMe], [ZA188; Me, H, H, H, OMe], [ZA189; F, H, H, H, OMe], [ZA190; Cl, H, H, H, OMe], [ZA191; H, Me, H, H, OMe], [ZA19 2; H,Et, H, H, OMe], [ZA193; H, Pr, H, H, OMe], [ZA194; H, i-Pr, H, H, OMe], [ZA195; H, t-Bu, H, H, OMe], [ZA196; H, OMe, H, H, OMe], [ZA197; H, OEt, H, H, OMe], [ZA 198; H, OPr, H, H, OMe], [ZA199; H, Oi-Pr, H, H, OMe], [ZA200; H, $CF_3$, H, H, OMe], [ZA201; H, $CF_2H$, H, H, OMe], [ZA202; H, $CFH_2$, H, H, OMe], [ZA203; H, F, H, H, OMe], [ZA204; H, Cl, H, H, OMe], [ZA205; H, Br, H, H, OMe], [ZA206; H, C N, H, H, OMe], [ZA207; H, Ph, H, H, OMe], [ZA208; H, OPh, H, H, OMe], [ZA20 9; H, c-Pr, H, H, OMe], [ZA210; H, c-Pen, H, H, OMe], [ZA211; H, c-Hex, H, H, OMe], [ZA212; H, H, Me, H, OMe], [ZA213; H, H,Et, H, OMe], [ZA2 14; H, H, Pr, H, OMe], [ZA215; H, H, i-Pr, H, OMe], [ZA216; H, H, t-Bu, H, OMe], [ZA217; H, H, OMe, H, OMe], [ZA218; H, H, OEt, H, OMe], [ZA21 9; H, H, OPr, H, ONMe], [ZA220; H, H, Oi-Pr, H, OMe], [ZA221; H, H, $CF_3$, H, OMe], [ZA222; H, H, $CF_2H$, H, OMe], [ZA2 23; H, H, $CFH_2$, H, OMe], [ZA224; H, H, F, H, OMe], [ZA225; H, H, Cl, H, OMe], [ZA226; H, H, Br, H, OMe], [ZA227; H, H, CN, H, OMe], [ZA228; H, H, Ph, H, OMe], [ZA229; H, H, OPh, H, OMe], [ZA230; H, H, c-Pr, H, OMe], [ZA231; H, H, c-Pen, H, OMe], [ZA232; H, H, c-Hex, H, OMe], [ZA233; H, H, H, H, $CF_3$], [ZA234; Me, H, H, H, $CF_3$], [ZA235; F, H, H, H, $CF_3$], [ZA236; Cl, H, H, H, $CF_3$], [ZA237; H, Me, H, H, $CF_3$], [ZA2 38; H,Et, H, H, $CF_3$], [ZA239; H, Pr, H, H, $CF_3$], [ZA240; H, i-Pr, H, H, $CF_3$], [ZA241; H, t-Bu, H, H, $CF_3$], [ZA242; H, OMe, H, H, $CF_3$], [ZA243; H, OEt, H, H, $CF_3$], [ZA 244; H, OPr, H, H, $CF_3$], [ZA245; H, Oi-Pr, H, H, $CF_3$], [ZA246; H, $CF_3$, H, H, $CF_3$], [ZA247; H, $CF_2H$, H, H, $CF_3$], [Z A248; H, $CFH_2$, H, H, $CF_3$], [ZA249; H, F, H, H, $CF_3$], [ZA250; H, Cl, H, H, $CF_3$], [ZA251; H, Br, H, H, $CF_3$], [ZA252; H, CN, H, H, $CF_3$], [ZA253; H, Ph, H, H, $CF_3$], [ZA254; H, OPh, H, H, $CF_3$], [ZA255; H, c-Pr, H, H, $CF_3$], [ZA256; H, c-Pen, H, H, $CF_3$], [ZA257; H, c-Hex, H, H, $CF_3$], [ZA258; H, H, Me, H, $CF_3$], [ZA259; H, H,Et, H, $CF_3$], [ZA2 60; H, H, Pr, H, $CF_3$], [ZA261; H, H, i-Pr, H, $CF_3$], [ZA262; H, H, t-Bu, H, $CF_3$], [ZA263; H, H, OMe, H, $CF_3$], [ZA264; H, H, OEt, H, $CF_3$], [ZA26 5; H, H, OPr, H, $CF_3$], [ZA266; H, H, Oi-Pr, H, $CF_3$], [ZA267; H, H, $CF_3$, H, $CF_3$], [ZA268; H, H, $CF_2H$, H, $CF_3$], [ZA2 69; H, H, $CFH_2$, H, $CF_3$], [ZA270; H, H, F, H, $CF_3$], [ZA271; H, H, Cl, H, $CF_3$], [ZA272; H, H, Br, H, $CF_3$], [ZA273; H, H, CN, H, $CF_3$], [ZA274; H, H, Ph, H, $CF_3$], [ZA275; H, H, OPh, H, $CF_3$], [ZA276; H, H, c-Pr, H, $CF_3$], [ZA277; H, H, c-Pen, H, $CF_3$], [ZA278; H, H, c-Hex, H, $CF_3$], [ZA279; H, F, F, H, H], [ZA280; H, F, H, F, H], [ZA281; H, F, F, F, H], [ZA282; F, F, F, H, H], [ZA283; F, F, H, F, H], [ZA284; F, H, F, H, F], [ZA285; F, F, F, F, F], [ZA286; H, Cl, H, Cl, H], [ZA287; H, OMe, H, OMe, H], [ZA288; H, F, Cl, H, H], [ZA289; H, F, Me, H, H], [ZA290; H, F, OMe, H, H], [ZA291; H, F, $CF_3$, H, H], [ZA292; H, Cl, F, H, H], [ZA293; H, Cl, Cl, H, H], [ZA294; H, Cl, Me, H, H], [ZA295; H, Cl, OMe, H, H], [ZA296; H, Cl, $CF_3$, H, H], [ZA297; H, Me, F, H, H], [ZA298; H, Me, Cl, H, H], [ZA299; H, Me, Me, H, H], [ZA300; H, Me, OMe, H, H], [ZA301; H, Me, $CF_3$, H, H], [ZA302; H, OMe, F, H, H], [ZA303; H, OMe, Cl, H, H], [ZA304; H, OMe, Me, H, H], [ZA305; H, OMe, OMe, H, H], [ZA306; H, OMe, $CF_3$, H, H], [ZA307; H, $CF_3$, F, H, H], [ZA308; H, $CF_3$, Cl, H, H], [ZA309; H, $CF_3$, F, H, H], [ZA310; H, $CF_3$, Cl, H, H], [ZA311; H, $CF_3$, F, H, H]

A compound (1B) wherein Q represents Q3, $R^1$ represents a methyl group, $L^2$ represents an oxygen atom, m is 1, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX28).

A compound (1B) wherein Q represents Q3, $R^1$ represents a chlorine atom, $L^2$ represents an oxygen atom, m is 1, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX29).

A compound (1B) wherein Q represents Q3, $R^1$ represents a methyl group, $L^2$ represents NH, m is 1, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX30).

A compound (1B) wherein Q represents Q3, $R^1$ represents a chlorine atom, $L^2$ represents NH, m is 1, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX31).

A compound (1B) wherein Q represents Q4, $R^1$ represents a methyl group, $R^3$ represents a methoxy group, m is 1, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX32).

A compound (1B) wherein Q represents Q4, $R^1$ represents a chlorine atom, $R^3$ represents a methoxy group, m is 1, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX33).

A compound (1B) wherein Q represents Q4, $R^1$ represents a methyl group, $R^3$ represents a difluoromethyl group, m is 1, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX34).

A compound (1B) wherein Q represents Q4, $R^1$ represents a chlorine atom, $R^3$ represents a difluoromethyl group, m is 1, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX35).

A compound (1B) wherein Q represents Q5, $R^1$ represents a methyl group, m is 1, J represents an oxygen atom, and a combination of $R^{x2}$, $R^{x3}$, $R^{x4}$, $R^{x49}$ and $R^{x6}$ represents any combination described in Combination A thereof (hereinafter, referred to as Compound Class SX36).

A compound (1B) wherein Q represents Q5, $R^1$ represents a chlorine atom, m is 1, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX37).

A compound (1B) wherein Q represents Q2, $R^1$ represents a hydrogen atom, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX38).

A compound (1B) wherein Q represents Q3, $R^1$ represents a methyl group, $L^2$ represents an oxygen atom, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX39).

A compound (1B) wherein Q represents Q3, $R^1$ represents a chlorine atom, $L^2$ represents an oxygen atom, m is 2, J represents an oxygen atom, and a combination of $R^{x2}$, $R^{x3}$, $R^{x4}$, $R^{xb}$ and $R^{x6}$ represents any combination described in Combination A thereof (hereinafter, referred to as Compound Class SX40).

A compound (1B) wherein Q represents Q3, $R^1$ represents a methyl group, $L^2$ represents NH, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX41).

A compound (1B) wherein Q represents Q3, $R^1$ represents a chlorine atom, $L^2$ represents NH, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX42).

A compound (1B) wherein Q represents Q3, $R^1$ represents a methyl group, $R^1$ represents a methoxy group, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX43).

A compound (1B) wherein Q represents Q3, $R^1$ represents a chlorine atom, $R^3$ represents a methoxy group, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX44).

A compound (1B) wherein Q represents Q4, $R^1$ represents a methyl group, $R^3$ represents a difluoromethyl group, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX45).

A compound (1B) wherein Q represents Q4, $R^1$ represents a chlorine atom, $R^3$ represents a difluoromethyl group, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX46).

A compound (1B) wherein Q represents Q5, $R^1$ represents a methyl group, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX47).

A compound (1B) wherein Q represents Q5, $R^1$ represents a chlorine atom, m is 2, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX48).

A compound (1B) wherein Q represents Q1, $R^1$ represents a methyl group, $L^5$ represents $CH_2$, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX49).

A compound (1B) wherein Q represents Q1, $R^1$ represents a chlorine atom, $L^1$ represents $CH_2$, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX50).

A compound (1B) wherein Q represents Q1, $R^1$ represents a methyl group, $L^1$ represents $CH_2$, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX51).

A compound (1B) wherein Q represents Q1, $R^1$ represents a chlorine atom, $L^1$ represents an oxygen atom, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX52).

A compound (1B) wherein Q represents Q2, $R^1$ represents a hydrogen atom, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX53).

A compound (1B) wherein Q represents Q3, $R^1$ represents a methyl group, $L^2$ represents an oxygen atom, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX54).

A compound (1B) wherein Q represents Q3, $R^1$ represents a chlorine atom, $L^2$ represents an oxygen atom, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX55).

A compound (1B) wherein Q represents Q3, $R^1$ represents a methyl group, $L^2$ represents NH, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX56).

A compound (1B) wherein Q represents Q3, $R^1$ represents a chlorine atom, $L^2$ represents NH, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX57).

A compound (1B) wherein Q represents Q4, $R^1$ represents a methyl group, $R^3$ represents a methoxy group, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX58).

A compound (1B) wherein Q represents Q4, $R^1$ represents a chlorine atom, $R^3$ represents a methoxy group, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX59).

A compound (1B) wherein Q represents Q4, $R^1$ represents a methyl group, $R^3$ represents a difluoromethyl group, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX60).

A compound (1B) wherein Q represents Q4, $R^1$ represents a chlorine atom, $R^3$ represents a difluoromethyl group, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX61).

A compound (1B) wherein Q represents Q5, $R^1$ represents a methyl group, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX62).

A compound (1B) wherein Q represents Q5, $R^1$ represents a chlorine atom, m is 0, J represents an oxygen atom, and a combination of $R^{x2}$, $R^{x3}$, $R^{x4}$, $R^{x5}$ and $R^{x6}$ represents any combination described in Combination A thereof (hereinafter, referred to as Compound Class SX63).

A compound (1B) wherein Q represents Q1, $R^1$ represents a methyl group, $L^1$ represents $CH_2$, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX64).

A compound (1B) wherein Q represents Q1, $R^1$ represents a chlorine atom, $L^1$ represents $CH_2$, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX65).

A compound (1B) wherein Q represents Q1, $R^1$ represents a methyl group, $L^1$ represents an oxygen atom, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX66).

A compound (1B) wherein Q represents Q1, $R^1$ represents a chlorine atom, $L^1$ represents an oxygen atom, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX67).

A compound (1B) wherein Q represents Q2, $R^1$ represents a hydrogen atom, m is 1, J represents a sulfur atom, and a combination of $R^{x2}$, $R^{x3}$, $R^{x4}$, $R^{x49}$ and $R^{x6}$ represents any combination described in Combination A thereof (hereinafter, referred to as Compound Class SX68).

A compound (1B) wherein Q represents Q3, $R^1$ represents a methyl group, $L^2$ represents an oxygen atom, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX69).

A compound (1B) wherein Q represents Q3, $R^1$ represents a chlorine atom, $L^2$ represents an oxygen atom, m is 1, J represents a sulfur atom, and a combination of $R^{x2}$, $R^x j$, $R^{x4}$, $R^{x5}$ and $R^{x6}$ represents any combination described in Combination A thereof (hereinafter, referred to as Compound Class SX70).

A compound (1B) wherein Q represents Q3, $R^1$ represents a methyl group, $L^2$ represents NH, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX71).

A compound (1B) wherein Q represents Q3, $R^1$ represents a chlorine atom, $L^2$ represents NH, m is 1, J represents a sulfur atom, and a combination of $R^{x2}$, $R^{x3}$, $R^{x4}$, $R^{xb}$ and $R^{x6}$ represents any combination described in Combination A thereof (hereinafter, referred to as Compound Class SX72).

A compound (1B) wherein Q represents Q4, $R^1$ represents a methyl group, $R^3$ represents a methoxy group, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX73).

A compound (1B) wherein Q represents Q4, $R^1$ represents a chlorine atom, $R^3$ represents a methoxy group, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX74).

A compound (1B) wherein Q represents Q4, $R^1$ represents a methyl group, $R^3$ represents a difluoromethyl group, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX75).

A compound (1B) wherein Q represents Q4, $R^1$ represents a chlorine atom, $R^3$ represents a difluoromethyl group, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX76).

A compound (1B) wherein Q represents Q5, $R^1$ represents a methyl group, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX77).

A compound (1B) wherein Q represents Q5, $R^1$ represents a chlorine atom, m is 1, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX78).

A compound (1B) wherein Q represents Q1, $R^1$ represents a methyl group, $L^1$ represents $CH_2$, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX79).

A compound (1B) wherein Q represents Q1, $R^1$ represents a chlorine atom, $L^1$ represents $CH_2$, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX80).

A compound (1B) wherein Q represents Q1, $R^1$ represents a methyl group, $L^1$ represents an oxygen atom, m is 0, J represents a sulfur atom, and a combination of $R^{x2}$, $R^{x3}$, $R^{x4}$, $R^{xb}$ and $R^{x6}$ represents any combination described in Combination A thereof (hereinafter, referred to as Compound Class SX81).

A compound (1B) wherein Q represents Q1, $R^1$ represents a chlorine atom, $L^1$ represents an oxygen atom, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX82).

A compound (1B) wherein Q represents Q2, $R^1$ represents a hydrogen atom, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX83).

A compound (1B) wherein Q represents Q3, $R^1$ represents a methyl group, $L^2$ represents an oxygen atom, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX84).

A compound (1B) wherein Q represents Q3, $R^1$ represents a chlorine atom, $L^2$ represents an oxygen atom, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX85).

A compound (1B) wherein Q represents Q3, $R^1$ represents a methyl group, $L^2$ represents NH, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX86).

A compound (1B) wherein Q represents Q3, $R^1$ represents a chlorine atom, $L^2$ represents NH, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX87).

A compound (1B) wherein Q represents Q4, $R^1$ represents a methyl group, $R^3$ represents a methoxy group, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX88).

A compound (1B) wherein Q represents Q4, $R^1$ represents a chlorine atom, $R^3$ represents a methoxy group, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX89).

A compound (1B) wherein Q represents Q4, $R^1$ represents a methyl group, $R^3$ represents a difluoromethyl group, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX90).

A compound (1B) wherein Q represents Q4, $R^1$ represents a chlorine atom, $R^3$ represents a difluoromethyl group, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX91).

A compound (1B) wherein Q represents Q5, $R^1$ represents a methyl group, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to 0140 as Compound Class SX92).

A compound (1B) wherein Q represents Q5, $R^1$ represents a chlorine atom, m is 0, J represents a sulfur atom, and a combination of $R^{x2}$, $R^{x3}$, $R^{x4}$, $R^{x5}$ and $R^{x6}$ represents any combination described in Combination A thereof (hereinafter, referred to as Compound Class SX93).

A compound represented by formula (1C):
[wherein G represents any one of formulae G1 to G28:

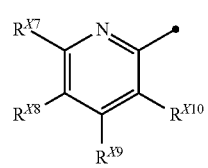
G1

-continued

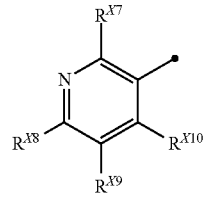
G2

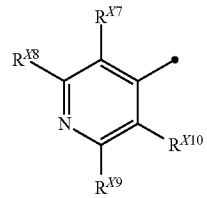
G3

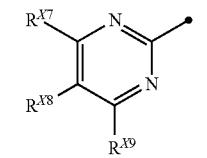
G4

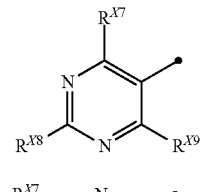
G5

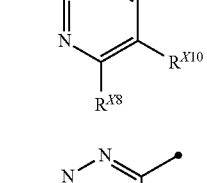
G6

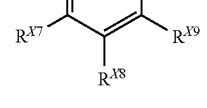
G7

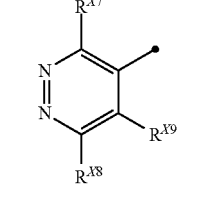
G8

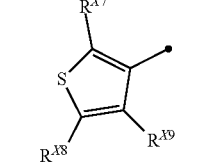
G9

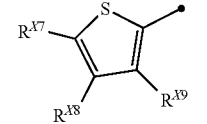
G10

-continued

G11 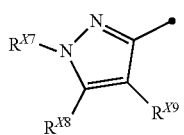

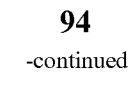 G21

G12 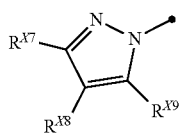

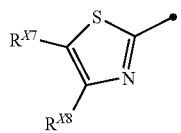 G22

G13 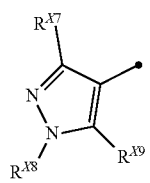

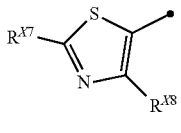 G23

G14 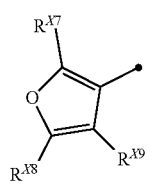

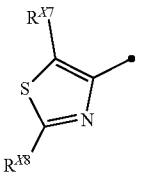 G24

G15 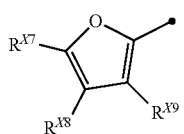

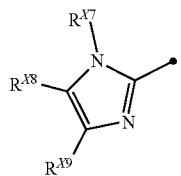 G25

G16 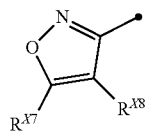

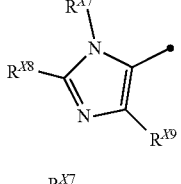 G26

G17 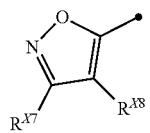

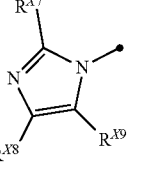 G27

G18 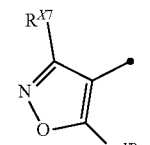

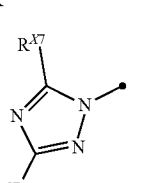 G28

G19 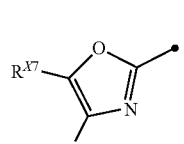

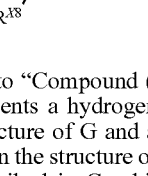

G20 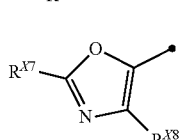

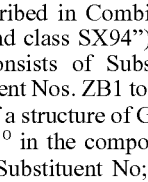

[hereinafter, referred to "Compound (1C)") wherein Q represents Q2, $R^1$ represents a hydrogen atom, m is 1, and a combination of a structure of G and a substituent $R^{x7}$, $R^{x8}$, $R^{x9}$ and $R^{x10}$ defined in the structure of G represents any one of combinations described in Combination B (hereinafter, referred to "Compound class SX94").

Combination B consists of Substituent Nos. ZB1 to ZB1145. The Substituent Nos. ZB1 to ZB1145 represent any one of combination of a structure of G and substituents Nos. $R^{x7}$, $R^{x8}$, $R^{x9}$ and $R^{x10}$ in the compound (1C), and hereinafter, referred to as [Substituent No; G, $R^{x7}$, $R^{x8}$, $R^{x9}$ and $R^{x10}$] For example, Substituent No. ZB2 represents a combination wherein G represents G1, $R^{x7}$ represents a methyl group, and $R^{x0}$, $R^{x9}$ and $R^{x1}$ represent a hydrogen atom.

Combination B

[ZB1; G1, H, H, H, H], [ZB2; G1, Me, H, H, H], [ZB3; G1, Et, H, H, H], [ZB4; G 1, Pr, H, H, H], [ZB5; G1, i-Pr, H, H, H], [ZB6; G1, c-Pr, H, H, H], [ZB7; G1, Ph, H, H, H], [ZB8; G1, OMe, H, H, H], [ZB9; G1, OEt, H, H, H], [ZB10; G1, OPh, H, H, H], [ZB11; G1, CF$_3$, H, H, H], [ZB12; G1, F, H, H, H], [ZB13; G1, Cl, H, H, H], [ZB14; G1, Br, H, H, H], [ZB15; G1, CN, H, H, H], [ZB16; G1, H, Me, H, H], [ZB17; G1, H,Et, H, H], [ZB18; G1, H, Pr, H, H], [ZB19; G1, H, i-Pr, H, H], [ZB20; G1, H, c-Pr, H, H], [ZB21; G1, H, Ph, H, H], [ZB22; G1, H, OMe, H, H], [ZB23; G1, H, O Et, H, H], [ZB24; G1, H, OPh, H, H], [ZB25; G1, H, CF$_3$, H, H], [ZB26; G1, H, F, H, H], [ZB27; G1, H, Cl, H, H], [ZB28; G1, H, Br, H, H], [ZB29; G1, H, CN, H, H], [ZB30; G1, H, H, Me, H], [ZB31; G1, H, H,Et, H], [ZB32; G1, H, H, Pr, H], [ZB33; G1, H, H, i-Pr, H], [ZB34; G1, H, H, c-Pr, H], [ZB35; G1, H, H, Ph, H], [ZB36; G1, H, H, OMe, H], [ZB37; G1, H, H, O Et, H], [ZB38; G1, H, H, OPh, H], [ZB39; G1, H, H, CF$_3$, H], [ZB40; G1, H, H, F, H], [ZB41; G1, H, H, Cl, H], [ZB42; G1, H, H, Br, H], [ZB43; G1, H, CN, H], [ZB44; G1, H, H, H, Me], [ZB45; G1, H, H, H,Et], [ZB46; G1, H, H, H, Pr], [ZB47; G1, H, H, H, i-Pr], [ZB48; G1, H, H, H, c-Pr], [ZB49; G1, H, H, H, Ph], [ZB50; G1, H, H, H, OMe], [ZB51; G1, H, H, H, O Et], [ZB52; G1, H, H, H, OPh], [ZB53; G1, H, H, H, CF$_3$], [ZB54; G1, H, H, H, F], [ZB55; G1, H, H, H, Cl], [ZB56; G1, H, H, H, Br], [ZB57; G1, H, H, H, CN], [ZB58; G2, H, H, H, H], [ZB59; G2, Me, H, H, H], [ZB60; G2, Et, H, H, H], [Z B61; G2, Pr, H, H, H], [ZB62; G2, i-Pr, H, H, H], [ZB63; G2, c-Pr, H, H, H], [ZB64; G2, Ph, H, H, H], [ZB65; G2, OMe, H, H, H], [ZB66; G2, O Et, H, H, H], [ZB67; G2, OPh, H, H, H], [ZB68; G2, CF$_3$, H, H, H], [ZB69; G2, F, H, H, H], [ZB70; G2, Cl, H, H, H], [ZB71; G2, Br, H, H, H], [ZB72; G2, CN, H, H, H], [ZB73; G2, H, Me, H, H], [ZB74; G2, H,Et, H, H], [ZB75; G2, H, Pr, H, H], [ZB76; G2, H, i-Pr, H, H], [ZB77; G2, H, c-Pr, H, H], [ZB78; G2, H, Ph, H, H], [ZB79; G2, H, OMe, H, H], [ZB80; G2, H, O Et, H, H], [ZB81; G2, H, OPh, H, H], [ZB82; G2, H, CF$_3$, H, H], [ZB83; G2, H, F, H, H], [ZB84; G2, H, Cl, H, H], [ZB85; G2, H, Br, H, H], [ZB86; G2, H, CN, H, H], [ZB87; G2, H, H, Me, H], [ZB88; G2, H, H,Et, H], [ZB89; G2, H, H, Pr, H], [ZB90; G2, H, H, i-Pr, H], [ZB91; G2, H, H, c-Pr, H], [ZB92; G2, H, H, Ph, H], [ZB93; G2, H, H, OMe, H], [ZB94; G2, H, H, O Et, H], [ZB95; G2, H, H, OPh, H], [ZB96; G2, H, H, CF$_3$, H], [ZB97; G2, H, H, F, H], [ZB98; G2, H, H, Cl, H], [ZB99; G2, H, H, Br, H], [ZB100; G2, H, H, CN, H], [ZB101; G2, H, H, H, Me], [ZB102; G2, H, H, H,Et], [ZB103; G2, H, H, H, Pr], [ZB104; G2, H, H, H, i-Pr], [ZB105; G2, H, H, H, c-Pr], [ZB106; G2, H, H, H, Ph], [ZB107; G2, H, H, H, OMe], [ZB108; G2, H, H, H, OEt], [ZB109; G2, H, H, H, OPh], [ZB110; G2, H, H, H, CF$_3$], [ZB111; G2, H, H, H, F], [ZB112; G2, H, H, H, Cl], [ZB113; G2, H, H, H, Br], [ZB114; G2, H, H, H, CN], [ZB115; G3, H, H, H, H], [ZB116; G3, Me, H, H, H], [ZB117; G3, Et, H, H, H], [ZB118; G3, Pr, H, H, H], [ZB119; G3, i-Pr, H, H, H], [ZB120; G3, c-Pr, H, H, H], [ZB121; G3, Ph, H, H, H], [ZB122; G3, OMe, H, H, H], [ZB123; G 3, OEt, H, H, H], [ZB124; G3, OPh, H, H, H], [ZB125; G3, CF$_3$, H, H, H], [ZB1 26; G3, F, H, H, H], [ZB127; G3, Cl, H, H, H], [ZB128; G3, Br, H, H, H], [ZB1 29; G3, CN, H, H, H], [ZB130; G3, H, Me, H, H], [ZB131; G3, H,Et, H, H], [ZB 132; G3, H, Pr, H, H], [ZB133; G3, H, i-Pr, H, H], [ZB134; G3, H, c-Pr, H, H], [ZB135; G3, H, Ph, H, H], [ZB136; G3, H, OMe, H, H], [ZB137; G3, H, OEt, H, H], [ZB138; G3, H, OPh, H, H], [ZB139; G3, H, CF$_3$, H, H], [ZB140; G3, H, F, H, H], [ZB141; G3, H, Cl, H, H], [ZB142; G3, H, Br, H, H], [ZB143; G3, H, CN, H, H], [ZB144; G3, H, H, Me, H], [ZB145; G3, H, H,Et, H], [ZB14 6; G3, H, H, Pr, H], [ZB147; G3, H, H, i-Pr, H], [ZB148; G3, H, H, c-Pr, H], [ZB149; G3, H, H, Ph, H], [ZB150; G3, H, H, OMe, H], [ZB151; G3, H, H, OEt, H], [ZB152; G3, H, H, OPh, H], [ZB153; G3, H, H, CF$_3$, H], [ZB154; G 3, H, H, F, H], [ZB155; G3, H, H, Cl, H], [ZB156; G3, H, H, Br, H], [ZB157; G 3, H, H, CN, H], [ZB158; G3, H, H, H, Me], [ZB159; G3, H, H, H,Et], [ZB160; G3, H, H, H, Pr], [ZB161; G3, H, H, H, i-Pr], [ZB162; G3, H, H, H, c-Pr], [ZB163; G3, H, H, H, Ph], [ZB164; G3, H, H, H, OMe], [ZB165; G3, H, H, H, OEt], [ZB166; G3, H, H, H, OPh], [ZB167; G3, H, H, H, CF$_3$], [ZB168; G3, H, H, H, F], [ZB169; G3, H, H, H, Cl], [ZB170; G3, H, H, H, Br], [ZB171; G3, H, H, H, CN], [ZB172; G4, H, H, H, -], [ZB173; G4, Me, H, H, -], [ZB174; G4, Et, H, H, -], [ZB175; G4, Pr, H, H, -], [ZB176; G4, i-Pr, H, H, -], [ZB177; G4, c-Pr, H, H, -], [ZB178; G4, Ph, H, H, -], [ZB179; G4, OMe, H, H, -], [ZB180; G 4, OEt, H, H, -], [ZB181; G4, OPh, H, H, -], [ZB182; G4, CF$_3$, H, H, -], [ZB1 83; G4, F, H, H, -], [ZB184; G4, Cl, H, H, -], [ZB185; G4, Br, H, H, -], [ZB1 86; G4, CN, H, H, -], [ZB187; G4, H, Me, H, -], [ZB188; G4, H,Et, H, -], [ZB 189; G4, H, Pr, H, -], [ZB190; G4, H, i-Pr, H, -], [ZB191; G4, H, c-Pr, H, -], [ZB192; G4, H, Ph, H, -], [ZB193; G4, H, OMe, H, -], [ZB194; G4, H, OEt, H, -], [ZB195; G4, H, OPh, H, -], [ZB196; G4, H, CF$_3$, H, -], [ZB197; G4, H, F, H, -], [ZB198; G4, H, Cl, H, -], [ZB199; G4, H, Br, H, -], [ZB200; G4, H, CN, H, -], [ZB201; G4, H, H, Me, -], [ZB202; G4, H, H,Et, -], [ZB203; G4, H, H, Pr,-], [ZB204; G4, H, H, i-Pr, -], [ZB205; G4, H, H, c-Pr, -], [ZB206; G4, H, H, Ph, -], [ZB207; G4, H, H, OMe, -], [ZB208; G4, H, H, OEt, -], [ZB209; G4, H, H, OPh, -], [ZB210; G4, H, H, CF$_3$, -], [ZB211; G 4, H, H, F, -], [ZB212; G4, H, H, Cl, -], [ZB213; G4, H, H, Br, -], [ZB214; G 4, H, H, CN, -], [ZB215; G5, H, H, H, -], [ZB216; G5, Me, H, H, -], [ZB217; G 5, Et, H, H, -], [ZB218; G5, Pr, H, H, -], [ZB219; G5, i-Pr, H, H, -], [ZB220; G5, c-Pr, H, H, -], [ZB221; G5, Ph, H, H, -], [ZB222; G5, OMe, H, H, -], [ZB223; G 5, OEt, H, H, -], [ZB224; G5, OPh, H, H, -], [ZB225; G5, CF$_3$, H, H, -], [ZB2 26; G5, F, H, H, -], [ZB227; G5, Cl, H, H, -], [ZB228; G5, Br, H, H, -], [ZB2 29; G5, CN, H, H, -], [ZB230; G5, H, Me, H,-1, [ZB231; G5, H,Et, H,-1, [ZB 232; G5, H, Pr, H, -], [ZB233; G5, H, i-Pr, H, -], [ZB234; G5, H, c-Pr, H, -], [ZB235; G5, H, Ph, H, -], [ZB236; G5, H, OMe, H, -], [ZB237; G5, H, OEt, H, -], [ZB238; G5, H, OPh, H, -], [ZB239; G5, H, CF$_3$, H, -], [ZB240; G5, H, F, H, -], [ZB241; G5, H, Cl, H, -], [ZB242; G5, H, Br, H, -], [ZB243; G5, H, CN, H, -], [ZB244; G5, H, H, Me, -], [ZB245; G5, H, H,Et, -], [ZB24 6; G5, H, H, Pr, -], [ZB247; G5, H, H, i-Pr, -], [ZB248; G5, H, H, c-Pr, -], [ZB249; G5, H, H, Ph, -], [ZB250; G5, H, H, OMe, -], [ZB251; G5, H, H, OEt, -], [ZB252; G5, H, H, OPh, -], [ZB253; G5, H, H, CF$_3$, -], [ZB254; G 5, H, H, F, -], [ZB255; G5, H, H, Cl, -], [ZB256; G5, H, H, Br, -], [ZB257; G 5, H, H, CN, -], [ZB258; G6, H, H, H, -], [ZB259; G6, Me, H, H, -], [ZB260; G 6, Et, H, H, -], [ZB261; G6, Pr, H, H, -], [ZB262; G6, i-Pr, H, H, -], [ZB263; G6, c-Pr, H, H, -], [ZB264; G6, Ph, H, H, -], [ZB265; G6, OMe, H, H, -], [ZB266; G 6, OEt, H, H, -], [ZB267; G6, OPh, H, H, -], [ZB268; G6, CF$_3$, H, H, -], [ZB2 69; G6, F, H, H, -], [ZB270; G6, Cl, H, H, -], [ZB271; G6, Br, H, H, -], [ZB2 72; G6, CN, H, H, -], [ZB273; G6, H, Me, H, -], [ZB274; G6, H,Et, H, -], [ZB 275; G6, H, Pr, H, -], [ZB276; G6, H, i-Pr, H, -], [ZB277; G6, H, c-Pr, H, -], [ZB278; G6, H, Ph, H, -], [ZB279; G6, H, OMe, H, -],

[ZB280; G6, H, OEt, H, -], [ZB281; G6, H, OPh, H, -], [ZB282; G6, H, CF$_3$, H, -], [ZB283; G6, H, F, H, -], [ZB284; G6, H, Cl, H, -], [ZB285; G6, H, Br, H, -], [ZB286; G6, H, CN, H, -], [ZB287; G6, H, H, Me, -], [ZB288; G6, H, H,Et, -], [ZB289; G6, H, H, Pr, -], [ZB290; G6, H, H, i-Pr, -], [ZB291; G6, H, H, c-Pr, -], [ZB292; G6, H, H, Ph, -], [ZB293; G6, H, H, OMe, -], [ZB294; G6, H, H, OEt, -], [ZB295; G6, H, H, OPh, -], [ZB296; G6, H, H, CF$_3$, -], [ZB297; G6, H, H, F, -], [ZB298; G6, H, H, Cl, -], [ZB299; G6, H, H, Br, -], [ZB300; G6, H, H, CN, -], [ZB301; G7, H, H, H, -], [ZB302; G7, Me, H, H, -], [ZB303; G7, Et, H, H, -], [ZB304; G7, Pr, H, H, -], [ZB305; G7, i-Pr, H, H, -], [ZB306; G7, c-Pr, H, H, -], [ZB307; G7, Ph, H, H, -], [ZB308; G7, OMe, H, H, -], [ZB309; G7, OEt, H, H, -], [ZB310; G7, OPh, H, H, -], [ZB311; G7, CF$_3$, H, H, -], [ZB312; G7, F, H, H, -], [ZB313; G7, Cl, H, H, -], [ZB314; G7, Br, H, H, -], [ZB315; G7, CN, H, H, -], [ZB316; G7, H, Me, H, -], [ZB317; G7, H,Et, H, -], [ZB318; G7, H, Pr, H, -], [ZB319; G7, H, i-Pr, H, -], [ZB320; G7, H, c-Pr, H, -], [ZB321; G7, H, Ph, H, -], [ZB322; G7, H, OMe, H, -], [ZB323; G7, H, OEt, H, -], [ZB324; G7, H, OPh, H, -], [ZB325; G7, H, CF$_3$, H, -], [ZB326; G7, H, F, H, -], [ZB327; G7, H, Cl, H, -], [ZB328; G7, H, Br, H, -], [ZB329; G7, H, CN, H, -], [ZB330; G7, H, H, Me, -], [ZB331; G7, H, H,Et, -], [ZB332; G7, H, H, Pr, -], [ZB333; G7, H, H, i-Pr, -], [ZB334; G7, H, H, c-Pr, -], [ZB335; G7, H, H, Ph, -], [ZB336; G7, H, H, OMe, -], [ZB337; G7, H, H, OEt, -], [ZB338; G7, H, H, OPh, -], [ZB339; G7, H, H, CF$_3$, -], [ZB340; G7, H, H, F, -], [ZB341; G7, H, H, Cl, -], [ZB342; G7, H, H, Br, -], [ZB343; G7, H, H, CN, -], [ZB344; G8, H, H, H, -], [ZB345; G8, Me, H, H, -], [ZB346; G8, Et, H, H, -], [ZB347; G8, Pr, H, H, -], [ZB348; G8, i-Pr, H, H, -], [ZB349; G8, c-Pr, H, H, -], [ZB350; G8, Ph, H, H, -], [ZB351; G8, OMe, H, H, -], [ZB352; G8, OEt, H, H, -], [ZB353; G8, OPh, H, H, -], [ZB354; G8, CF$_3$, H, H, -], [ZB355; G8, F, H, H, -], [ZB356; G8, Cl, H, H, -], [ZB357; G8, Br, H, H, -], [ZB358; G8, CN, H, H, -], [ZB359; G8, H, Me, H, -], [ZB360; G8, H,Et, H, -], [ZB361; G8, H, Pr, H, -], [ZB362; G8, H, i-Pr, H, -], [ZB363; G8, H, c-Pr, H,-1, [ZB364; G8, H, Ph, H, -], [ZB365; G8, H, OMe, H,-1, [ZB366; G8, H, OEt, H, -], [ZB367; q G8, H, OPh, H, -], [ZB368; G8, H, CF$_3$, H, -], [ZB369; G8, H, F, H, -], [ZB370; G8, H, Cl, H, -], [ZB371; G8, H, Br, H, -], [ZB372; G8, H, CN, H, -], [ZB373; G8, H, H, Me, -], [ZB374; G8, H, H,Et, -], [ZB375; G8, H, H, Pr, -], [ZB376; G8, H, H, i-Pr, -], [ZB377; G8, H, H, c-Pr, -], [ZB378; G8, H, H, Ph, -], [ZB379; G8, H, H, OMe, -], [ZB380; G8, H, H, OEt, -], [ZB381; G8, H, H, OPh, -], [ZB382; G8, H, H, CF$_3$, -], [ZB383; G8, H, H, F, -], [ZB384; G8, H, H, Cl, -], [ZB385; G8, H, H, Br, -], [ZB386; G8, H, H, CN, -], [ZB387; G9, H, H, H, -], [ZB388; G9, Me, H, H, -], [ZB389; G9, Et, H, H, -], [ZB390; G9, Pr, H, H, -], [ZB391; G9, i-Pr, H, H, -], [ZB392; G9, c-Pr, H, H, -], [ZB393; G9, Ph, H, H, -], [ZB394; G9, OMe, H, H, -], [ZB395; G9, OEt, H, H, -], [ZB396; G9, OPh, H, H, -], [ZB397; G9, CF$_3$, H, H, -], [ZB398; G9, F, H, H, -], [ZB399; G9, Cl, H, H, -], [ZB400; G9, Br, H, H, -], [ZB401; G9, CN, H, H, -], [ZB402; G9, H, Me, H, -], [ZB403; G9, H,Et, H,-], [ZB404; G9, H, Pr, H, -], [ZB405; G9, H, i-Pr, H, -], [ZB406; G9, H, c-Pr, H, -], [ZB407; G9, H, Ph, H, -], [ZB408; G9, H, OMe, H, -], [ZB409; G9, H, OEt, H, -], [ZB410; G9, H, OPh, H, -], [ZB411; G9, H, CF$_3$, H, -], [ZB412; G9, H, F, H, -], [ZB413; G9, H, Cl, H, -], [ZB414; G9, H, Br, H, -], [ZB415; G9, H, CN, H, -], [ZB416; G9, H, H, Me, -], [ZB417; G9, H, H,Et, -], [ZB418; G9, H, H, Pr, -], [ZB419; G9, H, H, i-Pr, -], [ZB420; G9, H, H, c-Pr, -], [ZB421; G9, H, H, Ph, -], [ZB422; G9, H, H, OMe, -], [ZB423; G9, H, H, OEt, -], [ZB424; G9, H, H, OPh, -], [ZB425; G9, H, H, CF$_3$, -], [ZB426; G9, H, H, F, -], [ZB427; G9, H, H, Cl, -], [ZB428; G9, H, H, Br, -], [ZB429; G9, H, H, CN, -], [ZB430; G10, H, H, H, -], [ZB431; G10, Me, H, H, -], [ZB432; G10, Et, H, H, -], [ZB433; G10, Pr, H, H, -], [ZB434; G10, i-Pr, H, H, -], [ZB435; G10, c-Pr, H, H, -], [ZB436; G10, Ph, H, H, -], [ZB437; G10, OMe, H, H, -], [ZB438; G10, OEt, H, H, -], [ZB439; G10, OPh, H, H, -], [ZB440; G10, CF$_3$, H, H,-], [ZB441; G10, F, H, H, -], [ZB442; G10, Cl, H, H, -], [ZB443; G10, Br, H, H,-], [ZB444; G10, CN, H, H, -], [ZB445; G10, H, Me, H, -], [ZB446; G10, H, Et, H, -], [ZB447; G10, H, Pr, H, -], [ZB448; G10, H, i-Pr, H, -], [ZB449; G10, H, c-Pr, H, -], [ZB450; G10, H, Ph, H, -], [ZB451; G10, H, OMe, H, -], [ZB452; G10, H, OEt, H, -], [ZB453; G10, H, OPh, H, -], [ZB454; G10, H, CF$_3$, H, -], [ZB455; G10, H, F, H, -], [ZB456; G10, H, Cl, H, -], [ZB457; G10, H, Br, H,-], [ZB458; G10, H, CN, H, -], [ZB459; G10, H, H, Me, -], [ZB460; G10, H, H, Et, -], [ZB461; G10, H, H, Pr, -], [ZB462; G10, H, H, i-Pr, -], [ZB463; G10, H, H, c-Pr, -], [ZB464; G10, H, H, Ph, -], [ZB465; G10, H, H, OMe, -], [ZB466; G10, H, H, OEt, -], [ZB467; G10, H, H, OPh, -], [ZB468; G10, H, H, CF$_3$, -], [ZB469; G10, H, H, F, -], [ZB470; G10, H, H, Cl, -], [ZB471; G10, H, H, Br, -], [ZB472; G10, H, H, CN, -], [ZB473; G11, H, H, H, -], [ZB474; G11, H, Me, H,-], [ZB475; G11, HEt, H, -], [ZB476; G11, HPr, H, -], [ZB477; G11, Hi-Pr, H, -], [ZB478; G11, Hc-Pr, H, -], [ZB479; G11, HPh, H, -], [ZB480; G11, HOMe, H, -], [ZB481; G11, HOEt, H, -], [ZB482; G11, HOPh, H, -], [ZB483; G11, HCF3, H, -], [ZB484; G11, HF, H, -], [ZB485; G11, HCl, H, -], [ZB486; G11, HBr, H, -], [ZB487; G11, HCN, H, -], [ZB488; G11, H, H, Me, -], [ZB489; G11, H, H,Et, -], [ZB490; G11, H, H, Pr, -], [ZB491; G11, H, H, i-Pr, -], [ZB492; G11, H, H, c-Pr,-1, [ZB493; G11, H, H, Ph,-1, [ZB494; G11, H, H, OMe,-1, [ZB495; G11 H, H, OEt, -], [ZB496; G11, H, H, OPh, -], [ZB497; G11, H, H, CF$_3$, -], [ZB498; G11, H, H, F, -], [ZB499; G11, H, H, Cl, -], [ZB500; G11, H, H, Br, -], [ZB501; G11, H, H, CN, -], [ZB502; G11, Me, H, H, -], [ZB503; G11, Me, Me, H, -], [ZB504; G11, MeEt, H, -], [ZB505; G11, MePr, H, -], [ZB506; G11, Mei-Pr, H, -], [ZB507; G11, Mec-Pr, H, -], [ZB508; G11, MePh, H, -], [ZB509; G11, MeOMe, H, -], [ZB510; G11, MeOEt, H, -], [ZB511; G11, MeOPh, H, -], [ZB512; G11, MeCF3, H, -], [ZB513; G11, MeF, H, -], [ZB514; G11, MeCl, H, -], [ZB515; G11, MeBr, H, -], [ZB516; G11, MeCN, H, -], [ZB517; G11, Me, H, Me, -], [ZB518; G11, Me, H,Et, -], [ZB519; G11, Me, H, Pr, -], [ZB520; G11, Me, H, i-Pr, -], [ZB521; G11, Me, H, c-Pr, -], [ZB522; G11, Me, H, Ph, -], [ZB523; G11, Me, H, OMe, -], [ZB524; G11, Me, H, OEt, -], [ZB525; G11, Me, H, OPh, -], [ZB526; G11, Me, H, CF$_3$,-], [ZB527; G11, Me, H, F, -], [ZB528; G11, Me, H, Cl, -], [ZB529; G11, Me, H, Br, -], [ZB530; G11, Me, H, CN, -], [ZB531; G12, H, H, H, -], [ZB532; G12, Me, H, H, -], [ZB533; G12, Et, H, H, -], [ZB534; G12, Pr, H, H, -], [ZB535; G12, i-Pr, H, H, -], [ZB536; G12, c-Pr, H, H, -], [ZB537; G12, Ph, H, H, -], [ZB538; G12,OMe, H, H, -], [ZB539; G12, OEt, H, H, -], [ZB540; G12, OPh, H, H, -], [ZB541; G12, CF$_3$, H, H,-], [ZB542; G12, F, H, H, -], [ZB543; G12, Cl, H, H, -], [ZB544; G12, Br, H, H,-], [ZB545; G12, CN, H, H, -], [ZB546; G12, H, Me, H, -], [ZB547; G12, H, Et, H, -], [ZB548; G12, H, Pr, H, -], [ZB549; G12, H, i-Pr, H, -], [ZB550; G12, H, c-Pr, H, -], [ZB551; G12, H, Ph, H, -], [ZB552; G12, H, OMe, H, -], [ZB553; G12, H, OEt, H,-1, [ZB554; G12, H, OPh, H,-1, [ZB555; G12, H, CF$_3$, H, -], [ZB556; G12, H, F, H, -], [ZB557; G12, H, Cl, H, -], [ZB558; G12, H, Br, H,-],

[ZB559; G12, H, CN, H, -], [ZB560; G12, H, H, Me, -], [ZB561; G12, H, H, Et, -], [ZB562; G12, H, H, Pr, -], [ZB563; G12, H, H, i-Pr, -], [ZB564; G12, H, H, C—Pr, -], [ZB565; G12, H, H, Ph, -], [ZB566; G12, H, H, OMe, -], [ZB567; G12, H, H, OEt, -], [ZB568; G12, H, H, OPh, -], [ZB569; G12, H, H, CF₃, -], [ZB 570; G12, H, H, F, -], [ZB571; G12, H, H, Cl, -], [ZB572; G12, H, H, Br, -], [ZB573; G12, H, H, CN, -], [ZB574; G13, H, H, H, -], [ZB575; G13, Me, H, H,-], [ZB576; G13, Et, H, H, -], [ZB577; G13, Pr, H, H, -], [ZB578; G13, i-Pr, H, H, -], [ZB579; G13, c-Pr, H, H, -], [ZB580; G13, Ph, H, H, -], [ZB581; G13, OMe, H, H, -], [ZB582; G13, OEt, H, H, -], [ZB583; G13, OPh, H, H, -], [ZB584; G13, CF₃, H, H,-], [ZB585; G13, F, H, H, -], [ZB586; G13, Cl, H, H, -], [ZB587; G13, Br, H, H,-], [ZB588; G13, CN, H, H, -], [ZB589; G13, H, H, Me, -], [ZB590; G13, H, H,Et, -], [ZB591; G13, H, H, Pr, -], [ZB592; G13, H, H, i-Pr,-], [ZB593; G13, H, H, c-Pr, -], [ZB594; G13, H, H, Ph, -], [ZB595; G13, H, H, OMe, -], [ZB596; G13, H, H, OEt, -], [ZB597; G13, H, H, OPh, -], [ZB598; G13, H, H, CF₃, -], [ZB 599; G13, H, H, F, -], [ZB600; G13, H, H, Cl, -], [ZB601; G13, H, H, Br, -], [ZB602; G13, H, H, CN, -], [ZB603; G13, H, Me, H,-], [ZB604; G13, Me, Me, H, -], [ZB605; G13, Et, Me, H, -], [ZB606; G13, Pr, Me, H, -], [ZB607; G13, i-Pr, Me, H, -], [ZB608; G13, c-Pr, Me, H, -], [ZB609; G13, Ph, Me, H, -], [ZB610; G13, OMe, Me, H, -], [ZB 611; G13, OEt, Me, H, -], [ZB612; G13, OPh, Me, H, -], [ZB613; G13, CF₃, M e, H, -], [ZB614; G13, F, Me, H, -], [ZB615; G13, Cl, Me, H, -], [ZB616; G1 3, Br, Me, H, -], [ZB617; G13, CN, Me, H, -], [ZB618; G13, H, Me, Me, -], [Z B619; G13, H, Me, Et, -], [ZB620; G13, H, Me, Pr, -], [ZB621; G13, H, Me, i —Pr, -], [ZB622; G13, H, Me, c-Pr, -], [ZB623; G13, H, Me, Ph, -], [ZB624; G13, H, Me, OMe, -], [ZB625; G 13, H, Me, OEt, -], [ZB626; G13, H, Me, OPh, -], [ZB627; G13, H, Me, CF₃, -], [ZB628; G13, H, Me, F, -], [ZB629; G13, H, Me, C1, -], [ZB630; G13, H, M e, Br, -], [ZB631; G13, H, Me, CN, -], [ZB632; G14, H, H, H, -], [ZB633; G1 4, Me, H, H, -], [ZB634; G14, Et, H, H, -], [ZB635; G14, Pr, H, H, -], [ZB63 6; G14, i-Pr, H, H, -], [ZB637; G14, c-Pr, H, H, -], [ZB638; G14, Ph, H, H, -], [ZB639; G14, OMe, H, H, -], [ZB640; G14, OEt, H, H, -], [ZB641; G14, OPh, H, H, -], [ZB642; G14, CF₃, H, H, -], [ZB643; G14, F, H, H, -], [ZB644; G14, Cl, H, H, -], [ZB645; G14, Br, H, H,-], [ZB646; G14, CN, H, H, -], [ZB647; G14, H, Me, H, -], [ZB648; G14, H, Et, H, -], [ZB649; G14, H, Pr, H, -], [ZB650; G14, H, i-Pr, H, -], [ZB651; G14, H, c-Pr, H, -], [ZB652; G14, H, Ph, H, -], [ZB653; G14, H, OMe, H, -], [ZB654; G 14, H, OEt, H, -], [ZB655; G14, H, OPh, H, -], [ZB656; G14, H, CF₃, H, -], [ZB657; G14, H, F, H, -], [ZB658; G14, H, Cl, H, -], [ZB659; G14, H, Br, H, -], [ZB660; G14, H, CN, H, -], [ZB661; G14, H, H, Me, -], [ZB662; G14, H, H, Et, -], [ZB663; G14, H, H, Pr, -], [ZB664; G14, H, H, i-Pr,-], [ZB665; G14, H, H, C—Pr, -], [ZB666; G14, H, H, Ph, -], [ZB667; G14, H, H, OMe, -], [ZB668; G14, H, H, OEt, -], [ZB669; G14, H, H, OPh, -], [ZB670; G14, H, H, CF₃, -], [ZB 671; G14, H, H, F, -], [ZB672; G14, H, H, Cl, -], [ZB673; G14, H, H, Br, -], [ZB674; G14, H, H, CN, -], [ZB675; G15, H, H, H, -], [ZB676; G15, Me, H, H,-], [ZB677; G15, Et, H, H, -], [ZB678; G15, Pr, H, H, -], [ZB679; G15, i-Pr, H, H, -], [ZB680; G15, c-Pr, H, H, -], [ZB681; G15, Ph, H, H, -], [ZB682; G15, OMe, H, H, -], [ZB683; G15, OEt, H, H, -], [ZB684; G15, OPh, H, H, -], [ZB685; G15, CF₃, H, H,-], [ZB686; G15, F, H, H, -], [ZB687; G15, Cl, H, H, -], [ZB688; G15, Br, H, H,-], [ZB689; G15, CN, H, H, -], [ZB690; G15, H, Me, H, -], [ZB691; G15, H, Et, H, -], [ZB692; G15, H, Pr, H, -], [ZB693; G15, H, i-Pr, H, -], [ZB694; G15, H, c-Pr, H, -], [ZB695; G15, H, Ph, H, -], [ZB696; G15, H, OMe, H, -], [ZB697; G 15, H, OEt, H, -], [ZB698; G15, H, OPh, H, -], [ZB699; G15, H, CF₃, H, -], [ZB700; G15, H, F, H, -], [ZB701; G15, H, Cl, H, -], [ZB702; G15, H, Br, H, -], [ZB703; G15, H, CN, H,-], [ZB704; G15, H, H, Me, -], [ZB705; G15, H, H,Et, -], [ZB706; G15, H, H, Pr, -], [ZB707; G15, H, H, i-Pr, -], [ZB708; G15, H, H, c-Pr, -], [ZB709; G15, H, H, Ph, -], [ZB710; G15, H, H, OMe, -], [ZB711; G15, H, H, OEt, -], [ZB712; G15, H, H, OPh, -], [ZB713; G15, H, H, CF₃, -], [ZB 714; G15, H, H, F, -], [ZB715; G15, H, H, Cl, -], [ZB716; G15, H, H, Br, -], [ZB717; G15, H, H, CN, -], [ZB718; G16, H, H, -, -], [ZB719; G16, Me, H, -,-], [ZB720; G16, Et, H, -, -], [ZB721; G16, Pr, H, -, -], [ZB722; G16, i-Pr, H, -, -], [ZB723; G16, c-Pr, H, -, -], [ZB724; G16, Ph, H, -, -], [ZB725; G16, OMe, H, -, -], [ZB726; G16, OEt, H, -, -], [ZB727; G16, OPh, H, -, -], [ZB728; G16, CF₃, H, -, -], [ZB729; G16, F, H, -, -], [ZB730; G16, Cl, H, -, -], [ZB731; G16, Br, H, -, -], [ZB732; G16, CN, H, -, -], [ZB733; G16, H, Me, -, -], [ZB734; G16, H, Et, -,-1, [ZB735; G16, H, Pr, -,-1, [ZB736; G16, H, i-Pr, -, -], [ZB737; G16, H, c-Pr, -, -], [ZB738; G16, H, Ph, -, -], [ZB739; G16, H, OMe, -, -], [ZB740; G 16, H, OEt, -, -], [ZB741; G16, H, OPh, -, -], [ZB742; G16, H, CF₃, -, -], [ZB743; G16, H, F, -, -], [ZB744; G16, H, Cl, -, -], [ZB745; G16, H, Br, -,-], [ZB746; G16, H, CN, -, -], [ZB747; G17, H, H, -, -], [ZB748; G17, Me, H,-, -], [ZB749; G17, Et, H, -, -], [ZB750; G17, Pr, H, -, -], [ZB751; G17, i —Pr, H, -, -], [ZB752; G17, c-Pr, H, -, -], [ZB753; G17, Ph, H, -, -], [ZB754; G17, OMe, H, -, -], [ZB755; G17, OEt, H, -, -], [ZB756; G17, OPh, H, -, -], [ZB757; G17, CF₃, H, -,-], [ZB758; G17, F, H, -, -], [ZB759; G17, Cl, H, -, -], [ZB760; G17, Br, H, -, -], [ZB761; G17, CN, H, -, -], [ZB762; G17, H, Me, -, -], [ZB763; G17, H, Et, -, -], [ZB764; G17, H, Pr, -, -], [ZB765; G17, H, i-Pr, -, -], [ZB766; G17, H, c-Pr, -, -], [ZB767; G17, H, Ph, -, -], [ZB768; G17, H, OMe, -, -], [ZB769; G 17, H, OEt, -, -], [ZB770; G17, H, OPh, -, -], [ZB771; G17, H, CF₃, -, -], [ZB772; G17, H, F, -, -], [ZB773; G17, H, Cl, -, -], [ZB774; G17, H, Br, -,-], [ZB775; G17, H, CN, -, -], [ZB776; G18, H, H, -, -], [ZB777; G18, Me, H,-, -], [ZB778; G18, Et, H, -, -], [ZB779; G18, Pr, H, -, -], [ZB780; G18, i —Pr, H, -, -], [ZB781; G18, c-Pr, H, -, -], [ZB782; G18, Ph, H, -, -], [ZB783; G18, OMe, H, -, -], [ZB784; G18, OEt, H, -, -], [ZB785; G18, OPh, H, -, -], [ZB786; G18, CF₃, H, -,-], [ZB787; G18, F, H, -, -], [ZB788; G18, Cl, H, -, -], [ZB789; G18, Br, H, -, -], [ZB790; G18, CN, H, -, -], [ZB791; G18, H, Me, -, -], [ZB792; G18, H, Et, -, -], [ZB793; G18, H, Pr, -, -], [ZB794; G18, H, i-Pr, -, -], [ZB795; G18, H, c-Pr, -, -], [ZB796; G18, H, Ph, -, -], [ZB797; G18, H, OMe, -, -], [ZB798; G 18, H, OEt, -, -], [ZB799; G18, H, OPh, -, -], [ZB800; G18, H, CF₃, -, -], [ZB801; G18, H, F, -, -], [ZB802; G18, H, Cl, -, -], [ZB803; G18, H, Br, -,-], [ZB804; G18, H, CN, -, -], [ZB805; G19, H, H, -, -], [ZB806; G19, Me, H,-, -], [ZB807; G19, Et, H, -, -], [ZB808; G19, Pr, H, -, -], [ZB809; G19, i-Pr, H, -, -], [ZB810; G19, c-Pr, H, -, -], [ZB811; G19, Ph, H, -, -], [ZB812; G19, OMe, H, -, -], [ZB813; G19, OEt, H, -, -], [ZB814; G19, OPh, H, -, -], [ZB815; G19, CF₃, H, -, -], [ZB816; G19, F, H, -, -], [ZB817; G19, Cl, H, -, -], [ZB818; G19, Br, H, -, -], [ZB819; G19, CN, H, -, -], [ZB820; G19, H, Me, -, -], [ZB821; G19, H, Et, -, -], [ZB822; G19, H, Pr, -, -], [ZB823; G19, H, i-Pr, -, -], [ZB824; G19, H, c-Pr, -, -], [ZB825; G19, H, Ph, -, -], [ZB826; G19, H, OMe, -, -], [ZB827; G 19, H, OEt, -, -], [ZB828; G19, H, OPh, -, -], [ZB829; G19, H, CF₃, -, -], [ZB830; G19, H, F, -, -], [ZB831; G19, H, Cl, -, -], [ZB832; G19, H, Br, -, -], [ZB833; G19, H, CN, -, -], [ZB834; G20, H, H, -, -], [ZB835; G20,

Me, H,-, -], [ZB836; G20, Et, H, -, -], [ZB837; G20, Pr, H, -, -], [ZB838; G20, i—Pr, H, -, -], [ZB839; G20, c-Pr, H, -, -], [ZB840; G20, Ph, H, -, -], [ZB841; G20, OMe, H, -, -], [ZB842; G20, OEt, H, -, -], [ZB843; G20, OPh, H, -, -], [ZB844; G20, CF$_3$, H, -, -], [ZB845; G20, F, H, -, -], [ZB846; G20, Cl, H, -, -], [ZB847; G20, Br, H, -, -], [ZB848; G20, CN, H, -, -], [ZB849; G20, H, Me, -, -], [ZB850; G20, H, Et, -, -], [ZB851; G20, H, Pr, -, -], [ZB852; G20, H, i-Pr, -, -], [ZB853; G20, H, c-Pr, -,-1, [ZB854; G20, H, Ph, -,-1, [ZB855; G20, H, OMe, -,-1, [ZB856; G 20, H, OEt, -, -], [ZB857; G20, H, OPh, -, -], [ZB858; G20, H, CF$_3$, -, -], [ZB859; G20, H, F, -, -], [ZB860; G20, H, Cl, -, -], [ZB861; G20, H, Br, -, -], [ZB862; G20, H, CN, -, -], [ZB863; G21, H, H, -, -], [ZB864; G21, Me, H,-, -], [ZB865; G21, Et, H, -, -], [ZB866; G21, Pr, H, -, -], [ZB867; G21, i—Pr, H, -, -], [ZB868; G21, c-Pr, H, -, -], [ZB869; G21, Ph, H, -, -], [ZB870; G21,OMe, H, -, -], [ZB871; G21, OEt, H, -, -], [ZB872; G21, OPh, H, -, -], [ZB873; G21, CF$_3$, H, -, -], [ZB874; G21, F, H, -, -], [ZB875; G21, Cl, H, -, -], [ZB876; G21, Br, H, -, -], [ZB877; G21, CN, H, -, -], [ZB878; G21, H, Me, -, -], [ZB879; G21, H, Et, -, -], [ZB880; G21, H, Pr, -, -], [ZB881; G21, H, i-Pr, -, -], [ZB882; G21, H, c-Pr, -, -], [ZB883; G21, H, Ph, -, -], [ZB884; G21, H, OMe, -, -], [ZB885; G 21, H, OEt, -, -], [ZB886; G21, H, OPh, -, -], [ZB887; G21, H, CF$_3$, -, -], [ZB888; G21, H, F, -, -], [ZB889; G21, H, Cl, -, -], [ZB890; G21, H, Br, -, -], [ZB891; G21, H, CN, -, -], [ZB892; G22, H, H, -, -], [ZB893; G22, Me, H,-, -], [ZB894; G22, Et, H, -, -], [ZB895; G22, Pr, H, -, -], [ZB896; G22, i—Pr, H, -, -], [ZB897; G22, c-Pr, H, -, -], [ZB898; G22, Ph, H, -, -], [ZB899; G22,OMe, H, -, -], [ZB900; G22, OEt, H, -, -], [ZB901; G22, OPh, H, -, -], [ZB902; G22, CF$_3$, H, -, -], [ZB903; G22, F, H,-, -], [ZB904; G22, Cl, H, -, -], [ZB905; G22, Br, H, -, -], [ZB906; G22, C N, H, -, -], [ZB907; G22, H, Me, -, -], [ZB908; G22, H,Et, -, -], [ZB909; G 22, H, Pr, -, -], [ZB910; G22, H, i-Pr, -, -], [ZB911; G22, H, c-Pr, -, -], [ZB912; G22, H, Ph, -, -], [ZB913; G22, H, OMe, -, -], [ZB914; G 22, H, OEt, -,-1, [ZB915; G22, H, OPh, -,-1, [ZB916; G22, H, CF$_3$, -, -], [ZB917; G22, H, F, -, -], [ZB918; G22, H, Cl, -, -], [ZB919; G22, H, Br, -, -], [ZB920; G22, H, CN, -, -], [ZB921; G23, H, H, -, -], [ZB922; G23, Me, H,-, -], [ZB923; G23, Et, H, -, -], [ZB924; G23, Pr, H, -, -], [ZB925; G23, i—Pr, H, -, -], [ZB926; G23, c-Pr, H, -, -], [ZB927; G23, Ph, H, -, -], [ZB928; G23, OMe, H, -, -], [ZB929; G23, OEt, H, -, -], [ZB930; G23, OPh, H, -, -], [ZB931; G23, CF$_3$, H, -,-], [ZB932; G23, F, H, -, -], [ZB933; G23, Cl, H, -, -], [ZB934; G23, Br, H, -, -], [ZB935; G23, CN, H, -, -], [ZB936; G23, H, Me, -, -], [ZB937; G23, H, Et, -, -], [ZB938; G23, H, Pr, -, -], [ZB939; G23, H, i-Pr, -, -], [ZB940; G23, H, c-Pr, -, -], [ZB941; G23, H, Ph, -, -], [ZB942; G23, H, OMe, -, -], [ZB943; G 23, H, OEt, -, -], [ZB944; G23, H, OPh, -, -], [ZB945; G23, H, CF$_3$, -, -], [ZB946; G23, H, F, -, -], [ZB947; G23, H, Cl, -, -], [ZB948; G23, H, Br, -,-], [ZB949; G23, H, CN, -, -], [ZB950; G24, H, H, -, -], [ZB951; G24, Me, H,-, -], [ZB952; G24, Et, H, -, -], [ZB953; G24, Pr, H, -, -], [ZB954; G24, i—Pr, H, -, -], [ZB955; G24, c-Pr, H, -, -], [ZB956; G24, Ph, H, -, -], [ZB957; G24, OMe, H, -, -], [ZB958; G24, OEt, H, -, -], [ZB959; G24, OPh, H, -, -], [ZB960; G24, CF$_3$, H, -, -], [ZB961; G24, F, H, -, -], [ZB962; G24, Cl, H, -, -], [ZB963; G24, Br, H, -, -], [ZB964; G24, CN, H, -, -], [ZB965; G24, H, Me, -, -], [ZB966; G24, H, Et, -, -], [ZB967; G24, H, Pr, -, -], [ZB968; G24, H, i-Pr, -, -], [ZB969; G24, H, c-Pr, -, -], [ZB970; G24, H, Ph, -, -], [ZB971; G24, H, OMe, -, -], [ZB972; G 24, H, OEt, -, -], [ZB973; G24, H, OPh, -, -], [ZB974; G24, H, CF$_3$, -, -], [ZB975; G24, H, F, -,-1, [ZB976; G24, H, Cl, -, -], [ZB977; G24, H, Br, -, -], [ZB978; G24, H, CN, -, -], [ZB979; G25, H, H, H, -], [ZB980; G25, H, Me, H, -], [ZB981; G25, H,Et, H, -], [ZB982; G25, H, Pr, H, -], [ZB983; G25, H, i-Pr, H, -], [ZB984; G25, H, c-Pr, H, -], [ZB985; G25, H, Ph, H, -], [ZB986; G25, H, OMe, H, -], [ZB987; G 25, H, OEt, H, -], [ZB988; G25, H, OPh, H, -], [ZB989; G25, H, CF$_3$, H, -], [ZB990; G25, H, F, H, -], [ZB991; G25, H, Cl, H, -], [ZB992; G25, H, Br, H, -], [ZB993; G25, H, CN, H, -], [ZB994; G25, H, H, Me, -], [ZB995; G25, H, H, Et, -], [ZB996; G25, H, H, Pr, -], [ZB997; G25, H, H, i-Pr, -], [ZB998; G25, H, H, c-Pr, -], [ZB999; G25, H, H, Ph, -], [ZB1000; G25, H, H, OMe, -], [ZB1001; G25, H, H, OEt, -], [ZB1002; G25, H, H, OPh, -], [ZB1003; G25, H, H, CF$_3$, -], [ZB1004; G25, H, H, F, -], [ZB1005; G25, H, H, Cl, -], [ZB100 6; G25, H, H, Br, -], [ZB1007; G25, H, H, CN, -], [ZB1008; G25, Me, H, H,-], [ZB1009; G25, Me, Me, H, -], [ZB11O0; G25, Me, Et, H, -], [ZB1O11; G25, Me, Pr, H, -], [ZB1012; G25, Me, i-Pr, H, -], [ZB1013; G25, Me, c-Pr, H, -], [ZB1014; G25, Me, Ph, H, -], [ZB1015; G25, Me, OMe, H, -], [ZB1 016; G25, Me, OEt, H, -], [ZB1017; G25, Me, OPh, H, -], [ZB1018; G25, Me, CF$_3$, H, -], [ZB1019; G25, Me, F, H, -], [ZB1020; G25, Me, Cl, H, -], [ZB10 21; G25, Me, Br, H, -], [ZB1022; G25, Me, CN, H, -], [ZB1023; G25, Me, H, M e, -], [ZB1024; G25, Me, H,Et, -], [ZB1025; G25, Me, H, Pr, -], [ZB1026; G25, Me, H, i-Pr, -], [ZB1027; G25, Me, H, c-Pr, -], [ZB1028; G25, Me, H, Ph, -], [ZB1029; G25, Me, H, OMe, -], [ZB103 0; G25, Me, H, OEt, -], [ZB1031; G25, Me, H, OPh, -], [ZB1032; G25, Me, H, CF$_3$, -], [ZB1033; G25, Me, H, F, -], [ZB1034; G25, Me, H, Cl, -], [ZB1035; G25, Me, H, Br, -], [ZB1036; G25, Me, H, CN, -], [ZB1037; G26, H, H, H,-][ZB1038; G26, H, Me, H, -], [ZB1039; G26, H,Et, H, -], [ZB1040; G26, H, Pr, H, -], [ZB1041; G26, H, i-Pr, H, -], [ZB1042; G26, H, c-Pr, H, -], [ZB1043; G26, H, Ph, H, -], [ZB1044; G26, H, OMe, H, -], [ZB104 5; G26, H, OEt, H, -], [ZB1046; G26, H, OPh, H, -], [ZB1047; G26, H, CF$_3$, H,-], [ZB1048; G26, H, F, H, -], [ZB1049; G26, H, Cl, H, -], [ZB1050; G26, H, Br, H, -], [ZB1051; G26, H, CN, H, -], [ZB1052; G26, H, H, Me, -], [ZB10 53; G26, H, H,Et, -], [ZB1054; G26, H, H, Pr, -], [ZB1055; G26, H, H, i-Pr, -], [ZB1056; G26, H, H, C—Pr, -], [ZB1057; G26, H, H, Ph, -], [ZB1058; G26, H, H, OMe, -], [ZB1059; G26, H, H, OEt, -], [ZB1060; G26, H, H, OPh, -], [ZB1061; G26, H, H, CF$_3$, -], [ZB1062; G26, H, H, F, -], [ZB1063; G26, H, H, Cl, -], [ZB1064; G26, H, H, Br, -], [ZB1065; G26, H, H, CN, -], [ZB1066; G26, Me, H, H, -], [ZB1067; G26, Me, Me, H, -], [ZB1068; G26, Me, Et, H, -], [ZB1069; G26, Me, Pr, H,-], [ZB1070; G26, Me, i-Pr, H, -], [ZB1071; G26, Me, c-Pr, H, -], [ZB1072; G26, Me, Ph, H, -], [ZB1073; G26, Me, OMe, H, -], [ZB1 074; G26, Me, OEt, H, -], [ZB1075; G26, Me, OPh, H, -], [ZB1076; G26, Me, CF$_3$, H, -], [ZB1077; G26, Me, F, H, -], [ZB1078; G26, Me, Cl, H, -], [ZB10 79; G26, Me, Br, H, -], [ZB1080; G26, Me, CN, H, -], [ZB1081; G26, Me, H, M e, -], [ZB1082; G26, Me, H,Et, -], [ZB1083; G26, Me, H, Pr, -], [ZB1084; G26, Me, H, i-Pr, -], [ZB1085; G26, Me, H, c-Pr, -], [ZB1086; G26, Me, H, Ph, -], [ZB1087; G26, Me, H, OMe, -], [ZB108 8; G26, Me, H, OEt, -], [ZB1089; G26, Me, H, OPh, -], [ZB1090; G26, Me, H, CF$_3$, -], [ZB1091; G26, Me, H, F, -], [ZB1092; G26, Me, H, Cl, -], [ZB1093; G26, Me, H, Br, -], [ZB1094; G26, Me, H, CN, -], [ZB1095; G27, H, H, H,-], [ZB1096; G27, Me, H, H, -], [ZB1097; G27, Et, H, H, -], [ZB1098; G27, Pr H, H, -], [ZB1099; G27, i-Pr, H, H, -], [ZB1100; G27, c-Pr, H, H, -], [ZB1101; G27, Ph, H, H, -], [ZB1102; G27, OMe, H, H, -], [ZB1103; G27, OE t, H, H, -], [ZB1104; G27, OPh, H, H, -], [ZB1105; G27, CF$_3$, H, H, -], [ZB1 106; G27, F, H, H, -], [ZB1107; G27, Cl, H, H, -], [ZB1108; G27, Br, H, H,-], [ZB1109; G27, CN, H, H, -], [ZB1110; G27, H, Me, H, -], [ZB1111; G27, H, Et, H, -],

[ZB1112; G27, H, Pr, H, -], [ZB1113; G27, H, i-Pr, H, -], [ZB1114; G27, H, c-Pr, H, -], [ZB1115; G27, H, Ph, H, -], [ZB1116; G27, H, OMe, H, -], [ZB111 7; G27, H, OEt, H, -], [ZB1118; G27, H, OPh, H, -], [ZB1119; G27, H, $CF_3$, H,-], [ZB1120; G27, H, F, H, -], [ZB1121; G27, H, Cl, H, -], [ZB1122; G27, H, Br, H, -], [ZB1123; G27, H, CN, H, -], [ZB1124; G27, H, H, Me, -], [ZB11 25; G27, H, H,Et, -], [ZB1126; G27, H, H, Pr, -], [ZB1127; G27, H, H, i-Pr, -], [ZB1128; G27, H, H, c-Pr, -], [ZB1129; G27, H, H, Ph, -], [ZB1130; G27, H, H, OMe, -], [ZB1131; G27, H, H, OEt, -], [ZB1132; G27, H, H, OPh, -], [ZB1133; G27, H, H, $CF_3$,-], [ZB1134; G27, H, H, F, -], [ZB1135; G27, H, H, Cl, -], [ZB1136; G27, H, H, Br, -], [ZB1137; G27, H, H, CN, -], [ZB1138; G28, H, H, -, -], [ZB1139; G28, Me, H, -, -], [ZB1140; G28, Cl, H, -, -], [ZB1141; G28, $CF_3$, H, -, -], [ZB1142; G28, H, Me, -, -], [ZB1143; G28, H, Cl, -, -], [ZB1144; G28, H, C $F_3$, -, -], [ZB1145; G28, H, SH, -,-]

A compound (1C) wherein Q represents Q3, $R^1$ represents a methyl group, $L^2$ represents an oxygen atom, m is 1, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX95).

A compound (1C) wherein Q represents Q3, $R^1$ represents a chlorine atom, $L^2$ represents an oxygen atom, m is 1, and a combination of a structure of G and a substituent $R^{x1}$, Rx, $R^{x9}$, and $R^{x10}$ defined in the structure of G represents any one of the combination described in the combination B (hereinafter, referred to as Compound Class SX96).

A compound (1C) wherein Q represents Q3, $R^1$ represents a methyl group, $L^2$ represents NH, m is 1, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX97).

A compound (1C) wherein Q represents Q3, $R^1$ represents a chlorine atom, $L^2$ represents NH, m is 1, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX98).

A compound (1C) wherein Q represents Q4, $R^1$ represents a methyl group, $R^3$ represents a methoxy group, m is 1, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX99).

A compound (1C) wherein Q represents Q4, $R^1$ represents a chlorine atom, $R^3$ represents a methoxy group, m is 1, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX100).

A compound (1C) wherein Q represents Q4, $R^1$ represents a methyl group, $R^3$ represents a difluoromethyl group, m is 1, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX101).

A compound (1C) wherein Q represents Q4, $R^1$ represents a chlorine atom, $R^3$ represents a difluoromethyl group, m is 1, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX102).

A compound (1C) wherein Q represents Q5, $R^1$ represents a methyl group, m is 1, and a combination of a structure of G and a substituent $R^{x7}$, $R^{xB}$, $R^{x9}$, and $R^{x10}$ defined in the structure of G represents any one of the combination described in the combination B (hereinafter, referred to as Compound Class SX103).

A compound (1C) wherein Q represents Q5, $R^1$ represents a chlorine atom, m is 1, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX104).

A compound (1C) wherein Q represents Q2, $R^1$ represents a hydrogen atom, m is 2, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX105).

A compound (1C) wherein Q represents Q3, $R^1$ represents a methyl group, $L^2$ represents an oxygen atom, m is 2, and a combination of a structure of G and a substituent $R^{x7}$, $R^{xB}$, $R^{x9}$, and $R^{x10}$ defined in the structure of G represents any one of the combination described in the combination B (hereinafter, referred to as Compound Class SX106).

A compound (1C) wherein Q represents Q3, $R^1$ represents a chlorine atom, $L^2$ represents an oxygen atom, m is 2, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX107).

A compound (1C) wherein Q represents Q3, $R^1$ represents a methyl group, $L^2$ represents NH, m is 2, and a combination of a structure of G and a substituent $R^{x7}$, $R^{xB}$, $R^{x9}$, and $R^{x10}$ defined in the structure of G represents any one of the combination described in the combination B (hereinafter, referred to as Compound Class SX108).

A compound (1C) wherein Q represents Q3, $R^1$ represents a chlorine atom, $L^2$ represents NH, m is 2, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX109).

A compound (1C) wherein Q represents Q4, $R^1$ represents a methyl group, $R^3$ represents a methoxy group, m is 2, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX110).

A compound (1C) wherein Q represents Q4, $R^1$ represents a chlorine atom, $R^3$ represents a methoxy group, m is 2, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX111).

A compound (1C) wherein Q represents Q4, $R^1$ represents a methyl group, $R^3$ represents a difluoromethyl group, m is 2, and a combination of a structure of G and a substituent $R^{x7}$, $R^{x8}$, $R^{x9}$, and $R^{x1}$ defined in the structure of G represents any one of the combination described in the combination B (hereinafter, referred to as Compound Class SX112).

A compound (1C) wherein Q represents Q4, $R^1$ represents a chlorine atom, $R^3$ represents a difluoromethyl group, m is 2, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX113).

A compound (1C) wherein Q represents Q5, $R^1$ represents a methyl group, m is 2, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX114).

A compound (1C) wherein Q represents Q5, $R^1$ represents a chlorine atom, m is 2, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX115).

A compound (1C) wherein Q represents Q1, $R^1$ represents a methyl group, $L_1$ represents $CH_2$, m is 0, and a combination of a structure of G and a substituent $R^{x9}$, $R^{x8}$, $R^{x9}$, and $R^{x10}$ defined in the structure of G represents any one of the combination described in the combination B (hereinafter, referred to as Compound Class SX116).

A compound (1C) wherein Q represents Q1, $R^1$ represents a chlorine atom, $L_1$ represents $CH_2$, m is 0, and a combination of a structure of G and a substituent $R^{x7}$, $R^{x9}$, $R^{x9}$, and $R^{x10}$ defined in the structure of G represents any one of the combination described in the combination B (hereinafter, referred to as Compound Class SX117).

A compound (1C) wherein Q represents Q1, $R^1$ represents a methyl group, $L_1$ represents an oxygen atom, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX118).

A compound (1C) wherein Q represents Q1, $R^1$ represents a chlorine atom, $L_1$ represents an oxygen atom, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX119).

A compound (1C) wherein Q represents Q2, $R^1$ represents a hydrogen atom, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX120).

A compound (1C) wherein Q represents Q3, $R^1$ represents a methyl group, $L^2$ represents an oxygen atom, m is 0, and a combination of a structure of G and a substituent $R^{x1}$, Rx, $R^{x9}$, and $R^{x10}$ defined in the structure of G represents any one of the combination described in the combination B (hereinafter, referred to as Compound Class SX121).

A compound (1C) wherein Q represents Q3, $R^1$ represents a chlorine atom, $L^2$ represents an oxygen atom, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX122).

A compound (1C) wherein Q represents Q3, $R^1$ represents a methyl group, $L^2$ represents NH, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX123).

A compound (1C) wherein Q represents Q3, $R^1$ represents a chlorine atom, $L^2$ represents NH, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX124).

A compound (1C) wherein Q represents Q4, $R^1$ represents a methyl group, $R^3$ represents a methoxy group, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX125).

A compound (1C) wherein Q represents Q4, $R^1$ represents a chlorine atom, $R^3$ represents a methoxy group, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX126).

A compound (1C) wherein Q represents Q4, $R^1$ represents a methyl group, $R^3$ represents a difluoromethyl group, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX127).

A compound (1C) wherein Q represents Q4, $R^1$ represents a chlorine atom, $R^3$ represents a difluoromethyl group, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX128).

A compound (1C) wherein Q represents Q5, $R^1$ represents a methyl group, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX129).

A compound (1C) wherein Q represents Q5, $R^1$ represents a chlorine atom, m is 0, and a combination of a structure of G and a substituent $R^{x7}$, $R^{x8}$, $R^{x9}$, and $R^{x10}$ defined in the structure of G represents any one of the combination described in the combination B (hereinafter, referred to as Compound Class SX130).

A compound represented by formula (1D):

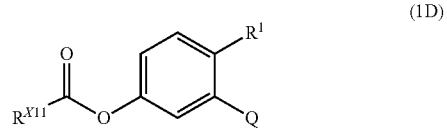

(1D)

(hereinafter, referred to as "Compound (1D)") wherein Q represents Q2, $R^1$ represents a hydrogen atom, and $R^{x11}$ represents any substituents selected from Group X, Group Y and Group Z (hereinafter, referred to as "Compound class SX131").

Group Y is a group consisting of Me, Ph, $CH_2Ph$, $(CH_2)_2Ph$, $(CH_2)_3Ph$, 2-pyridyl, 3-pyridyl, 4-pyridyl, 2-thienyl, and 3-thienyl.

Group Z is a group consisting of 1-pyrrolidinyl, 1-piperidinyl, and 4-morpholinyl.

The compound represented by formula (1D) wherein Q represents Q3, $R^1$ represents a methyl group, $L^2$ represents an oxygen atom, and $R^{x11}$ represents any substituents selected from Group X, Group Y and Group Z (hereinafter, referred to as "Compound class SX132").

The compound represented by formula (1D) wherein Q represents Q3, $R^1$ represents a chlorine atom, $L^2$ represents an oxygen atom, and $R^{x11}$ represents any substituents selected from Group X, Group Y and Group Z (hereinafter, referred to as "Compound class SX133").

The compound represented by formula (1D) wherein Q represents Q3, $R^1$ represents a methyl group, $L^2$ represents NH, and $R^{x11}$ represents any substituents selected from Group X, Group Y and Group Z (hereinafter, referred to as "Compound class SX134").

The compound represented by formula (1D) wherein Q represents Q3, $R^1$ represents a chlorine atom, $L^2$ represents NH, and $R^{x11}$ represents any substituents selected from Group X, Group Y and Group Z (hereinafter, referred to as "Compound class SX135").

The compound represented by formula (1D) wherein Q represents Q4, $R^1$ represents a methyl group, $R^3$ represents a methoxy group, and $R^{x11}$ represents any substituents selected from Group X, Group Y and Group Z (hereinafter, referred to as "Compound class SX136").

The compound represented by formula (1D) wherein Q represents Q4, $R^1$ represents a chlorine atom, $R^3$ represents a methoxy group, and $R^{x11}$ represents any substituents selected from Group X, Group Y and Group Z (hereinafter, referred to as "Compound class SX137").

The compound represented by formula (1D) wherein Q represents Q4, $R^1$ represents a methyl group, $R^3$ represents a difluoromethyl group, and $R^{x11}$ represents any substituents selected from Group X, Group Y and Group Z (hereinafter, referred to as "Compound class SX138").

The compound represented by formula (1D) wherein Q represents Q4, $R^1$ represents a chlorine atom, $R^3$ represents a difluoromethyl group, and $R^{x11}$ represents any substituents selected from Group X, Group Y and Group Z (hereinafter, referred to as "Compound class SX139").

The compound represented by formula (1D) wherein Q represents Q5, $R^1$ represents a methyl group, $R^3$ represents a difluoromethyl group, and $R^{x11}$ represents any substituents selected from Group X, Group Y and Group Z (hereinafter, referred to as "Compound class SX140").

The compound represented by formula (1D) wherein Q represents Q5, $R^1$ represents a chlorine atom, and $R^{x11}$ represents any substituents selected from Group X, Group Y and Group Z (hereinafter, referred to as "Compound class SX141").

A compound represented by formula (1E):

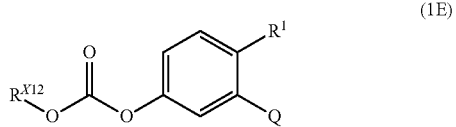

(1E)

(hereinafter, referred to as "Compound (1E)") wherein Q represents Q2, $R^1$ represents a hydrogen atom, and $R^{x12}$ represents any substituents selected from Group X and Group Y (hereinafter, referred to as "Compound class SX142"). The compound represented by formula (1E) wherein Q represents Q3, $R^1$ represents a methyl group, $L_2$ represents an oxygen atom, and $R^{x12}$ represents any substituents selected from Group X and Group Y (hereinafter, referred to as "Compound class SX143").

The compound represented by formula (1E) wherein Q represents Q3, $R^1$ represents a chlorine atom, $L_2$ represents an oxygen atom, and $R^{x12}$ represents any substituents selected from Group X and Group Y (hereinafter, referred to as "Compound class SX144").

The compound represented by formula (1E) wherein Q represents Q3, $R^1$ represents a methyl group, $L_2$ represents NH, and $R^{x12}$ represents any substituents selected from Group X and Group Y (hereinafter, referred to as "Compound class SX145").

The compound represented by formula (1E) wherein Q represents Q3, $R^1$ represents a chlorine atom, $L^2$ represents NH, and $R^{x12}$ represents any substituents selected from Group X and Group Y (hereinafter, referred to as "Compound class SX146").

The compound represented by formula (1E) wherein Q represents Q4, $R^1$ represents a methyl group, $R^3$ represents a methoxy group, and $R^{x12}$ represents any substituents selected from Group X and Group Y (hereinafter, referred to as "Compound class SX147").

The compound represented by formula (1E) wherein Q represents Q4, $R^1$ represents a chlorine atom, $R^3$ represents a methoxy group, and $R^{x12}$ represents any substituents selected from Group X and Group Y (hereinafter, referred to as "Compound class SX148").

The compound represented by formula (1E) wherein Q represents Q4, $R^1$ represents a methyl group, $R^3$ represents a difluoromethyl group, and $R^{x12}$ represents any substituents selected from Group X and Group Y (hereinafter, referred to as "Compound class SX149").

The compound represented by formula (1E) wherein Q represents Q4, $R^1$ represents a chlorine atom, $R^3$ represents a difluoromethyl group, and $R^{x12}$ represents any substituents selected from Group X and Group Y (hereinafter, referred to as "Compound class SX150").

The compound represented by formula (1E) wherein Q represents Q5, $R^1$ represents a methyl group, $R^3$ represents a difluoromethyl group, and $R^{x12}$ represents any substituents selected from Group X and Group Y (hereinafter, referred to as "Compound class SX151").

The compound represented by formula (1E) wherein Q represents Q5, $R^1$ represents a chlorine atom, and $R^{x12}$ represents any substituents selected from Group X and Group Y (hereinafter, referred to as "Compound class SX152").

A compound represented by formula (1F):

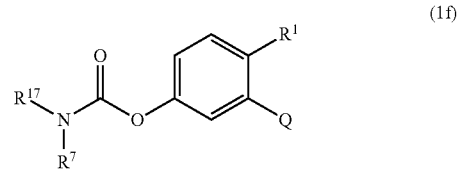

(1f)

(hereinafter, referred to as "Compound (1F)") wherein Q represents Q2, $R^1$ represents a hydrogen atom, $R^{x13}$ represents a hydrogen atom, and $R^{x14}$ represents any substituents selected from Group X and Group Y (hereinafter, referred to as "Compound class SX153").

The compound represented by formula (1F) wherein Q represents Q3, $R^1$ represents a methyl group, $L^2$ represents an oxygen atom, $R^{x12}$ represents a hydrogen atom, and $R^{x14}$ represents any substituents selected from Group X and Group Y (hereinafter, referred to as "Compound class SX154").

The compound represented by formula (1F) wherein Q represents Q3, $R^1$ represents a chlorine atom, $L^2$ represents an oxygen atom, $R^{x13}$ represents a hydrogen atom, and $R^{x14}$ represents any substituents selected from Group X and Group Y (hereinafter, referred to as "Compound class SX155").

The compound represented by formula (1F) wherein Q represents Q3, $R^1$ represents a methyl group, $L^2$ represents NH, $R^{x13}$ represents a hydrogen atom, and $R^{x14}$ represents any substituents selected from Group X and Group Y (hereinafter, referred to as "Compound class SX156").

The compound represented by formula (1F) wherein Q represents Q3, $R^1$ represents a chlorine atom, $L^2$ represents NH, $R^{x13}$ represents a hydrogen atom, and $R^{x14}$ represents any substituents selected from Group X and Group Y (hereinafter, referred to as "Compound class SX157").

The compound represented by formula (1F) wherein Q represents Q4, $R^1$ represents a methyl group, $R^3$ represents a methoxy group, $R^{x13}$ represents a hydrogen atom, and $R^{x14}$ represents any substituents selected from Group X and Group Y (hereinafter, referred to as "Compound class SX158").

The compound represented by formula (1F) wherein Q represents Q4, $R^1$ represents a chlorine atom, $R^3$ represents a methoxy group, $R^{x13}$ represents a hydrogen atom, and $R^{x14}$ represents any substituents selected from Group X and Group Y (hereinafter, referred to as "Compound class SX159").

The compound represented by formula (1F) wherein Q represents Q4, $R^1$ represents a methyl group, $R^3$ represents a difluoromethyl group, $R^{x13}$ represents a hydrogen atom, and $R^{x14}$ represents any substituents selected from Group X and Group Y (hereinafter, referred to as "Compound class SX160").

The compound represented by formula (1F) wherein Q represents Q4, $R^1$ represents a chlorine atom, $R^3$ represents a difluoromethyl group, $R^{x13}$ represents a hydrogen atom, and $R^{x14}$ represents any substituents selected from Group X and Group Y (hereinafter, referred to as "Compound class SX161").

The compound represented by formula (1F) wherein Q represents Q5, $R^1$ represents a methyl group, $R^{x13}$ represents a hydrogen atom, and $R^{x14}$ represents any substituents selected from Group X and Group Y (hereinafter, referred to as "Compound class SX162").

The compound represented by formula (1F) wherein Q represents Q5, $R^1$ represents a chlorine atom, $R^{x13}$ represents a hydrogen atom, and $R^{x14}$ represents any substituents selected from Group X and Group Y (hereinafter, referred to as "Compound class SX163").

The compound represented by formula (1F) wherein Q represents Q2, $R^1$ represents a hydrogen atom, $R^{x13}$ represents a methyl group, and $R^{x14}$ represents any substituents selected from Group X and Group Y (hereinafter, referred to as "Compound class SX164").

The compound represented by formula (1F) wherein Q represents Q3, $R^1$ represents a methyl group, $L^2$ represents an oxygen atom, $R^{x13}$ represents a methyl group, and $R^{x14}$ represents any substituents selected from Group X and Group Y (hereinafter, referred to as "Compound class SX165").

The compound represented by formula (1F) wherein Q represents Q3, $R^1$ represents a chlorine atom, $L^2$ represents an oxygen atom, $R^{x13}$ represents a methyl group, and $R^{x14}$ represents any substituents selected from Group X and Group Y (hereinafter, referred to as "Compound class SX166").

The compound represented by formula (1F) wherein Q represents Q3, $R^1$ represents a methyl group, $L^2$ represents NH, $R^{x13}$ represents a methyl group, and $R^{x14}$ represents any substituents selected from Group X and Group Y (hereinafter, referred to as "Compound class SX167").

The compound represented by formula (1F) wherein Q represents Q3, $R^1$ represents a chlorine atom, $L^2$ represents NH, $R^{x13}$ represents a methyl group, and $R^{x14}$ represents any substituents selected from Group X and Group Y (hereinafter, referred to as "Compound class SX168").

The compound represented by formula (1F) wherein Q represents Q4, $R^1$ represents a methyl group, $R^3$ represents a methoxy group, $R^{x13}$ represents a methyl group, and $R^{x14}$ represents any substituents selected from Group X and Group Y (hereinafter, referred to as "Compound class SX169").

The compound represented by formula (1F) wherein Q represents Q4, $R^1$ represents a chlorine atom, $R^3$ represents a methoxy group, $R^{x13}$ represents a methyl group, and $R^{x14}$ represents any substituents selected from Group X and Group Y (hereinafter, referred to as "Compound class SX170").

The compound represented by formula (1F) wherein Q represents Q4, $R^1$ represents a methyl group, $R^3$ represents a difluoromethyl group, $R^{x13}$ represents a methyl group, and $R^{x14}$ represents any substituents selected from Group X and Group Y (hereinafter, referred to as "Compound class SX171").

The compound represented by formula (1F) wherein Q represents Q4, $R^1$ represents a chlorine atom, $R^3$ represents a difluoromethyl group, $R^{x13}$ represents a methyl group, and $R^{x14}$ represents any substituents selected from Group X and Group Y (hereinafter, referred to as "Compound class SX172").

The compound represented by formula (1F) wherein Q represents Q5, $R^1$ represents a methyl group, $R^{x13}$ represents a methyl group, and $R^{x14}$ represents any substituents selected from Group X and Group Y (hereinafter, referred to as "Compound class SX173").

The compound represented by formula (1F) wherein Q represents Q5, $R^1$ represents a chlorine atom, $R^{x13}$ represents a methyl group, and $R^{x14}$ represents any substituents selected from Group X and Group Y (hereinafter, referred to as "Compound class SX174").

The compound represented by formula (1F) wherein Q represents Q2, $R^1$ represents a hydrogen atom, $R^{x11}$ represents an ethyl group, and $R^{x14}$ represents any substituents selected from Group X and Group Y (hereinafter, referred to as "Compound class SX175").

The compound represented by formula (1F) wherein Q represents Q3, $R^1$ represents a methyl group, $L^2$ represents an oxygen atom, $R^{x13}$ represents an ethyl group, and $R^{x14}$ represents any substituents selected from Group X and Group Y (hereinafter, referred to as "Compound class SX176").

The compound represented by formula (1F) wherein Q represents Q3, $R^1$ represents a chlorine atom, $L^2$ represents an oxygen atom, $R^{x13}$ represents an ethyl group, and $R^{x14}$ represents any substituents selected from Group X and Group Y (hereinafter, referred to as "Compound class SX177").

The compound represented by formula (1F) wherein Q represents Q3, $R^1$ represents a methyl group, $L^2$ represents NH, $R^{x13}$ represents an ethyl group, and $R^{x14}$ represents any substituents selected from Group X and Group Y (hereinafter, referred to as "Compound class SX178").

The compound represented by formula (1F) wherein Q represents Q3, $R^1$ represents a chlorine atom, $L^2$ represents NH, $R^{x13}$ represents an ethyl group, and $R^{x14}$ represents any substituents selected from Group X and Group Y (hereinafter, referred to as "Compound class SX179").

The compound represented by formula (1F) wherein Q represents Q4, $R^1$ represents a methyl group, $L^2$ represents a methoxy group, $R^{x13}$ represents an ethyl group, and $R^{x14}$ represents any substituents selected from Group X and Group Y (hereinafter, referred to as "Compound class SX180").

The compound represented by formula (1F) wherein Q represents Q4, $R^1$ represents a chlorine atom, $R^3$ represents a methoxy group, $R^{x13}$ represents an ethyl group, and $R^{x14}$ represents any substituents selected from Group X and Group Y (hereinafter, referred to as "Compound class SX181").

The compound represented by formula (1F) wherein Q represents Q4, $R^1$ represents a methyl group, $R^3$ represents a difluoromethyl group, $R^{x13}$ represents an ethyl group, and $R^{x14}$ represents any substituents selected from Group X and Group Y (hereinafter, referred to as "Compound class SX182").

The compound represented by formula (1F) wherein Q represents Q4, $R^1$ represents a chlorine atom, $R^3$ represents a difluoromethyl group, $R^{x13}$ represents an ethyl group, and $R^{x14}$ represents any substituents selected from Group X and Group Y (hereinafter, referred to as "Compound class SX183").

The compound represented by formula (1F) wherein Q represents Q5, $R^1$ represents a methyl group, $R^{x11}$ represents an ethyl group, and $R^{x14}$ represents any substituents selected from Group X and Group Y (hereinafter, referred to as "Compound class SX184").

The compound represented by formula (1F) wherein Q represents Q5, $R^1$ represents a chlorine atom, $R^{x13}$ represents an ethyl group, and $R^{x14}$ represents any substituents selected from Group X and Group Y (hereinafter, referred to as "Compound class SX185").

A compound represented by formula (1G):

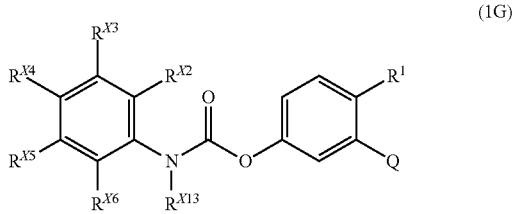

(1G)

(hereinafter, referred to as "Compound (1G)") wherein Q represents Q2, $R^1$ represents a hydrogen atom, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX186").

The compound represented by formula (1G) wherein Q represents Q3, $R^1$ represents a methyl group, $L^2$ represents an oxygen atom, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX187").

The compound represented by formula (1G) wherein Q represents Q3, $R^1$ represents a chlorine atom, $L^2$ represents an oxygen atom, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX188").

The compound represented by formula (1G) wherein Q represents Q3, $R^1$ represents a methyl group, $L^2$ represents NH, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX189").

The compound represented by formula (1G) wherein Q represents Q3, $R^1$ represents a chlorine atom, $L^2$ represents NH, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX190").

The compound represented by formula (1G) wherein Q represents Q4, $R^1$ represents a methyl group, $R^3$ represents a methoxy group, $R^{x13}$ represents a hydrogen atom, and a combination of $R^{x2}$, $R^xj$, $R^{x4}$, $R^{x5}$, and $R^{x6}$ represents any substituents selected from Group A (hereinafter, referred to as "Compound class SX191").

The compound represented by formula (1G) wherein Q represents Q4, $R^1$ represents a chlorine atom, $R^3$ represents a methoxy group, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX192").

The compound represented by formula (1G) wherein Q represents Q4, $R^1$ represents a methyl group, $R^3$ represents a difluoromethyl group, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX193").

The compound represented by formula (1G) wherein Q represents Q4, $R^1$ represents a chlorine atom, $R^3$ represents a difluoromethyl group, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX194").

The compound represented by formula (1G) wherein Q represents Q5, $R^1$ represents a methyl group, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX195").

The compound represented by formula (1G) wherein Q represents Q5, $R^1$ represents a chlorine atom, $R^{x13}$ represents a hydrogen atom, and a combination of $R^{x2}$, $R^{x3}$, $R^{x4}$, $R^{x5}$, and $R^{x6}$ represents any substituents selected from Group A (hereinafter, referred to as "Compound class SX196").

The compound represented by formula (1G) wherein Q represents Q2, $R^1$ represents a hydrogen atom, $R^{x13}$ represents a methyl group, and a combination of $R^{x2}$, $R^xj$, $R^{x4}$, $R^xS$, and $R^{x6}$ represents any substituents selected from Group A (hereinafter, referred to as "Compound class SX197").

The compound represented by formula (1G) wherein Q represents Q3, $R^1$ represents a methyl group, $L^2$ represents an oxygen atom, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX198").

The compound represented by formula (1G) wherein Q represents Q3, $R^1$ represents a chlorine atom, $L^2$ represents an oxygen atom, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX199").

The compound represented by formula (1G) wherein Q represents Q3, $R^1$ represents a methyl group, $L^2$ represents NH, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX200").

The compound represented by formula (1G) wherein Q represents Q3, $R^1$ represents a chlorine atom, $L^2$ represents NH, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX201").

The compound represented by formula (1G) wherein Q represents Q4, $R^1$ represents a methyl group, $R^3$ represents a methoxy group, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX202").

The compound represented by formula (1G) wherein Q represents Q4, $R^1$ represents a chlorine atom, $R^3$ represents a methoxy group, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX203").

The compound represented by formula (1G) wherein Q represents Q4, $R^1$ represents a methyl group, $R^3$ represents a difluoromethyl group, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX204").

The compound represented by formula (1G) wherein Q represents Q4, $R^1$ represents a chlorine atom, $R^3$ represents a difluoromethyl group, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX205").

The compound represented by formula (1G) wherein Q represents Q5, $R^1$ represents a methyl group, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX206").

The compound represented by formula (1G) wherein Q represents Q5, $R^1$ represents a chlorine atom, $R^{x13}$ represents a methyl group, and a combination of $R^{x2}$, $R^{x3}$, $R^{x4}$, $R^{x5}$, and $R^{x6}$ represents any substituents selected from Group A (hereinafter, referred to as "Compound class SX207").

A compound represented by formula (1H):

(1H)

(hereinafter, referred to as "Compound (1H)") wherein Q represents Q1, $R^1$ represents a methyl group, $L^1$ represents $CH_2$, $R^{x15}$ represents a hydrogen atom, and $R^{x16}$ represents any substituents selected from Group X and Group Y (hereinafter, referred to as "Compound class SX208").

The compound represented by formula (1H) wherein Q represents Q1, $R^1$ represents a methyl group, $L^1$ represents $CH_2$, $R^{x15}$ represents a hydrogen atom, and $R^{x16}$ represents any substituents selected from Group X and Group Y (hereinafter, referred to as "Compound class SX208").

The compound represented by formula (1H) wherein Q represents Q1, $R^1$ represents a chlorine atom, $L^1$ represents $CH_2$, $R^{x1}$ represents a hydrogen atom, and $R^{x16}$ represents any substituents selected from Group X and Group Y (hereinafter, referred to as "Compound class SX209").

The compound represented by formula (1H) wherein Q represents Q1, $R^1$ represents a methyl group, $L^1$ represents an oxygen atom, $R^{x15}$ represents a hydrogen atom, and $R^{x16}$ represents any substituents selected from Group X and Group Y (hereinafter, referred to as "Compound class SX210").

The compound represented by formula (1H) wherein Q represents Q1, $R^1$ represents a chlorine atom, $L^1$ represents an oxygen atom, $R^{x15}$ represents a hydrogen atom, and $R^{x16}$ represents any substituents selected from Group X and Group Y (hereinafter, referred to as "Compound class SX211").

The compound represented by formula (1H) wherein Q represents Q2, $R^1$ represents a hydrogen atom, $R^{x15}$ represents a hydrogen atom, and $R^{x16}$ represents any substituents selected from Group X and Group Y (hereinafter, referred to as "Compound class SX212").

The compound represented by formula (1H) wherein Q represents Q3, $R^1$ represents a methyl group, $L^2$ represents an oxygen atom, $R^{x15}$ represents a hydrogen atom, and $R^{x16}$ represents any substituents selected from Group X and Group Y (hereinafter, referred to as "Compound class SX213").

The compound represented by formula (1H) wherein Q represents Q3, $R^1$ represents a chlorine atom, $L^2$ represents an oxygen atom, $R^{x15}$ represents a hydrogen atom, and $R^{x16}$ represents any substituents selected from Group X and Group Y (hereinafter, referred to as "Compound class SX214").

The compound represented by formula (1H) wherein Q represents Q3, $R^1$ represents a methyl group, $L^2$ represents NH, $R^{x15}$ represents a hydrogen atom, and $R^{x11}$ represents any substituents selected from Group X and Group Y (hereinafter, referred to as "Compound class SX215").

The compound represented by formula (1H) wherein Q represents Q3, $R^1$ represents a chlorine atom, $L^2$ represents NH, $R^{x15}$ represents a hydrogen atom, and $R^{x16}$ represents any substituents selected from Group X and Group Y (hereinafter, referred to as "Compound class SX216").

The compound represented by formula (1H) wherein Q represents Q4, $R^1$ represents a methyl group, $R^3$ represents a methoxy group, $R^{x15}$ represents a hydrogen atom, and $R^{x16}$ represents any substituents selected from Group X and Group Y (hereinafter, referred to as "Compound class SX217").

The compound represented by formula (1H) wherein Q represents Q4, $R^1$ represents a chlorine atom, $R^3$ represents a methoxy group, $R^{x15}$ represents a hydrogen atom, and $R^{x16}$ represents any substituents selected from Group X and Group Y (hereinafter, referred to as "Compound class SX218").

The compound represented by formula (1H) wherein Q represents Q4, $R^1$ represents a methyl group, $R^3$ represents a difluoromethyl group, $R^{x1D}$ represents a hydrogen atom, and $R^{x16}$ represents any substituents selected from Group X and Group Y (hereinafter, referred to as "Compound class SX219").

The compound represented by formula (1H) wherein Q represents Q4, $R^1$ represents a chlorine atom, $R^3$ represents a difluoromethyl group, $R^{x15}$ represents a hydrogen atom, and $R^{x16}$ represents any substituents selected from Group X and Group Y (hereinafter, referred to as "Compound class SX220").

The compound represented by formula (1H) wherein Q represents Q5, $R^1$ represents a methyl group, $R^{x15}$ represents a hydrogen atom, and $R^{x16}$ represents any substituents selected from Group X and Group Y (hereinafter, referred to as "Compound class SX221").

The compound represented by formula (1H) wherein Q represents Q5, $R^1$ represents a chlorine atom, $R^{x15}$ represents a hydrogen atom, and $R^{x16}$ represents any substituents selected from Group X and Group Y (hereinafter, referred to as "Compound class SX222").

The compound represented by formula (1H) wherein Q represents Q1, $R^1$ represents a methyl group, $L^1$ represents $CH_2$, $R^{x15}$ represents a methyl group, and $R^{x16}$ represents any substituents selected from Group X and Group Y (hereinafter, referred to as "Compound class SX223").

The compound represented by formula (1H) wherein Q represents Q1, $R^1$ represents a chlorine atom, $L^1$ represents $CH_2$, $R^{x15}$ represents a methyl group, and $R^{x16}$ represents any substituents selected from Group X and Group Y (hereinafter, referred to as "Compound class SX224").

The compound represented by formula (1H) wherein Q represents Q1, $R^1$ represents a methyl group, $L^1$ represents an oxygen atom, $R^{x15}$ represents a methyl group, and $R^{x16}$ represents any substituents selected from Group X and Group Y (hereinafter, referred to as "Compound class SX225").

The compound represented by formula (1H) wherein Q represents Q1, $R^1$ represents a chlorine atom, $L^1$ represents an oxygen atom, $R^{x15}$ represents a methyl group, and $R^{x16}$ represents any substituents selected from Group X and Group Y (hereinafter, referred to as "Compound class SX226").

The compound represented by formula (1H) wherein Q represents Q2, $R^1$ represents a hydrogen atom, $R^{x15}$ represents a methyl group, and $R^{x16}$ represents any substituents selected from Group X and Group Y (hereinafter, referred to as "Compound class SX227").

The compound represented by formula (1H) wherein Q represents Q3, $R^1$ represents a methyl group, $L^2$ represents an oxygen atom, $R^{x15}$ represents a methyl group, and $R^{x16}$ represents any substituents selected from Group X and Group Y (hereinafter, referred to as "Compound class SX228").

The compound represented by formula (1H) wherein Q represents Q3, $R^1$ represents a chlorine atom, $L^2$ represents an oxygen atom, $R^{x16}$ represents a methyl group, and $R^{x16}$ represents any substituents selected from Group X and Group Y (hereinafter, referred to as "Compound class SX229").

The compound represented by formula (1H) wherein Q represents Q3, $R^1$ represents a methyl group, $L^2$ represents NH, $R^{x15}$ represents a methyl group, and $R^{x16}$ represents any substituents selected from Group X and Group Y (hereinafter, referred to as "Compound class SX230").

The compound represented by formula (1H) wherein Q represents Q3, $R^1$ represents a chlorine atom, $L^2$ represents NH, $R^{x15}$ represents a methyl group, and $R^{x16}$ represents any substituents selected from Group X and Group Y (hereinafter, referred to as "Compound class SX231").

The compound represented by formula (1H) wherein Q represents Q4, $R^1$ represents a methyl group, $R^3$ represents a methoxy group, $R^{x15}$ represents a methyl group, and $R^{x16}$ represents any substituents selected from Group X and Group Y (hereinafter, referred to as "Compound class SX232").

The compound represented by formula (1H) wherein Q represents Q4, $R^1$ represents a chlorine atom, $R^3$ represents a methoxy group, $R^{x15}$ represents a methyl group, and $R^{x16}$ represents any substituents selected from Group X and Group Y (hereinafter, referred to as "Compound class SX233").

The compound represented by formula (1H) wherein Q represents Q4, $R^1$ represents a methyl group, $R^3$ represents a difluoromethyl group, $R^{x1b}$ represents a methyl group, and $R^{x16}$ represents any substituents selected from Group X and Group Y (hereinafter, referred to as "Compound class SX234").

The compound represented by formula (1H) wherein Q represents Q4, $R^1$ represents a chlorine atom, $R^3$ represents a difluoromethyl group, $R^{x15}$ represents a methyl group, and $R^{x16}$ represents any substituents selected from Group X and Group Y (hereinafter, referred to as "Compound class SX235").

The compound represented by formula (1H) wherein Q represents Q5, $R^1$ represents a methyl group, $R^{x15}$ represents a methyl group, and $R^{x16}$ represents any substituents selected from Group X and Group Y (hereinafter, referred to as "Compound class SX236").

The compound represented by formula (1H) wherein Q represents Q5, $R^1$ represents a chlorine atom, $R^{x15}$ represents a methyl group, and $R^{x16}$ represents any substituents selected from Group X and Group Y (hereinafter, referred to as "Compound class SX237").

The compound represented by formula (1H) wherein Q represents Q5, $R^1$ represents a methyl group, $L^1$ represents $CH_2$, $R^{x15}$ represents an ethyl group, and $R^{x16}$ represents any substituents selected from Group X and Group Y (hereinafter, referred to as "Compound class SX238").

The compound represented by formula (1H) wherein Q represents Q1, $R^1$ represents a chlorine atom, $L^1$ represents $CH_2$, $R^{x15}$ represents an ethyl group, and $R^{x16}$ represents any substituents selected from Group X and Group Y (hereinafter, referred to as "Compound class SX239").

The compound represented by formula (1H) wherein Q represents Q1, $R^1$ represents a methyl group, $L^1$ represents an oxygen atom, $R^{x15}$ represents an ethyl group, and $R^{x16}$ represents any substituents selected from Group X and Group Y (hereinafter, referred to as "Compound class SX240").

The compound represented by formula (1H) wherein Q represents Q1, $R^1$ represents a chlorine atom, $L^1$ represents an oxygen atom, $R^{x15}$ represents an ethyl group, and $R^{x16}$ represents any substituents selected from Group X and Group Y (hereinafter, referred to as "Compound class SX241").

The compound represented by formula (1H) wherein Q represents Q2, $R^1$ represents a hydrogen atom, $R^{x15}$ represents an ethyl group, and $R^{x16}$ represents any substituents selected from Group X and Group Y (hereinafter, referred to as "Compound class SX242").

The compound represented by formula (1H) wherein Q represents Q3, $R^1$ represents a methyl group, $L^2$ represents an oxygen atom, $R^{x15}$ represents an ethyl group, and $R^{x16}$ represents any substituents selected from Group X and Group Y (hereinafter, referred to as "Compound class SX243").

The compound represented by formula (1H) wherein Q represents Q3, $R^1$ represents a chlorine atom, $L^2$ represents an oxygen atom, $R^{x15}$ represents an ethyl group, and $R^{x16}$ represents any substituents selected from Group X and Group Y (hereinafter, referred to as "Compound class SX244").

The compound represented by formula (1H) wherein Q represents Q3, $R^1$ represents a methyl group, $L^2$ represents NH, $R^{x15}$ represents an ethyl group, and $R^{x16}$ represents any substituents selected from Group X and Group Y (hereinafter, referred to as "Compound class SX245").

The compound represented by formula (1H) wherein Q represents Q3, $R^1$ represents a chlorine atom, $L^2$ represents NH, $R^{x15}$ represents an ethyl group, and $R^{x16}$ represents any substituents selected from Group X and Group Y (hereinafter, referred to as "Compound class SX246").

The compound represented by formula (1H) wherein Q represents Q4, $R^1$ represents a methyl group, $R^3$ represents a methoxy group, $R^{x15}$ represents an ethyl group, and $R^{x16}$ represents any substituents selected from Group X and Group Y (hereinafter, referred to as "Compound class SX247").

The compound represented by formula (1H) wherein Q represents Q4, $R^1$ represents a chlorine atom, $R^3$ represents a methoxy group, $R^{x15}$ represents an ethyl group, and $R^{x16}$ represents any substituents selected from Group X and Group Y (hereinafter, referred to as "Compound class SX248").

The compound represented by formula (1H) wherein Q represents Q4, $R^1$ represents a methyl group, $R^3$ represents a difluoromethyl group, $R^{x1D}$ represents an ethyl group, and $R^{x16}$ represents any substituents selected from Group X and Group Y (hereinafter, referred to as "Compound class SX249").

The compound represented by formula (1H) wherein Q represents Q4, $R^1$ represents a chlorine atom, $R^3$ represents a difluoromethyl group, $R^{x15}$ represents an ethyl group, and $R^{x16}$ represents any substituents selected from Group X and Group Y (hereinafter, referred to as "Compound class SX250").

The compound represented by formula (1H) wherein Q represents Q5, $R^1$ represents a methyl group, $R^{x15}$ represents an ethyl group, and $R^{x16}$ represents any substituents selected from Group X and Group Y (hereinafter, referred to as "Compound class SX251").

The compound represented by formula (1H) wherein Q represents Q5, $R^1$ represents a chlorine atom, $R^{x15}$ represents an ethyl group, and $R^{x16}$ represents any substituents selected from Group X and Group Y (hereinafter, referred to as "Compound class SX252").

A compound represented by formula (1I):

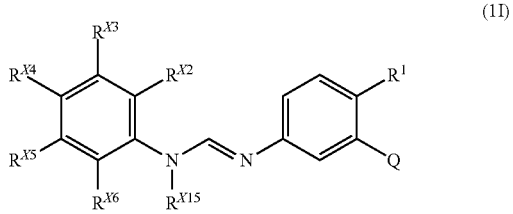

(1I)

(hereinafter, referred to as "Compound (11)") wherein Q represents Q1, $R^1$ represents a methyl group, $L^1$ represents $CH_2$, $R^{x1}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX253").

The compound represented by formula (1I) wherein Q represents Q1, $R^1$ represents a chlorine atom, $L^1$ represents $CH_2$, $R^{x11}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX254").

The compound represented by formula (1I) wherein Q represents Q1, $R^1$ represents a methyl group, $L^1$ represents an oxygen atom, $R^{x15}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX255").

The compound represented by formula (1I) wherein Q represents Q1, $R^1$ represents a chlorine atom, $L^1$ represents an oxygen atom, $R^{x15}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX256").

The compound represented by formula (1I) wherein Q represents Q2, $R^1$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX257").

The compound represented by formula (1I) wherein Q represents Q3, $R^1$ represents a methyl group, $L^2$ represents an oxygen atom, $R^{x15}$ represents a hydrogen atom, and a combination of $R^{x2}$, $R^{x3}$, $R^4$, $R^{x5}$, and $R^{x6}$ represents any combination described in Group A (hereinafter, referred to as "Compound class SX258").

The compound represented by formula (1I) wherein Q represents Q3, $R^1$ represents a chlorine atom, $L^2$ represents an oxygen atom, $R^{x15}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX259").

The compound represented by formula (1I) wherein Q represents Q3, $R^1$ represents a methyl group, $L^2$ represents NH, $R^{x15}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX260").

The compound represented by formula (1I) wherein Q represents Q3, $R^1$ represents a chlorine atom, $L^2$ represents NH, $R^{x15}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX261").

The compound represented by formula (1I) wherein Q represents Q4, $R^1$ represents a methyl group, $R^3$ represents a methoxy group, $R^{x1}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX262").

The compound represented by formula (1I) wherein Q represents Q4, $R^1$ represents a chlorine atom, $R^3$ represents a methoxy group, $R^{x15}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX263").

The compound represented by formula (1I) wherein Q represents Q4, $R^1$ represents a methyl group, $R^3$ represents a difluoromethyl group, $R^{x15}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX264").

The compound represented by formula (1I) wherein Q represents Q4, $R^1$ represents a chlorine atom, $R^3$ represents a difluoromethyl group, $R^{x15}$ represents a hydrogen atom, and a combination of $R^{x2}$, $R^x j$, $R^{x4}$, $R^{x5}$, and $R^{x6}$ represents any combination described in Group A (hereinafter, referred to as "Compound class SX265").

The compound represented by formula (1I) wherein Q represents Q5, $R^1$ represents a methyl group, $R^x$ is represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX266").

The compound represented by formula (1I) wherein Q represents Q5, $R^1$ represents a chlorine atom, $R^{x15}$ represents a hydrogen atom, and a combination of $R^{x2}$, $R^{x3}$, $R^{x4}$, $R^{x5}$, and $R^{x6}$ represents any combination described in Group A (hereinafter, referred to as "Compound class SX267").

The compound represented by formula (1I) wherein Q represents Q1, $R^1$ represents a methyl group, $L^1$ represents $CH_2$, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX268").

The compound represented by formula (1I) wherein Q represents Q1, $R^1$ represents a chlorine atom, $L^1$ represents $CH_2$, $R^{x15}$ represents a methyl group, and a combination of $R^{x2}$, $R^{x3}$, $R^{x4}$, $R^xS$, and $R^{x6}$ represents any combination described in Group A (hereinafter, referred to as "Compound class SX269").

The compound represented by formula (1I) wherein Q represents Q1, $R^1$ represents a methyl group, $L^1$ represents an oxygen atom, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX270").

The compound represented by formula (1I) wherein Q represents Q1, $R^1$ represents a chlorine atom, $L^1$ represents an oxygen atom, $R^{x1}D$ represents a methyl group, and a combination of $R^{x2}$, $R^{x3}$, $R^{x4}$, $R^{x5}$, and $R^{x6}$ represents any combination described in Group A (hereinafter, referred to as "Compound class SX271").

The compound represented by formula (1I) wherein Q represents Q2, $R^1$ represents a chlorine atom, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX272").

The compound represented by formula (1I) wherein Q represents Q3, $R^1$ represents a methyl group, $L^2$ represents an oxygen atom, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX273").

The compound represented by formula (1I) wherein Q represents Q3, $R^1$ represents a chlorine atom, $L^2$ represents an oxygen atom, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX274").

The compound represented by formula (1I) wherein Q represents Q3, $R^1$ represents a methyl group, $L^2$ represents NH, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX275").

The compound represented by formula (1I) wherein Q represents Q3, $R^1$ represents a chlorine atom, $L^2$ represents NH, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX276").

The compound represented by formula (1I) wherein Q represents Q4, $R^1$ represents a methyl group, $R^3$ represents a methoxy group, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX277").

The compound represented by formula (1I) wherein Q represents Q4, $R^1$ represents a chlorine atom, $R^3$ represents a methoxy group, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX278").

The compound represented by formula (1I) wherein Q represents Q4, $R^1$ represents a methyl group, $R^3$ represents a difluoromethyl group, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX279").

The compound represented by formula (1I) wherein Q represents Q4, $R^1$ represents a chlorine atom, $R^3$ represents a difluoromethyl group, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX280").

The compound represented by formula (1I) wherein Q represents Q5, $R^1$ represents a chlorine atom, $R^{x15}$ represents a methyl group, and a combination of $R^{x2}$, $R^{x3}$, $R^{x4}$, $R^{x5}$, and $R^{x6}$ represents any combination described in Group A (hereinafter, referred to as "Compound class SX282").

The compound represented by formula (1I) wherein Q represents Q1, $R^1$ represents a methyl group, $L^1$ represents $CH_2$, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX283").

The compound represented by formula (1I) wherein Q represents Q1, $R^1$ represents a chlorine atom, $L^1$ represents $CHz$, $R^{x15}$ represents an ethyl group, and a combination of $R^xz$, $R^{x3}$, $R^{x4}$, $R^{x5}$, and $R^{x6}$ represents any combination described in Group A (hereinafter, referred to as "Compound class SX284").

The compound represented by formula (1I) wherein Q represents Q1, $R^1$ represents a methyl group, $L^1$ represents an oxygen atom, $R^{x1}D$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX285").

The compound represented by formula (1I) wherein Q represents Q1, $R^1$ represents a chlorine atom, $L^1$ represents an oxygen atom, $R^{x15}$ represents an ethyl group, and a combination of $R^{x2}$, $R^{x3}$, $R^4$, $R^{x5}$, and $R^{x6}$ represents any combination described in Group A (hereinafter, referred to as "Compound class SX286").

The compound represented by formula (1I) wherein Q represents Q2, $R^1$ represents a hydrogen atom, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX287").

The compound represented by formula (1I) wherein Q represents Q3, $R^1$ represents a methyl group, $L^2$ represents an oxygen atom, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX288").

The compound represented by formula (1I) wherein Q represents Q3, $R^1$ represents a chlorine atom, $L^2$ represents an oxygen atom, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX289").

The compound represented by formula (1I) wherein Q represents Q3, $R^1$ represents a methyl group, $L^2$ represents NH, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX290").

The compound represented by formula (1I) wherein Q represents Q3, $R^1$ represents a chlorine atom, $L^2$ represents NH, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX291").

The compound represented by formula (1I) wherein Q represents Q4, $R^1$ represents a methyl group, $R^3$ represents a methoxy group, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX292").

The compound represented by formula (1I) wherein Q represents Q4, $R^1$ represents a chlorine atom, $R^3$ represents a methoxy group, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX293").

The compound represented by formula (1I) wherein Q represents Q4, $R^1$ represents a methyl group, $R^3$ represents a difluoromethyl group, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX294").

The compound represented by formula (1I) wherein Q represents Q4, $R^1$ represents a chlorine atom, $R^3$ represents a difluoromethyl group, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX295").

The compound represented by formula (1I) wherein Q represents Q5, $R^1$ represents a methyl group, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX296").

The compound represented by formula (1I) wherein Q represents Q5, $R^1$ represents a chlorine atom, $R^{x15}$ represents an ethyl group, and a combination of $R^{x2}$, $R^{x3}$, $R^{x4}$, $R^{x5}$, and $R^{x6}$ represents any combination described in Group A (hereinafter, referred to as "Compound class SX297").

A compound represented by formula (1J):

(1J)

(hereinafter, referred to as "Compound (1J)") wherein Q represents Q1, $R^1$ represents a methyl group, $L^1$ represents $CH_2$, and $R^{x17}$, $R^{x18}$, and $R^{x19}$ represent a hydrogen atom, and $R^{x20}$ represents a hydrogen atom, or any substituents selected from Group X and Group Y (hereinafter, referred to as "Compound class SX298").

The compound represented by formula (1J) wherein Q represents Q1, $R^1$ represents a chlorine atom, $L^1$ represents $CH_2$, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX299").

The compound represented by formula (1J) wherein Q represents Q1, $R^1$ represents a methyl group, $L^1$ represents an oxygen atom, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX300").

The compound represented by formula (1J) wherein Q represents Q1, $R^1$ represents a chlorine atom, $L^1$ represents an oxygen atom, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX301").

The compound represented by formula (1J) wherein Q represents Q2, $R^1$ represents a hydrogen atom, $L^1$ represents an oxygen atom, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX302").

The compound represented by formula (1J) wherein Q represents Q3, $R^1$ represents a methyl group, $L^2$ represents an oxygen atom, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX303").

The compound represented by formula (1J) wherein Q represents Q3, $R^1$ represents a chlorine atom, $L^2$ represents an oxygen atom, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX304").

The compound represented by formula (1J) wherein Q represents Q3, $R^1$ represents a methyl group, $L^2$ represents NH, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX305").

The compound represented by formula (1J) wherein Q represents Q3, $R^1$ represents a chlorine atom, $L^2$ represents NH, and $R^{x17}$, $R^{x19}$, and $R^{x19}$ represent a hydrogen atom, and $R^{x20}$ represents a hydrogen atom, a cyclopropyl group, or any substituents selected from Group X and Group Y (hereinafter, referred to as "Compound class SX306").

The compound represented by formula (1J) wherein Q represents Q4, $R^1$ represents a methyl group, $R^3$ represents a methoxy group, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX307").

The compound represented by formula (1J) wherein Q represents Q4, $R^1$ represents a chlorine atom, $R^3$ represents a methoxy group, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX308").

The compound represented by formula (1J) wherein Q represents Q4, $R^1$ represents a methyl group, $R^3$ represents a difluoromethyl group, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX309").

The compound represented by formula (1J) wherein Q represents Q4, $R^1$ represents a chlorine atom, $R^3$ represents a difluoromethyl group, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX310").

The compound represented by formula (1J) wherein Q represents Q5, $R^1$ represents a methyl group, and $R^{x17}$, $R^{x18}$, and $R^{x19}$ represent a hydrogen atom, and $R^{x20}$ represents a hydrogen atom, a cyclopropyl group, or any substituents selected from Group X and Group Y (hereinafter, referred to as "Compound class SX311").

The compound represented by formula (1J) wherein Q represents Q5, $R^1$ represents a chlorine atom, and $R^{x17}$, $R^{x11}$, and $R^{x19}$ represent a hydrogen atom, and $R^{x20}$ represents a hydrogen atom, a cyclopropyl group, or any substituents selected from Group X and Group Y (hereinafter, referred to as "Compound class SX312").

The compound represented by formula (1J) wherein Q represents Q1, $R^1$ represents a methyl group, $L^1$ represents $CH_2$, and $R^{x10}$ and $R^{x13}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX313").

The compound represented by formula (1J) wherein Q represents Q1, $R^1$ represents a chlorine atom, $L^1$ represents $CH_2$, and $R^{x17}$ and $R^{x18}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX314").

The compound represented by formula (1J) wherein Q represents Q1, $R^1$ represents a methyl group, $L^1$ represents an oxygen atom, and $R^{x17}$ and $R^{x18}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX315").

The compound represented by formula (1J) wherein Q represents Q1, $R^1$ represents a chlorine atom, $L^1$ represents an oxygen atom, and $R^{x17}$ and $R^{x11}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX316").

The compound represented by formula (1J) wherein Q represents Q2, $R^1$ represents a hydrogen atom, and $R^{x17}$ and $R^{x18}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX317").

The compound represented by formula (1J) wherein Q represents Q3, $R^1$ represents a methyl group, $L^2$ represents an oxygen atom, and $R^{x17}$ and $R^{x19}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX318").

The compound represented by formula (1J) wherein Q represents Q3, $R^1$ represents a chlorine atom, $L^2$ represents an oxygen atom, and $R^{x17}$ and $R^{x18}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX319").

The compound represented by formula (1J) wherein Q represents Q3, $R^1$ represents a methyl group, $L^2$ represents an oxygen atom, and $R^{x17}$ and $R^{x18}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX320").

The compound represented by formula (1J) wherein Q represents Q3, $R^1$ represents a chlorine atom, $L^2$ represents NH, and $R^{x11}$ and $R^{x13}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX321").

The compound represented by formula (1J) wherein Q represents Q4, $R^1$ represents a methyl group, $R^3$ represents a methoxy group, and $R^{x17}$ and $R^{x11}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX322").

The compound represented by formula (1J) wherein Q represents Q4, $R^1$ represents a chlorine atom, $R^3$ represents a methoxy group, and $R^{x17}$ and $R^{x18}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX323").

The compound represented by formula (1J) wherein Q represents Q4, $R^1$ represents a chlorine atom, $R^3$ represents a difluoromethyl group, and $R^{x17}$ and $R^{x18}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX324").

The compound represented by formula (1J) wherein Q represents Q4, $R^1$ represents a chlorine atom, $R^3$ represents a difluoromethyl group, and $R^{x17}$ and $R^{x18}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX325").

The compound represented by formula (1J) wherein Q represents Q5, $R^1$ represents a methyl group, and $R^{x17}$ and $R^{x19}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX326").

The compound represented by formula (1J) wherein Q represents Q5, $R^1$ represents a chlorine atom, and $R^{x17}$ and $R^{x18}$ represent a hydrogen atom, $R^{x19}$ represents a methyl group, and $R^{x20}$ represents a hydrogen atom, a cyclopropyl group, or any substituents selected from Group X and Group Y (hereinafter, referred to as "Compound class SX327").

The compound represented by formula (1J) wherein Q represents Q1, $R^1$ represents a methyl group, $L^1$ represents $CH_2$, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX328").

The compound represented by formula (1J) wherein Q represents Q1, $R^1$ represents a chlorine atom, $L^1$ represents $CH_2$, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX329").

The compound represented by formula (1J) wherein Q represents Q1, $R^1$ represents a methyl group, $L^1$ represents an oxygen atom, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX330").

The compound represented by formula (1J) wherein Q represents Q1, $R^1$ represents a chlorine atom, $L^1$ represents an oxygen atom, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX331").

The compound represented by formula (1J) wherein Q represents Q2, $R^1$ represents a hydrogen atom, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX332").

The compound represented by formula (1J) wherein Q represents Q3, $R^1$ represents a methyl group, $L^2$ represents an oxygen atom, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX333").

The compound represented by formula (1J) wherein Q represents Q3, $R^1$ represents a chlorine atom, $L^2$ represents an oxygen atom, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX334").

The compound represented by formula (1J) wherein Q represents Q3, $R^1$ represents a methyl group, $L^2$ represents NH, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX335").

The compound represented by formula (1J) wherein Q represents Q3, $R^1$ represents a chlorine atom, $L^2$ represents NH, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX336").

The compound represented by formula (1J) wherein Q represents Q4, $R^1$ represents a methyl group, $R^3$ represents a methoxy group, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX337").

The compound represented by formula (1J) wherein Q represents Q4, $R^1$ represents a chlorine atom, $R^3$ represents a methoxy group, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX338").

The compound represented by formula (1J) wherein Q represents Q4, $R^1$ represents a methyl group, $R^3$ represents a difluoromethyl group, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX339").

The compound represented by formula (1J) wherein Q represents Q4, $R^1$ represents a methyl group, $R^3$ represents a difluoromethyl group, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX340").

The compound represented by formula (1J) wherein Q represents Q5, $R^1$ represents a methyl group, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX341").

The compound represented by formula (1J) wherein Q represents Q5, $R^1$ represents a chlorine atom, and $R^{x17}$ and $R^{x18}$ represent a chlorine atom, $R^{x19}$ represents a hydrogen atom, and $R^{x20}$ represents a hydrogen atom, a cyclopropyl group, or any substituents selected from Group X and Group Y (hereinafter, referred to as "Compound class SX342").

A compound represented by formula (1K):

(hereinafter, referred to as "Compound (1K)") wherein Q represents Q1, $R^1$ represents a methyl group, $L^1$ represents $CH_2$, t is 0, $R^{x21}$ represents a hydrogen atom, and $R^{x22}$ represents a hydrogen atom, or any substituents selected from Group X and Group Y (hereinafter, referred to as "Compound class SX343").

The compound represented by formula (1K) wherein Q represents Q1, $R^1$ represents a chlorine atom, $L^1$ represents $CH_2$, t is 0, $R^{x21}$ represents a hydrogen atom, and $R^{x22}$ represents a hydrogen atom, or any substituents selected from Group X and Group Y (hereinafter, referred to as "Compound class SX344").

The compound represented by formula (1K) wherein Q represents Q1, $R^1$ represents a methyl group, $L^1$ represents an oxygen atom, t is 0, $R^{x21}$ represents a hydrogen atom, and $R^{x22}$ represents a hydrogen atom, or any substituents selected from Group X and Group Y (hereinafter, referred to as "Compound class SX345").

The compound represented by formula (1K) wherein Q represents Q1, $R^1$ represents a chlorine atom, $L^1$ represents an oxygen atom, t is 0, $R^{x21}$ represents a hydrogen atom, and $R^{x22}$ represents a hydrogen atom, or any substituents selected from Group X and Group Y (hereinafter, referred to as "Compound class SX346").

The compound represented by formula (1K) wherein Q represents Q2, $R^1$ represents a hydrogen atom, t is 0, $R^{x21}$ represents a hydrogen atom, and $R^{x22}$ represents a hydrogen atom, or any substituents selected from Group X and Group Y (hereinafter, referred to as "Compound class SX347").

The compound represented by formula (1K) wherein Q represents Q3, $R^1$ represents a methyl group, $L^2$ represents an oxygen atom, t is 0, $R^{x21}$ represents a hydrogen atom, and $R^{x22}$ represents a hydrogen atom, or any substituents selected from Group X and Group Y (hereinafter, referred to as "Compound class SX348").

The compound represented by formula (1K) wherein Q represents Q3, $R^1$ represents a chlorine atom, $L^2$ represents an oxygen atom, t is 0, $R^{x21}$ represents a hydrogen atom, and $R^{x22}$ represents a hydrogen atom, or any substituents selected from Group X and Group Y (hereinafter, referred to as "Compound class SX349").

The compound represented by formula (1K) wherein Q represents Q3, $R^1$ represents a methyl group, $L^2$ represents NH, t is 0, $R^{x21}$ represents a hydrogen atom, and $R^{x22}$ represents a hydrogen atom, or any substituents selected from Group X and Group Y (hereinafter, referred to as "Compound class SX350").

The compound represented by formula (1K) wherein Q represents Q3, $R^1$ represents a chlorine atom, $L^2$ represents NH, t is 0, $R^{x21}$ represents a hydrogen atom, and $R^{x22}$ represents a hydrogen atom, or any substituents selected from Group X and Group Y (hereinafter, referred to as "Compound class SX351").

The compound represented by formula (1K) wherein Q represents Q4, $R^1$ represents a methyl group, $R^3$ represents a methoxy group, t is 0, $R^{x21}$ represents a hydrogen atom, and $R^{x22}$ represents a hydrogen atom, or any substituents selected from Group X and Group Y (hereinafter, referred to as "Compound class SX352").

The compound represented by formula (1K) wherein Q represents Q4, $R^1$ represents a chlorine atom, $R^3$ represents a methoxy group, t is 0, $R^{x21}$ represents a hydrogen atom, and $R^{x22}$ represents a hydrogen atom, or any substituents selected from Group X and Group Y (hereinafter, referred to as "Compound class SX353").

The compound represented by formula (1K) wherein Q represents Q4, $R^1$ represents a methyl group, $R^3$ represents a difluoromethyl group, t is 0, $R^{x21}$ represents a hydrogen atom, and $R^{x22}$ represents a hydrogen atom, or any substituents selected from Group X and Group Y (hereinafter, referred to as "Compound class SX354").

The compound represented by formula (1K) wherein Q represents Q4, $R^1$ represents a chlorine atom, $R^3$ represents a difluoromethyl group, t is 0, $R^{x21}$ represents a hydrogen atom, and $R^{x22}$ represents a hydrogen atom, or any substituents selected from Group X and Group Y (hereinafter, referred to as "Compound class SX355").

The compound represented by formula (1K) wherein Q represents Q5, $R^1$ represents a methyl group, t is 0, $R^{x21}$ represents a hydrogen atom, and $R^{x22}$ represents a hydrogen atom, or any substituents selected from Group X and Group Y (hereinafter, referred to as "Compound class SX356").

The compound represented by formula (1K) wherein Q represents Q5, $R^1$ represents a chlorine atom, t is 0, $R^{x21}$ represents a hydrogen atom, and $R^{x22}$ represents a hydrogen atom, or any substituents selected from Group X and Group Y (hereinafter, referred to as "Compound class SX357").

The compound represented by formula (1K) wherein Q represents Q1, $R^1$ represents a methyl group, $L^1$ represents $CH_2$, t is 0, $R^{x21}$ represents a methyl group, and $R^{x22}$ represents a hydrogen atom, or any substituents selected from Group X and Group Y (hereinafter, referred to as "Compound class SX358").

The compound represented by formula (1K) wherein Q represents Q1, $R^1$ represents a chlorine atom, $L^1$ represents $CH_2$, t is 0, $R^{x21}$ represents a methyl group, and $R^{x22}$ represents a hydrogen atom, or any substituents selected from Group X and Group Y (hereinafter, referred to as "Compound class SX359").

The compound represented by formula (1K) wherein Q represents Q1, $R^1$ represents a methyl group, $L^1$ represents an oxygen atom, t is 0, $R^{x21}$ represents a methyl group, and $R^{x22}$ represents a hydrogen atom, or any substituents selected from Group X and Group Y (hereinafter, referred to as "Compound class SX360").

The compound represented by formula (1K) wherein Q represents Q1, $R^1$ represents a chlorine atom, $L^1$ represents an oxygen atom, t is 0, $R^{x21}$ represents a methyl group, and $R^{x22}$ represents a hydrogen atom, or any substituents selected from Group X and Group Y (hereinafter, referred to as "Compound class SX361").

The compound represented by formula (1K) wherein Q represents Q2, $R^1$ represents a hydrogen atom, t is 0, $R^{x21}$ represents a methyl group, and $R^{x22}$ represents a hydrogen atom, or any substituents selected from Group X and Group Y (hereinafter, referred to as "Compound class SX362").

The compound represented by formula (1K) wherein Q represents Q3, $R^1$ represents a methyl group, $L^2$ represents an oxygen atom, t is 0, $R^{x21}$ represents a methyl group, and $R^{x22}$ represents a hydrogen atom, or any substituents selected from Group X and Group Y (hereinafter, referred to as "Compound class SX363").

The compound represented by formula (1K) wherein Q represents Q3, $R^1$ represents a chlorine atom, $L^2$ represents an oxygen atom, t is 0, $R^{x21}$ represents a methyl group, and $R^{x22}$ represents a hydrogen atom, or any substituents selected from Group X and Group Y (hereinafter, referred to as "Compound class SX364").

The compound represented by formula (1K) wherein Q represents Q3, $R^1$ represents a methyl group, $L^2$ represents NH, t is 0, $R^{x21}$ represents a methyl group, and $R^{x22}$ represents a hydrogen atom, or any substituents selected from Group X and Group Y (hereinafter, referred to as "Compound class SX365").

The compound represented by formula (1K) wherein Q represents Q3, $R^1$ represents a chlorine atom, $L^2$ represents NH, t is 0, $R^{x21}$ represents a methyl group, and $R^{x22}$ represents a hydrogen atom, or any substituents selected from Group X and Group Y (hereinafter, referred to as "Compound class SX366").

The compound represented by formula (1K) wherein Q represents Q4, $R^1$ represents a methyl group, $R^3$ represents a methoxy group, t is 0, $R^{x21}$ represents a methyl group, and $R^{x22}$ represents a hydrogen atom, or any substituents selected from Group X and Group Y (hereinafter, referred to as "Compound class SX367").

The compound represented by formula (1K) wherein Q represents Q4, $R^1$ represents a chlorine atom, $R^3$ represents a methoxy group, t is 0, $R^{x21}$ represents a methyl group, and $R^{x22}$ represents a hydrogen atom, or any substituents selected from Group X and Group Y (hereinafter, referred to as "Compound class SX368").

The compound represented by formula (1K) wherein Q represents Q4, $R^1$ represents a methyl group, $R^3$ represents a difluoromethyl group, t is 0, $R^{x21}$ represents a methyl group, and $R^{x22}$ represents a hydrogen atom, or any substituents selected from Group X and Group Y (hereinafter, referred to as "Compound class SX369").

The compound represented by formula (1K) wherein Q represents Q4, $R^1$ represents a chlorine atom, $R^3$ represents a difluoromethyl group, t is 0, $R^{x21}$ represents a methyl group, and $R^{x22}$ represents a hydrogen atom, or any substituents selected from Group X and Group Y (hereinafter, referred to as "Compound class SX370").

The compound represented by formula (1K) wherein Q represents Q5, $R^1$ represents a methyl group, t is 0, $R^{x21}$ represents a methyl group, and $R^{x22}$ represents a hydrogen atom, or any substituents selected from Group X and Group Y (hereinafter, referred to as "Compound class SX371").

The compound represented by formula (1K) wherein Q represents Q5, $R^1$ represents a chlorine atom, t is 0, $R^{x21}$ represents a methyl group, and $R^{x22}$ represents a hydrogen atom, or any substituents selected from Group X and Group Y (hereinafter, referred to as "Compound class SX372").

The compound represented by formula (1K) wherein Q represents Q1, $R^1$ represents a methyl group, $L^1$ represents $CH_2$, t is 0, $R^{x21}$ represents a hydrogen atom, and $R^{x22}$ represents a hydrogen atom, or any substituents selected from Group X and Group Y (hereinafter, referred to as "Compound class SX373").

The compound represented by formula (1K) wherein Q represents Q1, $R^1$ represents a chlorine atom, $L^1$ represents $CH_2$, t is 0, $R^{x21}$ represents a hydrogen atom, and $R^{x22}$ represents a hydrogen atom, or any substituents selected from Group X and Group Y (hereinafter, referred to as "Compound class SX374").

The compound represented by formula (1K) wherein Q represents Q1, $R^1$ represents a methyl group, $L^1$ represents an oxygen atom, t is 0, $R^{x21}$ represents a hydrogen atom, and $R^{x22}$ represents a hydrogen atom, or any substituents selected from Group X and Group Y (hereinafter, referred to as "Compound class SX375").

The compound represented by formula (1K) wherein Q represents Q1, $R^1$ represents a chlorine atom, $L^1$ represents an oxygen atom, t is 0, $R^{x21}$ represents a hydrogen atom, and $R^{x22}$ represents a hydrogen atom, or any substituents selected from Group X and Group Y (hereinafter, referred to as "Compound class SX376").

The compound represented by formula (1K) wherein Q represents Q2, $R^1$ represents a hydrogen atom, t is 0, $R^{x21}$ represents a hydrogen atom, and $R^{x22}$ represents a hydrogen atom, or any substituents selected from Group X and Group Y (hereinafter, referred to as "Compound class SX377").

The compound represented by formula (1K) wherein Q represents Q3, $R^1$ represents a methyl group, $L^2$ represents an oxygen atom, t is 0, $R^{x21}$ represents a hydrogen atom, and $R^{x22}$ represents a hydrogen atom, or any substituents selected from Group X and Group Y (hereinafter, referred to as "Compound class SX378").

The compound represented by formula (1K) wherein Q represents Q3, $R^1$ represents a chlorine atom, $L^2$ represents an oxygen atom, t is 0, $R^{x21}$ represents a hydrogen atom, and $R^{x22}$ represents a hydrogen atom, or any substituents selected from Group X and Group Y (hereinafter, referred to as "Compound class SX379").

The compound represented by formula (1K) wherein Q represents Q3, $R^1$ represents a methyl group, $L^2$ represents NH, t is 0, $R^{x21}$ represents a hydrogen atom, and $R^{x22}$ represents a hydrogen atom, or any substituents selected from Group X and Group Y (hereinafter, referred to as "Compound class SX380").

The compound represented by formula (1K) wherein Q represents Q3, $R^1$ represents a chlorine atom, $L^2$ represents NH, t is 0, $R^{x21}$ represents a hydrogen atom, and $R^{x22}$ represents a hydrogen atom, or any substituents selected from Group X and Group Y (hereinafter, referred to as "Compound class SX381").

The compound represented by formula (1K) wherein Q represents Q4, $R^1$ represents a methyl group, $R^3$ represents a methoxy group, t is 0, $R^{x21}$ represents a hydrogen atom, and $R^{x22}$ represents a hydrogen atom, or any substituents selected from Group X and Group Y (hereinafter, referred to as "Compound class SX382").

The compound represented by formula (1K) wherein Q represents Q4, $R^1$ represents a chlorine atom, $R^3$ represents a methoxy group, t is 0, $R^{x21}$ represents a hydrogen atom, and $R^{x22}$ represents a hydrogen atom, or any substituents selected from Group X and Group Y (hereinafter, referred to as "Compound class SX383").

The compound represented by formula (1K) wherein Q represents Q4, $R^1$ represents a methyl group, $R^3$ represents a difluoromethyl group, t is 0, $R^{x21}$ represents a hydrogen atom, and $R^{x22}$ represents a hydrogen atom, or any substituents selected from Group X and Group Y (hereinafter, referred to as "Compound class SX384").

The compound represented by formula (1K) wherein Q represents Q4, $R^1$ represents a chlorine atom, $R^3$ represents a difluoromethyl group, t is 0, $R^{x21}$ represents a hydrogen atom, and $R^{x22}$ represents a hydrogen atom, or any substituents selected from Group X and Group Y (hereinafter, referred to as "Compound class SX385").

The compound represented by formula (1K) wherein Q represents Q5, $R^1$ represents a methyl group, t is 0, $R^{x21}$ represents a hydrogen atom, and $R^{x22}$ represents a hydrogen atom, or any substituents selected from Group X and Group Y (hereinafter, referred to as "Compound class SX386").

The compound represented by formula (1K) wherein Q represents Q5, $R^1$ represents a chlorine atom, t is 0, $R^{x21}$ represents a hydrogen atom, and $R^{x22}$ represents a hydrogen atom, or any substituents selected from Group X and Group Y (hereinafter, referred to as "Compound class SX387").

The compound represented by formula (1K) wherein Q represents Q1, $R^1$ represents a methyl group, $L^1$ represents $CH_2$, t is 1, $R^{x21}$ represents a methyl group, and $R^{x22}$ represents a hydrogen atom, or any substituents selected from Group X and Group Y (hereinafter, referred to as "Compound class SX388").

The compound represented by formula (1K) wherein Q represents Q1, $R^1$ represents a chlorine atom, $L^1$ represents $CH_2$, t is 1, $R^{x21}$ represents a methyl group, and $R^{x22}$ represents a hydrogen atom, or any substituents selected from Group X and Group Y (hereinafter, referred to as "Compound class SX389").

The compound represented by formula (1K) wherein Q represents Q1, $R^1$ represents a methyl group, $L^1$ represents an oxygen atom, t is 1, $R^{x21}$ represents a methyl group, and $R^{x22}$ represents a hydrogen atom, or any substituents selected from Group X and Group Y (hereinafter, referred to as "Compound class SX390").

The compound represented by formula (1K) wherein Q represents Q1, $R^1$ represents a chlorine atom, $L^1$ represents an oxygen atom, t is 1, $R^{x21}$ represents a methyl group, and $R^{x22}$ represents a hydrogen atom, or any substituents selected from Group X and Group Y (hereinafter, referred to as "Compound class SX391").

The compound represented by formula (1K) wherein Q represents Q2, $R^1$ represents a hydrogen atom, t is 1, $R^{x21}$ represents a methyl group, and $R^{x22}$ represents a hydrogen atom, or any substituents selected from Group X and Group Y (hereinafter, referred to as "Compound class SX392").

The compound represented by formula (1K) wherein Q represents Q3, $R^1$ represents a methyl group, $L^2$ represents an oxygen atom, t is 1, $R^{x21}$ represents a methyl group, and $R^{x22}$ represents a hydrogen atom, or any substituents selected from Group X and Group Y (hereinafter, referred to as "Compound class SX393").

The compound represented by formula (1K) wherein Q represents Q3, $R^1$ represents a chlorine atom, $L^2$ represents an oxygen atom, t is 1, $R^{x21}$ represents a methyl group, and $R^{x22}$ represents a hydrogen atom, or any substituents selected from Group X and Group Y (hereinafter, referred to as "Compound class SX394").

The compound represented by formula (1K) wherein Q represents Q3, $R^1$ represents a methyl group, $L^2$ represents NH, t is 1, $R^{x21}$ represents a methyl group, and $R^{x22}$ represents a hydrogen atom, or any substituents selected from Group X and Group Y (hereinafter, referred to as "Compound class SX395").

The compound represented by formula (1K) wherein Q represents Q3, $R^1$ represents a chlorine atom, $L^2$ represents NH, t is 1, $R^{x21}$ represents a methyl group, and $R^{x22}$ represents a hydrogen atom, or any substituents selected from Group X and Group Y (hereinafter, referred to as "Compound class SX396").

The compound represented by formula (1K) wherein Q represents Q4, $R^1$ represents a methyl group, $R^3$ represents a methoxy group, t is 1, $R^{x21}$ represents a methyl group, and $R^{x22}$ represents a hydrogen atom, or any substituents selected from Group X and Group Y (hereinafter, referred to as "Compound class SX397").

The compound represented by formula (1K) wherein Q represents Q4, $R^1$ represents a chlorine atom, $R^3$ represents a methoxy group, t is 1, $R^{x21}$ represents a methyl group, and $R^{x22}$ represents a hydrogen atom, or any substituents selected from Group X and Group Y (hereinafter, referred to as "Compound class SX398").

The compound represented by formula (1K) wherein Q represents Q4, $R^1$ represents a methyl group, $R^3$ represents a difluoromethyl group, t is 1, $R^{x21}$ represents a methyl group, and $R^{x22}$ represents a hydrogen atom, or any substituents selected from Group X and Group Y (hereinafter, referred to as "Compound class SX399").

The compound represented by formula (1K) wherein Q represents Q4, $R^1$ represents a chlorine atom, $R^3$ represents a difluoromethyl group, t is 1, $R^{x21}$ represents a methyl group, and $R^{x22}$ represents a hydrogen atom, or any substituents selected from Group X and Group Y (hereinafter, referred to as "Compound class SX400").

The compound represented by formula (1K) wherein Q represents Q5, $R^1$ represents a methyl group, t is 1, $R^{x21}$ represents a methyl group, and $R^{x22}$ represents a hydrogen atom, or any substituents selected from Group X and Group Y (hereinafter, referred to as "Compound class SX401").

The compound represented by formula (1K) wherein Q represents Q5, $R^1$ represents a chlorine atom, t is 1, $R^{x21}$ represents a methyl group, and $R^{x22}$ represents a hydrogen atom, or any substituents selected from Group X and Group Y (hereinafter, referred to as "Compound class SX402").

Next, the formulation examples are shown below. In the formulation examples, the "parts" represents "part by weight" unless otherwise specified. The present compound S represents the compounds described in the Compound Classes SX1 to SX402.

Formulation Example 1

Fifty (50) parts of any one of the present compound S, 3 parts of calcium lignin sulfonate, 2 parts of sodium lauryl sulfate, and 45 parts of wet silica are well mixed-grinding to obtain a formulation.

Formulation Example 2

Twenty (20) parts of any one of the present compound S, 1.5 parts of sorbitan trioleate are mixed with 28.5 parts of an aqueous solution containing 2 parts of polyvinyl alcohol, and the mixture is then finely-ground by a wet grinding method. To the mixture is then added 40 parts of an aqueous solution containing 0.05 parts of xanthan gum and 0.1 parts of magnesium aluminum silicate, and 10 parts of propylene glycol is further added thereto. The mixture is stirred to obtain a formulation.

Formulation Example 3

Two (2) parts of any one of the present compound S, 88 parts of kaolin clay and 10 parts of talc are mixed-grinding to obtain a formulation.

Formulation Example 4

Five (5) parts of any one of the present compound S, 14 parts of polyoxyethylene styryl phenyl ether, 6 parts of calcium dodecylbenzene sulfonate and 75 parts of xylene are well mixed to obtain a formulation.

Formulation Example 5

Five (5) parts of any one of the present compound S, 1 part of wet silica, 2 parts of calcium lignosulfonate, 30 parts of bentonite and 65 parts of kaolin clay are mixed-grinding, and thereto is added water, and the mixture is well kneaded and is then granulated and dried to obtain a formulation.

Formulation Example 6

Thirty five (35) parts of a mixture of ammonium polyoxyethylene alkyl ether sulfate and wet silica (weight ratio: 1:1), 20 parts of any one of the present compound S, and 45 parts of water are well mixed to obtain a formulation.

Next, Test Examples are described.

Test Example 1

A soybean leaf (cv; Kurosengoku) was punched out to 1 cm diameter to prepare a leaf disk. Each 1 mL of 1.2% agar medium was dispensed in 24 well microplate. A piece of the leaf disk was placed on each well. To a mixture of 0.5 μL of Sorpol (registered trademark) 1200KX, 4.5 μL of DMSO, and 5 μL of xylene was added 20 μL of a solution containing 10,000 ppm of the test compound in DMSO. The resulting mixture was diluted with ion exchange water to prepare a spray solution containing a predetermined concentration of the test compound. The spray solution was sprayed in 10 μL per one leaf disk. After 1 day, an aqueous suspension of spores of soybean rust fungus (*Phakopsora pachyrhizi*) having an amino acid substitution of F129L on mitochondrial cytochrome b protein ($1.0 \times 10^5$/mL) was inoculated onto the leaf disks. After the inoculation, the microplate was placed in a growth chamber (light on for 6 hours, light off for 18 hours, 23° C. temperature, 60% humidity). After 1 day, the leaf disks were air-dried to disappear water droplets on the surface of the leaf disk, and the microplate was placed again in the growth chamber for 10 to 14 days. Thereafter, a lesion area of soybean rust disease was assessed. As a result, in all cases, the lesion areas of the leaf disk on which any one of the present compounds 6 to 12, 15, 18, 23, 27 to 29, 31, 33, 36, 37, 44 or 45 or the compounds 1, 2, 4 to 6 or 9 of the present invention was applied as a test compound at 50 ppm was shown to 30% or less of the lesion area of the untreated leaf disk. Here the untreated means that the spray solution containing the test compound was not sprayed onto the leaf disk.

Test Example 2

A soybean leaf (cv; Kurosengoku) was punched out to 1 cm diameter to prepare a leaf disk. Each 1 mL of 1.2% agar medium was dispensed in 24 well microplate. A piece of the leaf disk was placed on each well. To a mixture of 0.5 μL of Sorpol (registered trademark) 1200KX, 4.5 μL of DMSO, and 5 μL of xylene was added 20 μL of a solution containing 10,000 ppm of the test compound in DMSO. The resulting mixture was diluted with ion exchange water to prepare a spray solution containing a predetermined concentration of the test compound. The spray solution was sprayed in 10 μL per one leaf disk. After 1 day, an aqueous suspension of spores of soybean rust fungus (*Phakopsora pachyrhizi*) having an amino acid substitution of F129L on mitochondrial cytochrome b protein ($1.0\times10^5$/mL) was inoculated onto the leaf disks. After the inoculation, the microplate was placed in a growth chamber (light on for 6 hours, light off for 18 hours, 23° C. temperature, 60% humidity). After 1 day, the leaf disks were air-dried to disappear water droplets on the surface of the leaf disk, and the microplate was placed again in the growth chamber for 10 to 14 days. Thereafter, a lesion area of soybean rust disease was assessed. As a result, in all cases, the lesion areas of the leaf disk on which any one of the present compounds 11, 15, 18, 23, 27, 28, 31 or 37 or the compounds 1, 2 or 9 of the present invention was applied as a test compound at 12.5 ppm was shown to 30% or less of the lesion area of the untreated leaf disk. Here the untreated means that the spray solution containing the test compound was not sprayed onto the leaf disk.

Comparative Test Example 1

The test was conducted by using as a test compound the compound 1, 4 or 9 of the present invention, the present compound 7, 8, 15, 18, 23, 31 or 37, pyribencarb, azoxystrobin, dimoxystrobin, metominostrobin, Fluoxastrobin, or Kresoxim-methyl at 50 ppm according to a method described in the Test Example 1. The results are indicated in [Table A] and [Table B].

TABLE A

| Compound | Lesion area (%) at 50 ppm |
|---|---|
| 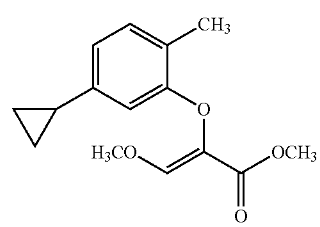 [SMILES: CO/C=C(\Oc1cc(C2CC2)ccc1C)C(=O)OC]  Compound 1 of the present invention | 0 |
| 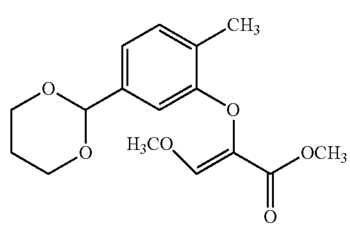 [SMILES: CO/C=C(\Oc1cc(C2OCCCO2)ccc1C)C(=O)OC]  Compound 4 of the present invention | 10 |
| 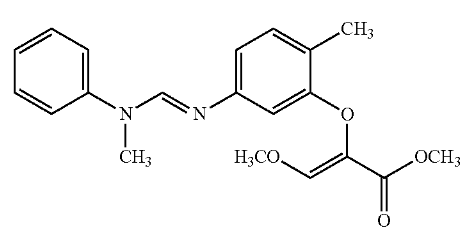 [SMILES: CO/C=C(\Oc1cc(/N=C/N(C)c2ccccc2)ccc1C)C(=O)OC]  Compound 9 of the present invention | 10 |

TABLE A-continued

| Compound | Lesion area (%) at 50 ppm |
|---|---|
| Present Compound 7 | 10 |
| Present Compound 8 | 10 |
| Present Compound 15 | 0 |
| Present Compound 18 | 0 |
| Present Compound 23 | 0 |
| Present Compound 31 | 0 |

TABLE A-continued

| Compound | Lesion area (%) at 50 ppm |
|---|---|
| Present Compound 37 | 10 |

TABLE B

| Compound | Lesion area (%) at 50 ppm |
|---|---|
| Pyribencarb | 100 |
| Azoxystrobin | 100 |
| Dimoxystrobin | 100 |
| Metominostrobin | 100 |

TABLE B-continued

| Compound | Lesion area (%) at 50 ppm |
|---|---|
| Fluoxastrobin | 100 |
| Kresoxim-methyl | 100 |

The above-indicated results suggests that the present compound or the compound of the present invention has superior efficacies for soybean rust fungus having an amino acid substitution of F129L in comparison with various commercially available QoI fungicides.

INDUSTRIAL APPLICABILITY

The present compound, the compound of the present invention, or the composition A has efficacies for controlling soybean rust fungus having an amino acid substitution of F129L on mitochondrial cytochrome b protein.

The invention claimed is:

1. A method for controlling a soybean rust fungus having an amino acid substitution of F129L on mitochondrial cytochrome b protein, the method comprising:
applying an effective amount of at least one compound selected from the group consisting of 2. Compounds represented by the following formulas

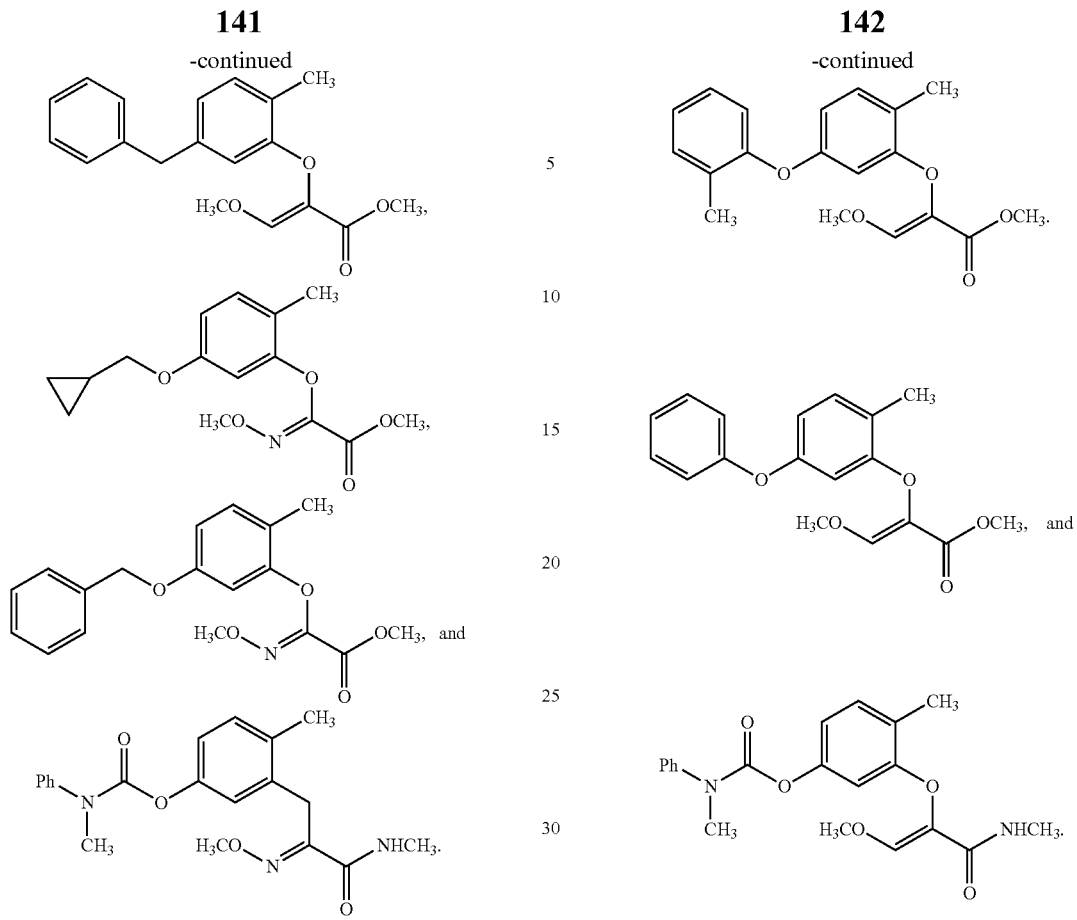

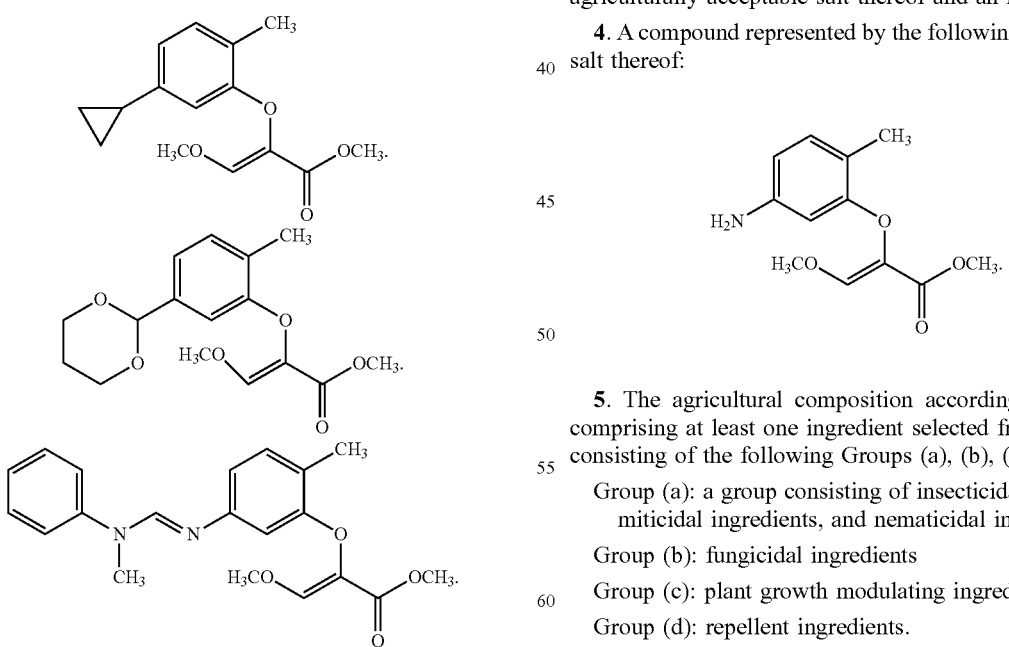

3. An agricultural composition, comprising at least one compound of claim 2 or its N-oxide compound or an agriculturally acceptable salt thereof and an inert carrier.

4. A compound represented by the following formula or a salt thereof:

5. The agricultural composition according to claim 3, comprising at least one ingredient selected from the group consisting of the following Groups (a), (b), (c) and (d):

Group (a): a group consisting of insecticidal ingredients, miticidal ingredients, and nematicidal ingredients;

Group (b): fungicidal ingredients

Group (c): plant growth modulating ingredients; and

Group (d): repellent ingredients.

* * * * *